US009563341B2

(12) United States Patent
Crandall

(10) Patent No.: US 9,563,341 B2
(45) Date of Patent: Feb. 7, 2017

(54) DATA SHARING

(71) Applicant: Jerry Alan Crandall, Reno, NV (US)

(72) Inventor: Jerry Alan Crandall, Reno, NV (US)

(*) Notice: Subject to any disclaimer, the term of this patent is extended or adjusted under 35 U.S.C. 154(b) by 0 days.

(21) Appl. No.: 14/985,216

(22) Filed: Dec. 30, 2015

(65) Prior Publication Data

US 2016/0110075 A1    Apr. 21, 2016

Related U.S. Application Data

(63) Continuation of application No. 14/067,856, filed on Oct. 30, 2013.

(60) Provisional application No. 61/802,400, filed on Mar. 16, 2013.

(51) Int. Cl.

| | |
|---|---|
| G06F 3/00 | (2006.01) |
| G06F 3/0484 | (2013.01) |
| H04L 29/06 | (2006.01) |
| G06F 3/0488 | (2013.01) |
| H04B 7/26 | (2006.01) |
| G06F 3/041 | (2006.01) |
| G06F 3/14 | (2006.01) |
| G09G 5/12 | (2006.01) |
| H04L 29/08 | (2006.01) |
| G06F 1/16 | (2006.01) |

(52) U.S. Cl.
CPC ......... *G06F 3/04842* (2013.01); *G06F 3/041* (2013.01); *G06F 3/0488* (2013.01); *G06F 3/04883* (2013.01); *G06F 3/1454* (2013.01); *G09G 5/12* (2013.01); *H04B 7/26* (2013.01); *H04L 65/1093* (2013.01); *H04L 65/403* (2013.01); *H04L 67/06* (2013.01); *G06F 1/1694* (2013.01); *G09G 2354/00* (2013.01); *G09G 2370/16* (2013.01)

(58) Field of Classification Search
CPC ..... H04L 65/403; H04L 67/06; G06F 3/04842
USPC .......................................................... 715/753
See application file for complete search history.

(56) References Cited

U.S. PATENT DOCUMENTS

| | | | | |
|---|---|---|---|---|
| 6,813,630 | B1* | 11/2004 | Sanamrad | G06F 3/0231 |
| | | | | 345/156 |
| 6,910,194 | B2* | 6/2005 | Mielke | G06F 17/5031 |
| | | | | 716/113 |
| 6,915,212 | B2* | 7/2005 | Kamps | G01V 1/28 |
| | | | | 702/14 |
| 7,356,569 | B1* | 4/2008 | Kembel | G06F 17/30899 |
| | | | | 707/E17.119 |
| 7,672,993 | B2* | 3/2010 | Creemer | G06Q 30/0226 |
| | | | | 709/203 |
| 8,554,897 | B2* | 10/2013 | Kim | H04L 12/2812 |
| | | | | 709/223 |
| 8,613,070 | B1* | 12/2013 | Borzycki | G06F 21/6218 |
| | | | | 726/8 |
| 8,659,400 | B2* | 2/2014 | Arling | G08C 19/28 |
| | | | | 340/12.23 |

(Continued)

OTHER PUBLICATIONS

ECFR Title 47 Telecommunications-FCC, index 1 pg, retrieved Nov. 2, 2015.

(Continued)

*Primary Examiner* — William Titcomb
(74) *Attorney, Agent, or Firm* — Jerry A. Crandall, Esq.

(57) ABSTRACT

In an embodiment, a method of data sharing is disclosed. The method may include routing a data set to a specific device in response to a data selection and a target selection.

16 Claims, 66 Drawing Sheets

(56) References Cited

U.S. PATENT DOCUMENTS

| | | | |
|---|---|---|---|
| 9,021,071 B2* | 4/2015 | Setnes | G06F 9/5033 709/222 |
| 9,088,663 B2* | 7/2015 | Arling | G06F 3/0486 |
| 9,270,736 B2* | 2/2016 | Luciw | H04L 67/2842 |
| 2002/0087473 A1* | 7/2002 | Harif | G06Q 20/382 705/44 |
| 2002/0087483 A1* | 7/2002 | Harif | G06Q 20/02 705/76 |
| 2002/0143878 A1* | 10/2002 | Birnbaum | G06F 17/30899 709/205 |
| 2004/0148194 A1* | 7/2004 | Wellons | G06Q 10/10 705/2 |
| 2004/0162887 A1* | 8/2004 | Dillon | G05B 19/4185 709/217 |
| 2005/0143016 A1 | 6/2005 | Becker | |
| 2007/0174410 A1 | 7/2007 | Croft | |
| 2008/0045234 A1* | 2/2008 | Reed | H04W 64/006 455/456.1 |
| 2009/0058820 A1 | 3/2009 | Hinckley | |
| 2009/0132070 A1* | 5/2009 | Ebrom | D06F 9/005 700/90 |
| 2009/0140986 A1* | 6/2009 | Karkkainen | G06F 3/0486 345/173 |
| 2009/0160694 A1* | 6/2009 | Di Flora | H04L 12/5895 341/176 |
| 2009/0307339 A1* | 12/2009 | Setnes | G06F 9/5033 709/222 |
| 2010/0014415 A1* | 1/2010 | Moeller | H04L 12/2856 370/216 |
| 2011/0022681 A1* | 1/2011 | Simeonov | G06Q 30/02 709/217 |
| 2011/0098087 A1 | 4/2011 | Tseng | |
| 2012/0062688 A1* | 3/2012 | Shen | G06F 3/04886 348/14.03 |
| 2012/0084698 A1 | 4/2012 | Sirpal | |
| 2012/0086717 A1* | 4/2012 | Liu | G06F 9/4445 345/564 |
| 2012/0092277 A1 | 4/2012 | Momchilov | |
| 2012/0179976 A1* | 7/2012 | Lee | G06F 17/30017 715/748 |
| 2012/0210245 A1* | 8/2012 | McCoy | H04N 21/47 715/747 |
| 2012/0210268 A1* | 8/2012 | Hilbrink | G06F 3/0484 715/773 |
| 2012/0214552 A1 | 8/2012 | Sirpal | |
| 2012/0242702 A1 | 9/2012 | Sirpal | |
| 2012/0262494 A1* | 10/2012 | Choi | G06F 3/0481 345/672 |
| 2012/0272158 A1* | 10/2012 | Weskamp | H04W 4/023 715/748 |
| 2012/0284638 A1* | 11/2012 | Cutler | G06Q 10/00 715/751 |
| 2012/0324368 A1* | 12/2012 | Putz | G06F 3/0486 715/748 |
| 2013/0002532 A1* | 1/2013 | Raffle | G06F 3/1423 345/156 |
| 2013/0069865 A1* | 3/2013 | Hart | H02G 11/00 345/156 |
| 2013/0091014 A1* | 4/2013 | Kellogg | G06Q 30/0256 705/14.54 |
| 2013/0125014 A1* | 5/2013 | Sharif-Ahmadi | G06F 17/30017 715/748 |
| 2013/0174191 A1* | 7/2013 | Thompson, Jr. | G06Q 30/0207 725/23 |
| 2013/0222224 A1* | 8/2013 | Eriksson | G06F 3/1423 345/156 |
| 2013/0238702 A1* | 9/2013 | Sheth | H04L 67/38 709/204 |
| 2014/0013239 A1* | 1/2014 | Kim | H04L 12/2812 715/748 |
| 2014/0053086 A1* | 2/2014 | Kim | H04L 65/403 715/753 |
| 2014/0108793 A1* | 4/2014 | Barton | G06F 21/6218 713/165 |
| 2014/0168453 A1* | 6/2014 | Shoemake | H04N 5/23206 348/207.11 |
| 2014/0244738 A1* | 8/2014 | Rydenhag | G06F 3/1423 709/204 |
| 2014/0244739 A1* | 8/2014 | Gardenfors | H04L 65/403 709/204 |
| 2014/0245140 A1* | 8/2014 | Brown | G06F 3/048 715/708 |
| 2014/0250203 A1* | 9/2014 | Amanieux | G06F 17/30047 709/217 |
| 2014/0250388 A1* | 9/2014 | Goncalves | H04W 4/206 715/753 |
| 2014/0282066 A1* | 9/2014 | Dawson | H04L 65/4038 715/748 |
| 2014/0317493 A1* | 10/2014 | Barman | G06Q 10/10 715/234 |
| 2014/0359477 A1* | 12/2014 | Chen | H04L 67/1095 715/748 |
| 2014/0380187 A1* | 12/2014 | Gardenfors | G06F 3/017 715/748 |
| 2014/0380194 A1* | 12/2014 | Kim | G06F 3/04842 715/753 |
| 2015/0039691 A1* | 2/2015 | Sharma | H04L 65/1016 709/204 |
| 2015/0213517 A1* | 7/2015 | Rothschild | G06Q 30/02 705/14.73 |
| 2015/0244785 A1* | 8/2015 | Kim | H04L 47/25 709/217 |

OTHER PUBLICATIONS

ECFR Title 47—Chapter I—Subchapter A—Part 15—section 15.249—Operation with the wireless Bands, ipg, retrieved Nov. 2, 2015.

* cited by examiner

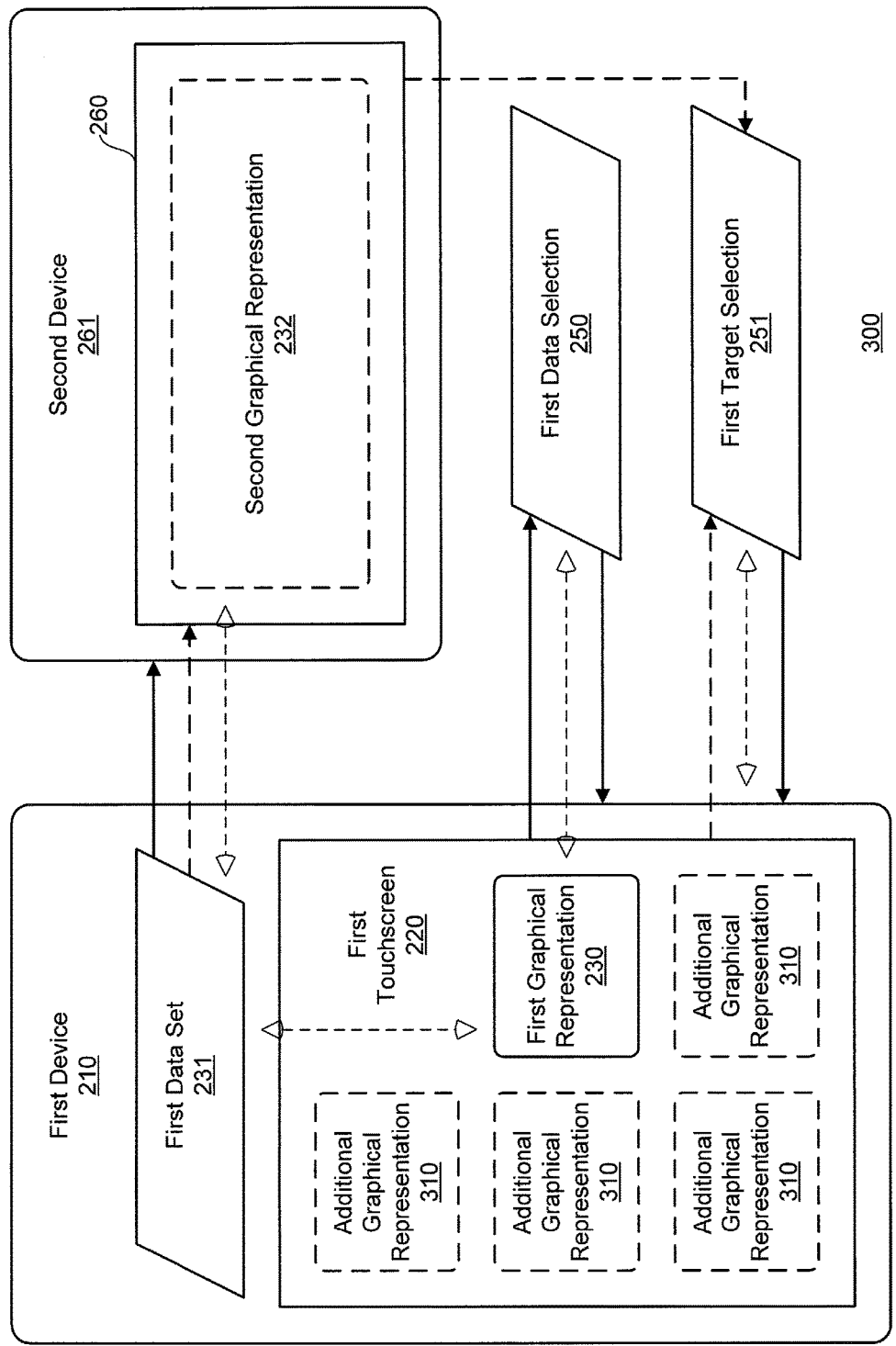

FIG. 12

External Device List 1030 (1100)

| External Display | Device | Connection | Type | Speed | Range | Status | Available Storage |
|---|---|---|---|---|---|---|---|
| First External Display 260 | Second Device 261 | Wired 1121 | USB 2.0 1122 | 480 Mbits/s 1123 | — 1124 | In Use 1125 | 1 TB 1126 |
| Second External Display 1131 | Third Device 1132 | Wireless 1133 | 802.11n 1134 | 54 Mbits/s 1135 | 230 ft 1136 | Not In Use 1137 | 500 GB 1138 |
| ... 1111 | ... 1112 | ... 1113 | ... 1114 | ... 1115 | ... 1116 | ... 1117 | ... 1118 |

1120, 1130, 1110

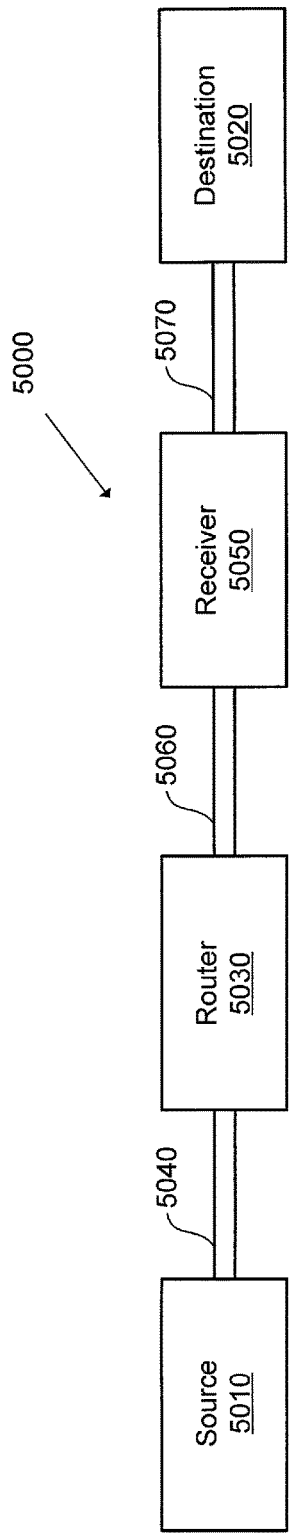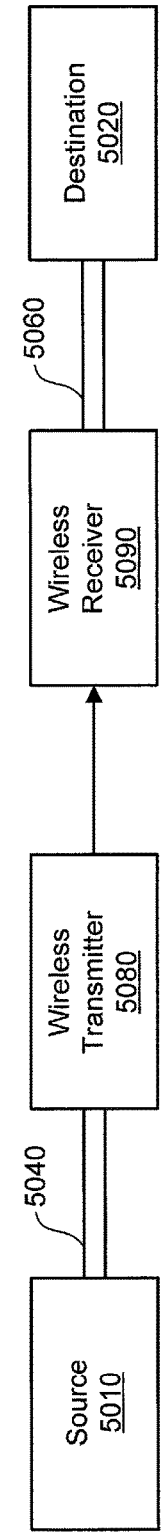
FIG. 50A
FIG. 50B

Wirelessly routing a selected data set to a selected device in response to a flicking or sliding gesture detected at a touchscreen
5510

DATA SHARING

CROSS REFERENCE TO RELATED APPLICATIONS

This application is a continuation of U.S. patent application Ser. No. 14/067,856, filed on Oct. 30, 2013, which claims the benefit of U.S. Provisional Application No. 61/802,400, filed on Mar. 16, 2013. This application claims the benefit of U.S. patent application Ser. No. 14/067,856 and U.S. Provisional Application No. 61/802,400, each of which is hereby incorporated by reference in its entirety.

TECHNICAL FIELD

The present application relates to the field of data sharing.

BACKGROUND

As a result of the modern digital age, the sharing of digital data is becoming increasingly important. For example, many people feel emotionally enriched and connected to others when they are able to electronically share digital images, videos, messages and other data with such individuals. Indeed, in one exemplary scenario, the ability to share files and applications between different electronic devices may be of interest to a significant number of individuals. Consequently, a valuable consumer market is developing for technologies that enable users to quickly and easily share digital data.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In an embodiment, a method of data sharing is disclosed. The method may include or comprise routing a data set to a specific device in response to a data selection and a target selection.

Additionally, in one embodiment, a method of data sharing is disclosed, wherein the method may include or comprise wirelessly routing a selected data set to a selected device in response to a flicking or sliding gesture detected at a touchscreen.

Moreover, in an embodiment, a method of data sharing is disclosed, wherein the method may include or comprise displaying a first graphical representation associated with a first data set on a first touchscreen, wherein a first device may include or comprise the first touchscreen. The method may also include or comprise receiving a first touchscreen input at the first touchscreen, wherein the first touchscreen input indicates a first data selection of the first graphical representation, and accessing a first target selection of a first external display, wherein the first target selection is indicated by a second touchscreen input, and wherein a second device may include or comprise the first external display. The method may further include or comprise wirelessly routing the first data set to the second device in response to the first data and first target selections.

Furthermore, in one embodiment, a method of data sharing is disclosed, wherein the method may include or comprise displaying a first graphical representation associated with a first data set on a first touchscreen, wherein a first device may include or comprise the first touchscreen. The method may also include or comprise utilizing the first touchscreen to identify a first data selection of the first graphical representation and identifying a second device communicatively coupled with the first device, wherein the second device may include or comprise a second touchscreen. The method may further include or comprise accessing a first target selection of the second touchscreen, wherein the second touchscreen is utilized to identify the first target selection, and routing the first data set to the second device in response to the first data and first target selections.

Additionally, in an embodiment, a method of data sharing is disclosed, wherein the method may include or comprise displaying a graphical representation associated with a data set on a touchscreen, wherein a first device may include or comprise the touchscreen. The method may also include or comprise detecting a flicking or sliding gesture along the touchscreen, wherein the flicking or sliding gesture indicates a first data selection of the graphical representation and a first target selection of a second device. The method may further include or comprise wirelessly routing the data set to the second device in response to the first data and first target selections.

Moreover, in one embodiment, a method of data sharing is disclosed, wherein the method may include or comprise displaying a first graphical representation associated with a first data set on a first touchscreen, wherein a first device may include or comprise the first touchscreen. The method may also include or comprise detecting a flicking or sliding gesture along the first touchscreen, wherein the flicking or sliding gesture indicates a first data selection of the first graphical representation and a first target selection of a first external display, and wherein a second device may include or comprise the first external display. The method may further include or comprise wirelessly routing the first data set to the second device in response to the first data and first target selections.

Furthermore, in an embodiment, a data sharing system is disclosed. The data sharing system may include or comprise a touchscreen, a router, and a data sharing control module that is communicatively associated with the touchscreen and the router, wherein the data sharing control module is configured to cause the router to wirelessly route a selected data set to a selected device in response to a flicking or sliding gesture detected at the touchscreen.

Additionally, in one embodiment, a data sharing system is disclosed, wherein the data sharing system may include or comprise a first device, wherein the first device may include or comprise a first touchscreen. The data sharing system may also include or comprise a router and a data sharing control module that is communicatively associated with the first touchscreen and the router. The data sharing control module is configured to enable a display of a first graphical representation that is associated with a first data set on the first touchscreen and enable a detection of a first touchscreen input at the first touchscreen, wherein the first touchscreen input indicates a first data selection of the first graphical representation. The data sharing control module is also configured to access a first target selection of a first external display, wherein the first target selection is indicated by a second touchscreen input, and wherein a second device may include or comprise the first external display. The data sharing control module is further configured to cause the router to wirelessly route the first data set to the second device in response to the first data and first target selections.

Moreover, in an embodiment, a data sharing system is disclosed, wherein the data sharing system may include or comprise a first device, wherein the first device may include or comprise a first touchscreen. The data sharing system may also include or comprise a router and a data sharing control module that is communicatively associated with the first touchscreen and the router. The data sharing control module is configured to enable a display of a first graphical representation that is associated with a first data set on the first touchscreen, utilize the first touchscreen to identify a first data selection of the first graphical representation, and identify a second device that is communicatively coupled with the first device, wherein the second device may include or comprise a second touchscreen. The data sharing control module is also configured to access a first target selection of the second touchscreen, wherein the second touchscreen is utilized to identify the first target selection. The data sharing control module is further configured to cause the router to route the first data set to the second device in response to the first data and first target selections.

Furthermore, in one embodiment, a data sharing system is disclosed, wherein the data sharing system may include or comprise a first device, wherein the first device may include or comprise a touchscreen. The data sharing system may also include or comprise a router and a data sharing control module that is communicatively associated with the touchscreen and the router. The data sharing control module is configured to enable a display of a graphical representation that is associated with a data set on the touchscreen and enable a detection of a flicking or sliding gesture along the touchscreen, wherein the flicking or sliding gesture indicates a first data selection of the graphical representation and a first target selection of a second device. The data sharing control module is also configured to cause the router to wirelessly route the data set to the second device in response to the first data and first target selections.

Additionally, in an embodiment, a data sharing system is disclosed, wherein the data sharing system may include or comprise a first device, wherein the first device may include or comprise a first touchscreen. The data sharing system may also include or comprise a router and a data sharing control module that is communicatively associated with the first touchscreen and the router. The data sharing control module is configured to enable a display of a first graphical representation that is associated with a first data set on the first touchscreen and enable a detection of a flicking or sliding gesture along the first touchscreen, wherein the flicking or sliding gesture indicates a first data selection of the first graphical representation and a first target selection of a first external display, and wherein a second device may include or comprise the first external display. The data sharing control module is also configured to cause the router to wirelessly route the first data set to the second device in response to the first data and first target selections.

DESCRIPTION OF THE DRAWINGS

The accompanying drawings, which are incorporated in and form a part of this specification, illustrate embodiments of the present technology, and, together with the Detailed Description, serve to explain principles discussed below.

FIG. 3 is a block diagram of an exemplary data sharing paradigm in accordance with an embodiment.

FIG. 12 is a diagram of an exemplary external device list configuration in accordance with an embodiment.

FIG. 50A is a block diagram of a first exemplary communication arrangement in accordance with an embodiment.

FIG. 50B is a block diagram of a second exemplary communication arrangement in accordance with an embodiment.

FIG. 55 is a flowchart of a first exemplary method of data sharing in accordance with an embodiment.

Figure 1:
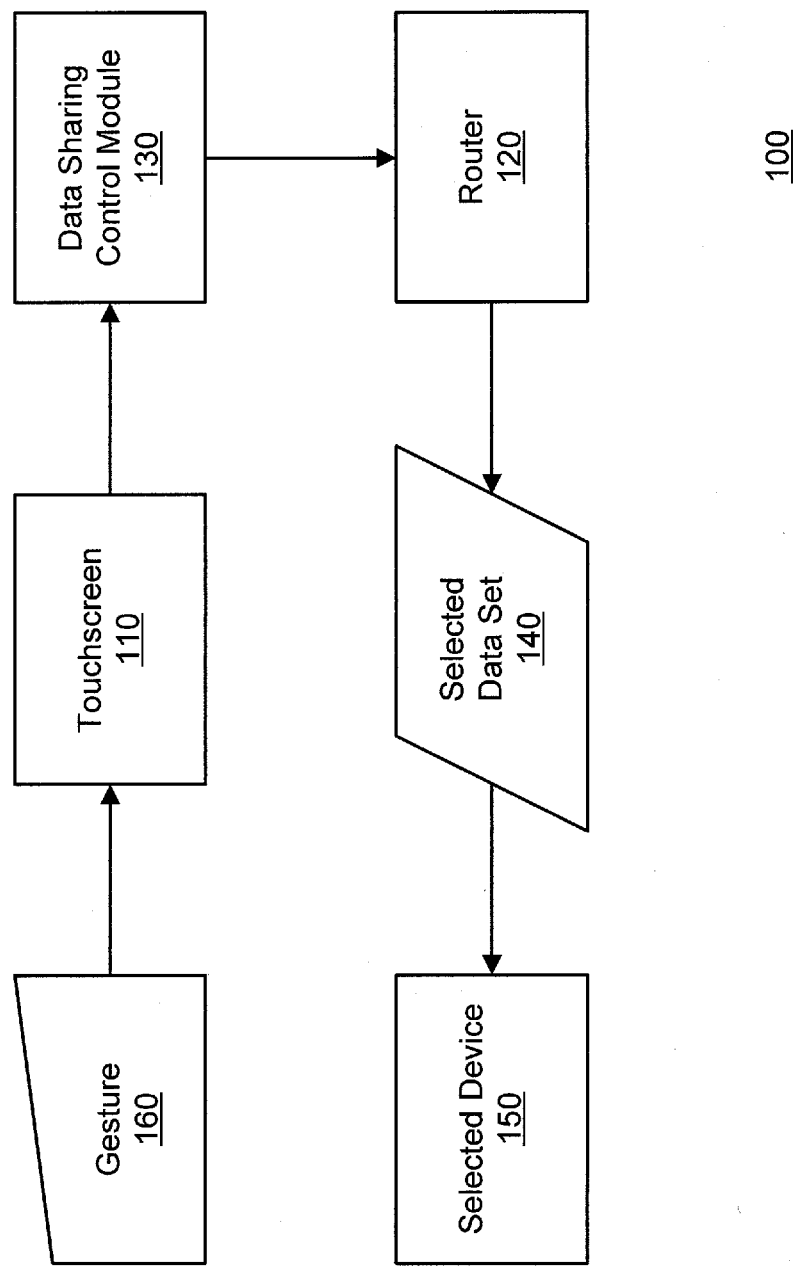
FIG. 1 is a block diagram of a first exemplary data sharing system in accordance with an embodiment.

The drawings referred to in this description are not to be understood as being drawn to scale except if specifically noted, and such drawings are only exemplary in nature.

DETAILED DESCRIPTION

Reference will now be made in detail to embodiments of the present technology, examples of which are illustrated in the accompanying drawings. While the present technology will be described in conjunction with various embodiments, these embodiments are not intended to limit the present technology. Rather, the present technology is to be understood as encompassing various alternatives, modifications and equivalents.

Additionally, it is noted that numerous specific details are set forth herein in order to provide a thorough understanding of the present technology. It is further noted, however, that these specific details are exemplary in nature, and that the present technology may be practiced without these specific details. In other instances, well-known methods, procedures, components, and circuits have not been described in detail so as to not unnecessarily obscure aspects of the exemplary embodiments presented herein.

Moreover, it is noted that discussions throughout the present detailed description that utilize terms indicating that some action or process is to occur may refer to the actions and processes of a computer system, or a similar electronic computing device. For example, the computer system or similar electronic computing device manipulates and transforms data represented as physical (e.g., electronic) quantities within the computer system's registers and memories into other data similarly represented as physical quantities within the computer system memories or registers, or other such information storage, transmission, or display devices. The present technology is also well-suited to the use of other types of computer systems, such as, for example, optical and mechanical computers. Furthermore, for purposes of clarity, the term "module" may be construed as being, for example, a hardware module, a software module, or a combination of a number of hardware modules and/or a number of software modules.

Thus, it is noted that the present technology may be described in the general context of computer-executable instructions, such as program modules, being executed by a computer. Such program modules may include, for example, routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote data storage media and computer memory devices.

The foregoing notwithstanding, it is further noted that terms indicating that some action or process is to occur may refer to manual actions or processes. Indeed, various embodiments of the present technology implement a combination of one or more computer-implemented actions or processes with one or more manual actions or processes. Moreover, one or more of these computer-implemented actions or processes may occur automatically, such as in response to (1) a specific user input, (2) a qualifying factor or parameter or (3) the occurrence of a previous action or process.

Additionally, the term "paradigm" shall not be construed as indicating a previously known understanding of the referenced subject matter. Rather, the term "paradigm" may be construed, for example, as simply referring to an example, arrangement, configuration or model presented in accordance with an embodiment of the present technology. Indeed, the term "paradigm" shall be given its broadest possible meaning, unless otherwise indicated.

Moreover, for purposes of clarity, it is noted that the term "program" may refer, for example, to an algorithm or series of instructions, or alternatively to the act of providing coded instructions for the performance of a particular task. Notwithstanding these exemplary definitions, the term "program" shall be given its broadest possible meaning, unless otherwise indicated.

Furthermore, the term "process" may refer, for example, to an activity whereby a program (or algorithm) is executed, or to a particular instance of a computer program that is being executed. Alternatively, the term "process" may simply refer, for example, to a series of actions taken to achieve a result, or alternatively to the act of performing a series of operations in order to achieve a result. Notwithstanding these exemplary definitions, the term "process" shall be given its broadest possible meaning, unless otherwise indicated.

Additionally, the terminology "computer-readable medium" may be interpreted, for example, as referring to either a transitory or non-transitory computer-readable medium. However, at no time shall the terminology "computer-readable medium" be interpreted as only comprising one or more signals (e.g., one or more transitory, propagating signals) per se. Moreover, in the event that the terminology "computer-readable medium" is interpreted as a "non-transitory computer-readable medium", the resulting terminology "non-transitory computer-readable medium" shall be interpreted as encompassing all computer-readable media with the sole exception being a computer-readable medium that only comprises one or more signals (e.g., one or more transitory, propagating signals) per se.

Moreover, it is noted that the terminology "coupled with" does not necessarily indicate a direct physical relationship. For example, when two components are described as being "coupled with" one another, there may be one or more other parts, materials, etc. (e.g., an adhesive or a signal/transmission line), that are coupled between, attaching, integrating, etc., the two components. As such, the terminology "coupled with" shall be given its broadest possible meaning, unless otherwise indicated.

Furthermore, the terminology "communicatively associated with" does not necessarily indicate a physical relationship. For example, when two components are described as being "communicatively associated with" one another, these components may be configured to communicate with one another, for example, using a wireless and/or wired communication protocol. As such, the terminology "communicatively associated with" shall be given its broadest possible meaning, unless otherwise indicated.

Finally, it is noted that the exemplary units referenced in association with data processing speeds, such as megabits (Mbits) per second (s), are presented herein for purposes of illustration, and that other units may be implemented. For example, a data processing speed may be measured in units of megabytes (MB)/s, gigabits (Gbits)/s, gigabytes (GB)/s, terabits (Tbits), terabytes (TB), etc. Indeed, the present technology is not limited to the implementation of any particular unit of data processing speed.

Overview

In accordance with an exemplary scenario, a digital file, image, video, application or program is stored in a user's smartphone or electronic tablet that the user wants to share with somebody else. Consequently, the user may choose to launch this file, image, video, application or program on the display screen of the smartphone or electronic tablet and angle this screen so that the other individual may view the launched content. It is noted, however, that the display screens of such portable electronic devices may be relatively small as compared, for example, to a large, high-definition television. Indeed, viewing the displayed content on one of these portable devices may involve the viewer being positioned within a few feet of the device in order to be able to effectively view the displayed content on device's relatively small screen. Moreover, it is noted that the quality of the audio speakers of such portable electronic devices may be relatively low as a result of their relatively small size, which could adversely affect the quality of audio associated with the shared content.

In an embodiment of the present technology, however, a user has the option of selecting content with the portable electronic device and then displaying or launching this content on an external device, such as on a large, high-definition television. This enables users to view the content from a greater distance away and with greater ease. Additionally, in so much as the external device may have higher quality audio speakers, sound associated with the content may in fact sound better when such content is launched by the external device than would be the case if such content was instead launched by the portable electronic device. As such, an embodiment provides that a portable electronic device may be utilized to direct an external device to launch selected content to thereby increase the quality of the overall data sharing experience.

Additionally, it is noted that many different methodologies may be implemented to select the content to be shared as well as the specific external device that will be implemented. In one embodiment, the user is able to touch an icon on the display screen of the portable electronic device and then "slide" or "flick" this icon in a direction associated with an external device to thereby cause the image or video associated with such icon to be stored in and/or displayed by this external device. For example, a user may flick an icon in a direction of a large, high-definition television to thereby cause the content associated with this icon to be wirelessly routed to and/or launched by the television. It is noted that this simple data sharing gesture may therefore be implemented to increase the ease with which data may be shared between different electronic devices. Indeed, an exemplary implementation provides that a user is able to launch content on an external display located across an entire room (or across an even longer distance) with a simple flick of a finger.

Moreover, it is noted that the content to be shared may be stored within the portable electronic device itself and then routed to the selected external device, such as using a wired or wireless communication protocol. In one embodiment, however, this content is already stored within the selected external device, or in one or more data storage units (e.g., a backup drive or "cloud" storage) accessible by the selected external device, such that the selected external device may access this content from a data source that is distinct from the portable electronic device upon receiving a data sharing instruction corresponding to such content. Furthermore, an embodiment provides that files, documents, applications and/or programs stored in different locations, respectively, may be accessed from such different locations (irrespective of whether such files, documents, applications and/or programs are accessible on the same network, and irrespective of whether such files, documents, applications and/or programs are accessible on different networks, respectively).

Various exemplary embodiments of the present technology will now be discussed. It is noted, however, that the present technology is not limited to these exemplary embodiments, and that the present technology also includes obvious variations of the exemplary embodiments and implementations described herein. It is further noted that various well-known components are generally not illustrated in the drawings so as to not unnecessarily obscure various principles discussed herein, but that such well-known components may be implemented by those skilled in the art to practice various embodiments of the present technology.

Exemplary Systems and Configurations

Various exemplary systems and configurations for implementing various embodiments of the present technology will now be described. However, the present technology is not limited to these exemplary systems and configurations. Indeed, other systems and configurations may be implemented.

I. Data Sharing

With reference now to FIG. 1, a first exemplary data sharing system 100 in accordance with an embodiment is shown. First exemplary data sharing system 100 includes a touchscreen 110, a router 120 and a data sharing control module 130, wherein data sharing control module 130 is communicatively associated or coupled with touchscreen 110, and wherein data sharing control module 130 is communicatively associated or coupled with router 120. Data sharing control module 130 is configured to cause router 120 to route (e.g., wirelessly route) a selected data set 140 to a selected device 150 in response to a gesture 160 (e.g., a flicking or sliding gesture) detected at touchscreen 110.

In an embodiment, touchscreen 110 is physically separated from selected device 150. For example, touchscreen 110 may be included within a mobile device (e.g., an electronic tablet, personal digital assistant (PDA) or smartphone) while selected device 150 may be an external device (e.g., an external storage device, a computer monitor or a television screen). Thus, it is noted that selected data set 140 may be routed from a first device to a second device, such as wirelessly or through a selected communication network.

Additionally, one embodiment provides that gesture 160 (e.g., a flicking or sliding gesture) indicates both of selected data set 140 and selected device 150. As such, a single gesture can be implemented to select a data set, select an external target, and route the selected data set to such external target, thereby increasing the relative ease with which a user is able to share data. For example, a particular device is identified as an available device during a device identification process, which will be further explored herein. Upon or subsequent to the identification of this available device, gesture 160 moves across touchscreen 110 such that (1) an icon displayed at a first location on touchscreen 110 is selected, wherein this icon corresponds to a specific data set (e.g., a data set pertaining to a particular electronic file or application) such that this data set is selected based on the selection of such icon, and (2) the available device is selected based on gesture 160 engaging a second location on touchscreen 110, wherein this second location (and possibly also the aforementioned first location) enable data sharing control module 130 to identify this available device as a selected device. For purposes of further illustration, it is noted that such a device selection process will be further explored herein.

The foregoing notwithstanding, it is noted that the present technology is not limited to a particular type of gesture. For example, gesture 160 may be a flicking or sliding gesture, such as a flicking or sliding gesture applied by a user and detected by touchscreen 110. Pursuant to a second example, gesture 160 is a touching gesture, such as a single touch or multi-touch input (e.g., a single, double or triple touch), which may be applied by a user and detected by touchscreen 110. However, other types of gestures may also be implemented.

Figure 2A:
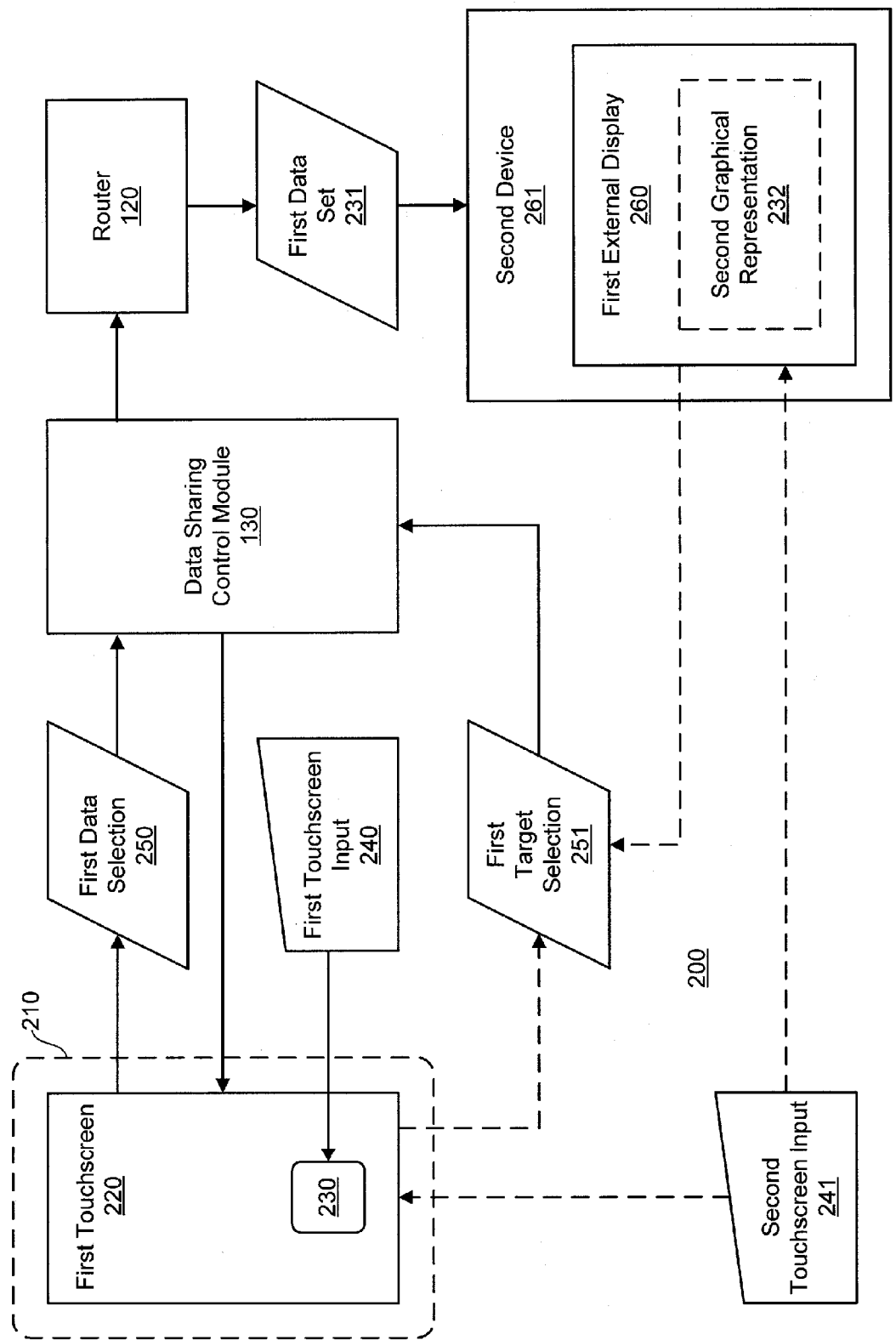
FIG. 2A is a block diagram of a second exemplary data sharing system in accordance with an embodiment.

With reference now to FIG. 2A, a second exemplary data sharing system 200 in accordance with an embodiment is shown. Second exemplary data sharing system 200 includes a first device 210 and router 120, wherein first device 210 includes a first touchscreen 220. Second exemplary data sharing system 200 also includes data sharing control module 130, wherein data sharing control module 130 (e.g., a data sharing software module, hardware module or device) is communicatively associated or coupled with both of first touchscreen 220 and router 120. Data sharing control module 130 is configured to enable a display of a first graphical representation 230 associated with a first data set 231 on first touchscreen 220.

Figure 2B:
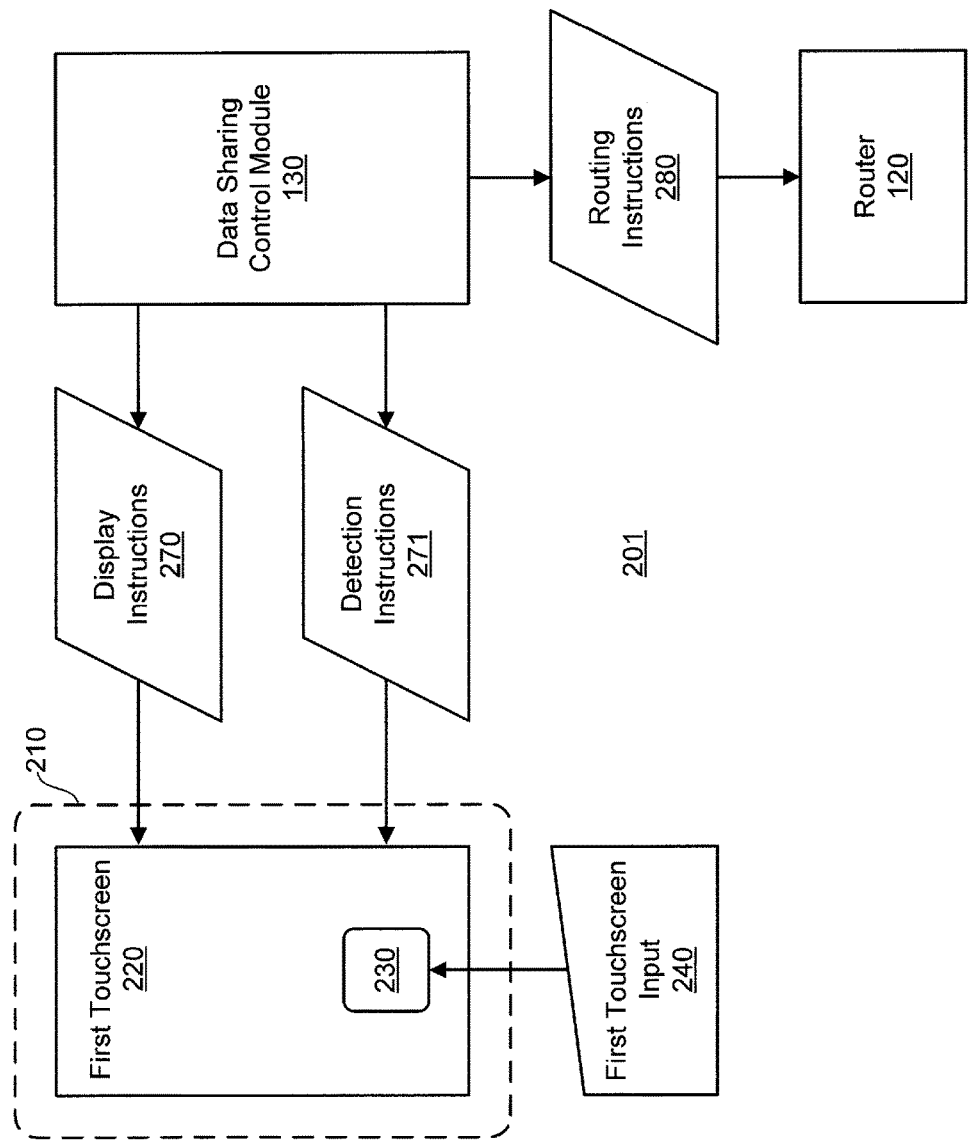
FIG. 2B is a block diagram of an exemplary data sharing control system in accordance with an embodiment.

For example, and with reference now to FIG. 2B, an exemplary data sharing control system 201 in accordance with an embodiment is shown. In particular, data sharing control module 130 is configured to generate display instructions 270 and then provide these display instructions 270 to first touchscreen 220. As a result of receiving display instructions 270, first touchscreen 220 displays first graphical representation 230. Indeed, in one embodiment, first graphical representation 230 is displayed at a particular location on first touchscreen 220 based on display instructions 270.

In an embodiment, first graphical representation 230 includes a thumbnail image or icon representing first data set 231. For example, first data set 231 may include data representing a digital image, and first graphical representation 230 may include a thumbnail image (e.g., a smaller, lower-resolution image) of at least a portion of this digital image. In a second example, first data set 231 may include computer-readable instructions that when executed causes a program or application to be launched, and first graphical representation 230 may include an icon (e.g., a brand logo or trademark) corresponding to this program or application. It is noted, however, that the present technology is not limited to the implementation of a thumbnail image or icon. Indeed, in one embodiment, first graphical representation 230 includes a graphical representation other than a thumbnail image or icon, wherein such graphical representation represents first data set 231.

Moreover, one embodiment provides that first data set 231 includes a digital audio file, digital image file, digital video file or digital software application. It is noted, however, that the present technology is not limited to such a digital audio file, digital image file, digital video file or digital software application. Indeed, in one embodiment, first data set 231 includes information or data that does not correspond to a digital audio file, digital image file, digital video file or digital software application.

With reference still to FIG. 2A, data sharing control module 130 is also configured to utilize first touchscreen 220 to identify a first data selection 250 of first graphical representation 230. For example, an embodiment provides that data sharing control module 130 is configured to enable a detection of a first touchscreen input 240 at first touchscreen 220, wherein first touchscreen input 240 indicates first data selection 250 of first graphical representation 230. Indeed, and with reference to both of FIGS. 2A and 2B, it is noted that data sharing control module 130 may be configured to generate detection instructions 271 and transmit detection instructions 271 to first touchscreen 220, wherein detection instructions 271 cause first touchscreen 220 to be prepared to detect first touchscreen input 240. Upon or subsequent to detecting first touchscreen input 240, first touchscreen 220 may generate first data selection 250 and transmit first data selection 250 to data sharing control module 130.

To further illustrate, consider the example where first data set 231 includes, or corresponds to, a file or application represented by first graphical representation 230. In response to a user touching first graphical representation 230, in order to thereby select this file or application, first data selection 250 is generated by first touchscreen 220, wherein first data selection 250 reflects the user's selection of this file or application.

In an embodiment, a flicking or sliding gesture enables first touchscreen input 240 to be identified, such as discussed herein. In particular, data sharing control module 130 is configured to enable a detection of the flicking or sliding gesture along first touchscreen 220, wherein this flicking or sliding gesture indicates first data selection 250 of first graphical representation 230 (and possibly also a target selection of an external device/display). Pursuant to one embodiment, however, first touchscreen input 240 is identified as a result of, for example, a simple touching (or double touching) of first touchscreen 220 at a specific location on first touchscreen 220. Indeed, it is noted that different types of touchscreen inputs may be implemented/detected, and that the present technology is not limited to any particular type of touchscreen input.

In an embodiment, data sharing control module 130 is configured to perform a device identification process, such as further discussed herein, to thereby identify a second device 261. Indeed, in accordance with an embodiment, first and second devices 210, 261 are communicatively coupled with one another, such as where first device 210 is physically "docked" with second device 261, or such as where first and second devices 210, 261 are communicatively linked with one another through a transmission line (and/or a wired communication network). Pursuant to one embodiment, however, first and second devices 210, 261 are not communicatively coupled with one another. Indeed, an embodiment provides that first and second devices 210, 261 are in wireless communication with one another despite first and second devices 210, 261 not being physically coupled with one another. As such, various types of communication paradigms may be implemented.

With reference to second device 261, it is noted that, in accordance with an embodiment, second device 261 includes a first external display 260. Indeed, an embodiment provides that first external display 260 is, or includes, a second touchscreen (e.g., a touchscreen that is distinct from first touchscreen 220 of first device 210). Pursuant to one embodiment, however, first external display 260 is not capable of functioning as a touchscreen. As such, various types of external displays may be implemented.

With reference still to FIG. 2A, and in accordance with an embodiment, data sharing control module 130 is configured to access a first target selection 251 of second device 261. It is noted that first target selection 251 indicates a target device to which certain selected data may be routed. Consider the example where second device 261 includes an external storage unit. Data sharing control module 130 is configured to cause router 120 to route first data set 231 to second device 261 in response to first data and first target selections 250, 251 such that first data set 231 is stored in this external storage unit. In particular, first data selection 250 identifies first data set 231 as the data set that is to be routed, and first target selection 251 identifies second device 261 as the selected target to which first data set 231 is to be routed. Moreover, and with reference again to FIG. 2B, data sharing control module 130 transmits routing instructions 280 to router 120 to thereby cause router to route first data set 231 to this selected target.

In one embodiment, first target selection 251 is indicated by a second touchscreen input 241, which may be detected, for example, by first touchscreen 220. Consider the example where a flicking or sliding gesture along first touchscreen 220 causes first and second touchscreen inputs 240, 241 to be identified, such as where this flicking or sliding gesture causes two different areas on touchscreen to be touched at two different points in time, respectively, such that both of first and second touchscreen inputs 240, 241 may be detected by first touchscreen 220. Data sharing control module 130 is configured to enable a detection of the flicking or sliding gesture along first touchscreen 220, wherein this flicking or sliding gesture indicates (1) first data selection 250 of first graphical representation 230 as well as (2) first target selection 251 of second device 261. Indeed, and with reference again to FIG. 2B, data sharing control module 130 may be configured to generate detection instructions 271 and transmit detection instructions 271 to first touchscreen 220, wherein detection instructions 271 cause first touchscreen 220 to be prepared to detect first and second touchscreen inputs 240, 241 (and possibly a number of additional touchscreen inputs). In this manner, a single gesture (e.g., a flicking or sliding gesture) may be detected to thereby identify both of first data and first target selections 250, 251.

The foregoing notwithstanding, and with reference still to FIG. 2A, an embodiment provides that data sharing control module 130 is configured to access a first target selection 251 of first external display 260. Consider the example where second device 261 includes first external display 260. In response to first target selection 251, such as where a user touches first external display 260, first external display 260 will be identified as a target display to which a selected data set (e.g., first data set 231) is to be routed such that this data set may be displayed by first external display 260. As such, it is noted that a target selection of an external device may be referred to, for example, as a display selection, although the present technology is not limited to any particular terminology for such a target selection.

In an embodiment, first target selection 251 is indicated by a second touchscreen input 241, which may be detected, for example, by first touchscreen 220. Consider the example where a flicking or sliding gesture along first touchscreen 220 causes first and second touchscreen inputs 240, 241 to be identified. This may occur, for example, as a result of a user touching two distinct areas on first touchscreen 220. Data sharing control module 130 is configured to enable a detection of the flicking or sliding gesture along first touchscreen 220, wherein this flicking or sliding gesture indicates (1) first data selection 250 of first graphical representation 230, as a result of the first area being touched, as well as (2) first target selection 251 of first external display 260, as a result of the second area being touched, and possibly as a result of both areas being touched (such as will be further explored herein). In this manner, a single gesture may be detected to thereby identify both of first data and first target selections 250, 251.

The foregoing notwithstanding, in one embodiment, first external display 260 is, or includes, a second touchscreen (e.g., a touchscreen that is distinct from first touchscreen 220 of first device 210), and first target selection 251 is indicated by a second touchscreen input 241, which may be detected, for example, by this second touchscreen. In this manner, a touching of first touchscreen 220 indicates first data selection 250, and a touching of this second touchscreen indicates first target selection 251.

With reference still to FIG. 2A, in an embodiment, data sharing control module 130 is configured to cause router 120 to route (e.g., wirelessly or through a transmission line) first data set 231 to second device 261 in response to first data and first target selections 250, 251. Moreover, one embodiment provides that data sharing control module 130 is configured to cause router 120 to route first data set 231 to second device 261 in response to first data and first target selections 250, 251 such that a second graphical representation 232 of, or associated with, first data set 231 is displayed on first external display 260, wherein, as previously indicated, it is noted that first external display 260 may be, or include, for example, a second touchscreen.

To illustrate, consider the example where a user touches first graphical representation 230 to thereby select first data set 231. The user then touches, slides or flicks first graphical representation 230 toward a different location on first touchscreen 220 that is associated with first external display 260, wherein this second action represents second touchscreen input 241. As a result of this second action, first external display 260 is selected, and first data set 231 is routed to second device 261. Second graphical representation 232, which may include, for example, an application or a number of images corresponding to first data set 231, may then be displayed on first external display 260.

Thus, it is noted that, in accordance with an embodiment, second touchscreen input 241 is received at, or detected by, first touchscreen 220. Pursuant to one embodiment, however, second touchscreen input 241 is received at, or detected by, first external display 260. To illustrate, consider the example where first external display 260 includes a second touchscreen. A user is able to touch first graphical representation 230, to thereby select first data set 231, and also touch the second touchscreen to thereby select first external display 260. As a result, first external display 260 generates first target selection 251, second device 261 routes first target selection 251 to data sharing control module 130, and first data set 231 will be routed to second device 261 as a result of first target selection 251.

To further illustrate, and with reference now to FIG. 3, an exemplary data sharing paradigm 300 in accordance with an embodiment is shown. Exemplary data sharing paradigm 300, which includes first and second devices 210, 261, may be implemented to perform a method of data sharing that includes displaying first graphical representation 230, which is associated with first data set 231, on first touchscreen 220, wherein first device 210 includes first touchscreen 220. Additionally, one or more additional graphical representations, such as exemplary additional graphical representations 310, may also be displayed on first touchscreen 220. These additional graphical representations 310 may be, for example, thumbnails or icons corresponding to different files or applications, respectively. The method also includes receiving first data selection 250 of first graphical representation 230, such as where first data selection 250 is generated by first touchscreen 220 as a result of first graphical representation 230 being touched, accessing first target selection 251 of first external display 260, wherein second device 261 includes first external display 260, and routing first data set 231 to second device 261 in response to first data and first target selections 250, 251. Moreover, in one embodiment, first data set 231 is routed to second device 261 in response to first data selection 250 and first target selection 251 such that a second graphical representation 232 associated with first data set 231 is displayed on first external display 260.

To illustrate, consider the example (1) where first device 210 is a mobile electronic device (e.g., an electronic tablet, PDA or smartphone), (2) where first graphical representation 230 is a graphical symbol (e.g., an icon) displayed on first touchscreen 220, and (3) where this graphical symbol is representative of first data set 231, such as where the graphical symbol suggests the type of electronic file, application or functionality associated with first data set 231. When a user touches the area of first touchscreen 220 where this graphical symbol is displayed, thereby selecting this graphical symbol (such that first data selection 250 has been received or identified by first device 210), first data set 231, which corresponds to first graphical representation 230, is consequently selected. When the user then touches first external display 260, which may be, for example, an external television or computer monitor, the selection of this external display is communicated (e.g., wirelessly) to first device 210 (such that first target selection 251 has been received by first device 210). In response to the selections of the displayed graphical symbol and the aforementioned external display, first data set 231 is routed (e.g., wirelessly) to second device 261 such that (1) an electronic file associated with first data set 231 is displayed on such external display or (2) an electronic application associated with first data set 231 is launched on such external display (such as where first data set 231 includes a computer program that, when executed, causes this electronic application to be launched on the external display).

In an embodiment, second device 261 is identified in response to first data selection 250. For example, first device 210 may be configured to wirelessly or optically identify those devices within a vicinity of first device 210 that are capable of communicating (e.g., wirelessly) with first device 210. In particular, first device 210 may be configured to perform this device identification process in response to a graphical symbol (e.g., first graphical representation 230) being selected within first touchscreen 220. In this manner, first device 210 is able identify a number of external display screens before first target selection 251 is received. This may be useful, for example, in expediting the routing of first data set 231 to a selected external device once first target selection 251 is received, because the aforementioned device identification process will have already been performed. Moreover, the availability of these external devices may be communicated to a user, such as in an external device list or virtual environment map as discussed herein, so as to aid the user with the target device selection process.

Pursuant to one embodiment, however, second device 261 is identified in response to first target selection 251. For example, first device 210 may be configured to perform the aforementioned device identification process after a graphical symbol (e.g., first graphical representation 230) has been selected within first touchscreen 220 and in response to an external device being selected, such as where the external device (e.g., second device 261) is configured to communicate (e.g., wirelessly communicate) a selection of such external device to first device 210. This may be useful, for example, in order to minimize or decrease the amount of time between which first device 210 is able to receive and process both first data selection 250 and first target selection 251.

II. Routing Determination

Thus, in an embodiment, it is determined that a data set is to be routed to an external device. Consequently, an exemplary routing determination system will now be explored.

However, the present technology is not limited to this exemplary system. Indeed, other systems may be implemented.

Figure 4:
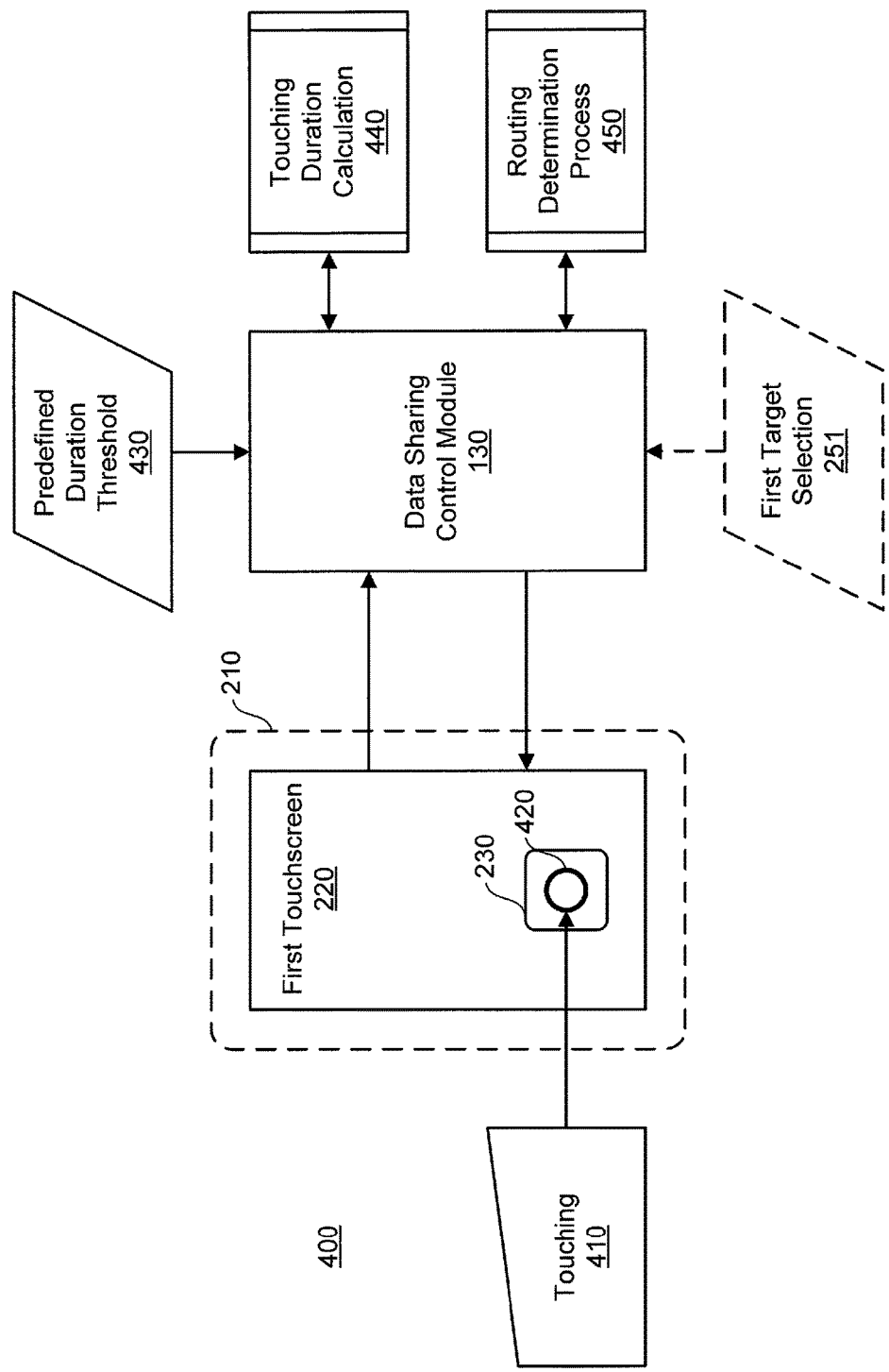
FIG. 4 is a block diagram of an exemplary routing determination system in accordance with an embodiment.

With reference now to FIG. 4, an exemplary routing determination system 400 in accordance with an embodiment is shown. In particular, data sharing control module 130 is configured to enable a detection of a touching 410 of a location 420 on first touchscreen 220, wherein location 420 corresponds to first graphical representation 230, and determine that first data set 231 is to be routed to an external device based on a duration of touching 410 of location 420 being equal to or longer than a predefined duration threshold 430. For example, an embodiment provides that data sharing control module 130 is configured to implement a touching duration calculation 440 to thereby determine that the duration of touching 410 of location 420 is equal to or longer than predefined duration threshold 430, as well as implement a routing determination process 450 to thereby determine that first data set 231 is to be routed to an external device based on the duration of touching 410 of location 420 being equal to or longer than predefined duration threshold 430.

To illustrate, consider the example where a user may quickly touch (or double touch) first graphical representation 230 to thereby launch a file or application associated with first data set 231 on first touchscreen 220. However, if a user instead touches first graphical representation 230 for a duration of, for example, at least 2 seconds, data sharing control module 130 will consequently determine that a routing of first data set 231 to an external device has been selected. It is noted that such a determination may be conducted before the specific external device to which first data set 231 will be routed has been selected. It is also noted that, once the specific external device has finally been selected, data sharing control module 130 will initiate the routing.

To further illustrate, in one embodiment, data sharing control module 130 is configured to determine that first data set 231 is to be routed to second device 261 based on (1) the duration of touching 410 of location 420 being equal to or longer than predefined duration threshold 430 and (2) first target selection 251. In particular, while the duration of touching 410 of location 420 being longer than predefined duration threshold 430 enables data sharing control module 130 to determine that first data set 231 is to be routed to an external device, first target selection 251 enables data sharing control module 130 to identify the exact external device to which first data set 231 is to be routed.

Figure 5:
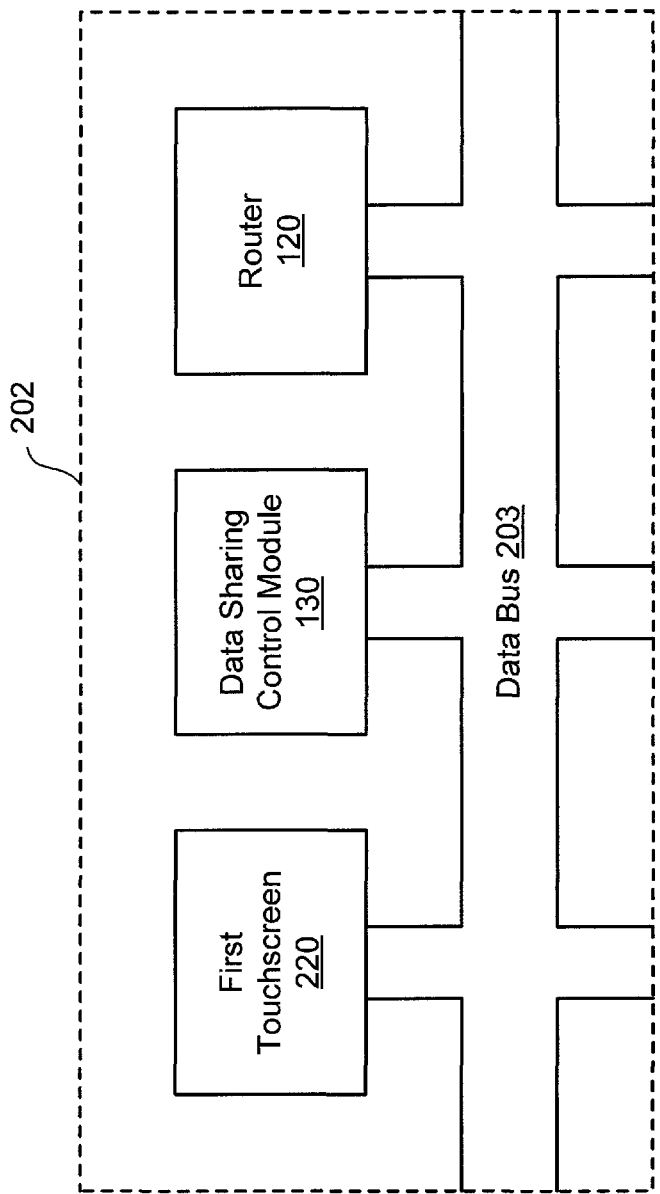
FIG. 5 is a block diagram of an exemplary data transmission system in accordance with an embodiment.

With reference now to FIG. 5, an exemplary data transmission system 202 in accordance with an embodiment is shown. Exemplary data transmission system 202 includes a data bus 203 that is communicatively coupled with or connected to each of first touchscreen 220, data sharing control module 130 and router 120. With reference again to FIGS. 2A and 2B, data bus 203 is configured to transmit display instructions 270 from data sharing control module 130 to first touchscreen 220, such as to cause first touchscreen 220 to display first graphical representation 230. Data bus 203 is also configured to transmit detection instructions 271 from data sharing control module 130 to first touchscreen 220, such as to cause first touchscreen 220 be able to detect one or more touchscreen inputs (e.g., first and second touchscreen inputs 240, 241). Data bus 203 is further configured to transmit detected data from first touchscreen 220 to data sharing control module 130, such as to enable first touchscreen 220 to transmit one or more selections (e.g., first data and first target selections 250, 251) to data sharing control module 130. Finally, data bus 203 is configured to transmit routing instructions 280 from data sharing control module 130 to router 120, such as to cause router 120 to route data (e.g., first data set 231) to a specific target (e.g., second device 261).

Thus, an embodiment provides that data bus 203 is communicatively coupled with or connected to first touchscreen 220, data sharing control module 130 and router 120, such as where each of first touchscreen 220, data sharing control module 130 and router 120 are included within first device 210. Additionally, in one embodiment, data bus 203 may optionally be communicatively coupled with or connected to one or more additional modules or components discussed herein. In this manner, data bus 203 may be utilized to transmit or route data and/or instructions between a number of modules/components that are implemented in accordance with various embodiments of the present technology.

III. Device Identification

In an embodiment, an external target device is identified. Consequently, a number of exemplary device identification systems will now be explored. However, the present technology is not limited to these exemplary systems. Indeed, other systems may be implemented.

Figure 6:
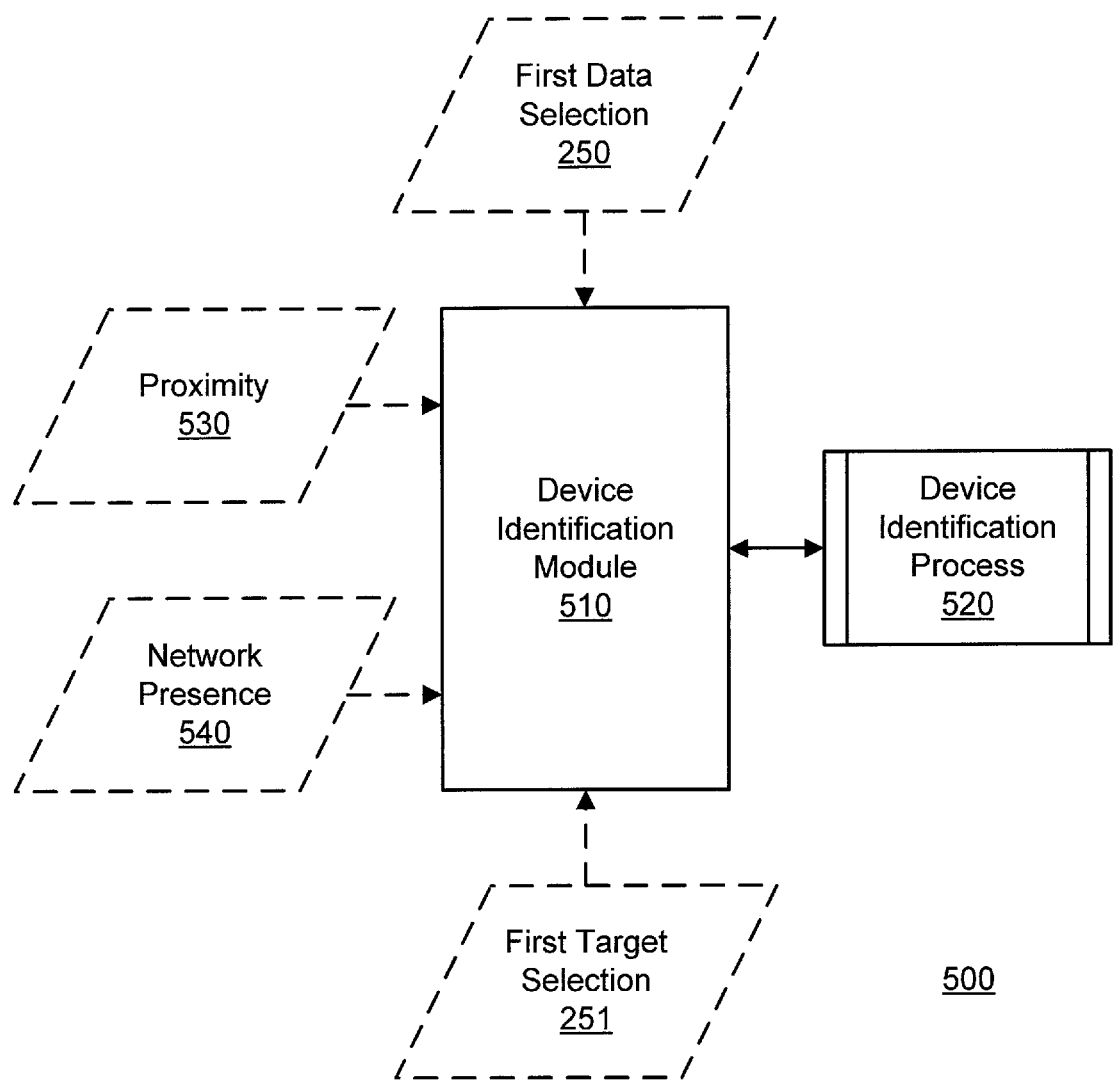
FIG. 6 is a block diagram of a first exemplary device identification system in accordance with an embodiment.

With reference now to FIG. 6, a first exemplary device identification system 500 in accordance with an embodiment is shown. First exemplary device identification system 500 includes a device identification module 510, which may be communicatively associated or coupled with data sharing control module 130 (not shown). Device identification module 510 is configured to implement a device identification process 520 to thereby identify the external target device (e.g., first external display 260 and/or second device 261), or an availability thereof.

To illustrate, in an embodiment, device identification module 510 is configured to identify second device 261 in response to first target selection 251, since first target selection 251 communicates the selection of second device 261. Pursuant to one embodiment, however, device identification module 510 is configured to identify second device 261 in response to first data selection 250. Consider the example where a user touches first graphical representation 230 for a predetermined period of time such that data sharing control module 130 determines that first data set 231 is to be routed to an external device. Device identification module 510 identifies second device 261 as being an available external device before first target selection 251 is even received.

It is noted that device identification process 520 may be carried out in accordance with a number of different methodologies. To illustrate, and with reference still to FIG. 6, an embodiment provides that device identification module 510 is configured to optically identify second device 261, or identify second device 261 based on a proximity 530 of second device 261 to first device 210, such as where, for example, first device 210 is able to optically identify second device 261 when first device 210 is sufficiently close to second device 261 for such an optic identification to be effectively performed.

Moreover, an embodiment provides that device identification module 510 is configured to identify second device 261 based on a network presence 540 (e.g., a wireless network presence) of second device 261. Consider the example where both of first and second devices 210, 261 are communicatively associated, coupled or connected with a local communication network, such as a local area network (LAN) (e.g., a wireless LAN (WLAN)). As a result of second device 261 being communicatively associated, coupled or connected with this network, device identification module 510 is able to detect a "presence" of second device 261 on the network (e.g., second device 261 may be allocated as a network "node") such that second device 261 is considered to be an available external device.

Furthermore, in an embodiment, first and second devices 210, 261 are registered with a data sharing service such that the respective registrations of first and second devices 210, 261 are associated with one another (such as where the device registrations are linked to a registered user account). Consequently, first and second devices 210, 261 are able to identify each other (and transmit data to one another), such as with optic and/or RF signals, as a result of their respective registrations being associated with one another. In one embodiment, however, first and second devices 210, 261 are able to identify each other, such as in a manner discussed herein, without first and second devices 210, 261 being registered with such a data sharing service. In this manner, an unregistered device is able to identify another unregistered device (and share data with that device) without a tedious and restrictive registration process being implemented. This provides users with greater flexibility and convenience, such as when a user wants to share data on the fly with an unregistered device belonging to a friend or family member.

Figure 7:
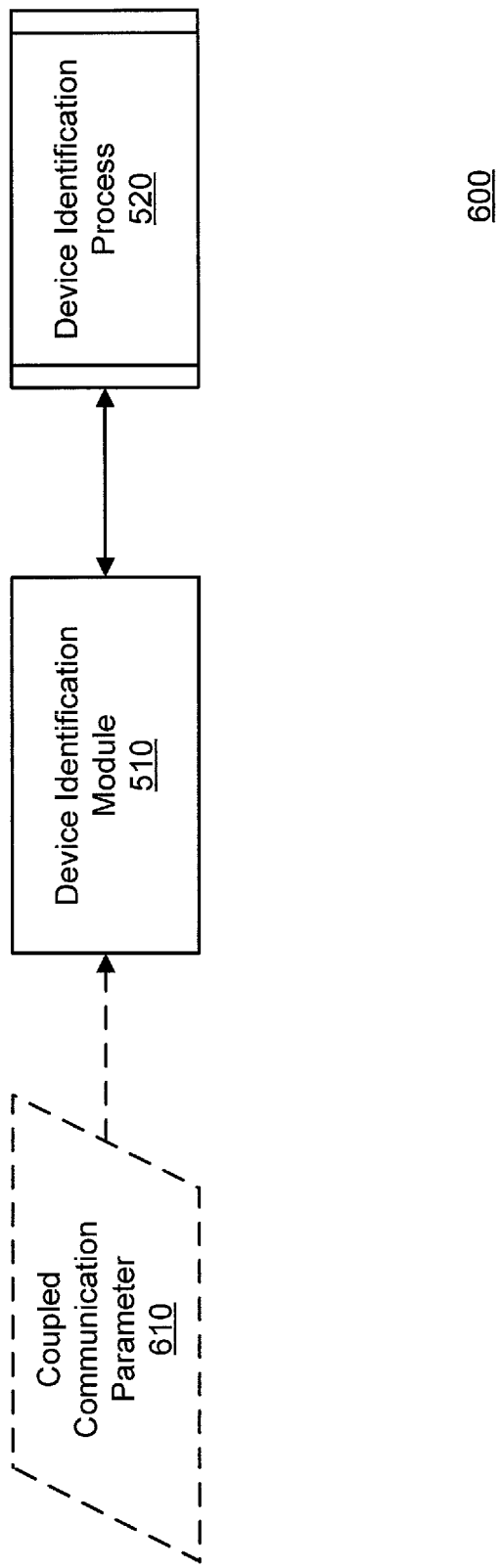
FIG. 7 is a block diagram of a second exemplary device identification system in accordance with an embodiment.

In an embodiment, a device identification module 510, which may be communicatively associated or coupled with said data sharing control module 130, is configured to identify second device 261 based on second device 261 being communicatively coupled with first device 210. To illustrate, and with reference now to FIG. 7, a second exemplary device identification system 600 in accordance with an embodiment is shown. In particular, device identification module 510 is configured to access a coupled communication parameter 610, wherein coupled communication parameter 610 reflects whether first and second devices 210, 261 are communicatively coupled with one another, such as where, for example, first device 210 has been physically and communicatively "docked" with second device 261, or such as where, for example, first and second devices 210, 261 are communicatively coupled with one another through a transmission line (e.g., a universal serial bus (USB) cable). Additionally, device identification module 510 is configured to perform device identification process 520 to thereby identify second device 261 based on this coupled communication parameter 610.

The foregoing notwithstanding, it is noted that the present technology is not limited to any particular methodology for carrying out device identification process 520. As such, device identification process 520 may be carried out using a methodology not disclosed herein.

Figure 8:
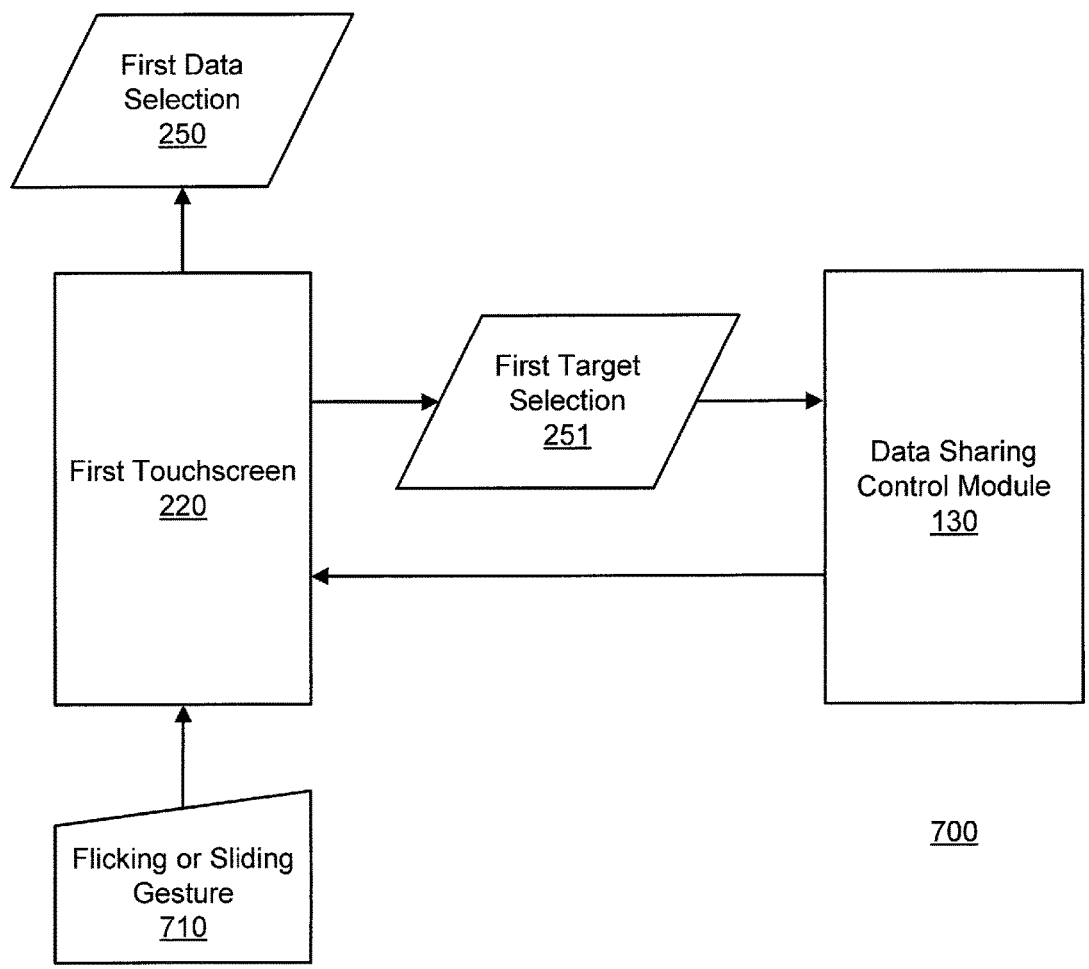
FIG. 8 is a block diagram of an exemplary gesture detection system in accordance with an embodiment.

With reference now to FIG. 8, an exemplary gesture detection system 700 in accordance with an embodiment is shown. In particular, data sharing control module 130 is configured to enable a detection of a flicking or sliding gesture 710 made along first touchscreen 220, wherein flicking or sliding gesture 710 indicates first and second touchscreen inputs 240, 241 such that flicking or sliding gesture 710 thereby indicates first data and first target selections 250, 251. Indeed, in one embodiment, first and second touchscreen inputs 240, 241 result from flicking or sliding gesture 710 along first touchscreen 220.

To illustrate, and in accordance with an exemplary implementation, flicking or sliding gesture 710 is detected, such as where a user touches an icon displayed by first touchscreen 220 and then "flicks" or "slides" this icon along first touchscreen 220 in a direction toward an external device or display (or a graphical representation thereof). It is noted that flicking or sliding gesture 710 indicates first and second touchscreen inputs 240, 241, wherein first and second touchscreen inputs 240, 241 in turn indicate first data and first target selections 250, 251, respectively. In this manner, a single gesture may be detected to thereby identify both of first data and first target selections 250, 251.

Figure 9:
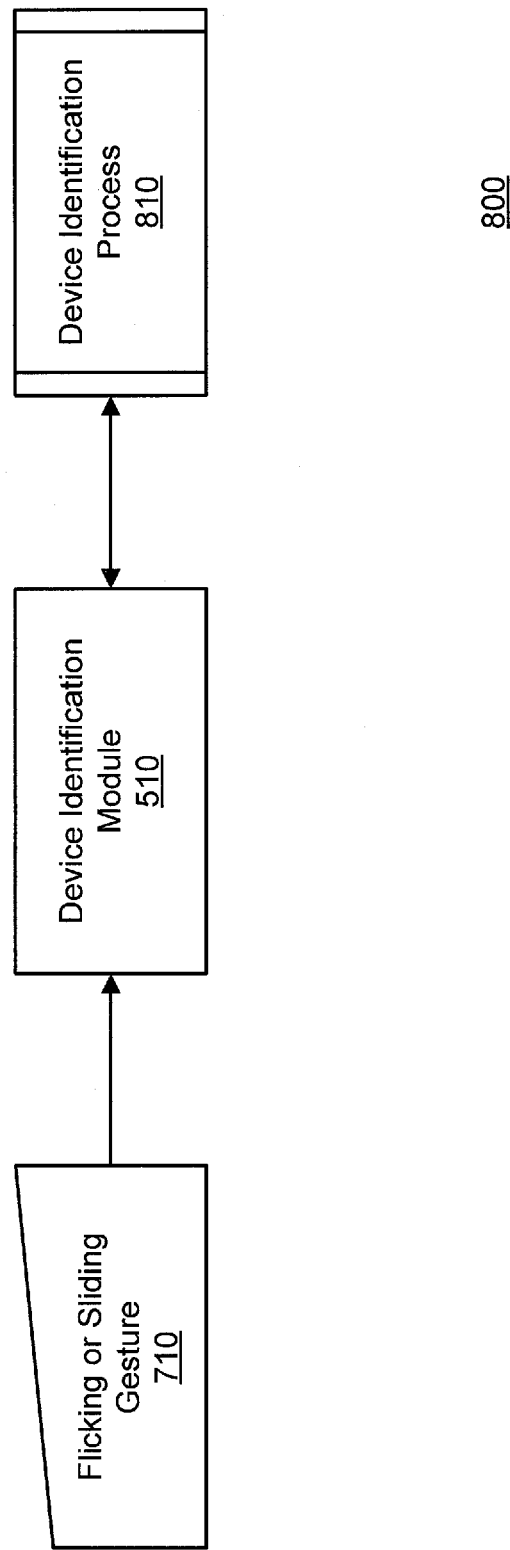
FIG. 9 is a block diagram of a third exemplary device identification system in accordance with an embodiment.

With reference now to FIG. 9, a third exemplary device identification system 800 in accordance with an embodiment is shown. Third exemplary device identification system 800 includes device identification module 510, which may be communicatively associated or coupled with data sharing control module 130 (not shown). Device identification module 510 is configured to implement a device identification process 810 to thereby identify second device 261 based on flicking or sliding gesture 710 (or based on first data and first target selections 250, 251).

To illustrate, consider the example where a user touches first graphical representation 230 on first touchscreen 220 and then flicks first graphical representation 230 (1) in a direction toward, or associated with, second device 261 or (2) in a direction toward, or associated with, a virtual representation of second device 261 that is displayed on first touchscreen 220. As a result of this flicking input, device identification module 510 will identify second device 261 as being the external device to which first data set 231 is to be routed.

Similarly, a second example provides that a user touches first graphical representation 230 on first touchscreen 220 and then slides first graphical representation 230 to a virtual representation of second device 261 that is displayed on first touchscreen 220. As a result of this sliding input, device identification module 510 will identify second device 261 as being the external device to which first data set 231 is to be routed.

IV. Display Identification

In an embodiment, a display associated with an external device is identified. Consequently, a number of exemplary display identification systems and paradigms will now be explored. However, the present technology is not limited to these exemplary systems and paradigms. Indeed, other systems and paradigms may be implemented.

Figure 10:
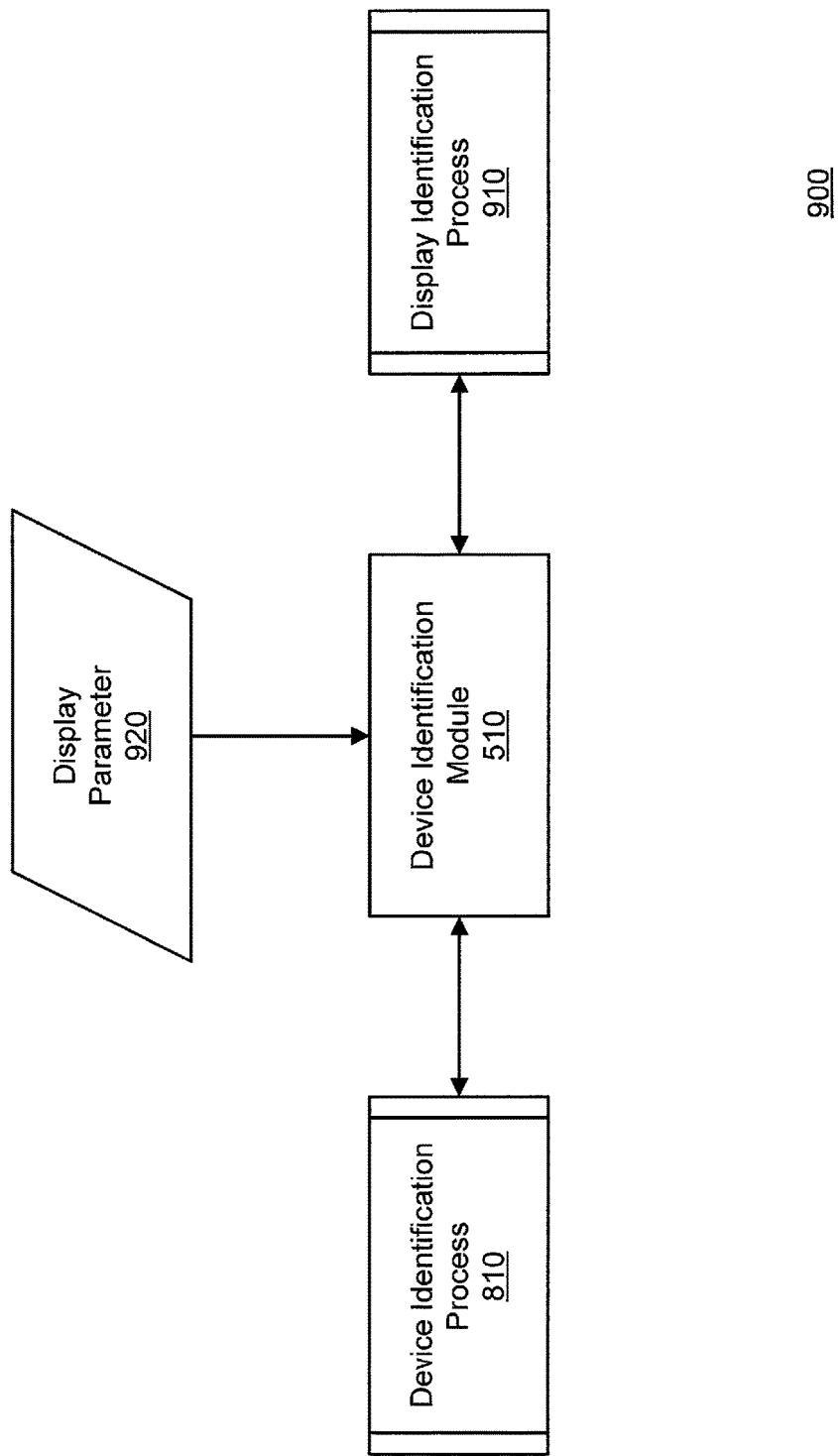
FIG. 10 is a block diagram of a first exemplary display identification system in accordance with an embodiment.

With reference now to FIG. 10, a first exemplary display identification system 900 in accordance with an embodiment is shown. First exemplary display identification system 900 includes device identification module 510, which may be communicatively associated or coupled with data sharing control module 130 (not shown). Device identification module 510 is configured to implement device identification process 810 to thereby identify second device 261. Device identification module 510 is also configured to implement a display identification process 910 to thereby identify first external display 260 in response to the identifying of second device 261, wherein, as previously indicated, first external display 260 may be, or include, for example, a second touchscreen. To illustrate, consider the example where, in response to identifying second device 261, device identification module 510 analyzes a display parameter 920 associated with second device 261 to thereby determine if second device 261 includes an external display. If second device 261 does in fact include such an external display, then this external display is identified. If second device 261 does not include such an external display, then this result is yielded by display identification process 910.

Thus, an embodiment provides that display parameter 920 indicates whether an identified device includes a display unit. Pursuant to one embodiment, display parameter 920 also indicates one or more of a screen resolution, contrast ratio, three-dimensional (3D) display capability, etc., associated with this display unit. In this manner, the display identification process may be performed such that an external display is identified based on a preselected display feature. For example, if a 3D display capability is to be utilized to display a 3D image on an external device, then an external display may be selected based on this external display having such a 3D display capability.

Figure 11:
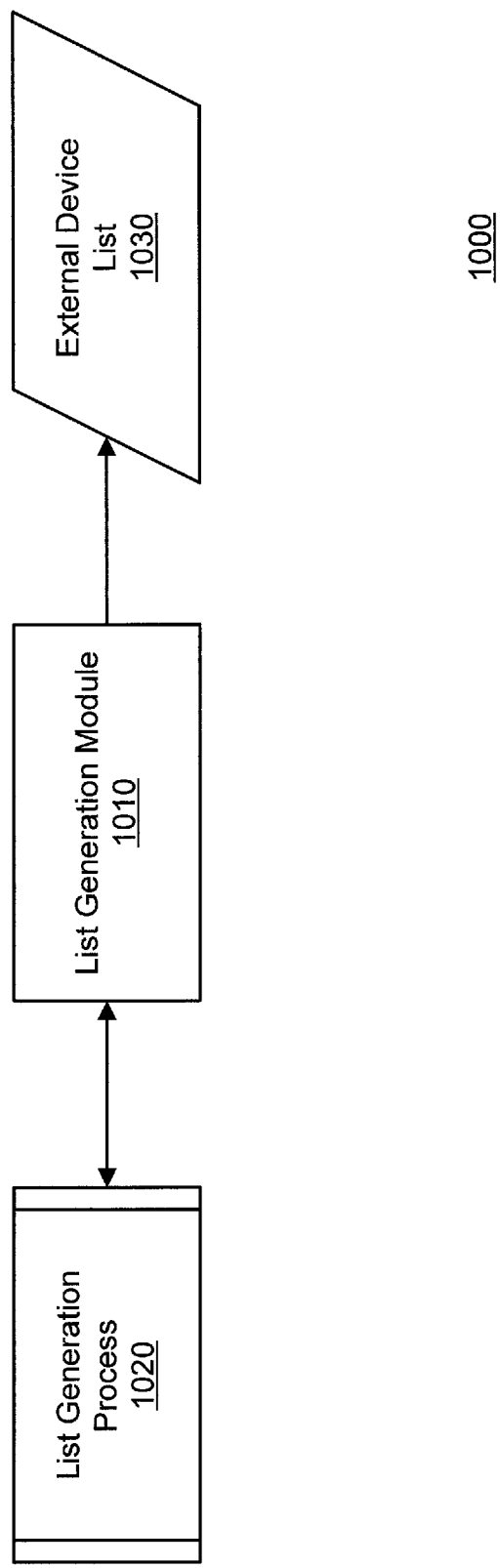
FIG. 11 is a block diagram of an exemplary list generation system in accordance with an embodiment.

With reference now to FIG. 11, an exemplary list generation system 1000 in accordance with an embodiment is shown. Exemplary list generation system 1000 includes a list generation module 1010, which may be communicatively associated or coupled with the device identification module 510 (not shown). List generation module 1010 is configured to implement a list generation process 1020 to thereby generate an external device list 1030. List generation module is also configured to (1) indicate an availability of first external display 260 in external device list 1030 in response to first external display 260 being identified and/or (2) indicate an identified availability of second device 261 in external device list 1030 in response to the identifying of such availability of second device 261 (such as by device identification module 510 as discussed herein with reference to FIG. 6). Again, as previously indicated, it is noted that first external display 260 may be, or include, for example, a second touchscreen.

To illustrate, and with reference now to FIG. 12, an exemplary external device list configuration 1100 in accordance with an embodiment is shown. In particular, a method of data sharing includes identifying second device 261, identifying first external display 260 in response to the identifying of second device 261, generating an external device list, such as, for example, external device list 1030, and adding first external display 260 to external device list 1030 in response to first external display 260 being identified.

The foregoing notwithstanding, it is noted that an external device (e.g., second device 261) might not include an external display, such as where this external device is an external hard drive (e.g., a back-up drive) that is not configured to display stored information to a user. As such, one embodiment provides a simplified method of data sharing whereby second device 261 is identified, the external device list (e.g., external device list 1030) is generated, and second device 261 is added to this external device list in response to second device 261 being identified.

With reference still to FIG. 12, and in accordance with an embodiment, external device list 1030 includes a number of data columns 1110. Each of data columns 1110 may be labeled with a different subject heading that indicates the subject matter of the information that is listed in such data column. For example, in the illustrated embodiment, data columns 1110 include first, second, third, fourth, fifth, sixth, seventh and eighth data columns 1111-1118. First data column 1111 is labeled with the subject heading "External Display", because the identified external displays (if applicable) are to be listed in first data column 1111. Second data column 1112 is labeled with the subject heading "Device", because the devices corresponding to the identified external displays are to be listed in second data column 1112. Third data column 1113 is labeled with the subject heading "Connection", because the connection types (e.g., wired or wireless) associated with the corresponding devices are to be listed in third data column 1113. Fourth data column 1114 is labeled with the subject heading "Type", because the types of communications (or the communication protocols) associated with the corresponding devices are to be listed in fourth data column 1114. Fifth data column 1115 is labeled with the subject heading "Speed", because the data transmission speeds associated with the available data transmission bandwidths are to be listed in fifth data column 1115. Sixth data column 1116 is labeled with the subject heading "Range", because the data transmission ranges associated with the corresponding data connections are to be listed in sixth data column 1116. Seventh data column 1117 is labeled with the subject heading "Status", because the respective operational statuses (e.g., whether the corresponding device is currently in use or not) of the listed devices are to be listed in seventh data column 1117. Eighth data column 1118 is labeled with the subject heading "Available Storage", because the amounts of available storage in the listed devices, respectively, are to be listed in eighth data column 1118.

With reference still to FIG. 12, an embodiment provides that external device list 1030 includes a number of data rows, such as first and second data rows 1120, 1130. In the illustrated embodiment, first data row 1120 reflects that first external display 260 has been identified, and that first external display 260 corresponds to second device 261. First data row 1120 also reflects that the connection type associated with second device 261 is wired 1121, that the communication protocol associated with second device 261 is "USB 2.0" 1122, and that the data transmission speed associated with the available data transmission bandwidth for this device is 480 megabits (Mbits) per second (s) 1123. It is noted that the data transmission range for this communication protocol is not listed in first data row 1120 (as indicated by the symbol "–" at 1124) as a result of the wired 1121 connection being established.

Moreover, in an embodiment, first data row 1120 reflects that first external display 260 has a current status of "in use" 1125, thereby indicating that first external display 260 is currently displaying information. Consider the example where first external display 260 is currently displaying video data to a number of users. The transmission of first data set 231 to second device 261 causes first external display 260 to cease displaying such video data and instead display second graphical representation 232. Consequently, the display of this "in use" 1125 status informs the user that a present selection of first external display 260 by the user may cause the use of first external display 260 by a number of other individuals to be disrupted. Thus, the user may choose to avoid selecting first external display 260 so as to be polite to these other individuals. The user may also seek to identify whether one or more other external displays listed in external device list 1030 are not currently in use so that the user may select one of such other external displays. The foregoing notwithstanding, in one embodiment, the transmission of first data set 231 to second device 261 causes first external display 260 to display both of the aforementioned video data as well as second graphical representation 232 (such as in a split-screen or embedded frame configuration).

With reference still to the illustrated embodiment, second data row 1130 reflects that a second external display 1131 has been identified, and that second external display 1131 corresponds to third device 1132. Second data row 1130 also reflects that the connection type associated with third device 1132 is wireless 1133, that the communication protocol associated with third device 1132 is "802.11n" 1134, and that the data transmission speed associated with the available data transmission bandwidth for this device is 54 Mbits per s (Mbits/s) 1135. It is noted that the data transmission range for this communication protocol is listed in second data row 1130 as 230 feet (ft) 1136, which may be utilized by a user to determine how far away first and third devices 210, 1132 may be positioned away from each other such that a successful wireless communication between these devices may occur. Furthermore, in an embodiment, second data row 1130 reflects that second external display 1131 has a current status of not in use 1137, thereby indicating that second external display 1131 is not currently displaying information, which may indicate to a user of first device 210 that no potential users of third device 1132 will be immediately disrupted by the transmission of first data set 231 to third device 1132 such that second graphical representation 232 is displayed by second external display 1131.

Furthermore, in an embodiment, first and second data rows 1120, 1130 reflect that second and third devices 261, 1132 have 1 terabyte (TB) and 500 gigabytes (GB) of available storage, respectively. As such, a user can review external device list 1030 to thereby determine which available devices have sufficient available memory for the task at hand. For example, if first data set 231 includes 550 GB of information, then a user can review external device list 1030 to thereby determine that first data set 231 shall be sent to second device 261 rather than to third device 1132, because the former has sufficient available memory to store first data set 231 whereas the latter does not.

Figure 13:
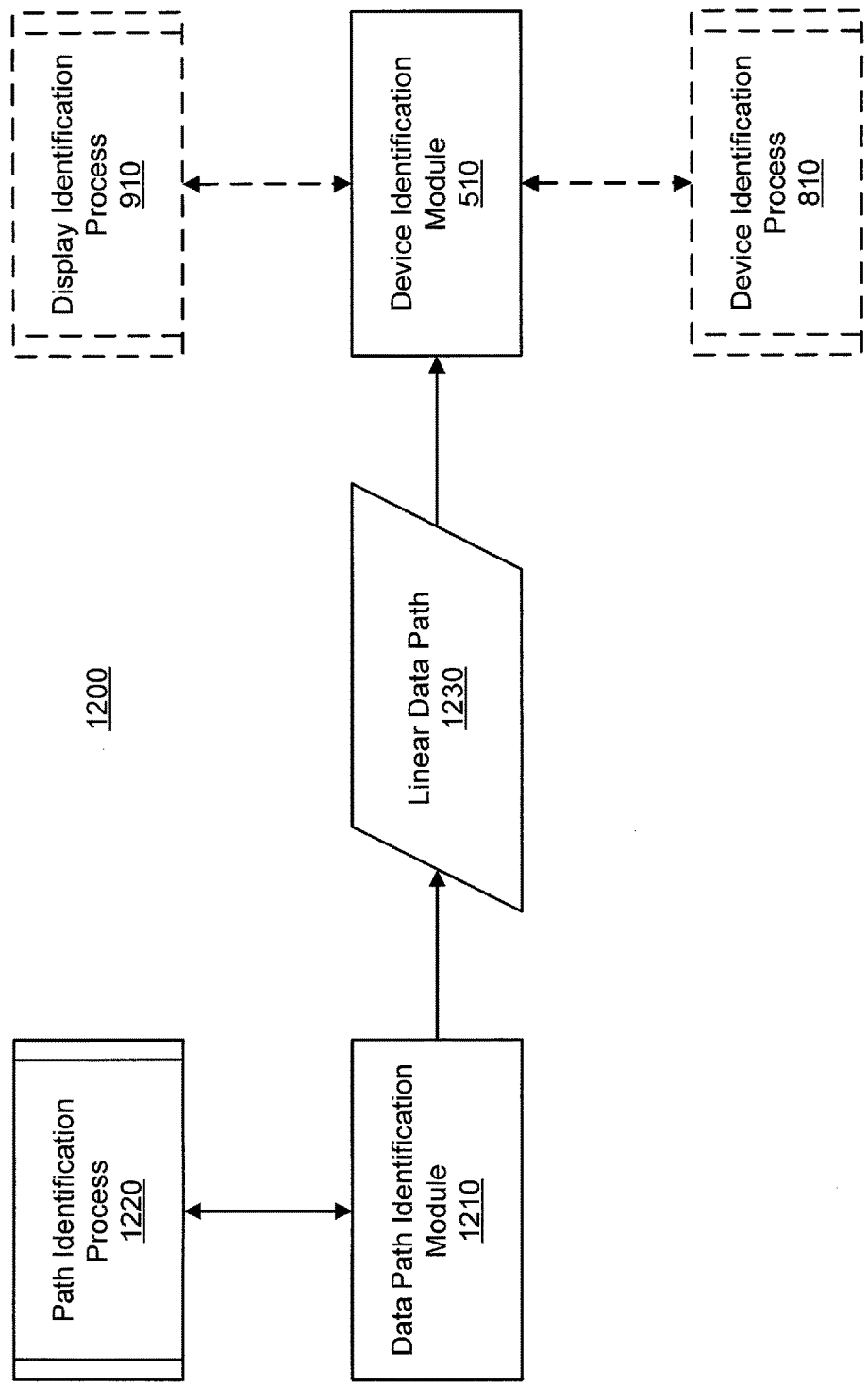
FIG. 13 is a block diagram of a fourth exemplary device identification system in accordance with an embodiment.

With reference now to FIG. 13, a fourth exemplary device identification system 1200 in accordance with an embodiment is shown. Fourth exemplary device identification system 1200 includes a data path identification module 1210, which may be communicatively associated or coupled with data sharing control module 130 (not shown). Data path identification module 1210 is configured to implement a path identification process 1220 to thereby identify a linear data path 1230 between first and second devices 210, 261. Fourth exemplary device identification system 1200 also includes a device identification module 510 that is communicatively associated or coupled with data path identification module 1210. Device identification module 510 is configured to implement (1) display identification process 910 to thereby identify first external display 260 in response to the identifying of linear data path 1230 and/or (2) device identification process 810 to thereby identify an availability of second device 261 in response to the identifying of linear data path 1230.

To illustrate, consider the example where linear data path 1230 between first and second devices 210, 261 is identified, such as where first device 210 optically identifies second device 261. As a result of this linear data path 1230 being identified, first external display 260 is identified as an available external display, such as where first data set 231 is to be optically or wirelessly transmitted from first device 210 to second device 261 along linear data path 1230.

Indeed, and with reference to FIGS. 10 and 13, an embodiment provides that first external display 260 is identified as an available external display based on both of linear data path 1230 and display parameter 920. For example, upon or subsequent to linear data path 1230 being identified, such that information may be wirelessly transmitted between first and second devices 210, 261, first external display 260 is identified as an available external display based on display parameter 920 indicating (1) that second device 261 includes first external display 260 and (2) that one or more preselected display features (e.g., a specific screen resolution or contrast ratio, or a 3D display capability) are associated with first external display 260.

Figure 14:
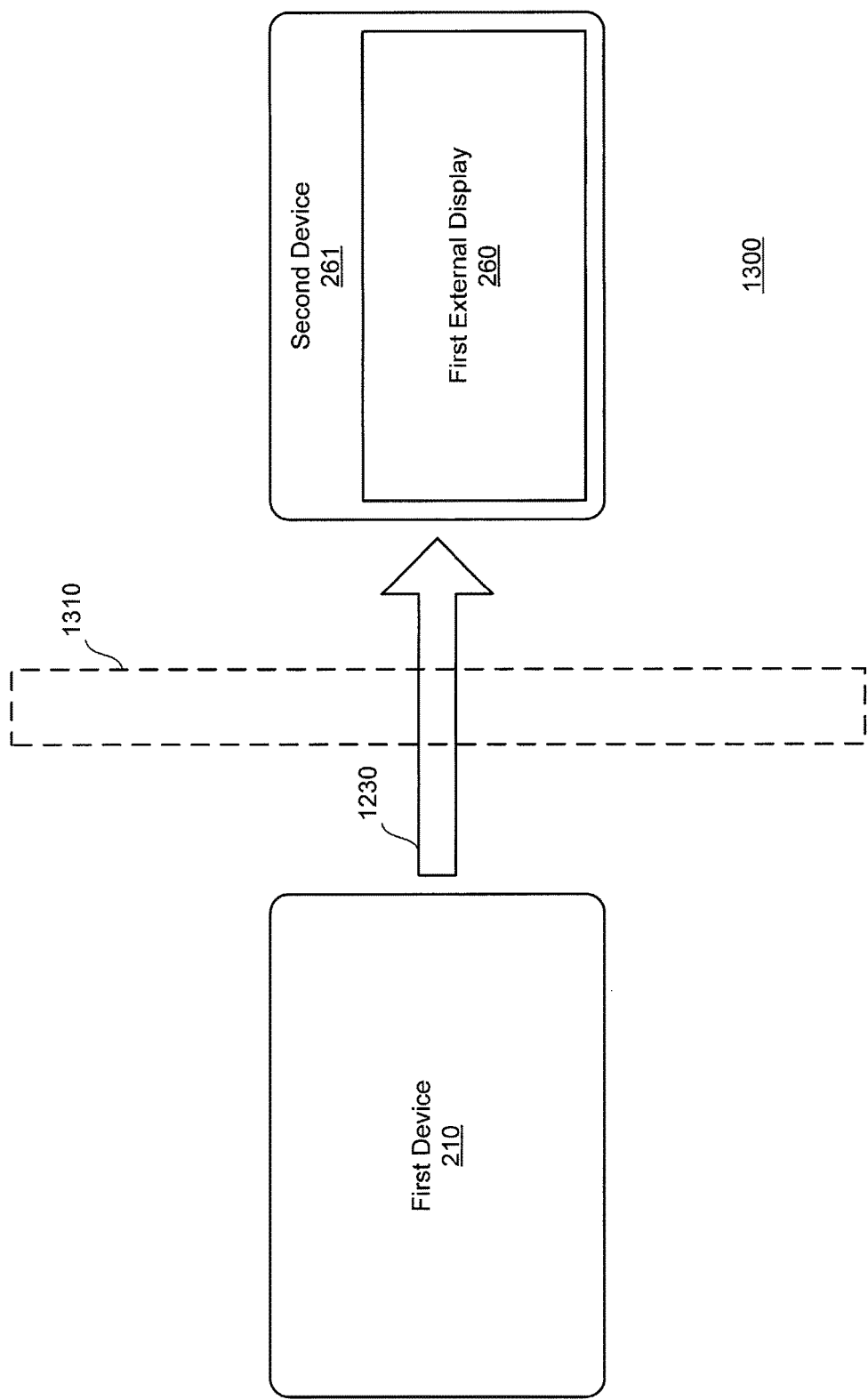
FIG. 14 is a block diagram of an exemplary display identification paradigm in accordance with an embodiment.

With reference now to FIG. 14, an exemplary display identification paradigm 1300 in accordance with an embodiment is shown. In particular, linear data path 1230 between first and second devices 210, 261 is identified, and first external display 260 is identified in response to the identifying of linear data path 1230. Pursuant to one embodiment, linear data path 1230 coincides with a line of sight between first and second devices 210, 261 such that no physical obstacles exist between first and second devices 210, 261. Consequently, a clear, visual path is defined between first and second devices 210, 261, which may be useful, for example, when first device 210 is configured to optically identify second device 261.

The foregoing notwithstanding, an embodiment provides that one or more physical obstacles, such as, for example, exemplary obstacle 1310 (e.g., a wall), are positioned between first and second devices 210, 261 such that linear data path 1230 does not coincide with a line of sight between first and second devices 210, 261. Nevertheless, linear data path 1230 is defined between first and second devices 210, 261. Consider the example where first device 210 is configured to communicate with second device 261 using electromagnetic communication signals (e.g., cellular or radio frequency (RF) signals). In so much as an electromagnetic signal is able to travel through various physical obstacles, an embodiment provides that the presence of the aforementioned one or more physical obstacles between first and second devices 210, 261 does not prevent linear data path 1230 from existing between first and second devices 210, 261.

Figure 15:
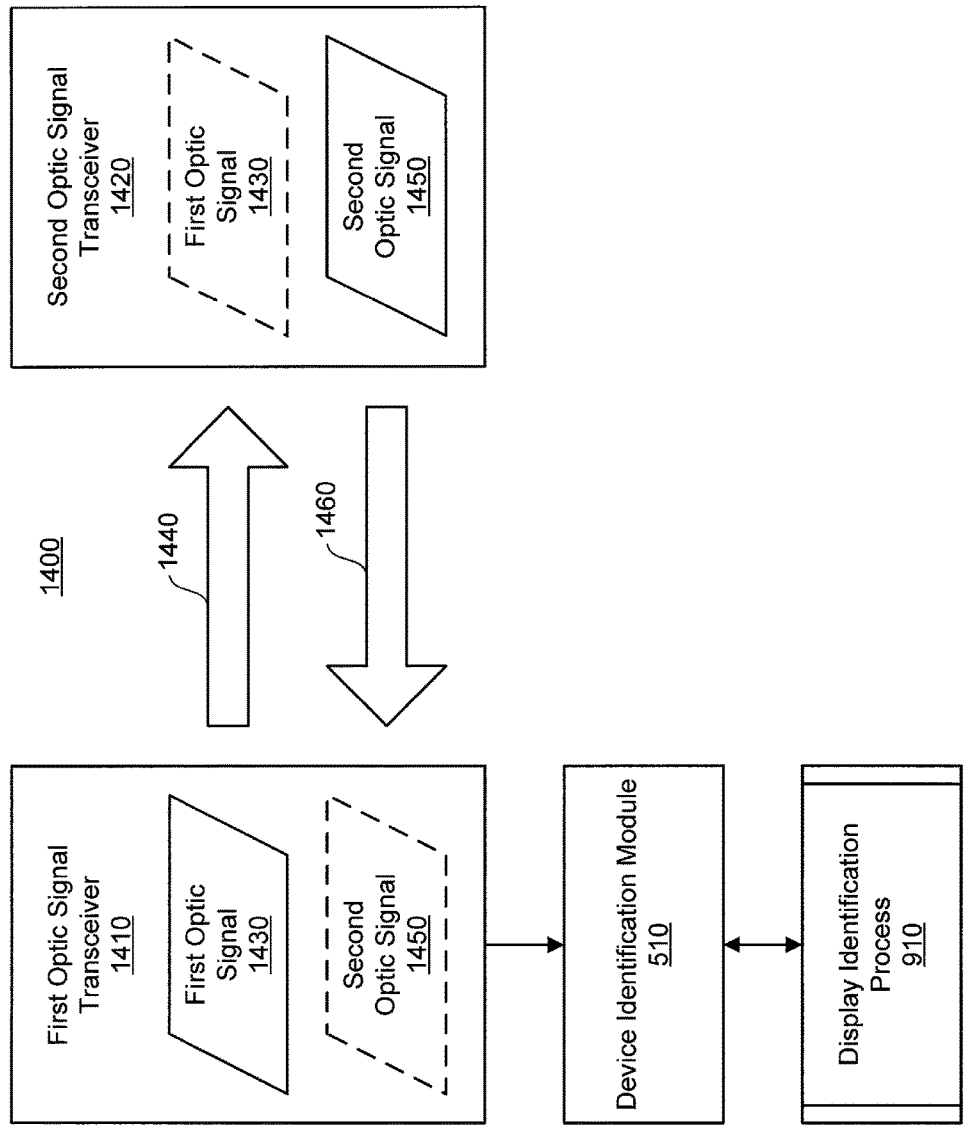
FIG. 15 is a block diagram of a second exemplary display identification system in accordance with an embodiment.

The foregoing notwithstanding, an embodiment provides that an external display is optically identified. Consider the example where an optic signal transceiver is communicatively associated or coupled with first device 210. This optic signal transceiver may be selected, and second device 261 may be selected with this optic signal transceiver. To illustrate, and with reference now to FIG. 15, a second exemplary display identification system 1400 in accordance with an embodiment is shown. Second exemplary display identification system 1400 includes a first optic signal transceiver 1410 that is communicatively associated or coupled with first device 210 (not shown), wherein a second optic signal transceiver 1420 is communicatively associated or coupled with second device 261 (not shown). First optic signal transceiver 1410 is configured to generate a first optic signal 1430 (e.g., an infrared (IR) light signal) in response to at least one selection from among first data and first target selections 250, 251 and transmit first optic signal 1430 to second optic signal transceiver 1420 along a linear signal path 1440. Additionally, second optic signal transceiver 1420 is configured to generate a second optic signal 1450 (e.g., an IR light signal) in response to receiving first optic signal 1430 and transmit second optic signal 1450 to first optic signal transceiver 1410 along a linear signal path 1460, wherein linear signal paths 1440, 1460 may or may not substantially overlap within the physical space between first and second optic signal transceivers 1410, 1420.

Second exemplary display identification system 1400 also includes device identification module 510, which is communicatively associated or coupled with first optic signal transceiver 1410. Device identification module 510 is configured to implement display identification process 910 to thereby identify first external display 260 (not shown) in response to second optic signal 1450 being received at first optic signal transceiver 1410. For example, if second device 261 is configured to communicate with first device 210, then second optic signal transceiver 1420 will route second optic signal 1450 to first optic signal transceiver 1410, which will then cause device identification module 510 to initiate display identification process 910 such that first external display 260 is identified.

Thus, as indicated above, it is noted that one or more of the various optic signals discussed herein may be IR signals. It is further noted, however, that the present technology is not limited to the implementation of IR signals. Indeed, in one embodiment, one or more of the various optic signals discussed herein may be optic signals other than IR signals.

Moreover, an embodiment provides that second device 261 is identified using RF signals (such as by enabling a communication between first and second devices 210, 261 using relatively short-wavelength radio transmissions configured to exchange data over relatively short distances). Consider the example where the aforementioned signal transceivers are actually RF signal transceivers, and where the aforementioned optic signals are actually RF signals (e.g., in the RF range of approximately 2.4 to 2.48 gigahertz). A transceiver that is communicatively associated or coupled with first device 210 may be selected, wherein this transceiver is configured for RF transmissions (e.g., in the RF range of approximately 2.4 to 2.48 gigahertz), and second device 261 may be identified with this transceiver.

Figure 16:
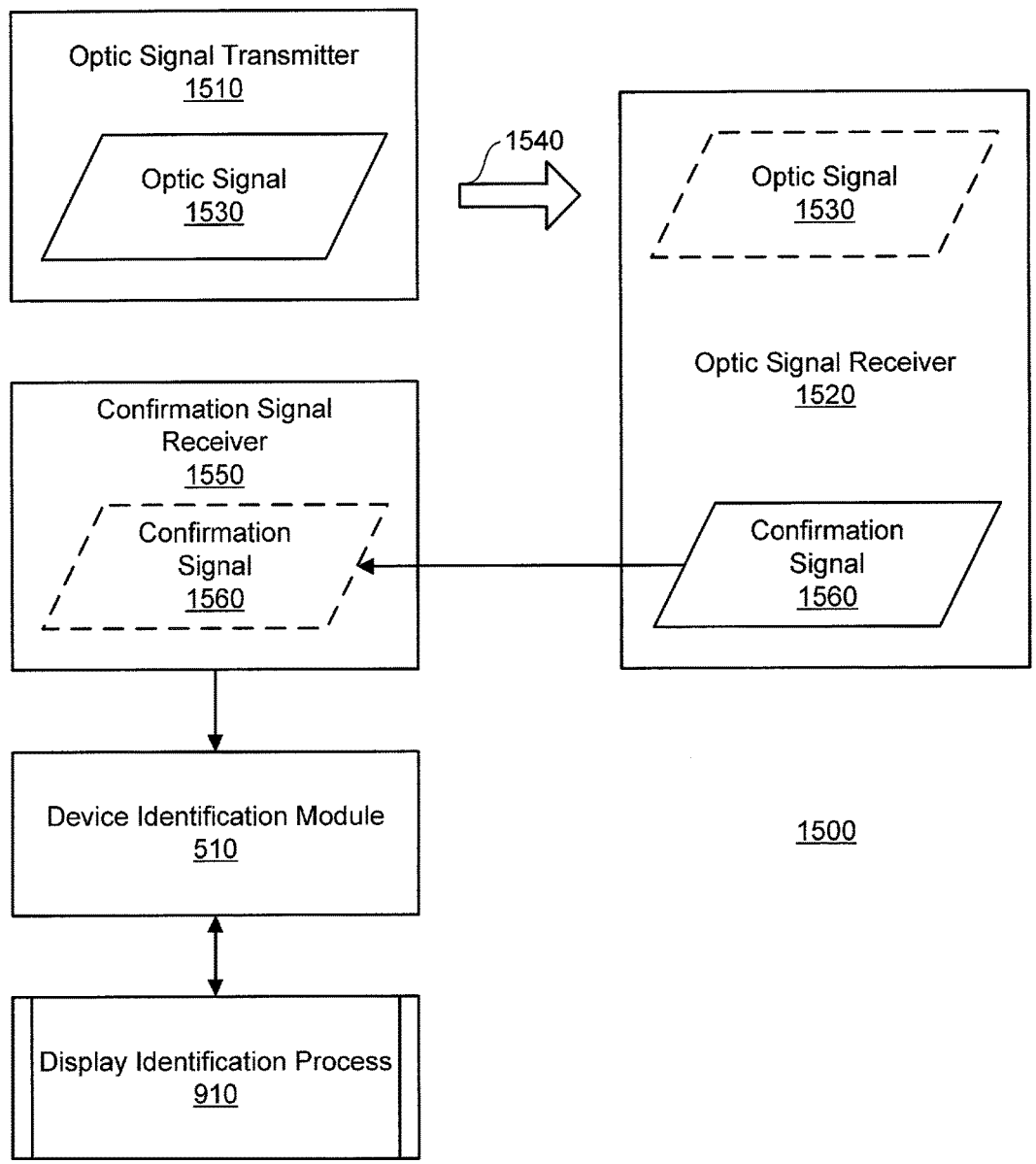
FIG. 16 is a block diagram of a third exemplary display identification system in accordance with an embodiment.

With reference now to FIG. 16, a third exemplary display identification system 1500 in accordance with an embodiment is shown. Third exemplary display identification system 1500 includes an optic signal transmitter 1510 communicatively associated or coupled with first device 210 (not shown), wherein an optic signal receiver 1520 is communicatively associated or coupled with second device 261 (not shown). Optic signal transmitter 1510 is configured to generate an optic signal 1530 (e.g., an IR light signal) in response to at least one selection from among first data and first target selections 250, 251 and transmit optic signal 1530 to optic signal receiver 1520 along a linear signal path 1540.

Third exemplary display identification system 1500 also includes a confirmation signal receiver 1550, which is communicatively associated or coupled with first device 210 (not shown), wherein optic signal receiver 1520 is configured to generate a confirmation signal 1560 in response to receiving optic signal 1530 and transmit confirmation signal 1560 to confirmation signal receiver 1550. Third exemplary display identification system 1500 further includes device identification module 510, which is communicatively associated or coupled with confirmation signal receiver 1550. Device identification module 510 is configured to implement display identification process 910 to thereby identify first external display 260 (not shown) in response to confirmation signal 1560 being received at confirmation signal receiver 1550. For example, if second device 261 is configured to communicate with first device 210, then optic signal receiver 1520 will route confirmation signal 1560 to confirmation signal receiver 1550, which will then cause device identification module 510 to initiate display identification process 910 such that first external display 260 is identified.

In an embodiment, confirmation signal 1560 is an optic signal (e.g., an IR light signal), such that second and third exemplary display identification systems 1400, 1500 are substantially similar. Pursuant to one embodiment, however, confirmation signal 1560 is a different type of signal. For example, confirmation signal 1560 may be a cellular or RF signal. Indeed, it is noted that the present technology is not limited to any particular signal type.

Figure 17:
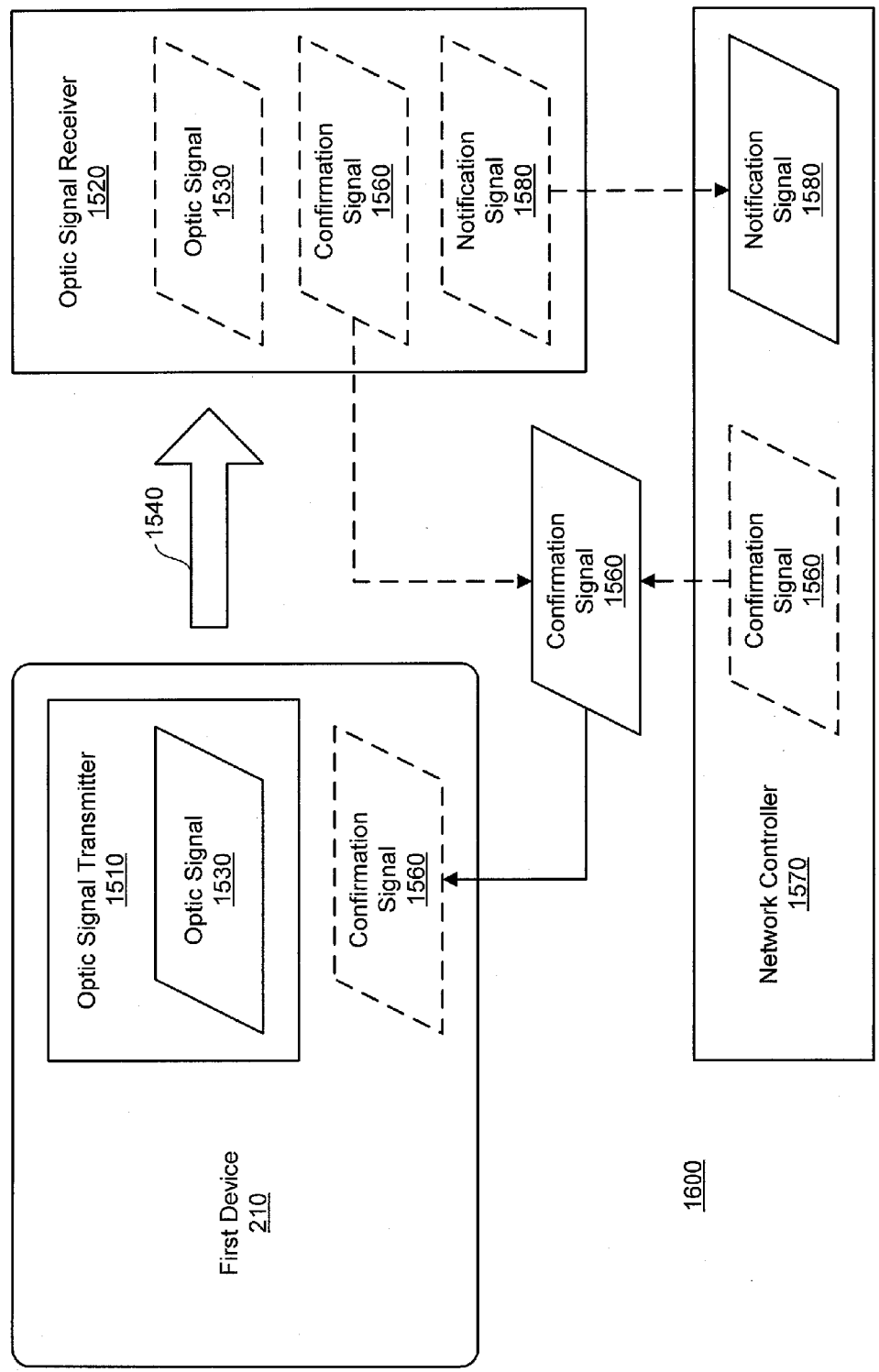
FIG. 17 is a block diagram of a fourth exemplary display identification system in accordance with an embodiment.

The foregoing notwithstanding, and with reference now to FIG. 17, a fourth exemplary display identification system 1600 in accordance with an embodiment is shown. In particular, optic signal transmitter 1510 is communicatively coupled or associated with first device 210, and optic signal receiver 1520 is communicatively coupled or associated with second device 261 (not shown). Optic signal transmitter 1510 is selected, optic signal 1530 is generated at optic signal transmitter 1510 in response to at least one selection from among first data and first target selections 250, 251, and optic signal 1530 is routed from optic signal transmitter 1510 to optic signal receiver 1520 along linear signal path 1540. Additionally, confirmation signal 1560 is generated in response to optic signal 1530 being received at optic signal receiver 1520, and confirmation signal 1560 is routed to first device 210. Finally, first external display 260 (not shown) is identified in response to confirmation signal 1560 being received at first device 210. For example, if second device 261 is configured to communicate with first device 210, then optic signal receiver 1520 will route confirmation signal 1560 to first device 210, which will then perform a display identification process to thereby identify first external display 260.

Thus, with reference still to FIG. 17, and in accordance with an embodiment, confirmation signal 1560 is generated at optic signal receiver 1520 and routed to first device 210 from optic signal receiver 1520. Pursuant to one embodiment, however, confirmation signal 1560 is generated by a device other than optic signal receiver 1520, and confirmation signal 1560 is then routed to first device 210 from this other device. Consider the example where second device 261 is a node on a local communication network, where optic signal receiver 1520 is configured to receive optic signal 1530, and where second device 261 is configured to notify a network controller 1570 that optic signal 1530 was received, such as by generating a notification signal 1580 and routing notification signal 1580 to network controller 1570. Upon this notification, network controller 1570 will generate confirmation signal 1560 and then route confirmation signal 1560 to first device 210. This may be useful, for example, when confirmation signal 1560 is an electromagnetic signal rather than an optic signal. Pursuant to one embodiment, however, confirmation signal 1560 is generated and transmitted by optic signal receiver 1520.

V. Device/Display Selection

In an embodiment, an external device, and/or a display associated with such external device, is selected. Consequently, a number of exemplary device selection systems and display selection paradigms will now be explored. However, the present technology is not limited to these exemplary systems and paradigms. Indeed, other systems and paradigms may be implemented.

Figure 18:
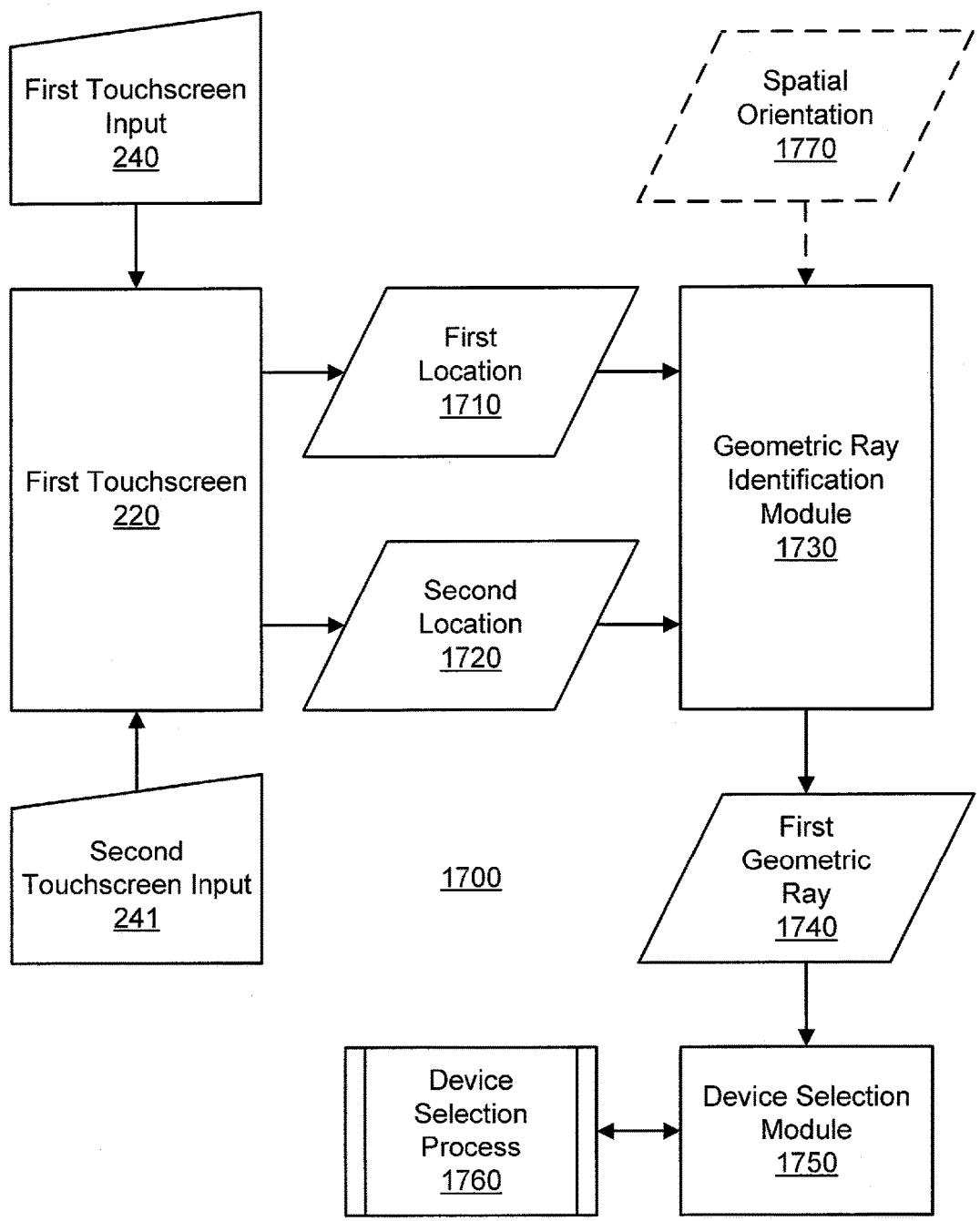
FIG. 18 is a block diagram of a first exemplary device selection system in accordance with an embodiment.

With reference now to FIG. 18, a first exemplary device selection system 1700 in accordance with an embodiment is shown. First exemplary device selection system 1700 includes first touchscreen 220, which is configured to detect first and second touchscreen inputs 240, 241 at first and second locations 1710, 1720, respectively, on first touchscreen 220. First exemplary device selection system 1700 also includes a geometric ray identification module 1730 communicatively associated or coupled with first touchscreen 220. Geometric ray identification module 1730 is configured to identify a first geometric ray 1740 based on first and second locations 1710, 1720. First exemplary device selection system 1700 further includes a device selection module 1750 communicatively associated or coupled with geometric ray identification module 1730. Device selection module 1750 is configured to implement a device selection process 1760 in order to determine that second device 261 is located along first geometric ray 1740 to thereby select second device 261 (or first external display 260).

Figure 19:
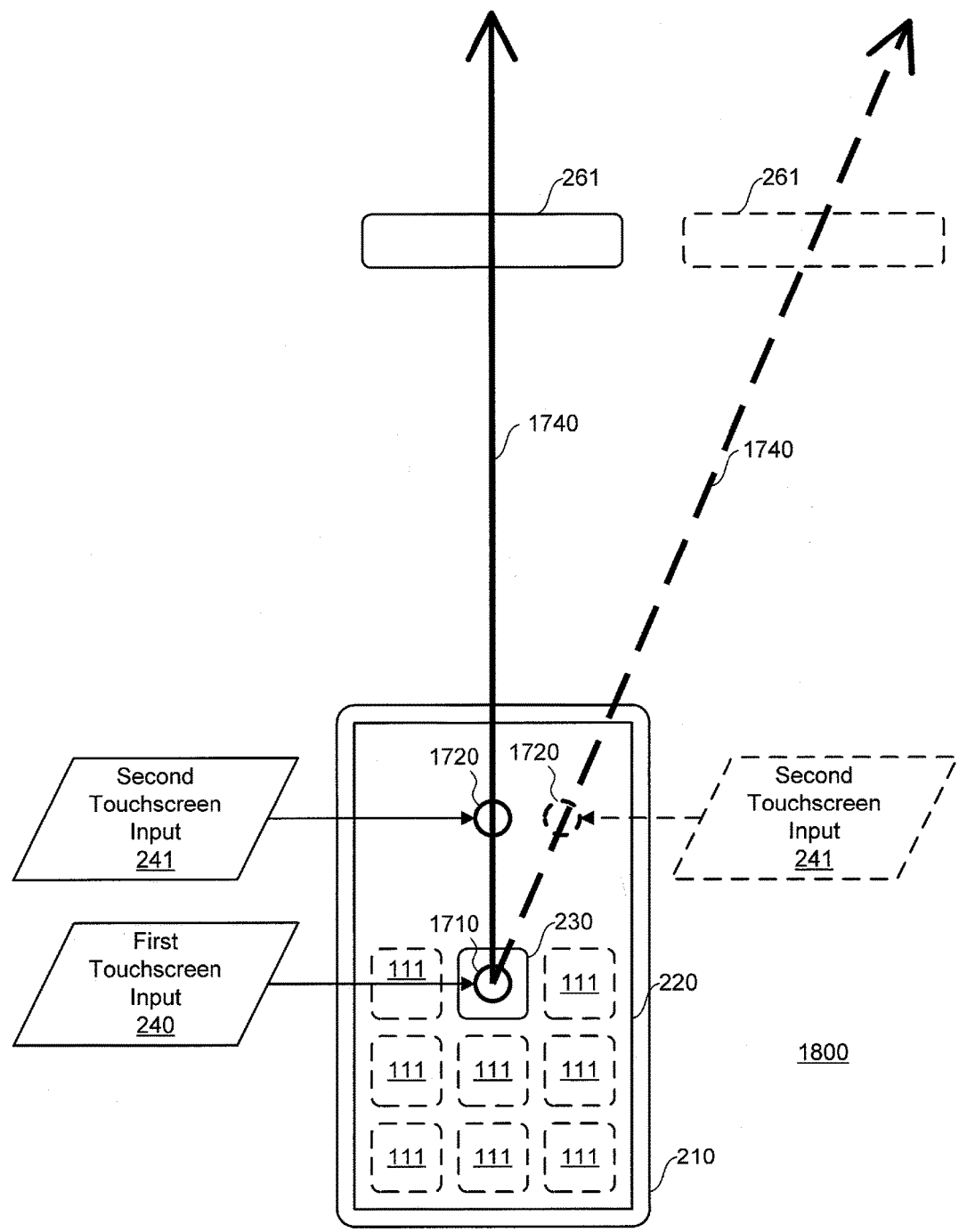
FIG. 19 is a plan view of a first exemplary display selection paradigm in accordance with an embodiment.

To illustrate, and with reference now to FIG. 19, a first exemplary display selection paradigm 1800 in accordance with an embodiment is shown. In particular, first and second touchscreen inputs 240, 241 are received at first and second locations 1710, 1720, respectively, on first touchscreen 220, wherein first touchscreen input 240 indicates first data selection 250. Additionally, first geometric ray 1740 is identified, wherein first geometric ray 1740 is based on first and second locations 1710, 1720, such as where first geometric ray 1740 is identified as (1) beginning at first location 1710 and (2) traveling through second location 1720. Furthermore, it is determined that second device 261 is located along first geometric ray 1740 in order to thereby select first external display 260. For example, and with reference to FIGS. 10 and 19, second device 261 is selected based on first and second touchscreen inputs 240, 241, and first external display 260 is then identified and selected based on display parameter 920.

In one embodiment, first and second touchscreen inputs 240, 241 result from a finger sliding or flicking gesture along first touchscreen 220. Consider the example where a user's finger touches first touchscreen 220 at first location 1710. The user's finger then slides to second location 1720 on first touchscreen 220, such as pursuant to a sliding or flicking motion, such that both first and second touchscreen inputs 240, 241 are sensed by first touchscreen 220. In this manner, it is noted that the identification of first geometric ray 1740 may result from a user's finger sliding or flicking gesture, such as may occur when the user is attempting to slide or flick a selected icon in the direction of a specific external display to thereby cause information associated with such icon to be displayed on such external display.

Figure 20:
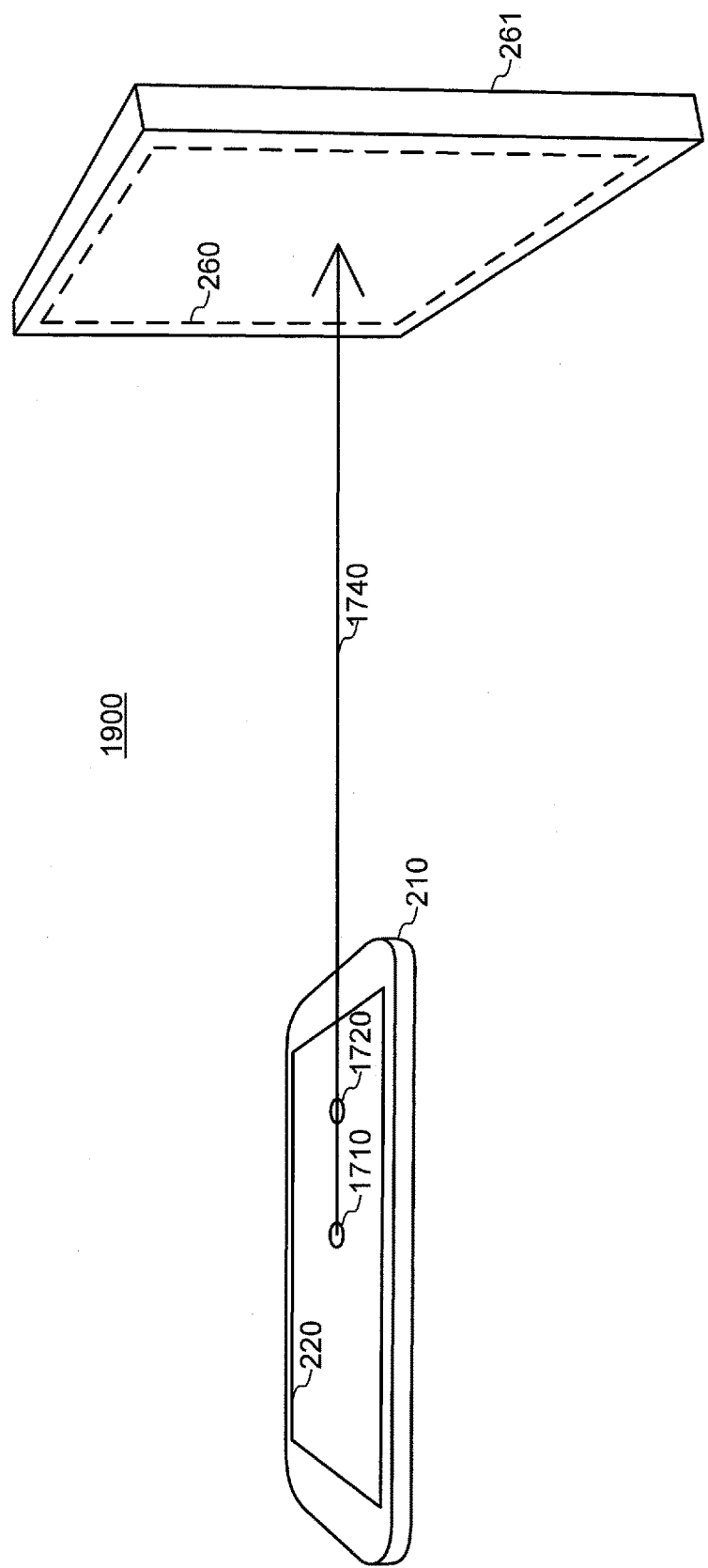
FIG. 20 is a perspective view of a first exemplary ray identification paradigm in accordance with an embodiment.

To further illustrate, and with reference now to FIG. 20, a first exemplary ray identification paradigm 1900 in accordance with an embodiment is shown. In particular, it is determined that each of first and second locations 1710, 1720, as well as second device 261, are located along first geometric ray 1740, and first geometric ray 1740 is selected based on this determination. For purposes of illustration, it is noted that first device 210 may be said to be "aimed at" second device 261 in FIG. 20, because second device 261 is positioned along first geometric ray 1740, wherein first geometric ray 1740 is determined (as previously discussed) based on first and second locations 1710, 1720 within first touchscreen 220.

Indeed, in one embodiment, an optic signal (such as discussed herein with reference to FIGS. 15-17) is transmitted toward second device 261 along first geometric ray 1740 (e.g., based on first and second locations 1710, 1720). In response to second device 261 receiving this optic signal, second device 261 communicates to first device 210 that second device 261 is capable of communicating with first device 210. Consequently, first device 210 then has the option of causing specific data, such as first data set 231 (not shown), to be routed to second device 261.

With reference again to FIG. 18, an embodiment provides that geometric ray identification module 1730 is further configured to identify first geometric ray 1740 based on first location 1710, second location 1720 and a spatial orientation 1770 of first touchscreen 220 relative to a reference plane. To illustrate, and with reference now to FIG. 21, a second exemplary ray identification paradigm 2000 in accordance with an embodiment is shown. In particular, a spatial orientation of first touchscreen 220 relative to a reference plane 2010 (e.g., a horizontal reference plane) is identified, such as where first device 210 is tilted relative to reference plane 2010. Additionally, first geometric ray 1740 is identified based on first location 1710, second location 1720 and the aforementioned relative spatial orientation.

To further illustrate, consider the example where a reference ray 2020 is identified based on both of first and second locations 1710, 1720 being located along reference ray 2020. Additionally, a reference angle 2030 (e.g., an angle of altitude or elevation) is identified between reference ray 2020 and reference plane 2010. Furthermore, first geometric ray 1740 is identified based on reference ray 2020 and reference angle 2030, such as where the calculated angle of altitude or elevation is utilized to determine the horizontal vector associated with reference ray 2020, and second device 261 is identified based on second device 261 being located along first geometric ray 1740. Thus, in FIG. 21, even though first device 210 is not "aimed at" second device 261 in the manner that was presented herein with reference to FIG. 20, second device 261 will nevertheless be identified and selected.

Figure 21:
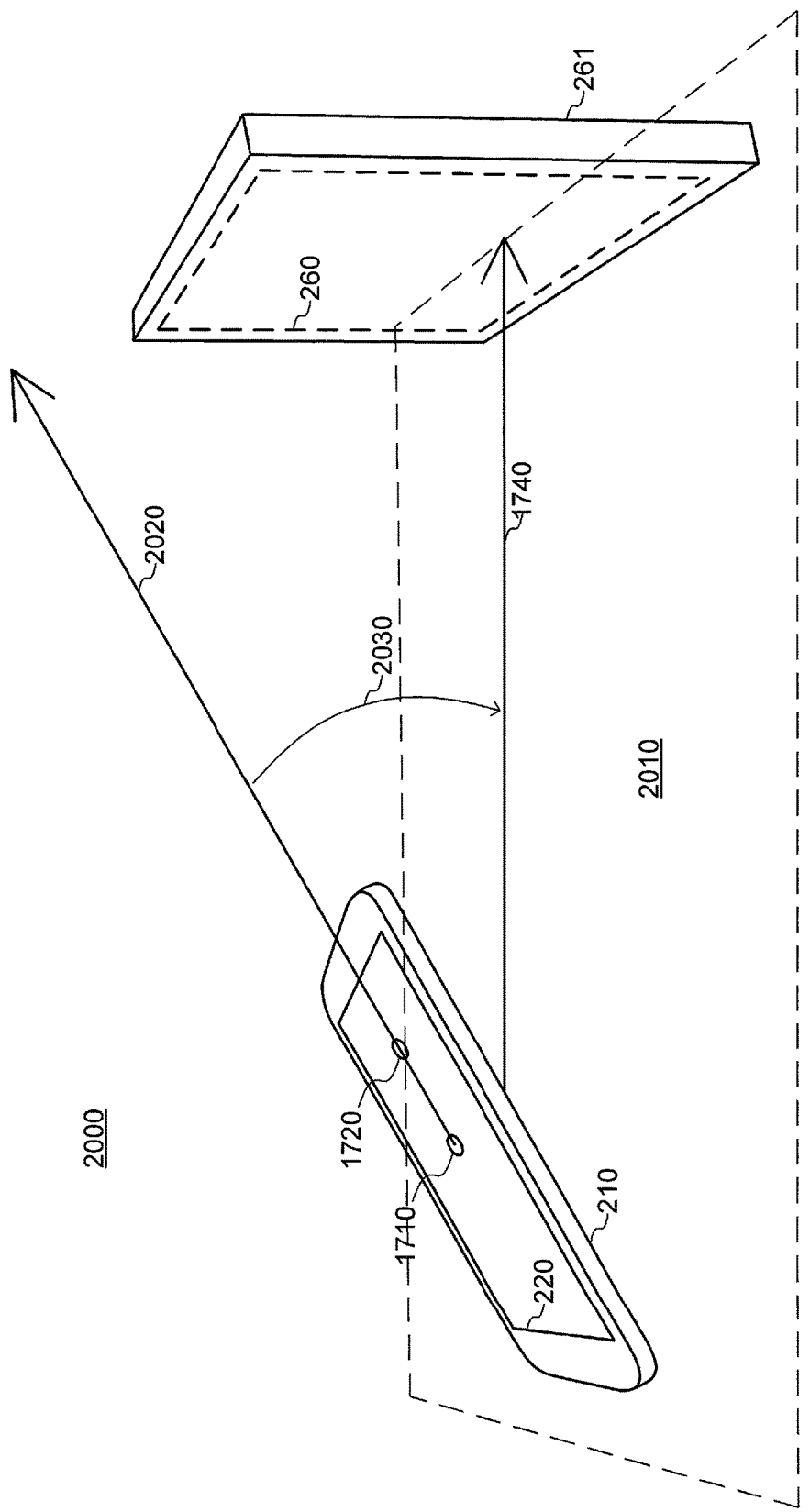
FIG. 21 is a perspective view of a second exemplary ray identification paradigm in accordance with an embodiment.

With reference still to FIG. 21, an embodiment provides that first geometric ray 1740 is identified as beginning at, or being aligned with, for example, first location 1710 on first touchscreen 220. Pursuant to one embodiment, however, first geometric ray 1740 begins at, or is aligned with, a different preselected point on or within either of first touchscreen 220 and first device 210. As such, it is noted that the present technology is not limited to any specific geometric paradigm.

Figure 22:
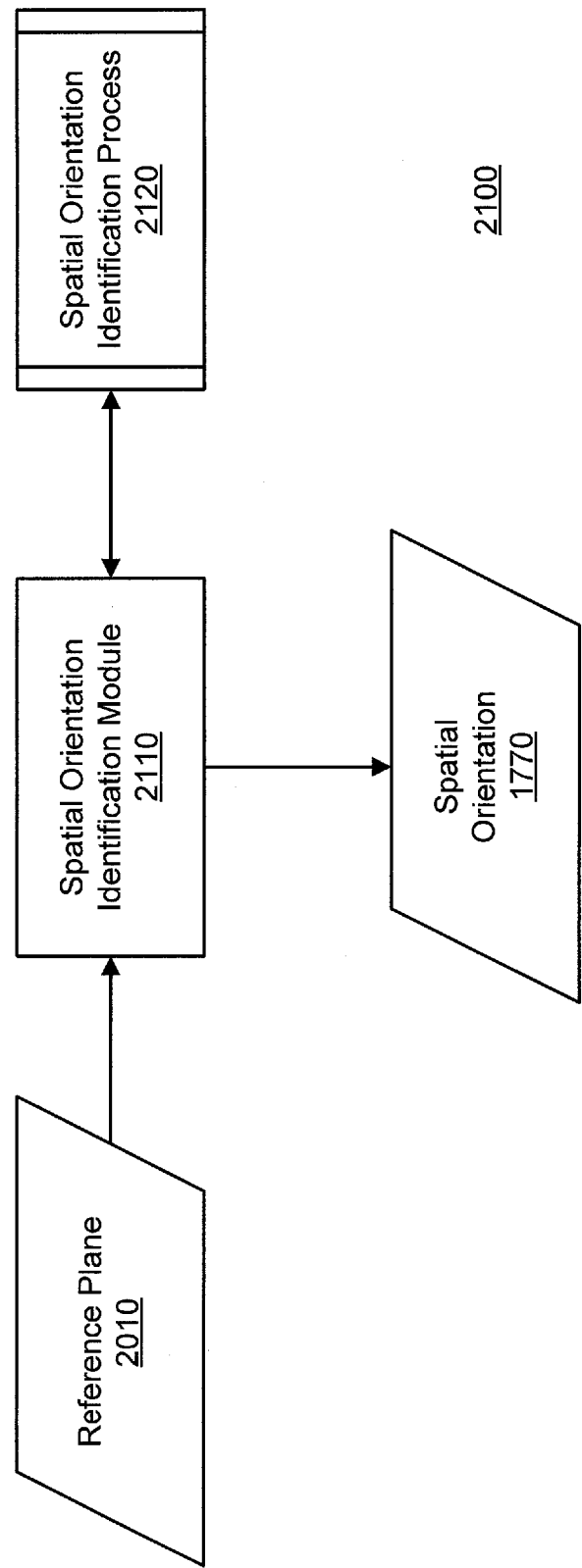
FIG. 22 is a block diagram of an exemplary spatial orientation identification system in accordance with an embodiment.

With reference now to FIG. 22, an exemplary spatial orientation identification system 2100 in accordance with an embodiment is shown. Exemplary spatial orientation identification system 2100 includes a spatial orientation identification module 2110, which may be communicatively associated or coupled with device selection module 1750 (not shown). Spatial orientation identification module 2110 is configured to implement a spatial orientation identification process 2120 to thereby identify spatial orientation 1770 of first touchscreen 220 relative to reference plane 2010, such as in a manner discussed above with reference to FIG. 21. It is noted, however, that the present technology is not limited to any particular spatial orientation identification process.

Figure 23:
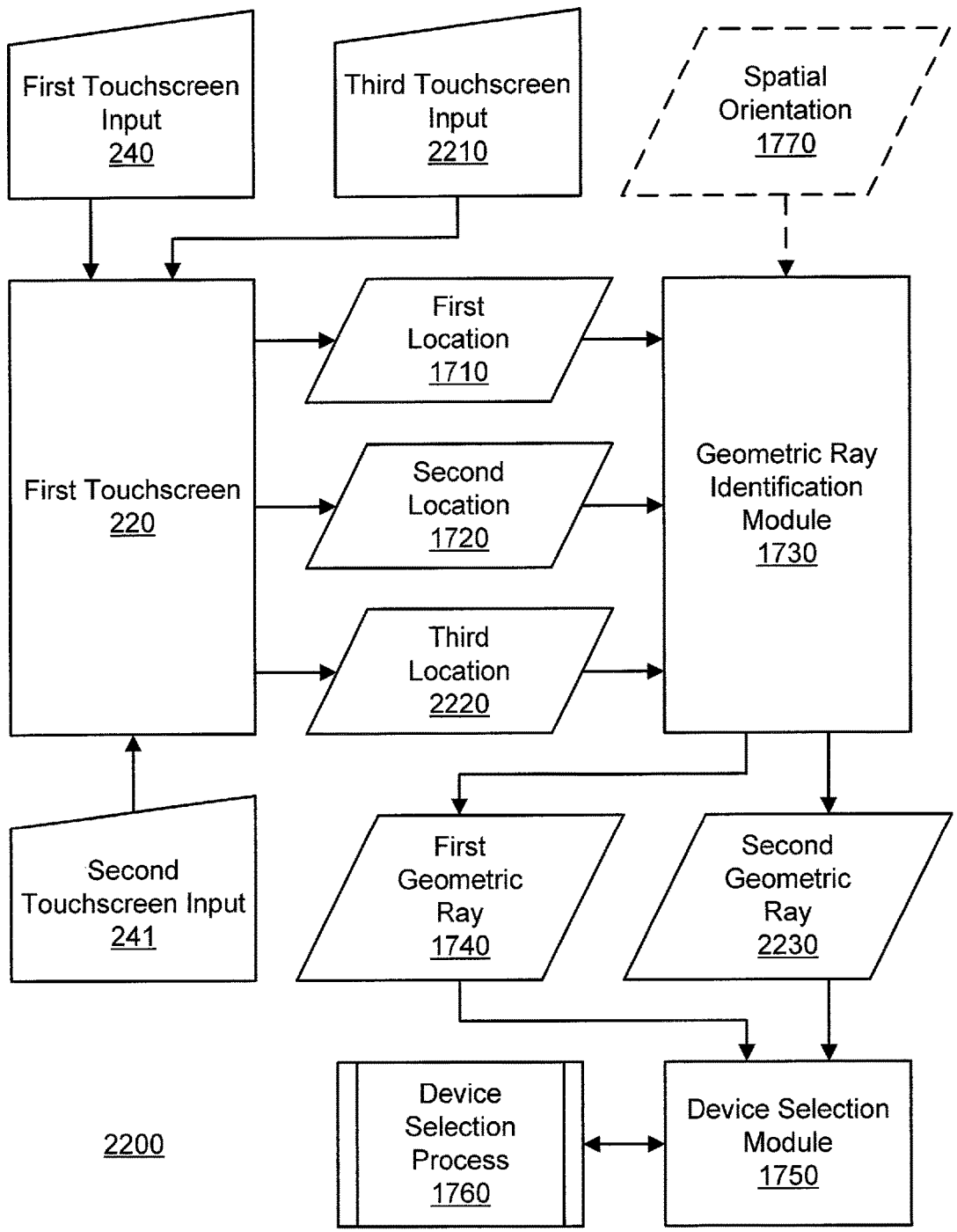
FIG. 23 is a block diagram of a second exemplary device selection system in accordance with an embodiment.

With reference now to FIG. 23, a second exemplary device selection system 2200 in accordance with an embodiment is shown. Second exemplary device selection system 2200 is similar to first exemplary device selection system 1700 of FIG. 18. In addition, however, data sharing control module 130 (not shown) is further configured to enable a detection of a third touchscreen input 2210 at a third location 2220 on first touchscreen 220. Moreover, geometric ray identification module 1730 is further configured to identify a second geometric ray 2230 based on first and third locations 1710, 2220, and device selection module 1750 is configured to implement device selection process 1760 to thereby determine that a third device, which includes a second external display, is located along second geometric ray 2230 to thereby select this second external display.

Figure 24:
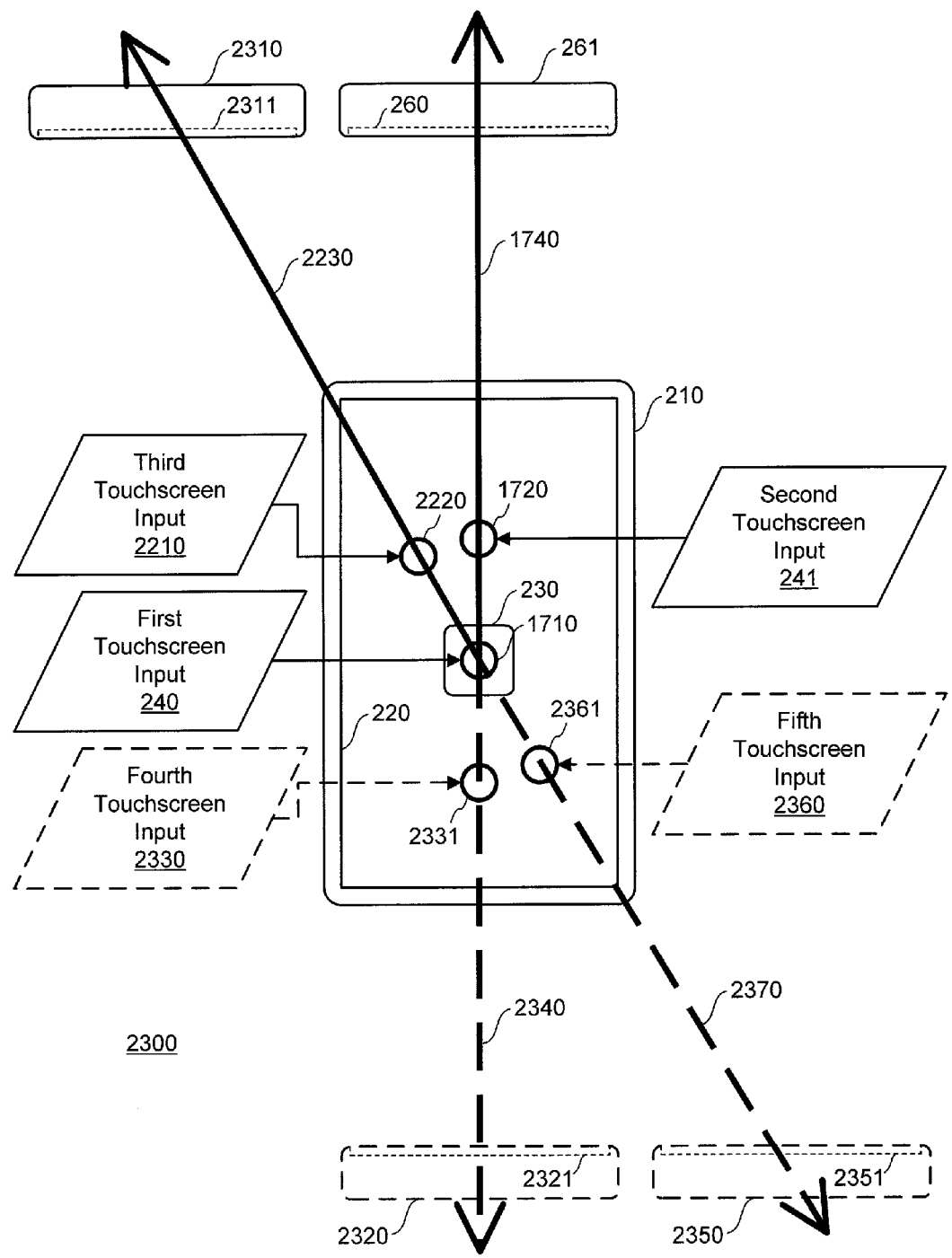
FIG. 24 is a plan view of a second exemplary display selection paradigm in accordance with an embodiment.

To illustrate, and with reference now to FIG. 24, a second exemplary display selection paradigm 2300 in accordance with an embodiment is shown. In particular, third touchscreen input 2210 is received at third location 2220 on first touchscreen 220. Additionally, a second geometric ray 2230 is identified based on first and third locations 1710, 2220. Furthermore, it is determined that a third device 2310 is located along second geometric ray 2230, and third device 2310 is selected based on this determination. Indeed, pursuant to one example, it is determined that third device 2310, which includes a second external display 2311, is located along second geometric ray 2230, and second external display 2311 is selected based on this determination.

The foregoing notwithstanding, an embodiment provides that first device 210 may be positioned between a number of external displays, such as where a number of external displays are located in front of first device 210 while a number of other external displays are located behind first device 210. For example, pursuant to one embodiment, first device 210 is positioned approximately between second device 261 and a fourth device 2320, wherein fourth device 2320 includes a third external display 2321. Second touchscreen input 241 is received at second location 1720 on first touchscreen 220, first geometric ray 1740 is identified based on first and second locations 1710, 1720, it is determined that second device 261 is located along first geometric ray 1740, and first external display 260 is selected based on this determination. Additionally, a fourth touchscreen input 2330 is received at a fourth location 2331 on first touchscreen 220, a third geometric ray 2340 is identified based on first and fourth locations 1710, 2331, it is determined that fourth device 2320 is located along third geometric ray 2340, and third external display 2321 is selected based on this determination.

Alternatively, or in addition to the foregoing, an embodiment provides that first device 210 is positioned approximately between third device 2310 and a fifth device 2350, wherein fifth device 2350 includes a fourth external display 2351. Third touchscreen input 2210 is received at third location 2220 on first touchscreen 220, second geometric ray 2230 is identified based on first and third locations 1710, 2220, it is determined that third device 2310 is located along second geometric ray 2230, and second external display 2311 is selected based on this determination. Moreover, a fifth touchscreen input 2360 is received at a fifth location 2361 on first touchscreen 220, a fourth geometric ray 2370 is identified based on first and fifth locations 1710, 2361, it is determined that fifth device 2350 is located along fourth geometric ray 2370, and fourth external display 2351 is selected based on this determination.

Thus, in accordance with an embodiment, different locations on first touchscreen 220 may be touched to thereby cause one or more specific external displays to be selected. As such, a number of exemplary gestures that may be implemented to touch different locations on first touchscreen 220 will now be explored. It is noted, however, that the present technology is not limited to these exemplary gestures. Indeed, various other gestures not discussed herein may be implemented.

Figure 25A:
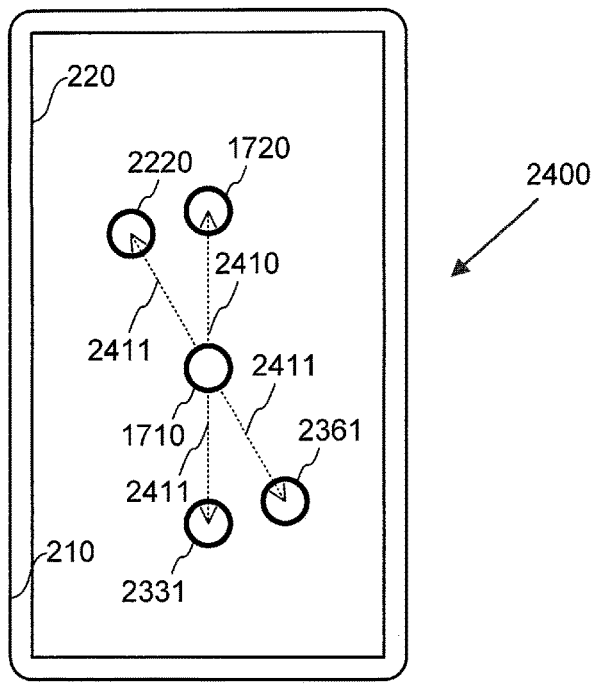
FIG. 25A is a plan view of a first exemplary gesture paradigm in accordance with an embodiment.

With reference now to FIG. 25A, a first exemplary gesture paradigm 2400 in accordance with an embodiment is shown. In particular, data sharing control module 130 (not shown) is configured to enable a detection of a "sliding" gesture (such as indicated by linear path 2410) along first touchscreen 220, wherein the sliding gesture indicates first and second touchscreen inputs 240, 241 at first and second locations 1710, 1720, respectively, such that the sliding gesture indicates first data selection 250 and first target selection 251. Additionally, for purposes of further illustration, a number of other possible linear paths 2411 are also illustrated.

Figure 25B:
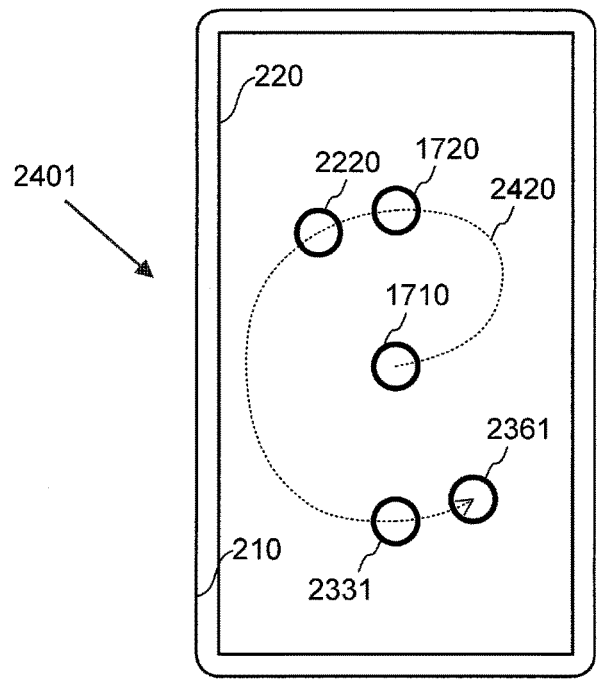
FIG. 25B is a plan view of a second exemplary gesture paradigm in accordance with an embodiment.

The foregoing notwithstanding, it is noted that the present technology is not limited to linear gestures. Indeed, nonlinear gestures may also be implemented. Moreover, it is noted that, in certain circumstances, a single nonlinear gesture may be more efficient for the selection of multiple external displays than would multiple linear gestures. To illustrate, and with reference now to FIG. 25B, a second exemplary gesture paradigm 2401 in accordance with an embodiment is shown. In particular, data sharing control module 130 (not shown) is configured to enable a detection of a "spiral" gesture (as indicated by nonlinear path 2420) made along first touchscreen 220, wherein the aforementioned first, second and third touchscreen inputs 240, 241, 2210 (and optionally also the aforementioned fourth and fifth touchscreen inputs 2330, 2360) result from this spiral gesture along first touchscreen 220.

For example, a user's finger touches first touchscreen 220 at first location 1710 and then travels along nonlinear path 2420 to second and third locations 1720, 2220. The user's finger may then continue to travel along nonlinear path 2420 to fourth and fifth locations 2331, 2361. Consequently, nonlinear path 2420 defines a spiral-shaped path along first touchscreen 220 such that first, second, third, fourth and fifth touchscreen inputs 240, 241, 2210, 2330, 2360 result from what may be referred to, for example, as a "spiral" gesture along first touchscreen 220. Furthermore, in one embodiment, the user's finger remains in physical contact with first touchscreen 220 between first location 1710 and the last identified location (e.g., fifth location 2361) along nonlinear path 2420 such that this spiral gesture has concluded before the user's finger is lifted away from first touchscreen 220. In this manner, multiple external devices may be selected with a single gesture along first touchscreen 220.

Figure 25C:
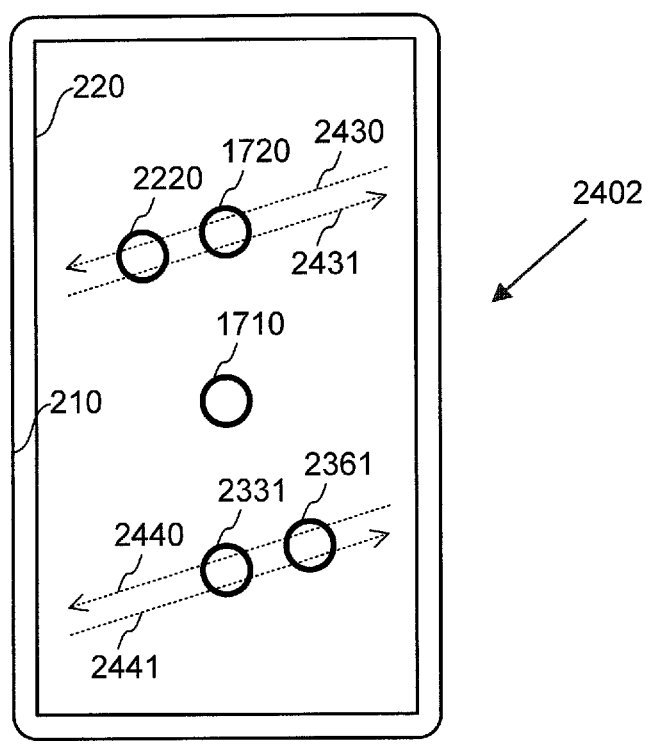
FIG. 25C is a plan view of a third exemplary gesture paradigm in accordance with an embodiment.

It is further noted that the present technology is not limited to merely a single gesture along first touchscreen 220. Indeed, multiple gestures along first touchscreen 220 may be implemented. To illustrate, and with reference now to FIG. 25C, a third exemplary gesture paradigm 2402 in accordance with an embodiment is shown. In particular, a user's finger touches first touchscreen 220 at first location 1710 and is then lifted away from first touchscreen 220 such that the user's finger is no longer in physical contact with first touchscreen 220. This first gesture may be referred to, for example, as a "touch" gesture. After this touch gesture, the user's finger again touches first touchscreen 220 and travels along a linear path (such as along first or second exemplary linear paths 2430, 2431) to second and third locations 1720, 2220. This second gesture may be referred to, for example, as a "linear" gesture. The combination of these touch and linear gestures causes first, second and third touchscreen inputs 240, 241, 2210 to be received by first touchscreen 220.

Similarly, in one embodiment, after the initial touch gesture at first location 1710 (and optionally before or after the linear gesture along second and third locations 1720, 2220), the user's finger again touches first touchscreen 220 and travels along a linear path (such as along third or fourth exemplary linear paths 2440, 2441) to fourth and fifth locations 2331, 2361. This latter gesture may also be referred to, for example, as a "linear" gesture, and the combination of the initial touch gesture at first location 1710 and the subsequent linear gesture at fourth and fifth locations 2331, 2361 causes first, fourth and fifth touchscreen inputs 240, 2330, 2360 to be received by first touchscreen 220.

Figure 26A:
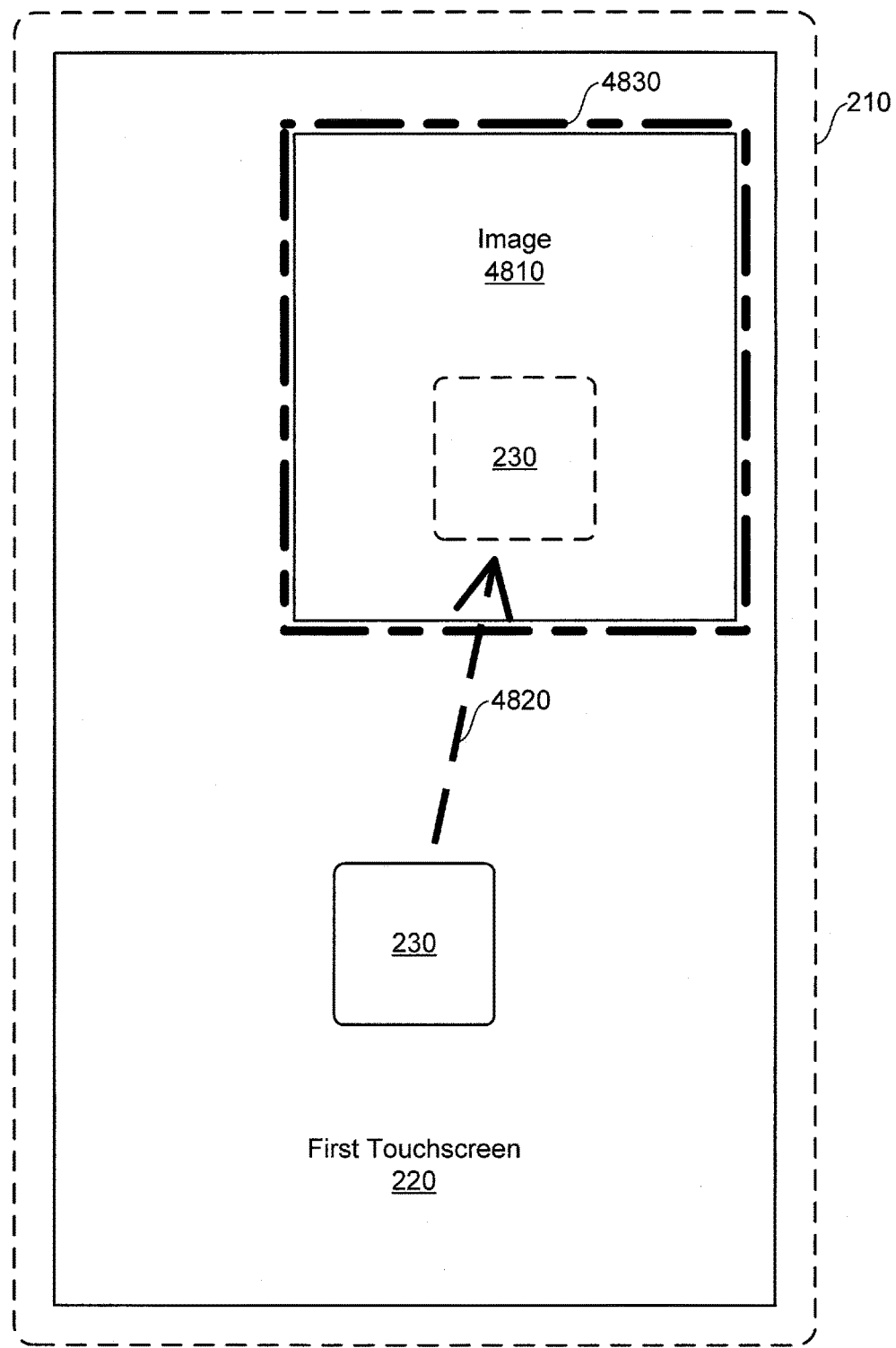
FIG. 26A is a plan view of an exemplary external device imaging paradigm in accordance with an embodiment.

With reference now to FIG. 26A, an exemplary external device imaging paradigm 4800 in accordance with an embodiment is shown. In particular, data sharing control module 130 (not shown) is configured to enable a display an image 4810 of second device 261 on first touchscreen 220. Consider the example where first device 210 includes a digital camera. When this digital camera is "aimed" at second device 261, this digital camera may be activated to thereby capture a digital image of second device 261, and this digital image may be displayed on first touchscreen 220. Additionally, the fact that second device 261 has been identified as an available external device may be communicated to a user using first touchscreen 220.

To illustrate, upon or subsequent to the device identification process discussed above, whereby second device 261 is identified as an available external device, object recognition software is utilized to identify image 4810 as being a graphical representation of second device 261. Consequently, image 4810 is identified as a recognized "object" within a larger background image displayed on first touchscreen 220. This recognition may be displayed to a user, for example, by displaying a conspicuous border 4830 around the recognized object. For example, border 4830 may be a broken (as shown) or solid border having a color or contrast shade/hue that is easily discernable from a remainder of the background image, and border 4830 may optionally be blinking or have a changing color or contrast shade/hue so as to be even more conspicuous to a user. Indeed, one embodiment provides that a conspicuous color or contrast shade/hue is automatically chosen on the fly using imaging processing software.

With reference still to FIG. 26A, data sharing control module 130 is also configured to enable a routing of first data set 231 (not shown) to second device 261 in response to a selection of image 4810 within first touchscreen 220. For example, data sharing control module 130 may be configured to enable a routing of first data set 231 to second device 261 in response to (1) a repositioning of first graphical representation 230 toward image 4810 (e.g., in exemplary direction 4820) on first touchscreen 220, wherein this repositioning indicates first target selection 251 (see FIG. 2A), or (2) a touching of image 4810 on first touchscreen 220, wherein this touching of image 4810 indicates first target selection 251.

Figure 26B:
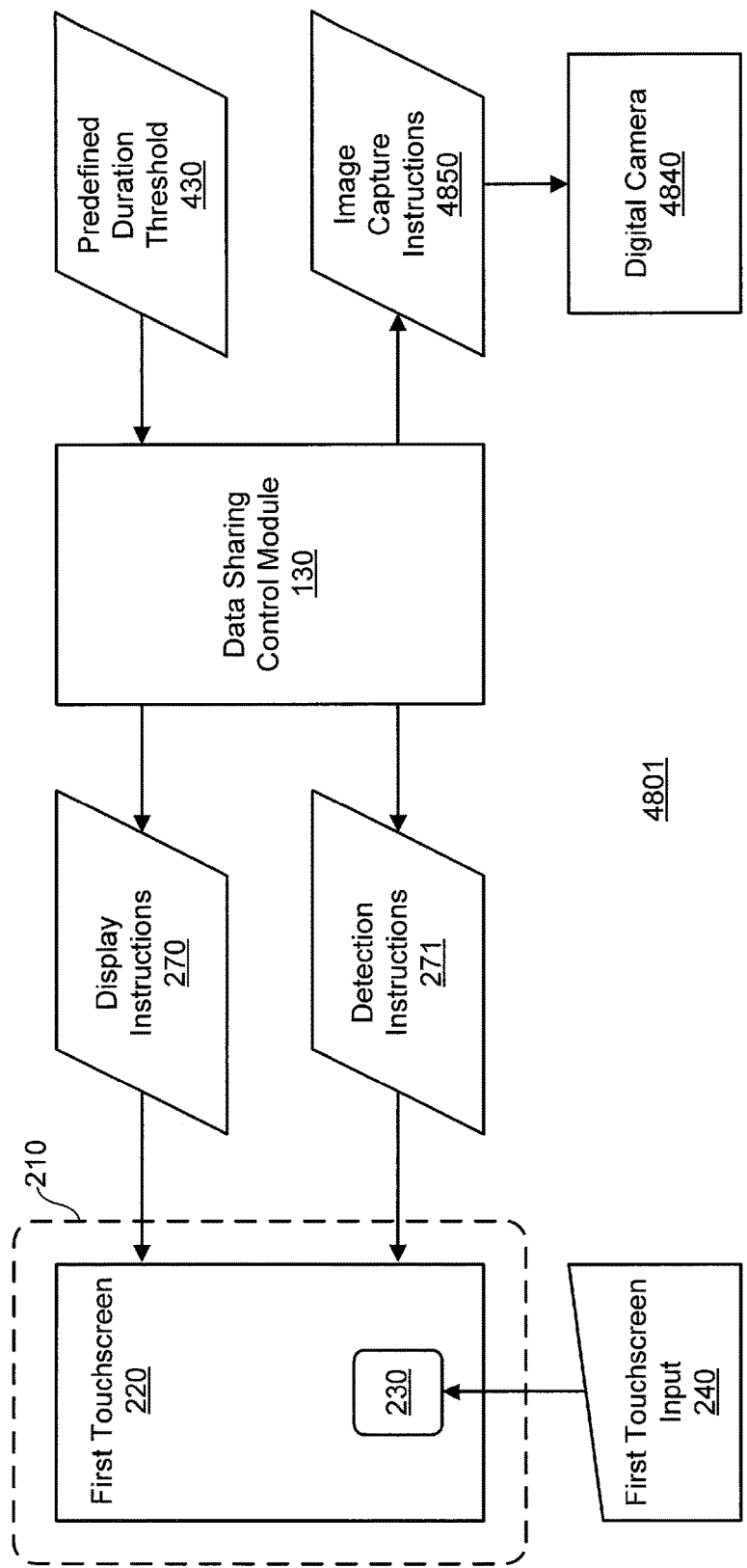
FIG. 26B is a block diagram of an exemplary external device imaging system in accordance with an embodiment.

With reference now to FIG. 26B, an exemplary external device imaging system 4801 in accordance with an embodiment is shown. Exemplary external device imaging system 4801 includes a digital camera 4840 that is communicatively associated or coupled with data sharing control module 130. Data sharing control module 130 is configured to enable a detection of a touching (see, e.g., first touchscreen input 240) of a location on first touchscreen 220, wherein this location corresponds to first graphical representation 330. This may be accomplished, for example, by data sharing control module 130 generating detection instructions 271 and transmitting detection instructions 271 to digital camera 4840. Data sharing control module 130 is also configured to (1) activate digital camera 4840 based on a duration of this touching of such location being longer than a predefined duration threshold 430 and (2) enable a generation of image 4810 (see FIG. 26A) with digital camera 4840. This may be accomplished, for example, by data sharing control module 130 generating image capture instructions 4850 and transmitting image capture instructions 4850 to digital camera 4840. Data sharing control module 130 is further configured to enable a display of image 4810 on said first touchscreen 220 such that second device 261 is graphically identified as an available external device (see, e.g., FIG. 26A). This may be accomplished, for example, by data sharing control module 130 generating display instructions 270 and transmitting display instructions 270 to digital camera 4840.

The foregoing notwithstanding, in one embodiment, image 4810 is actually a virtual representation of second device 261. For example, rather than being an accurate image of the actual shape, color, hue, etc., of second device 261, image 4810 may be a preselected shape or icon that represents second device 261 without actually resembling the appearance of second device 261.

VI. Virtual Mapping

The foregoing notwithstanding, in one embodiment, a virtual map of the available external displays is generated (e.g., on first touchscreen 220) such that a user may simply select from this virtual map a specific external device to which first data set 231 is to be routed. Consequently, a number of exemplary map generation systems and paradigms will now be explored. However, the present technology is not limited to these exemplary systems and paradigms. Indeed, other systems and paradigms may be implemented.

Figure 27:
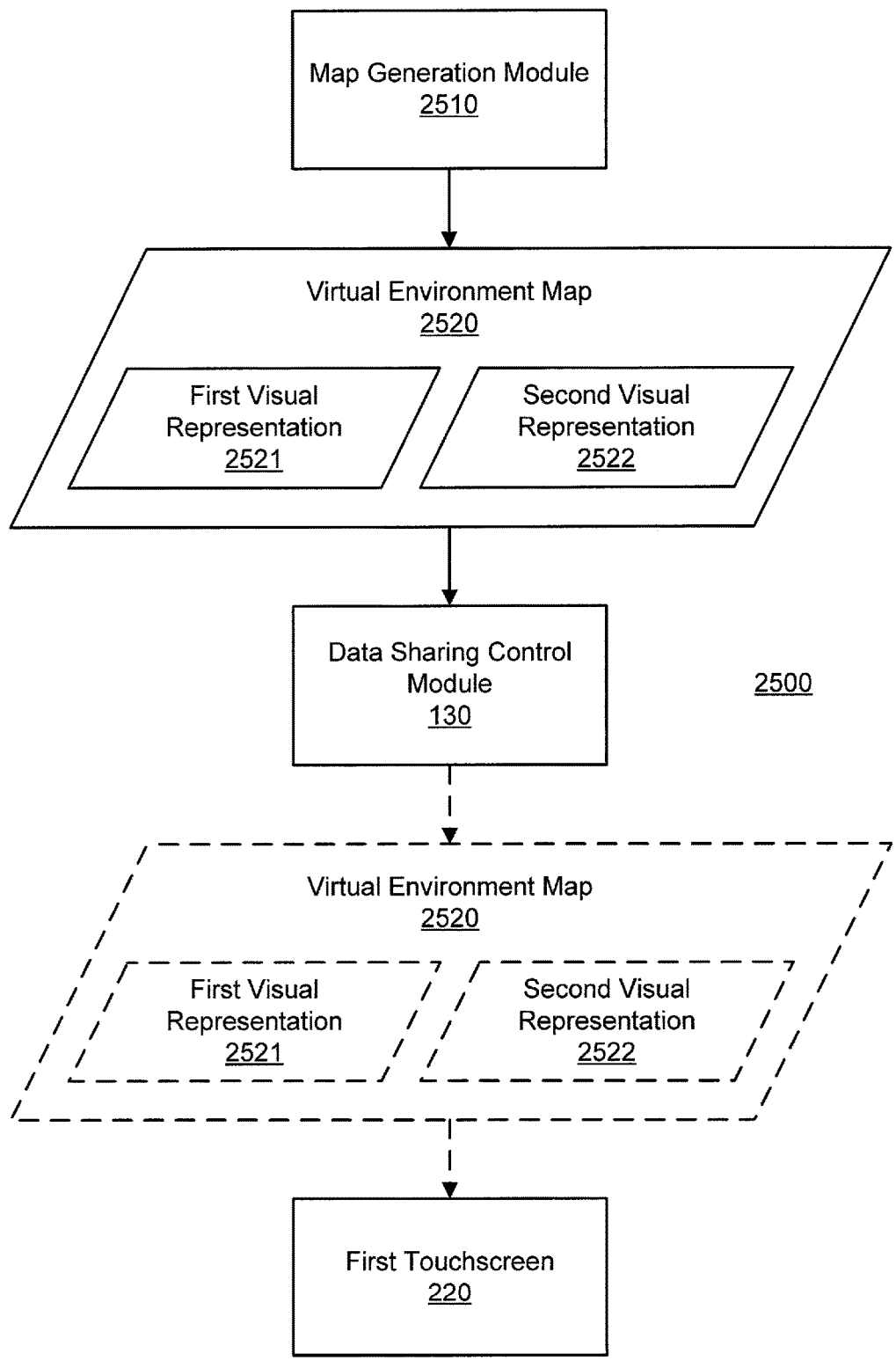
FIG. 27 is a block diagram of an exemplary map generation system in accordance with an embodiment.

To illustrate, and with reference now to FIG. 27, an exemplary map generation system 2500 in accordance with an embodiment is shown. Exemplary map generation system 2500 includes a map generation module 2510 communicatively associated or coupled with data sharing control module 130. Map generation module 2510 is configured to generate a virtual environment map 2520 that includes a first visual representation 2521 of first external display 260 (or of second device 261), and optionally, for example, a second visual representation 2522 of second external display 2311 (or of third device 2310). Moreover, data sharing control module 130 is configured to enable a display of virtual environment map 2520 on first touchscreen 220.

In one embodiment, and with reference to FIGS. 24 and 26, data sharing control module 130 is also configured to enable a detection of first and second touchscreen inputs 240, 241 at first and second locations 1710, 1720, respectively, on first touchscreen 220, wherein first location 1710 corresponds to first graphical representation 230 such that first touchscreen input 240 indicates first data selection 250, and wherein second location 1720 corresponds to first visual representation 2521 such that second touchscreen input 241 indicates first target selection 251. Moreover, one embodiment provides that data sharing control module 130 is further configured to enable a detection of third touchscreen input 2210 at third location 2220 on first touchscreen 220, wherein third location 2220 corresponds to second visual representation 2522 such that third touchscreen input 2210 indicates a second target selection of second external display 2311.

Figure 28:
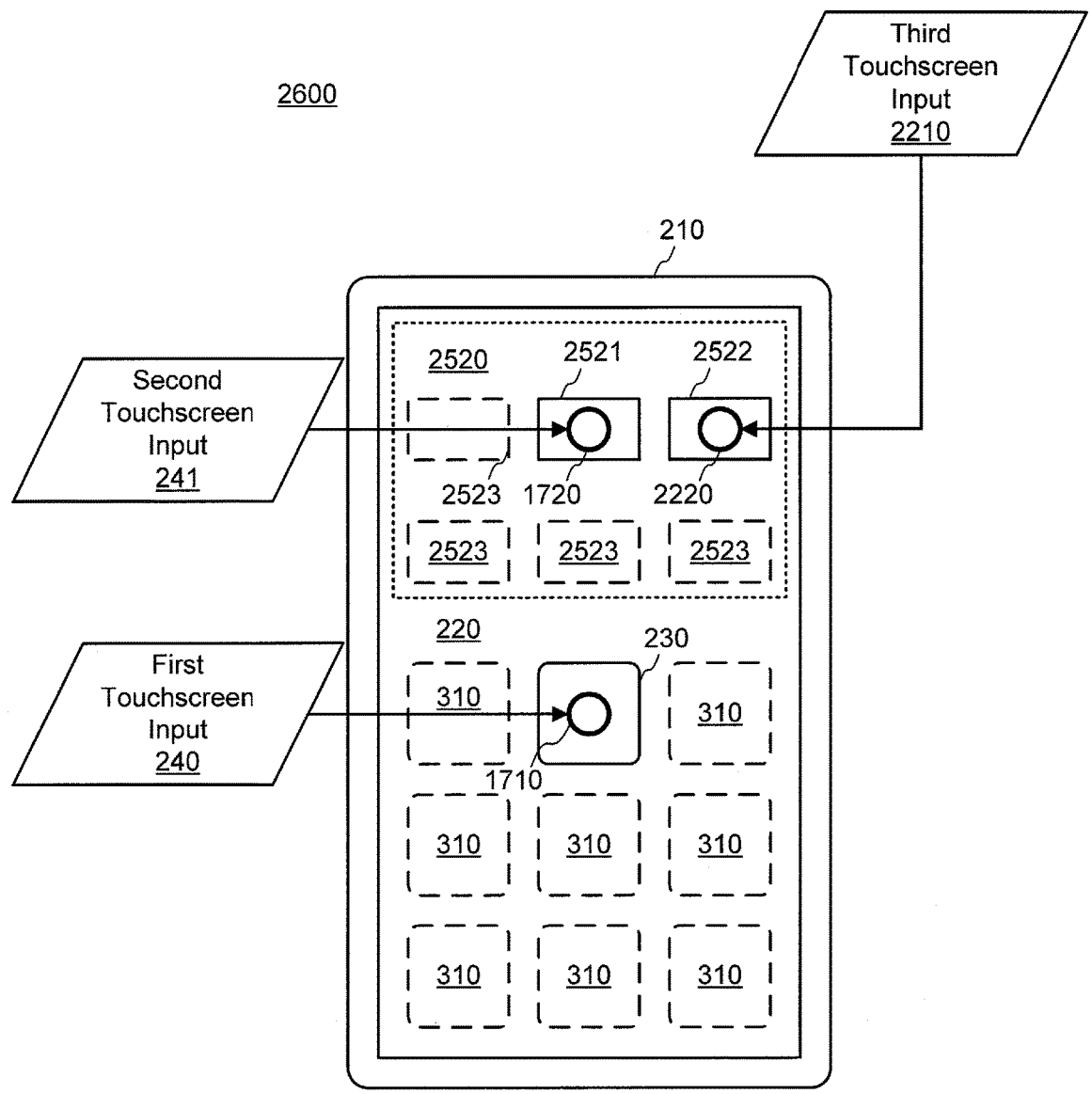
FIG. 28 is a plan view of an exemplary virtual mapping configuration in accordance with an embodiment.

To illustrate, and with reference now to FIG. 28, an exemplary virtual mapping configuration 2600 in accordance with an embodiment is shown. In particular, a virtual environment map 2520 is generated and displayed on first touchscreen 220, wherein virtual environment map 2520 includes first and second visual representations 2521, 2522 of first and second external displays 260, 2311, respectively. For purposes of illustration, virtual environment map 2520 may also include a number of additional visual representations (such as additional virtual representations 2523) of a corresponding number of other external displays. Moreover, first, second and third touchscreen inputs 240, 241, 2210 are received at first, second and third locations 1710, 1720, 2220, respectively, on first touchscreen 220. Furthermore, first location 1710 corresponds to first graphical representation 230 such that first touchscreen input 240 indicates first data selection 250, and second and third locations 1720, 2220 correspond to first and second visual representations 2521, 2522, respectively, such that second and third touchscreen inputs 241, 2210 indicate first and second target selections, respectively.

In one embodiment, map generation module 2510 (not shown) is configured to generate virtual environment map 2520, which includes a visual representation of third device 2310 (or of second external display 2311). Additionally, data sharing control module 130 is configured to enable a display of virtual environment map 2520 on first touchscreen 220 and enable a detection of a touchscreen input at a location on first touchscreen 220. This location corresponds to the visual representation of third device 2310 (or of second external display 2311) such that this touchscreen input indicates a second target selection of third device 2310 (or of second external display 2311). In this manner, third device 2310 (or second external display 2311) may be selected based on a selection of its corresponding visual representation within virtual environment map 2520.

Similarly, a number of additional external devices/displays may be selected based on a selection of a number of additional visual representations within virtual environment map 2520 that correspond to such external devices/displays, respectively. Indeed, it is noted that the present technology is not limited to the implementation of a specific number of external devices/displays, and that many different external devices/displays may be represented within (and consequently selected within) virtual environment map 2520.

The foregoing notwithstanding, one embodiment provides that a user may "flick" or "slide" an icon in a direction of one of the displayed visual representations of the external displays to thereby select one of such external displays. To illustrate, and with reference to FIGS. 2 and 27, an embodiment provides that data sharing control module 130 is configured to enable a detection of first touchscreen input 240 at first location 1710 on first touchscreen 220, wherein first location 1710 corresponds to first graphical representation 230 such that first touchscreen input 240 indicates first data selection 250. Data sharing control module 130 is also configured to enable a flicking or sliding of first graphical representation 230 toward first visual representation 2521 in response to first touchscreen input 240 being received at first location 1710. Data sharing control module 130 is further configured to cause router 120 to route first data set 231 to second device 261 in response to first graphical representation 230 being flicked or slid toward first visual representation 2521.

VII. Multiple Target Selections

In an embodiment, a data set may be routed to multiple external devices. Consequently, a number of exemplary data sharing systems and paradigms will now be explored that may be implemented to route a data set to multiple external devices. However, the present technology is not limited to these exemplary systems and paradigms. Indeed, other systems and paradigms may be implemented.

Figure 29:
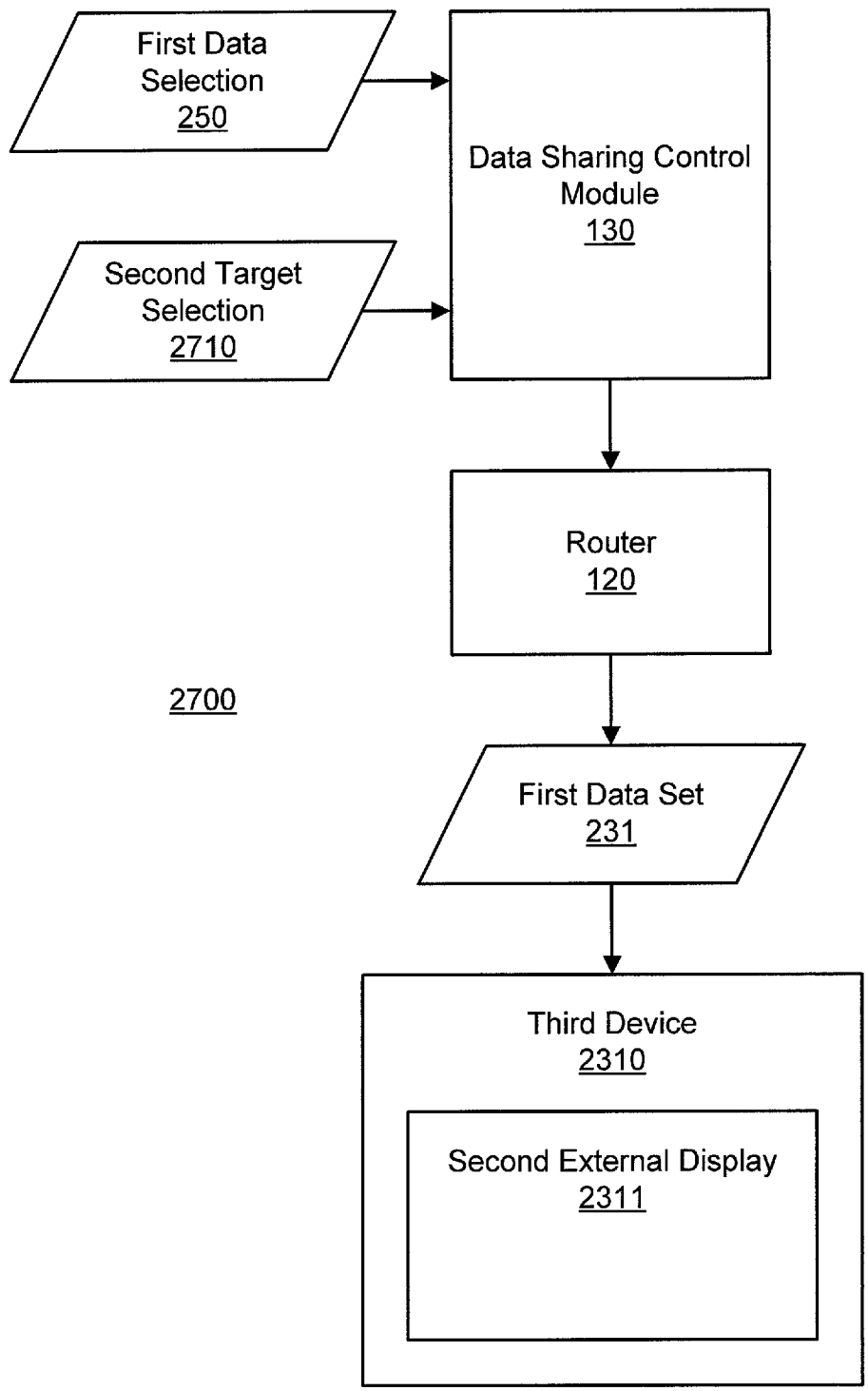
FIG. 29 is a block diagram of a third exemplary data sharing system in accordance with an embodiment.

With reference now to FIG. 29, a third exemplary data sharing system 2700 in accordance with an embodiment is shown. In particular, data sharing control module 130 is configured to access a second target selection 2710 of third device 2310 (or of second external display 2311, such as where third device 2310 includes second external display 2311), and cause router 120 to route first data set 231 to third device 2310 in response to first data selection 250 and second target selection 2710.

Figure 30:
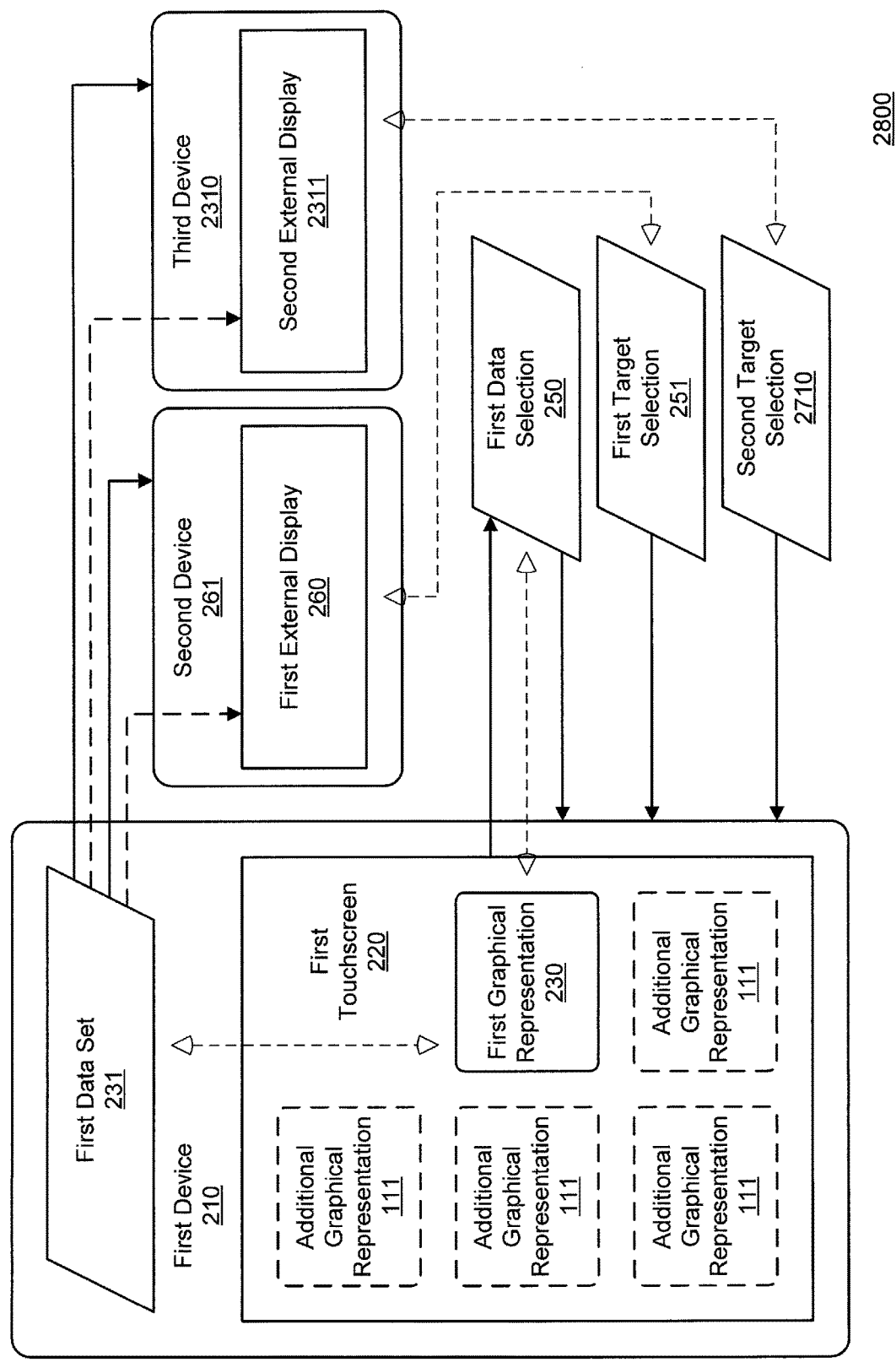
FIG. 30 is a block diagram of a first exemplary data routing paradigm in accordance with an embodiment.

To illustrate, and with reference now to FIG. 30, a first exemplary data routing paradigm 2800 in accordance with an embodiment is shown. In particular, second and third devices 261, 2310 include first and second external displays 260, 2311, respectively. First target selection 251 of first external display 260 is accessed, and first data set 231 is routed to second device 261 in response to first data selection 250 and first target selection 251. Additionally, second target selection 2710 of second external display 2311 is accessed, and first data set 231 is routed to third device 2310 in response to first data selection 250 and second target selection 2710. Thus, it is noted that first data set 231 may be routed to multiple external devices such that data associated with first graphical representation 230 may be displayed on multiple external displays. Indeed, in one embodiment, first data set 231 is routed to multiple (e.g., 2 or more) external devices such that data associated with first graphical representation 230 may be displayed on multiple (e.g., 2 or more) external displays.

Figure 31:
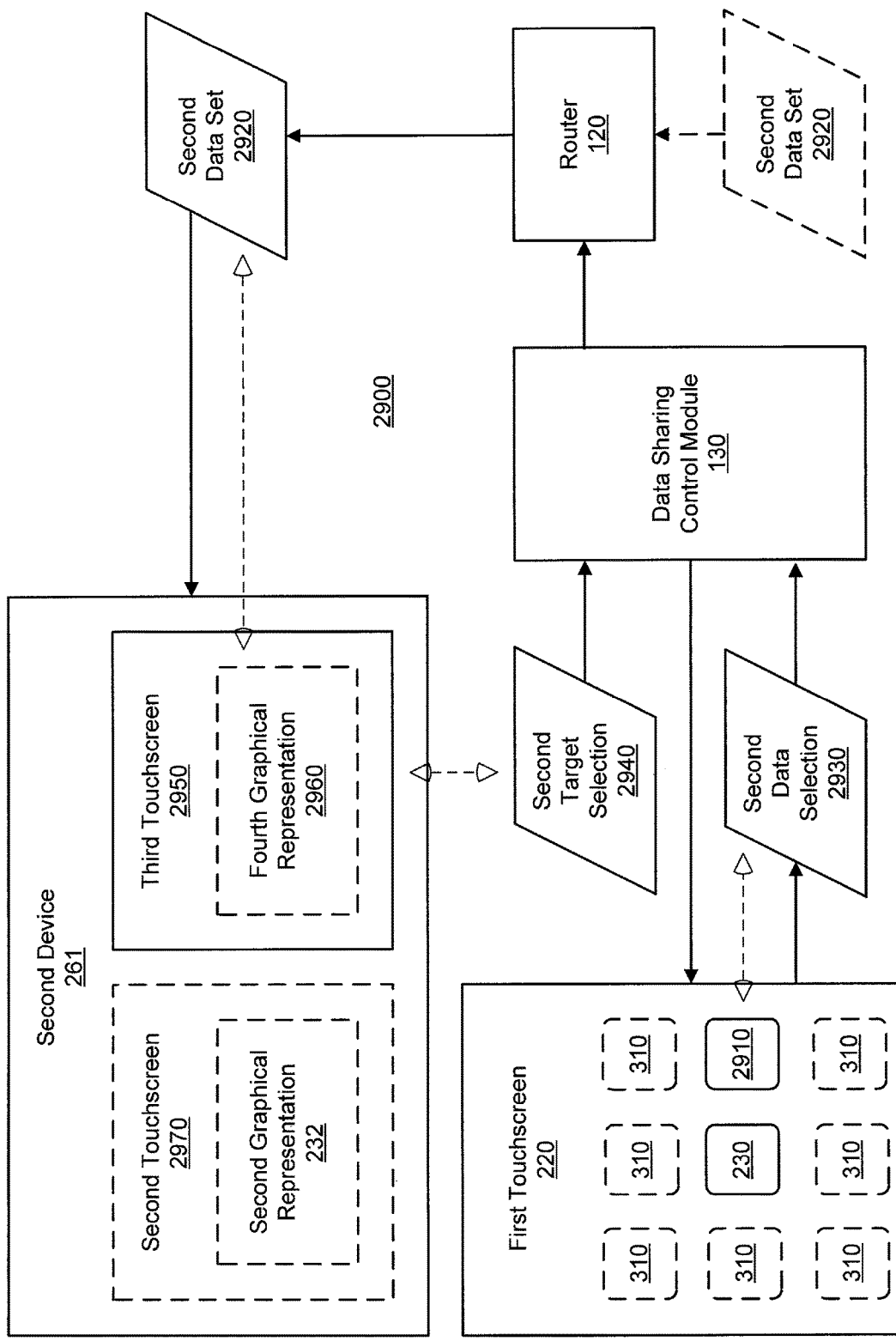
FIG. 31 is a block diagram of a first exemplary display system in accordance with an embodiment.

With reference now to FIG. 31, a first exemplary display system 2900 in accordance with an embodiment is shown. In particular, data sharing control module 130 is configured to enable a display of a third graphical representation 2910 (e.g., an icon) associated with a second data set 2920 on first touchscreen 220 and enable a detection of a second data selection 2930 of third graphical representation 2910 at first touchscreen 220. Data sharing control module 130 is also configured to access a second target selection 2940 of a third touchscreen 2950, wherein second device 261 includes third touchscreen 2950, which is distinguishable from the aforementioned second touchscreen. Data sharing control module 130 is further configured to cause router 120 to route second data set 2920 to second device 261 in response to second data and second target selections 2930, 2940 such that a fourth graphical representation 2960 of, or associated with, second data set 2920 is displayed on third touchscreen 2950.

To illustrate, consider the example where second device 261 includes a second touchscreen 2970 (such as where first external display 260 is or includes second touchscreen 2970) as well as third touchscreen 2950. Data sharing control module 130 is configured to cause router 120 to route first data set 231 to second device 261 in response to first data selection 250 and first target selection 251, as discussed above with reference to FIG. 2A, such that a second graphical representation 232 of, or associated with, first data set 231 is displayed on second touchscreen 2970, as shown in FIG. 31. For example, in response to a user touching (1) first graphical representation 230 on first touchscreen 220 to thereby select the data to be routed as well as (2) second touchscreen 2970 to thereby select the device to which such data is to be routed, this data is routed to second device 261, and second graphical representation 232 is displayed by second touchscreen 2970. Additionally, second data set 2920 is routed to second device 261 in response to second data and second target selections 2930, 2940 such that a fourth graphical representation 2960 of, or associated with, second data set 2920 is displayed on third touchscreen 2950. For example, in response to a user touching (1) third graphical representation 2910 on first touchscreen 220 to thereby select the data to be routed as well as (2) third touchscreen 2950 to thereby select the device to which such data is to be routed, this data is routed to second device 261, and fourth graphical representation 2960 is displayed by third touchscreen 2950. In this manner, a user may touch different icons displayed on first touchscreen 220 and touch different target touchscreens in order to launch files/applications associated with those icons on such target touchscreens, respectively.

Figure 32:
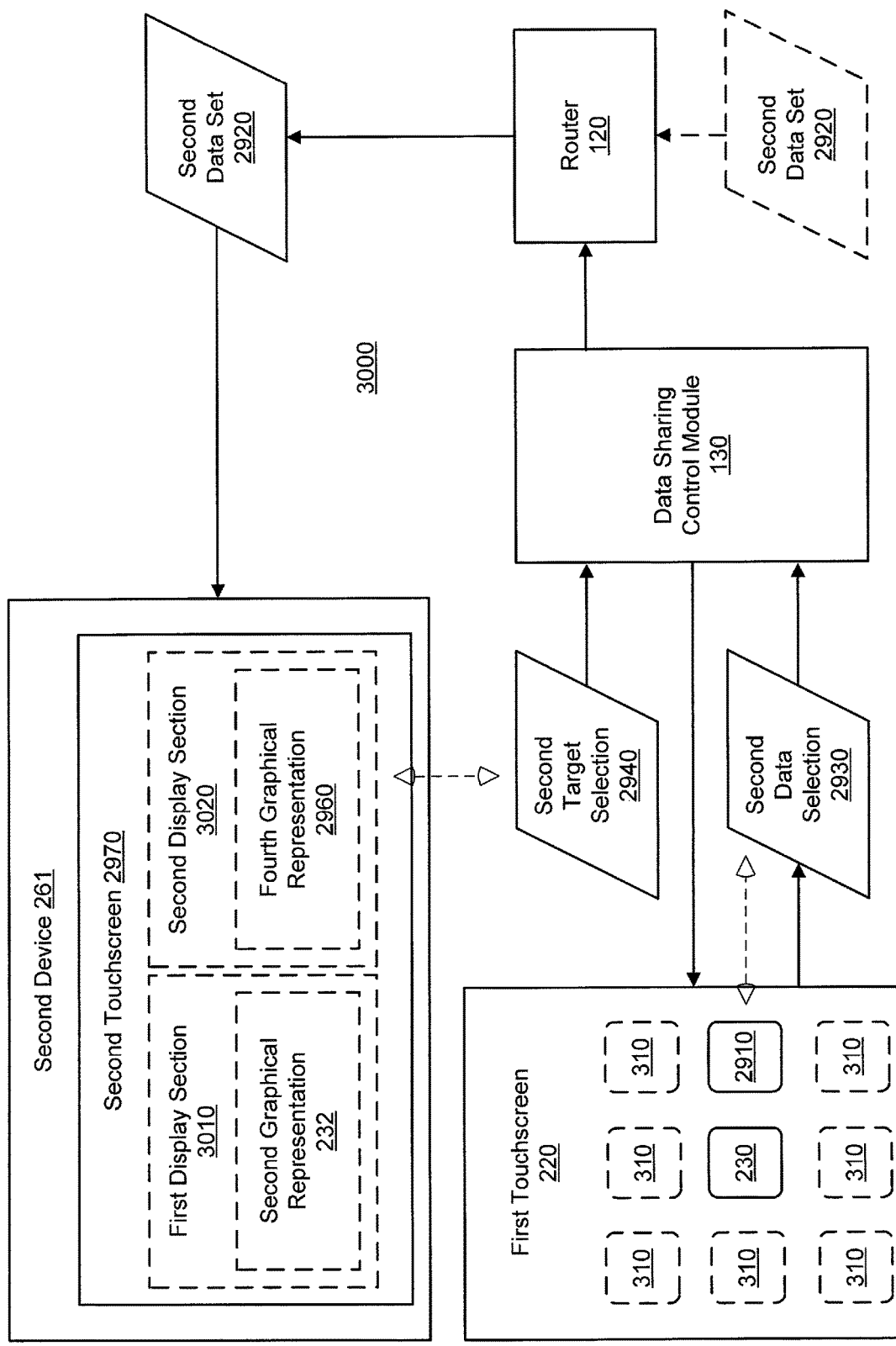
FIG. 32 is a block diagram of a second exemplary display system in accordance with an embodiment.

With reference now to FIG. 32, a second exemplary display system 3000 in accordance with an embodiment is shown. In particular, second device 261 includes a second touchscreen 2970 (such as where first external display 260 is or includes second touchscreen 2970), and second touchscreen 2970 includes first and second display sections 3010, 3020, wherein first target selection 251 corresponds to first display section 3010. Data sharing control module 130 is configured to cause router 120 to route first data set 231 to second device 261 in response to first data selection 250 and first target selection 251, as discussed above with reference to FIG. 2A, such that a second graphical representation 232 of, or associated with, first data set 231 is displayed on second touchscreen 2970 (e.g., within first display section 3010), as shown in FIG. 32.

Additionally, data sharing control module 130 is configured to enable a display of a third graphical representation 2910 associated with a second data set 2920 on first touchscreen 220, enable a detection of a second data selection 2930 of third graphical representation 2910 at first touchscreen 220, and access a second target selection 2940 of second display section 3020. Data sharing control module 130 is also configured to cause router 120 to route second data set 2920 to second device 261 in response to second data and second target selections 2930, 2940 such that a fourth graphical representation 2960 of, or associated with, second data set 2920 is displayed on second touchscreen 2970 (e.g., within second display section 3020), as shown in FIG. 32. In this manner, a user may touch different icons displayed on first touchscreen 220 and select (e.g., by touching) a single target touchscreen in order to launch files/applications associated with those icons in different sections of such target touchscreen, respectively.

VIII. Scrolling

In an embodiment, a user may physically interact with a touchscreen to thereby cause a scrolling of a graphical representation on an external display. Consequently, an exemplary scrolling system will now be explored. However, the present technology is not limited to this exemplary system. Indeed, other systems may be implemented.

Figure 33:
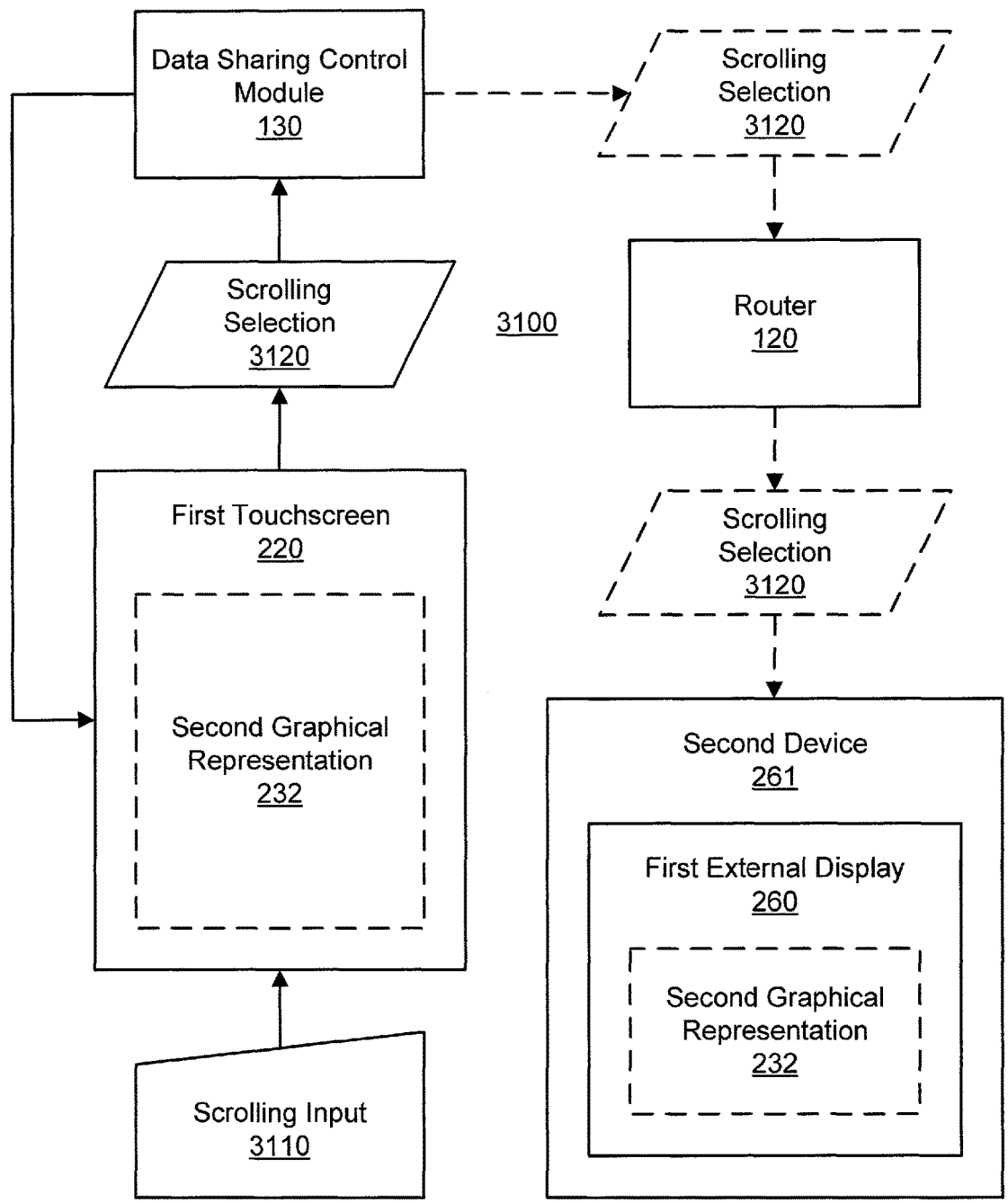
FIG. 33 is a block diagram of an exemplary scrolling system in accordance with an embodiment.

With reference again to FIG. 2A, an embodiment provides that data sharing control module 130 is configured to cause router 120 to route first data set 231 to second device 261 in response to first data selection 250 and first target selection 251 such that a second graphical representation 232 of, or associated with, first data set 231 is displayed on first external display 260. With reference now to FIG. 33, an exemplary scrolling system 3100 in accordance with an embodiment is shown. In particular, data sharing control module 130 is further configured to enable a display of second graphical representation 232 on first touchscreen 220, enable a detection of a scrolling input 3110 associated with first data set 231 at first touchscreen 220, and enable a scrolling of second graphical representation 232 on first external display 260 in response to scrolling input 3110, wherein, as previously indicated, it is noted that first external display 260 may be, or include, for example, a second touchscreen.

To illustrate, in one embodiment, first touchscreen 220 displays second graphical representation 232, which may include, for example, a graphical representation of an image file, a word processing file, a spreadsheet file, a database file, a portable document format (PDF) file or an application corresponding to first data set 231. A currently displayed size of second graphical representation 232 is sufficiently large such that at least a portion of second graphical representation 232 is not currently displayed by first touchscreen 220. However, the current display of second graphical representation 232 is scrollable in response to scrolling input 3110, such as where a user may touch first touchscreen 220 and move his or her finger along first touchscreen to thereby cause first touchscreen 220 to display a portion of second graphical representation 232 that was previously hidden from view. In this manner, a scrolling of second graphical representation 232 within first touchscreen 220 may be performed.

To further illustrate, and with reference still to FIG. 33, first touchscreen detects scrolling input 3110 and then generates scrolling selection 3120, which may include, for example, electronic data reflecting scrolling input 3110. Data sharing control module 130 receives scrolling selection 3120 and then forwards scrolling selection 3120 to router 120. Router 120 then routes scrolling selection 3120 to second device 261, wherein first external display 260 is also displaying second graphical representation 232. In response to scrolling selection 3120, a scrolling of second graphical representation 232 within first external display is performed.

Thus, in an embodiment, a user may slide his or her finger along first touchscreen 220 to thereby initiate a scrolling of a graphical representation that is displayed on an external device. This may be useful, for example, if the user is not positioned sufficiently close to the external display to physically interact with the external display, if the user is physically incapable of physically interacting with the external display, or if the external display does not itself include a touchscreen that would allow such physical interaction to be possible.

Furthermore, one embodiment provides that a user may physically interact with first touchscreen 220 to thereby rotate, resize and/or reposition a display of a graphical representation on an external device. Consider the example where a user touches two different areas on first touchscreen 220, such as with two different fingers, respectively. The user then simultaneously moves both of these fingers in the same clockwise (or counterclockwise) direction along first touchscreen 220 to thereby cause a display of a graphical representation on an external device to be similarly rotated in a clockwise (or counterclockwise) direction. Additionally, the user may move these two fingers toward (or away from) one another along first touchscreen 220 to thereby cause at least a portion of the display of the graphical representation on the external device to appear smaller (or larger). In this manner, a user may remotely zoom out (or zoom in) on the externally displayed graphical representation. Moreover, the user may drag his or her finger along first touchscreen 220 to thereby cause the graphical representation displayed on the external device to be repositioned to a different location on the external display.

IX. Routing

As previously discussed, an embodiment provides that first data set 231 is routed to second device 261. Consequently, a number of exemplary data routing systems and paradigms will now be explored. However, the present technology is not limited to these exemplary systems and paradigms. Indeed, other systems and paradigms may be implemented.

Figure 34:
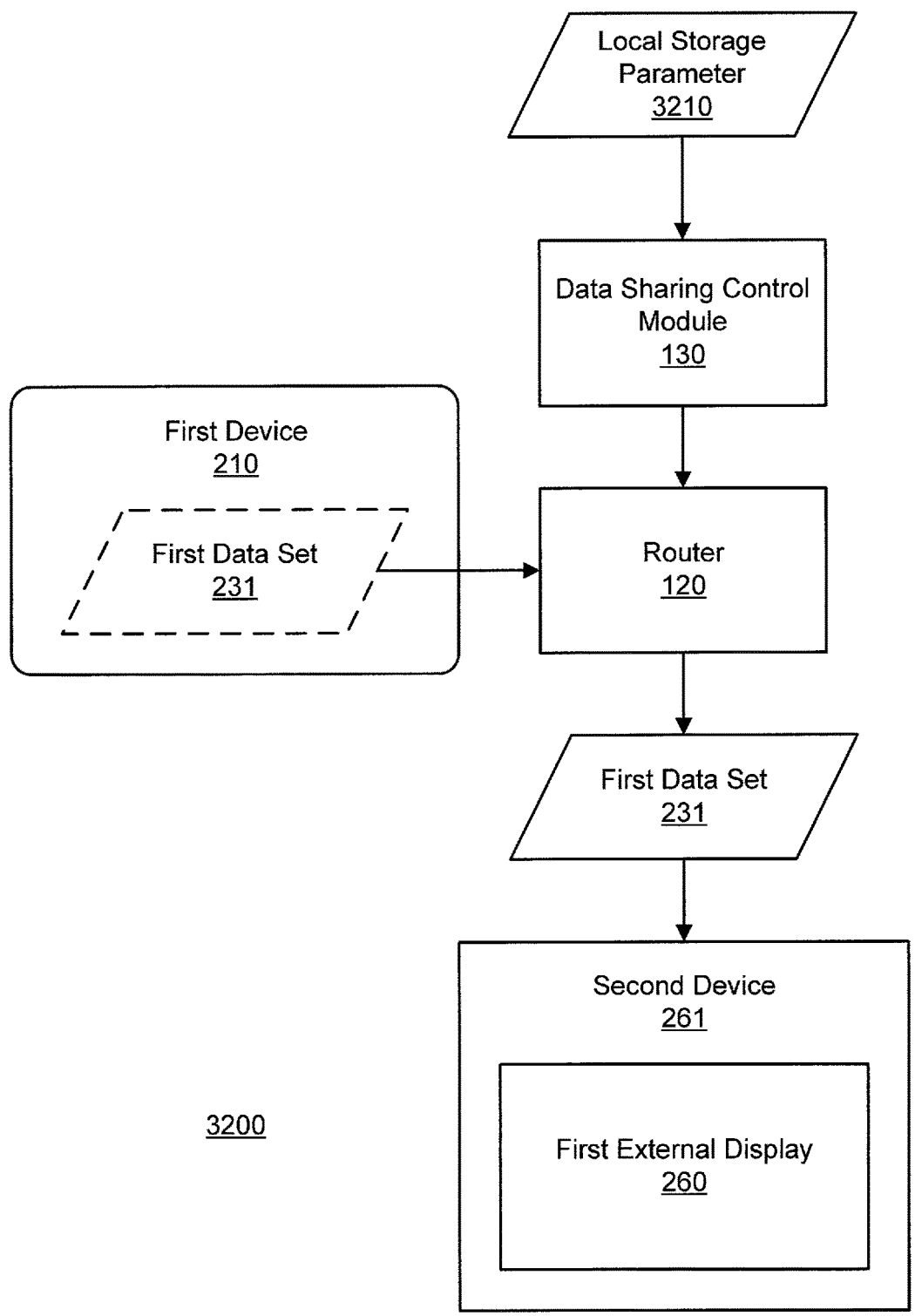
FIG. 34 is a block diagram of a first exemplary data routing system in accordance with an embodiment.

In an embodiment, first data set 231 is stored locally at or within first device 210 such that first data set 231 may be routed from first device 210 to second device 261. For example, and with reference now to FIG. 34, a first exemplary data routing system 3200 in accordance with an embodiment is shown. In particular, data sharing control module 130 is configured to identify a local storage parameter 3210 associated with first data set 231 and cause router 120 to route first data set 231 to second device 261 from first device 210 based on local storage parameter 3210. Consider the example where local storage parameter 3210 indicates that first device 210 is already storing first data set 231. As a result of this indication, data sharing control module 130 directs router 120 to route first data set 231 to second device 261 from first device 210 (rather than determining that first data set 231 is to be accessed by second device 261 from some other data source).

Figure 35:
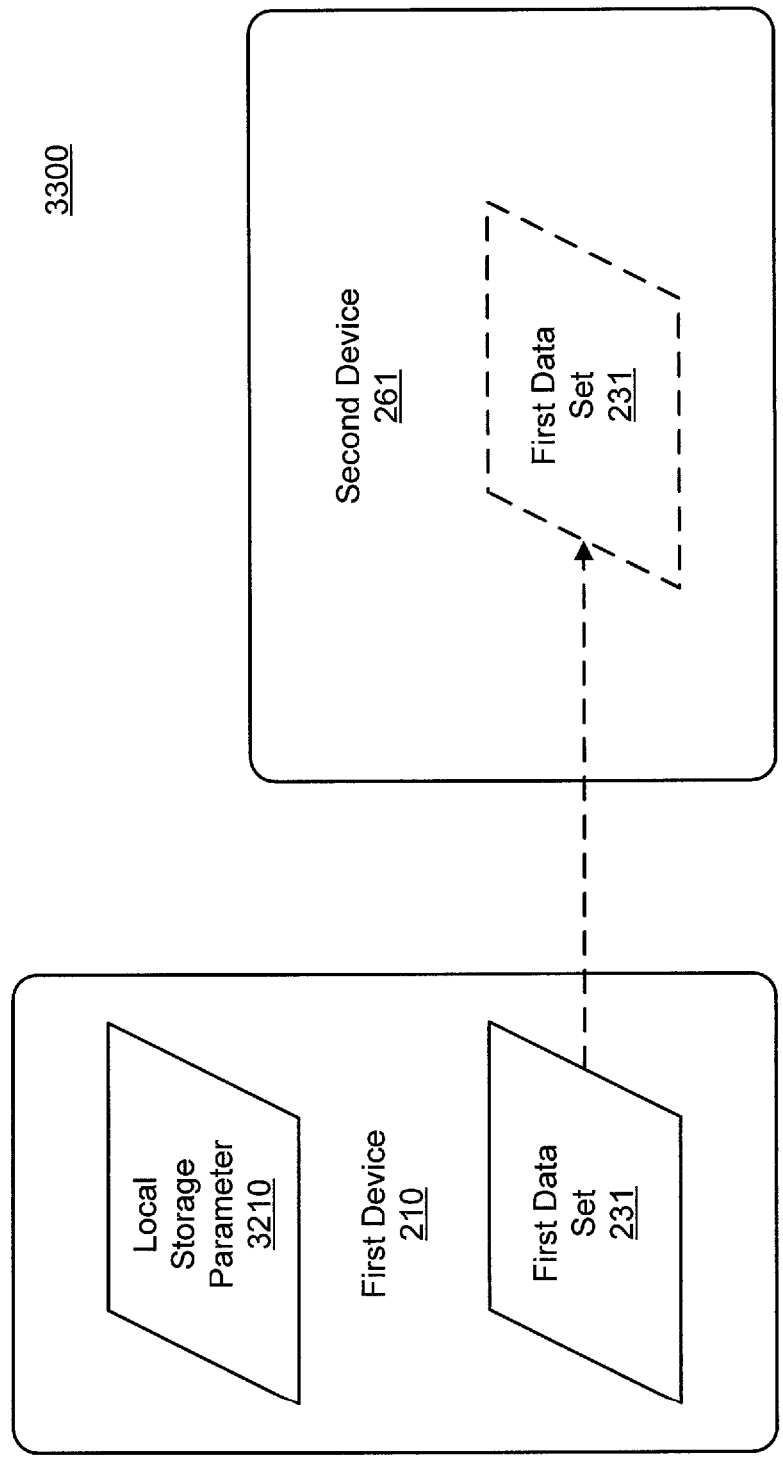
FIG. 35 is a block diagram of a second exemplary data routing paradigm in accordance with an embodiment.

To further illustrate, and with reference now to FIG. 35, a second exemplary data routing paradigm 3300 in accordance with an embodiment is shown. In particular, a local storage parameter 3210 associated with first data set 231 is identified, and first data set 231 is routed to second device 261 from first device 210 based on local storage parameter 3210. To further illustrate, consider the example where first data set 231 is stored locally within a storage unit that is communicatively associated or coupled with first device 210. Local storage parameter 3210 reflects that first data set 231 is stored locally such that first data set 231 is routed (e.g., wirelessly routed) directly to second device 261 from first device 210 rather than being retrieved from a remote storage unit.

Figure 36:
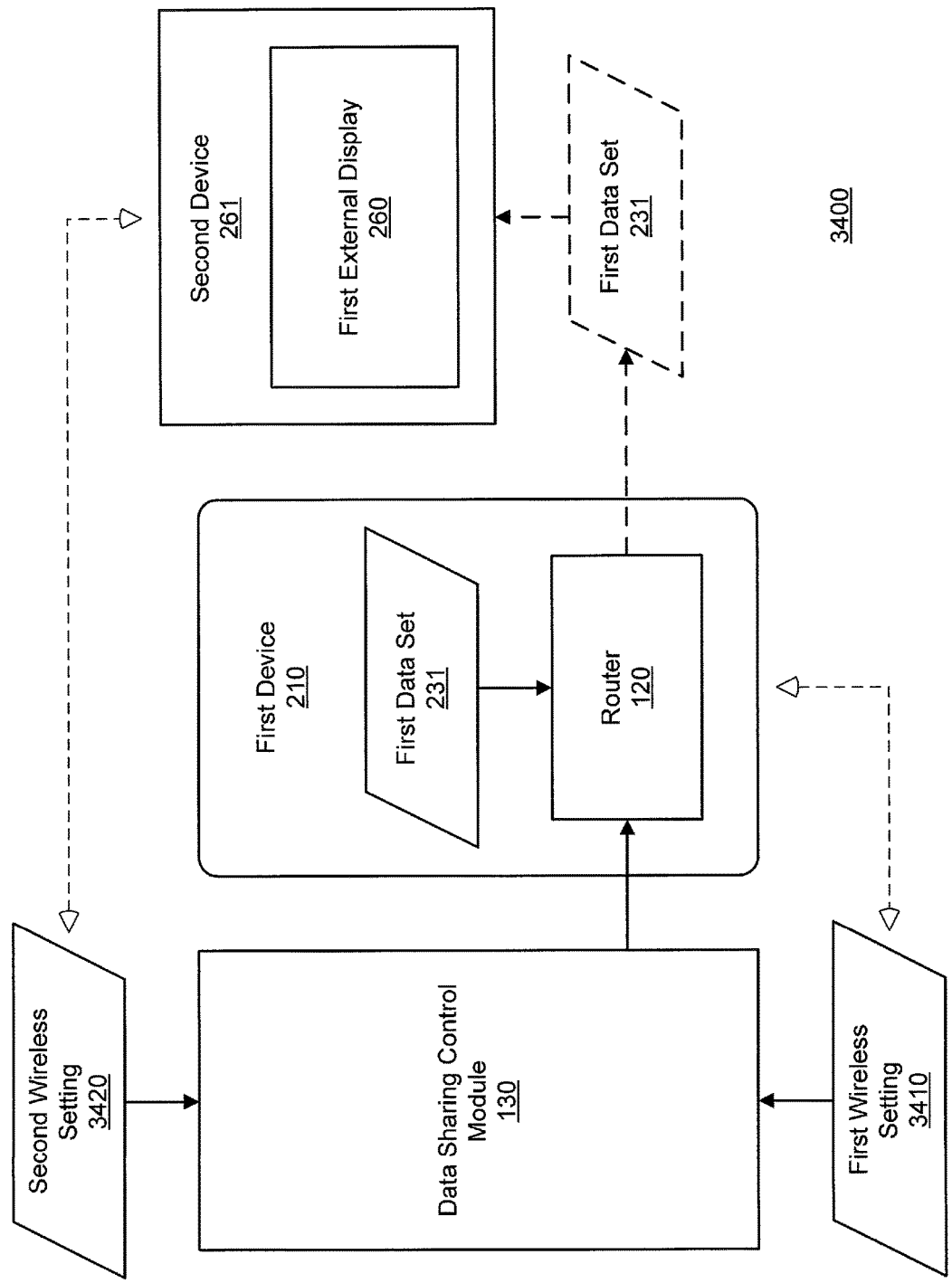
FIG. 36 is a block diagram of a second exemplary data routing system in accordance with an embodiment.

In one embodiment, first data set 231 is wirelessly routed from first device 210 to second device 261. For example, and with reference now to FIG. 36, a second exemplary data routing system 3400 in accordance with an embodiment is shown. In particular, data sharing control module 130 is configured to identify first and second wireless settings 3410, 3420 associated with first and second devices 210, 261, respectively, and cause router 120 to wirelessly route first data set 231 to second device 261 from first device 210 based on first and second wireless settings 3410, 3420.

Figure 37:
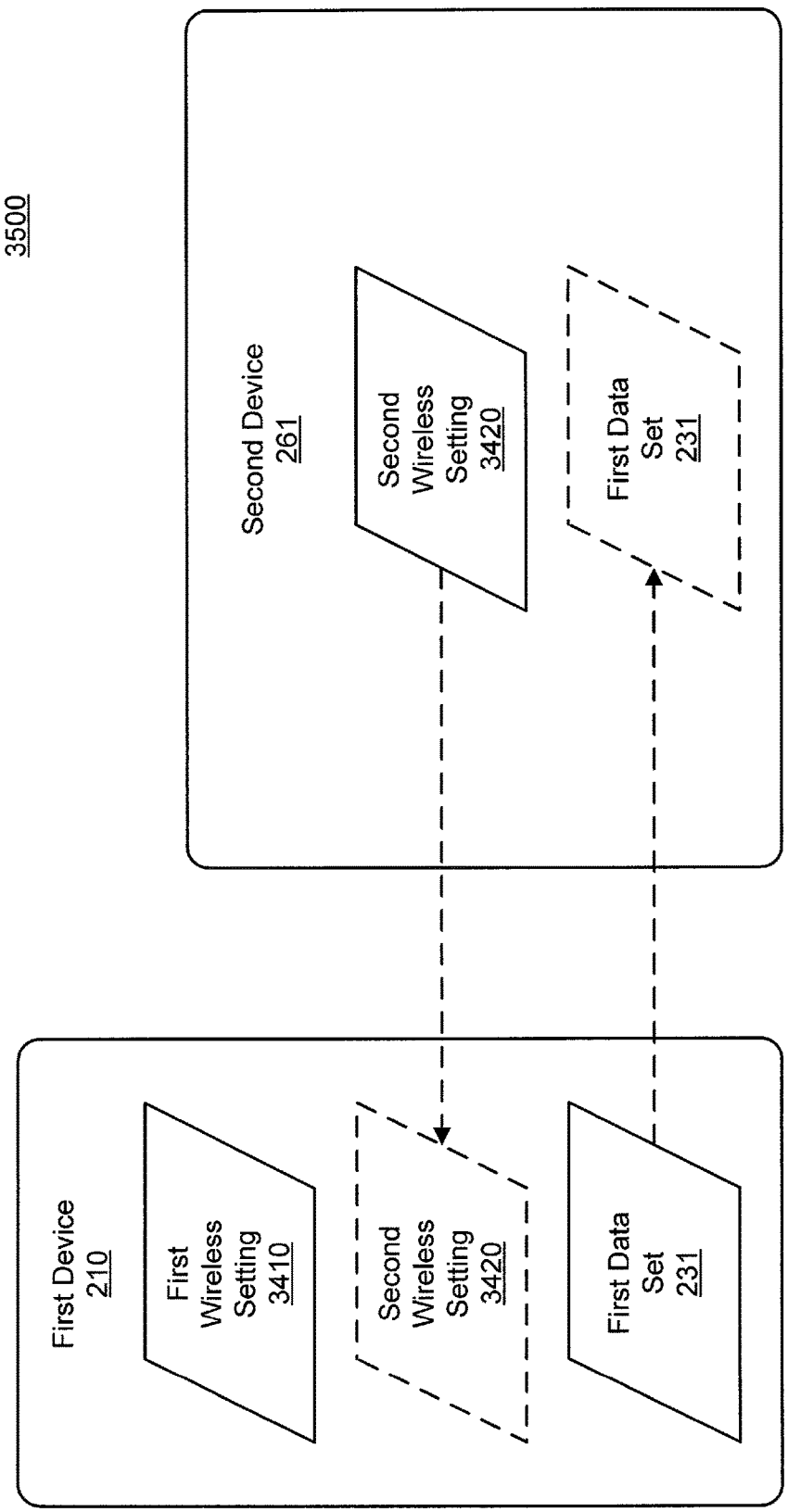
FIG. 37 is a block diagram of a third exemplary data routing paradigm in accordance with an embodiment.

To illustrate, and with reference now to FIG. 37, a third exemplary data routing paradigm 3500 in accordance with an embodiment is shown. In particular, first and second wireless settings 3410, 3420, which are associated with first and second devices 210, 261, respectively, are identified. Additionally, first data set 231 is wirelessly routed to second device 261 from first device 210 based on first and second wireless settings 3410, 3420. To further illustrate, consider the example where first wireless setting 3410 reflects that first device 210 is capable of transmitting information wirelessly, and where second wireless setting 3420 reflects that second device 261 is capable of receiving a wireless communication from first device 210. During the device identification process, second wireless setting 3420 is wirelessly transmitted from second device 261 to first device 210 such that first device 210, upon or subsequent to identifying second device 261 as being an available external device, is put on notice that first data set 231 is to be wirelessly routed directly to second device 261 from first device 210 rather than being retrieved from a remote storage unit.

Figure 38:
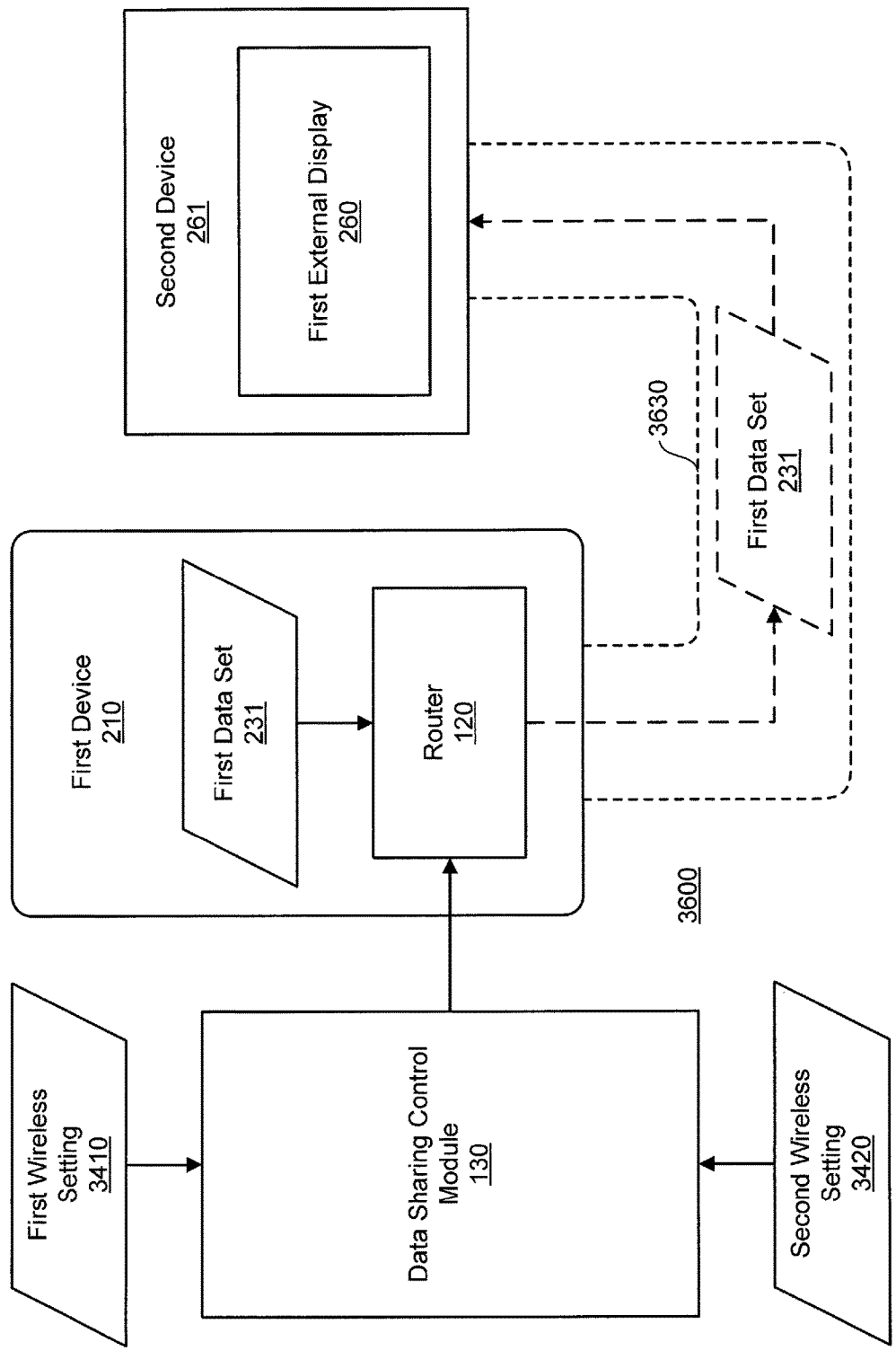
FIG. 38 is a block diagram of a third exemplary data routing system in accordance with an embodiment.

The foregoing notwithstanding, in one embodiment, data is routed to second device 261 based on first and second devices 210, 261 being communicatively coupled with one another, such as where first device 210 is physically "docked" with second device 261, or such as where first and second devices 210, 261 are communicatively linked with one another through a transmission line (and/or a wired communication network). To illustrate, and with reference now to FIG. 38, a third exemplary data routing system 3600 in accordance with an embodiment is shown. In particular, data sharing control module 130 is configured to identify first and second wired settings 3610, 3620 associated with first and second devices 210, 261, respectively. Data sharing control module 130 is also configured to cause router 120 to route first data set 231 to second device 261 from first device 210 through a transmission line 3630 based on first and second wired settings 3610, 3620. Indeed, pursuant to an exemplary implementation, first data set 231 is stored locally by first device 210, and once first and second devices 210, 261 have been communicatively coupled with one another, routing this locally stored data from first device 210 to second device 261 through transmission line 3630 will be quicker than would a wireless transmission of first data set 231 from first device 210 to second device 261.

Figure 39:
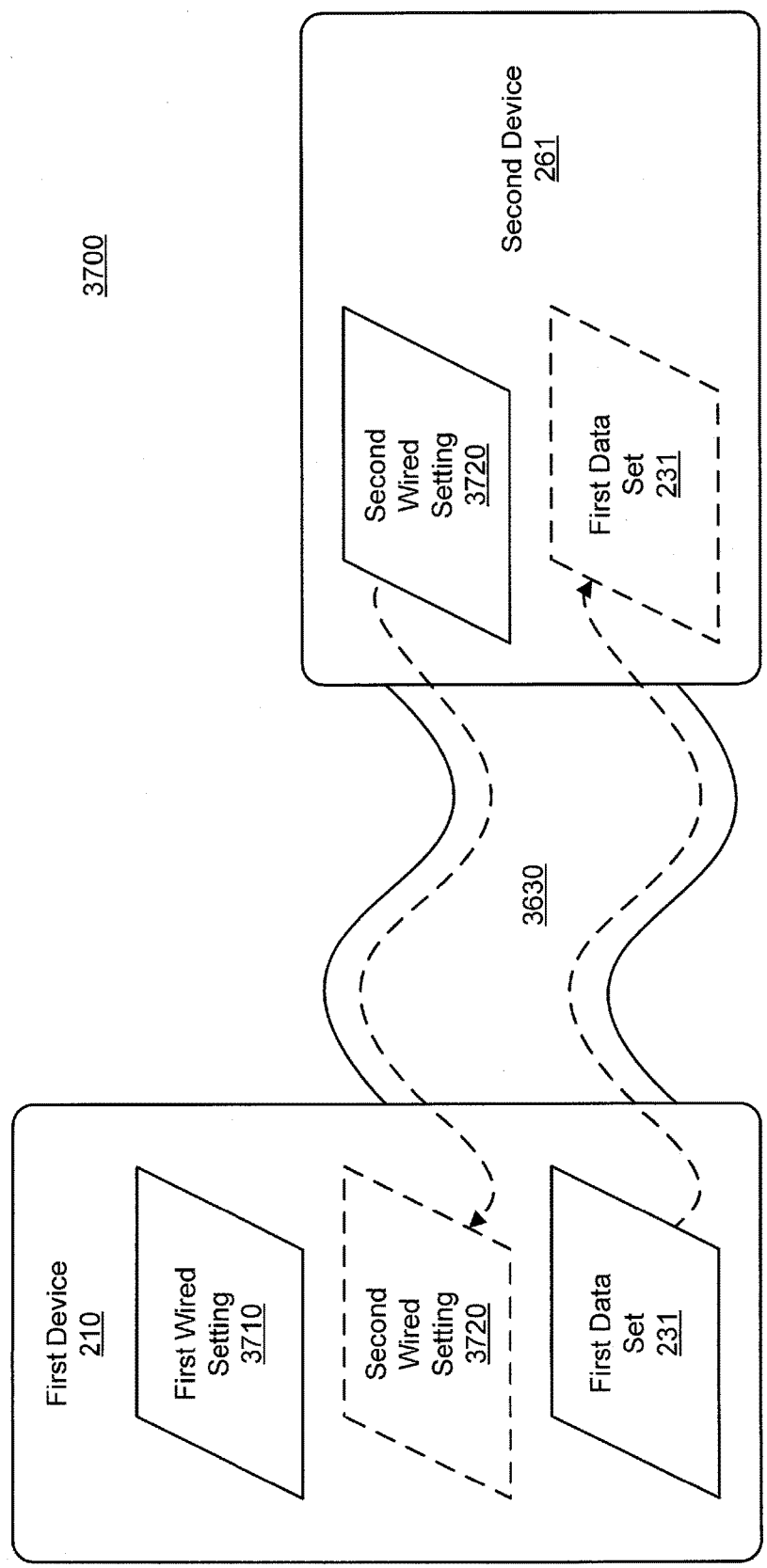
FIG. 39 is a block diagram of a fourth exemplary data routing paradigm in accordance with an embodiment.

To further illustrate, and with reference now to FIG. 39, a fourth exemplary data routing paradigm 3700 in accordance with an embodiment is shown. In particular, first and second wired settings 3710, 3720 associated with first and second devices 101, 102, respectively, are identified. Additionally, first data set 231 is routed to second device 261 from first device 210 through a transmission line 3630 based on first and second wired settings 3710, 3720. Consider the example where first wired setting 3710 reflects that first device 210 is capable of transmitting information pursuant to a specific wired communication protocol (e.g., pursuant to a serial or parallel data transmission protocol), and where second wired setting 3720 reflects that second device 261 is capable of receiving a wired communication from first device 210 through transmission line 3630 by utilizing this same wired communication protocol. During the device identification process, such as when both of first and second devices 101, 102 are communicatively coupled with or connected to transmission line 3630 such that first and second devices 101, 102 are communicatively associated or coupled with one another, second wired setting 3720 is transmitted from second device 261 to first device 210 through transmission line 3630 such that first device 210, upon or subsequent to identifying second device 261 as being an available external device, is put on notice that first data set 231 is to be routed directly to second device 261 from first device 210 through transmission line 3630 rather than being retrieved from a remote storage unit.

Figure 40:
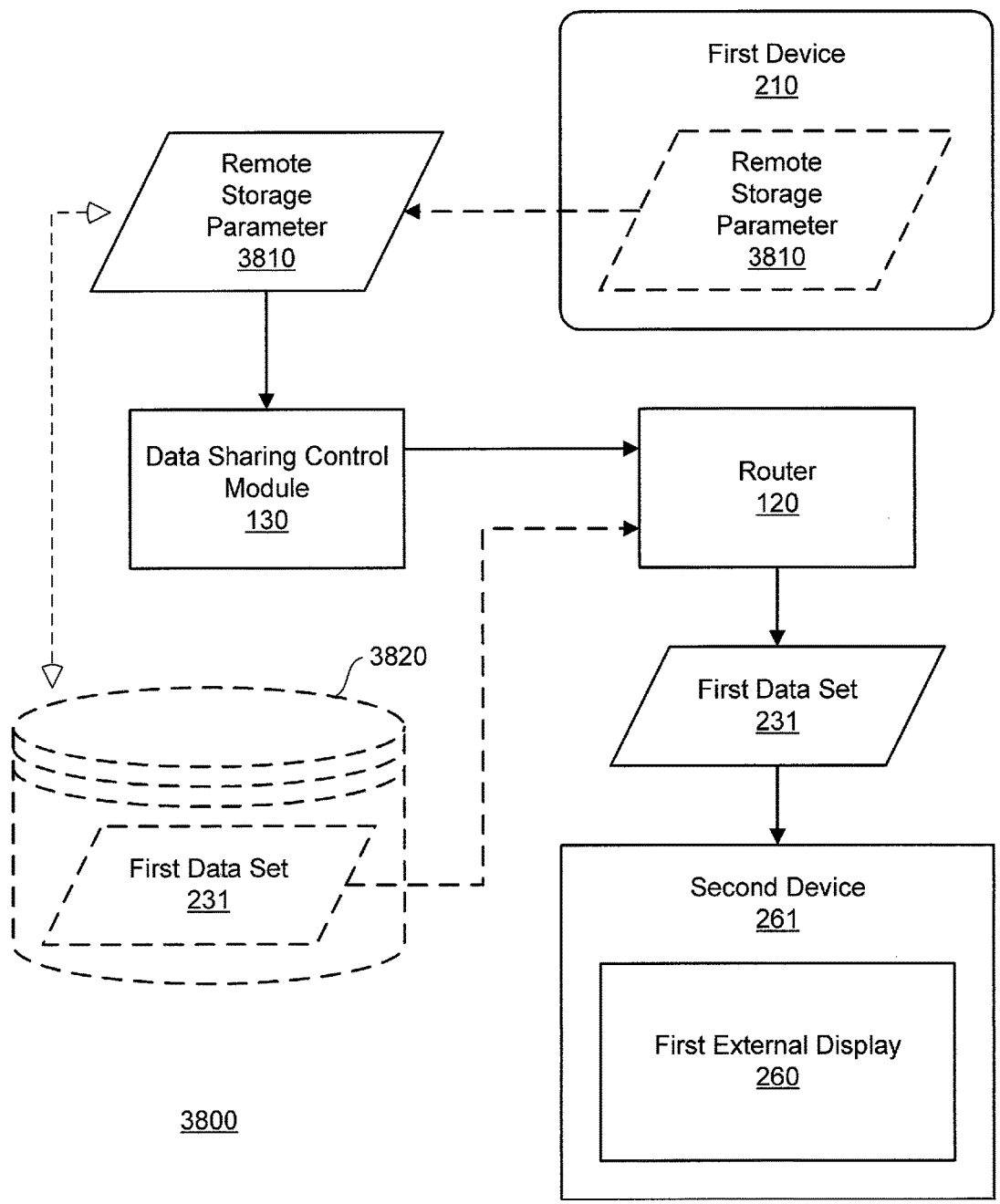
FIG. 40 is a block diagram of a fourth exemplary data routing system in accordance with an embodiment.

As previously discussed, an embodiment provides that first data set 231 is stored locally at or within first device 210 such that first data set 231 may be routed from first device 210 to second device 261. Pursuant to one embodiment, however, first data set 231 is stored in a remote storage device rather than at or within first device 210, and first data set 231 is routed from this remote storage device to second device 261. For example, and with reference now to FIG. 40, a fourth exemplary data routing system 3800 in accordance with an embodiment is shown. In particular, data sharing control module 130 is configured to identify a remote storage parameter 3810 associated with first data set 231, identify a remote storage device 3820 associated with remote storage parameter 3810, and cause router 120 to route (e.g., wirelessly route) first data set 231 to second device 261 from remote storage device 3820 (e.g., through a LAN or wide area network (WAN)) based on remote storage parameter 3810.

Figure 41:
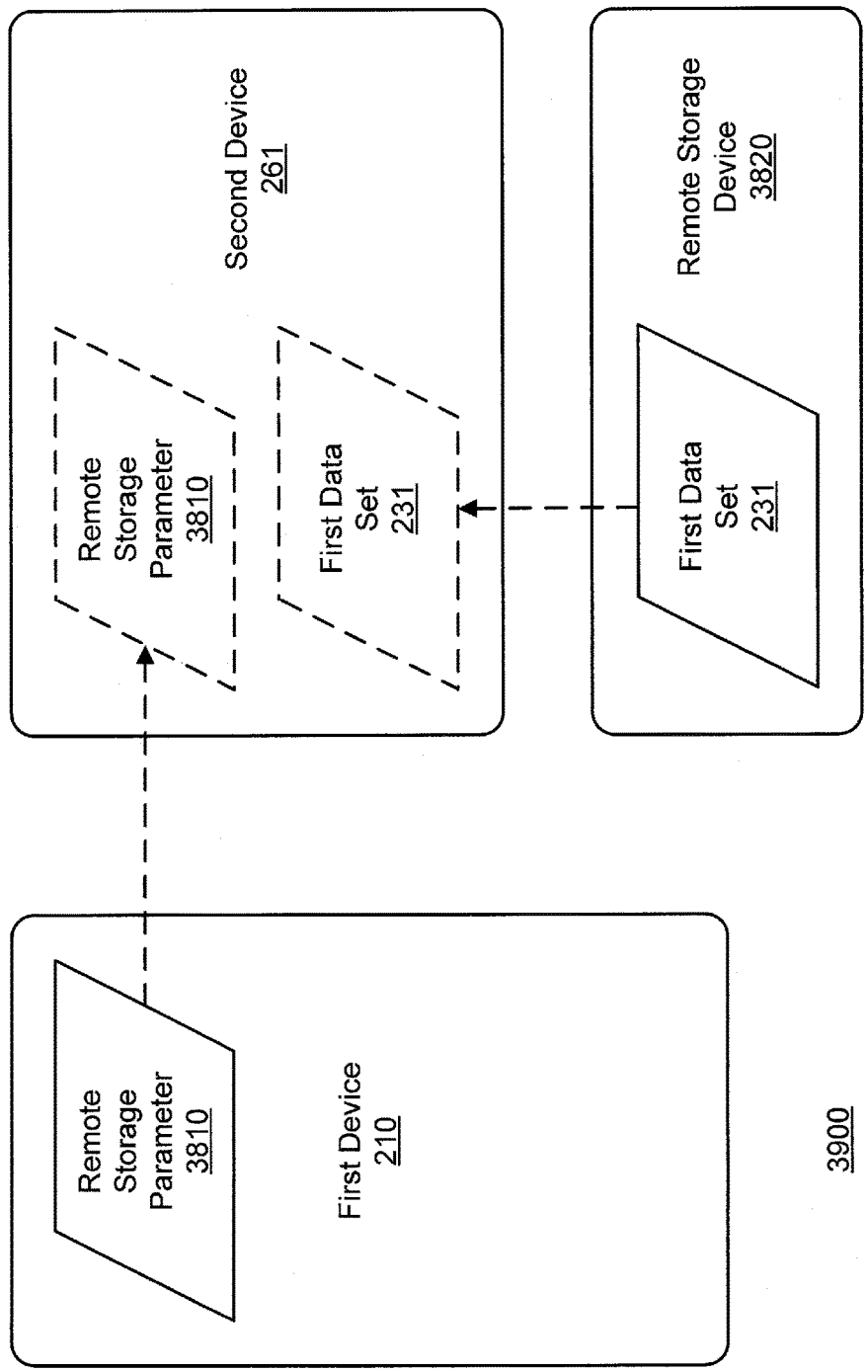
FIG. 41 is a block diagram of a fifth exemplary data routing paradigm in accordance with an embodiment.

To further illustrate, and with reference now to FIG. 41, a fifth exemplary data routing paradigm 3900 in accordance with an embodiment is shown. In particular, a remote storage parameter 3810 associated with first data set 231 is identified. Additionally, a remote storage device 3820 associated with remote storage parameter 3810 is identified, and a routing of first data set 231 to second device 261 from remote storage device 3820 is enabled based on remote storage parameter 3810. Consider the example where remote storage parameter 3810 reflects that first data set 231 is stored in remote storage device 3820. Remote storage parameter 3810 is routed to second device 261 from first device 210 such that second device 261 will know to retrieve first data set 231 directly from remote storage device 3820 rather than from first device 210. This may be useful, for example, where first data set 231 includes a relatively large amount of information, and where (1) the local storage of such a large amount of information within first device 210 is not practical and/or (2) the routing of such a large amount of information from first device 210 to second device 261 is not practical.

X. Application Launching

In an embodiment, an application associated with first data set 231 is launched on an external display. Consequently, a number of exemplary application launching systems and paradigms will now be explored. However, the present technology is not limited to these exemplary systems and paradigms. Indeed, other systems and paradigms may be implemented.

Figure 42:
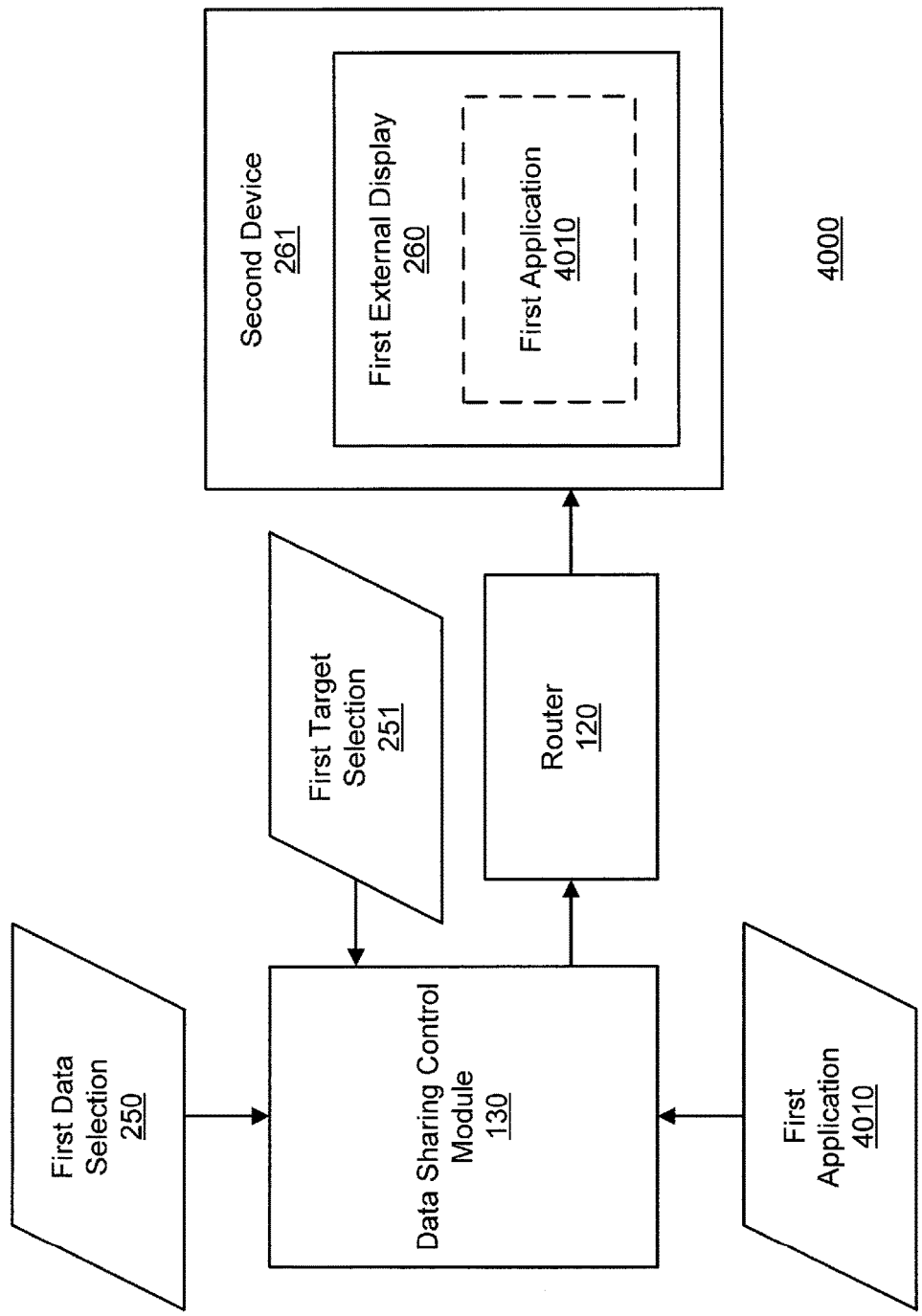
FIG. 42 is a block diagram of a first exemplary application launching system in accordance with an embodiment.

With reference now to FIG. 42, a first exemplary application launching system 4000 in accordance with an embodiment is shown. In particular, data sharing control module 130 is configured to identify a first application 4010 associated with first graphical representation 230 (not shown) in response to first data selection 250 and enable a launching of first application 4010 on first external display 260 in response to first data and first target selections 250, 251. For example, in response to first data selection 250, data sharing control module 130 determines that first data set 231 has been selected and that first data set 231 corresponds to first application 4010. In response to first target selection 251, data sharing control module 130 determines that first external display 260 has been selected. Consequently, data sharing control module 130 causes router 120 to route first application 4010 to second device 261 such that first application 4010 may be displayed on first external display 260, wherein, as previously indicated, it is noted that first external display 260 may be, or include, for example, a second touchscreen.

Figure 43:
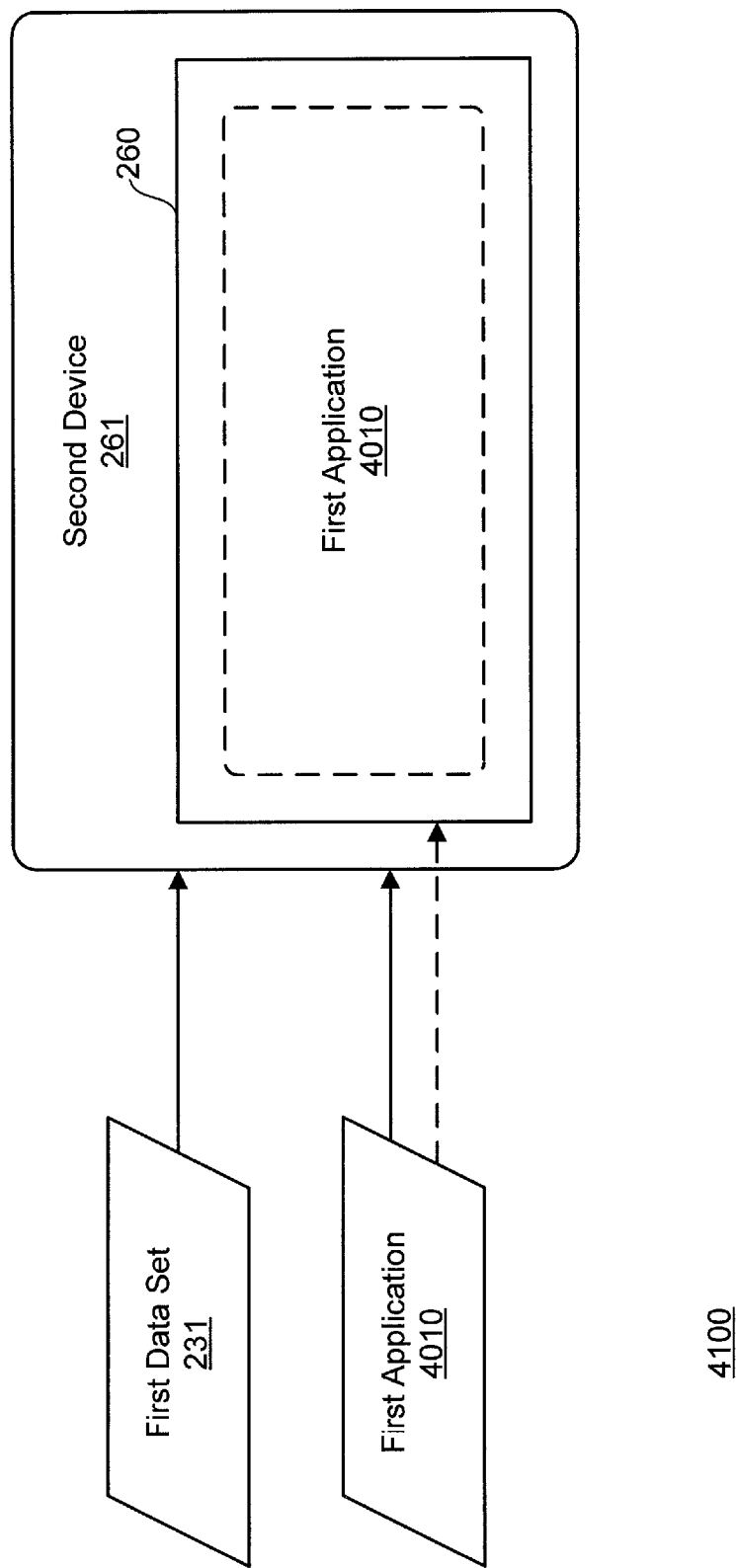
FIG. 43 is a block diagram of a first exemplary application launching paradigm in accordance with an embodiment.

To further illustrate, and with reference now to FIG. 43, a first exemplary application launching paradigm 4100 in accordance with an embodiment is shown. In particular, first application 4010, which is associated with first graphical representation 230 (not shown), is identified in response to first data selection 250 (not shown), and first application 4010 is launched on first external display 260 in response to first target selection 251 (not shown). Consider the example where first graphical representation 230 is selected, such as previously discussed, and where first external display 260 is selected, such as where first external display 260 is a second touchscreen that a user touches to thereby select first external display 260. First data set 231 is routed to second device 261 based on first graphical representation 230 and first external display 260 being selected, and first application 4010, which corresponds to first graphical representation 230, is then launched on first external display 260. Indeed, in an embodiment, first data set 231 includes instructions to launch first application 4010; consequently, second device 261 launches first application 4010 on first external display 260 in response to receiving first data set 231 and executing these instructions.

Moreover, it is noted that first data set 231 may or may not include first application 4010. For example, if first data set 231 includes first application 4010, then first application 4010 is routed to second device 261 as a result of first data set 231 being routed to second device 261. However, one embodiment provides that first application 4010 is already stored within a local memory of, or an external storage device (e.g., "cloud" storage) accessible by, second device 261. Consequently, second device 261 accesses first application 4010 from such memory in response to receiving and executing the instructions stored within first data set 231.

Figure 44:
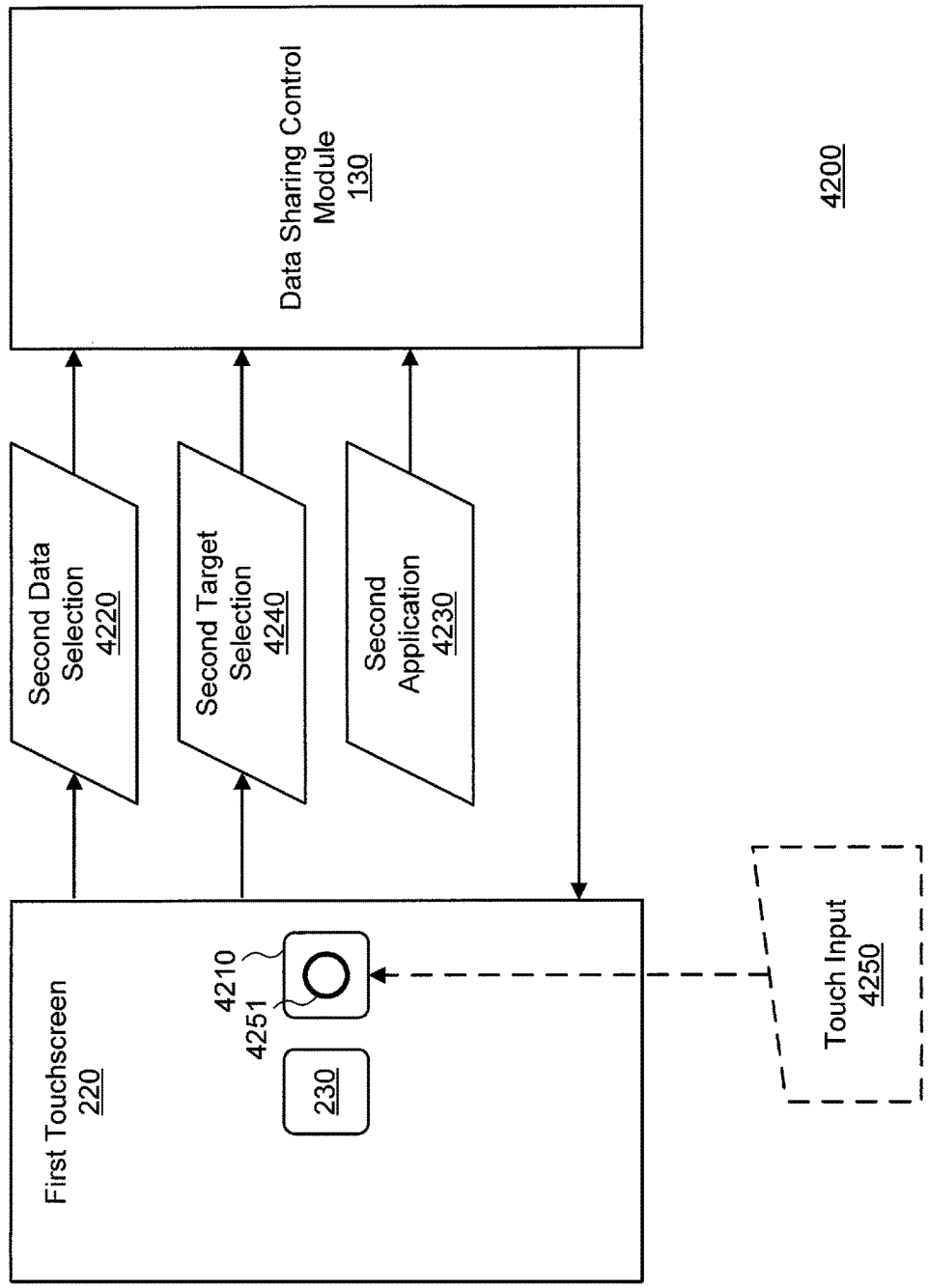
FIG. 44 is a block diagram of a second exemplary application launching system in accordance with an embodiment.

With reference now to FIG. 44, a second exemplary application launching system 4200 in accordance with an embodiment is shown. In particular, data sharing control module 130 is configured to enable a display of a second graphical representation 4210 associated with a second data set on first touchscreen 220, enable a detection of a second data selection 4220 of second graphical representation 4210 at first touchscreen 220, identify a second application 4230 associated with second graphical representation 4210 in response to second data selection 4220, enable a detection, generation, or identification of a second target selection 4240 of first touchscreen 220 at or with first touchscreen 220, and enable a launching of second application 4230 on first touchscreen 220 in response to second data selection 4220 and second target selection 4240. Moreover, in one embodiment, data sharing control module 130 is further configured to (1) enable a detection of a touch input 4250 at a location 4251 on first touchscreen 220 (e.g., a single touch or double touching of location 4251), wherein location 4251 corresponds to second graphical representation 4210, and (2) identify second data selection 4220 and second target selection 4240 based on the detection of touch input 4250 at location 4251.

Figure 45A:
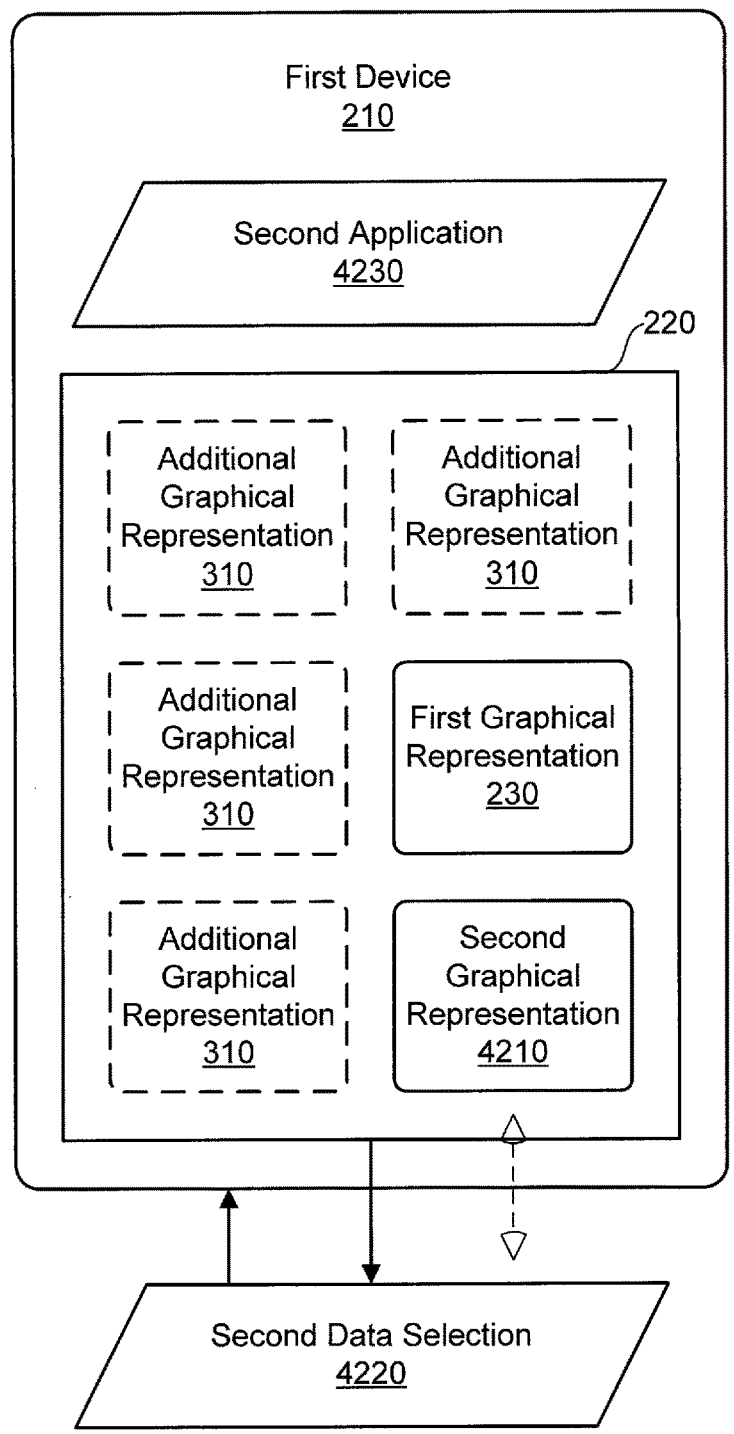
FIGS. 45A-45B are block diagrams of first and second views, respectively, of a second exemplary application launching paradigm in accordance with an embodiment.
Figure 45B:
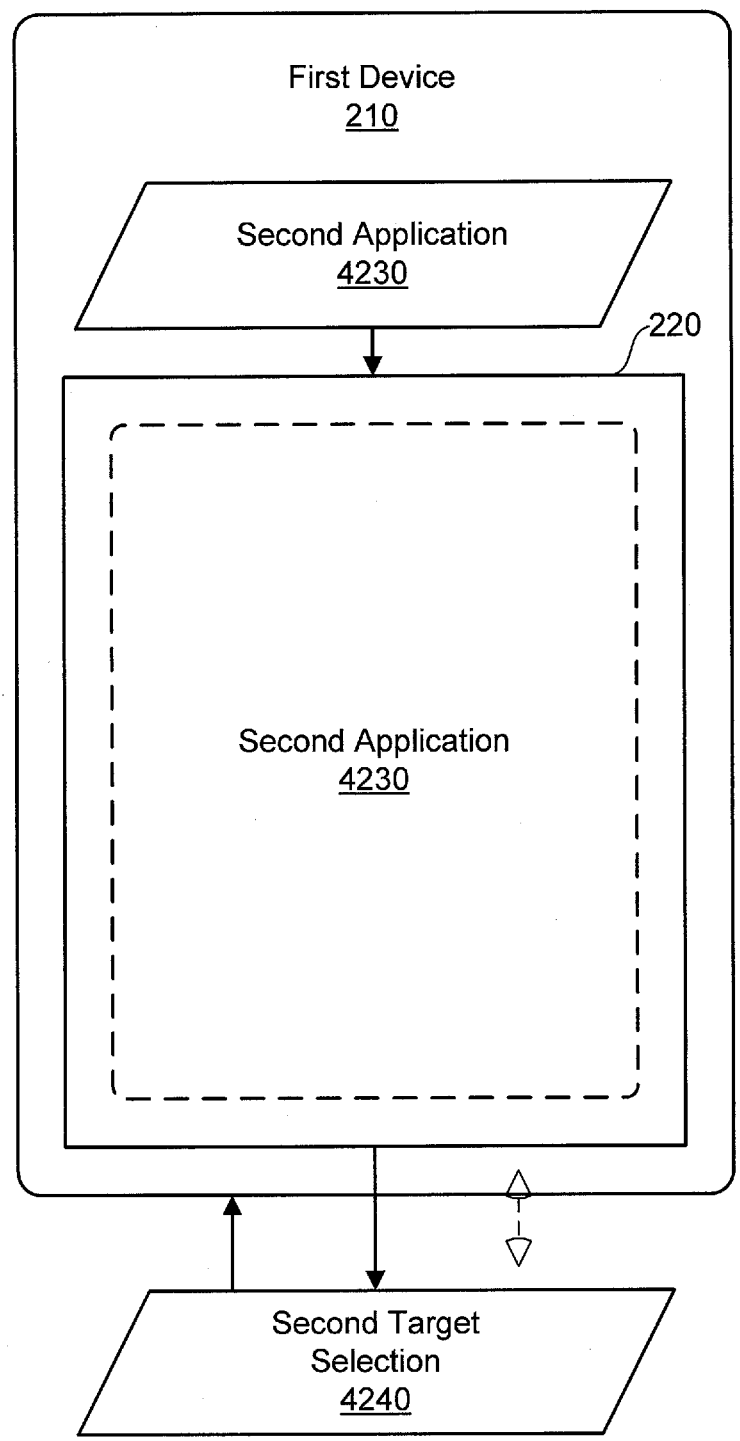

To illustrate, and with reference now to FIGS. 45A-45B, first and second views 4300, 4301, respectively, of a second exemplary application launching paradigm in accordance with an embodiment is shown. With reference to FIG. 45A, second data selection 4220 of second graphical representation 4210 is received, detected, generated or identified at or with first touchscreen 220. Additionally, second application 4230, which is associated with second graphical representation 4210, is identified in response to second data selection 4220. With reference to FIG. 45B, second target selection 4240 of first touchscreen 220 is received, detected, generated or identified at or with first touchscreen 220, and second application 4230 is launched on first touchscreen 220 in response to second target selection 4240.

To further illustrate, consider the example where second graphical representation 4210 is selected after first application 4010 has already been launched on first external display 260. After second graphical representation 4210 has been selected, the user again touches first touchscreen 220 such that first touchscreen, rather than another external display, is selected. Consequently, second application 4230, which corresponds to second graphical representation 4210, is then launched on first touchscreen 220. Thus, it is noted that a user may be provided with the option of launching applications on first device 210 (e.g., an electronic tablet, PDA or smartphone) as well as on a number of external devices (e.g., a number of computer monitors or television screens), and that the applications launched on these various devices may indeed be different applications.

The foregoing notwithstanding, although various embodiments discussed herein involve launching one or more applications, it is noted that the present technology is not limited to launching applications. For example, these embodiments may be modified to include launching, for example, files (e.g., digital image or video files) or programs, it being noted that the terms "application" and "program" may or may not be synonymous in different scenarios.

XI. Multiple Graphical User Interfaces

The foregoing notwithstanding, in one embodiment, two or more different graphical user interfaces (GUIs) that correspond to the same application (or the same computer program) may be launched on two or more different displays. Consequently, a number of exemplary GUI launching systems and paradigms will now be explored. However, the present technology is not limited to these exemplary systems and paradigms. Indeed, other systems and paradigms may be implemented.

Figure 46:
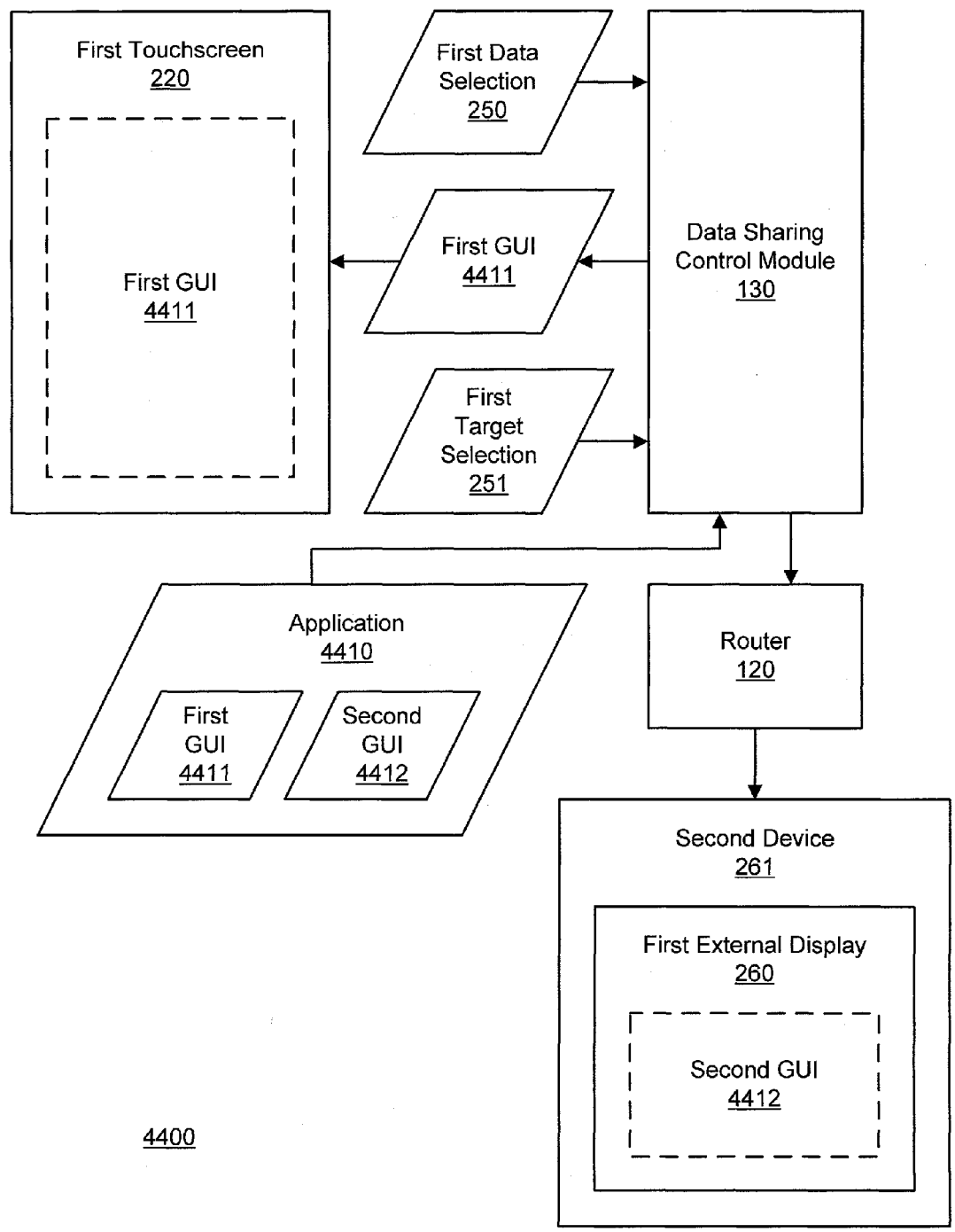
FIG. 46 is a block diagram of an exemplary graphical user interface (GUI) launching system in accordance with an embodiment.

With reference now to FIG. 46, an exemplary GUI launching system 4400 in accordance with an embodiment is shown. In particular, data sharing control module 130 is configured to identify an application 4410 associated with first graphical representation 230 in response to first data selection 250, wherein application 4410 includes first and second GUIs 4411, 4412, and enable a launching of first and second GUIs 4411, 4412 on first touchscreen 220 and first external display 260, respectively, in response to first data selection 250 and a first target selection 251 of second device 261 (or of first external display 260). To illustrate, data sharing control module 130 may be configured to, in response to first data selection 250 and first target selection 251, cause first touchscreen 220 to display first GUI 4411 and cause router 120 to route second GUI 4412 to second device 261 to thereby enable first external display 260 to display second GUI 4412, wherein, as previously indicated, it is noted that first external display 260 may be, or include, for example, a second touchscreen.

Figure 47A:
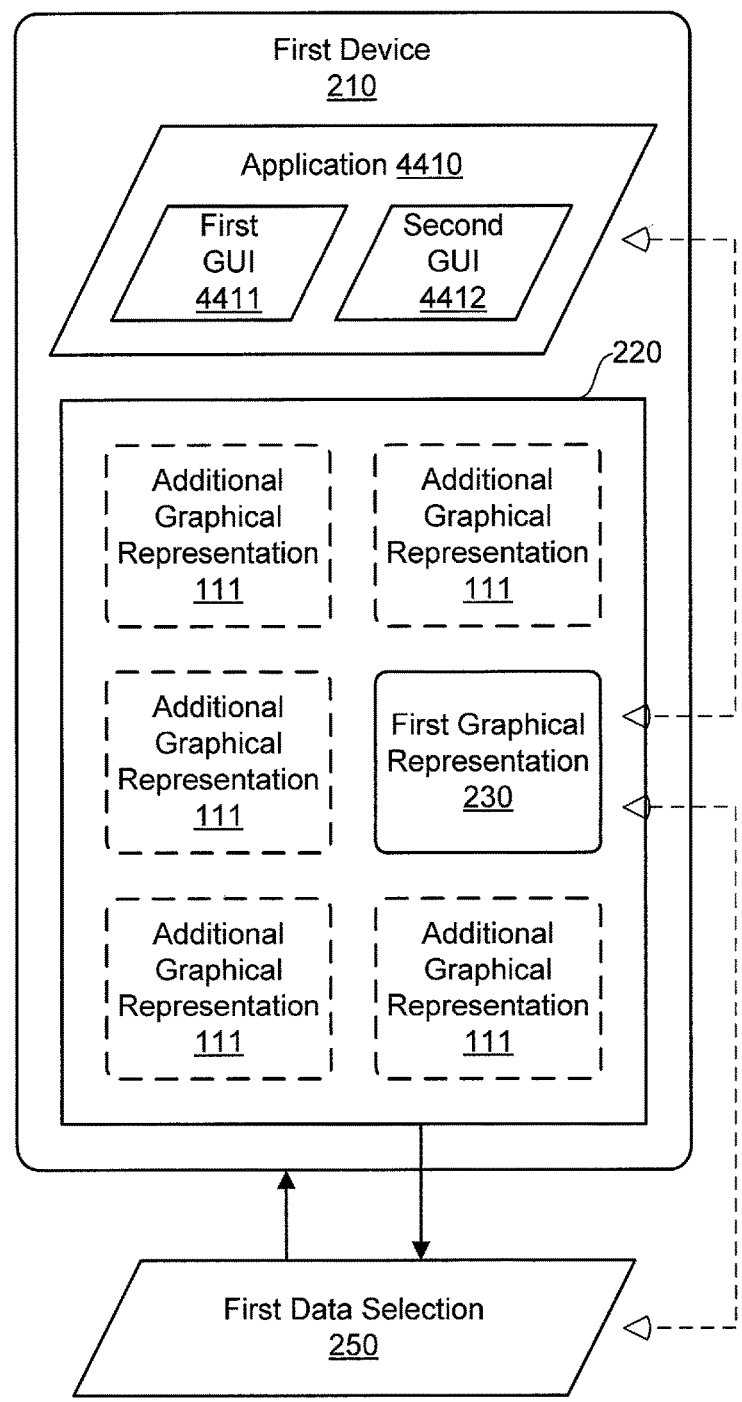
FIGS. 47A-47B are block diagrams of first and second views, respectively, of an exemplary GUI launching paradigm in accordance with an embodiment.
Figure 47B:
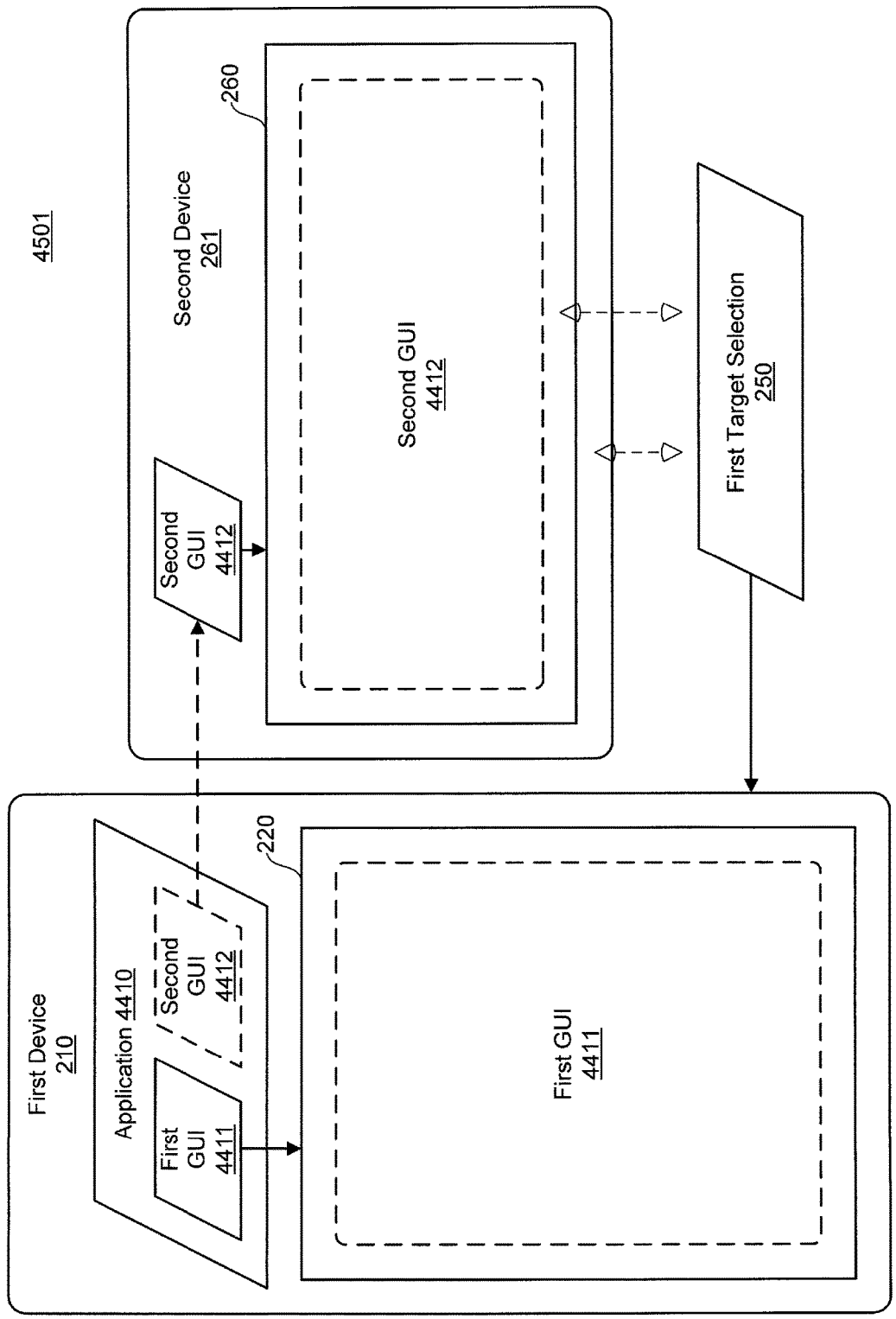

To further illustrate, and with reference now to FIGS. 47A-47B, first and second views 4500, 4501, respectively, of an exemplary GUI launching paradigm in accordance with an embodiment is shown. With reference to FIG. 47A, application 4410, which is associated with first graphical representation 230, is identified in response to first data selection 250, wherein application 4410 includes first and second GUIs 4411, 4412. With reference to FIG. 47B, first and second GUIs 4411, 4412 are launched on first touchscreen 220 and first external display 260, respectively, in response to first target selection 251. Moreover, an embodiment provides that a user may interact with first GUI 4411 within first touchscreen 220 to thereby communicate (e.g., wirelessly) information (e.g., user selections) to second GUI 4412, which is displayed by first external display 260. Similarly, one embodiment provides that a user may interact with second GUI 4412, such as where first external display 260 includes a second touchscreen, to thereby communicate (e.g., wirelessly) information (e.g., user selections) to first GUI 4411, which is displayed by first touchscreen 220.

Figure 48A:
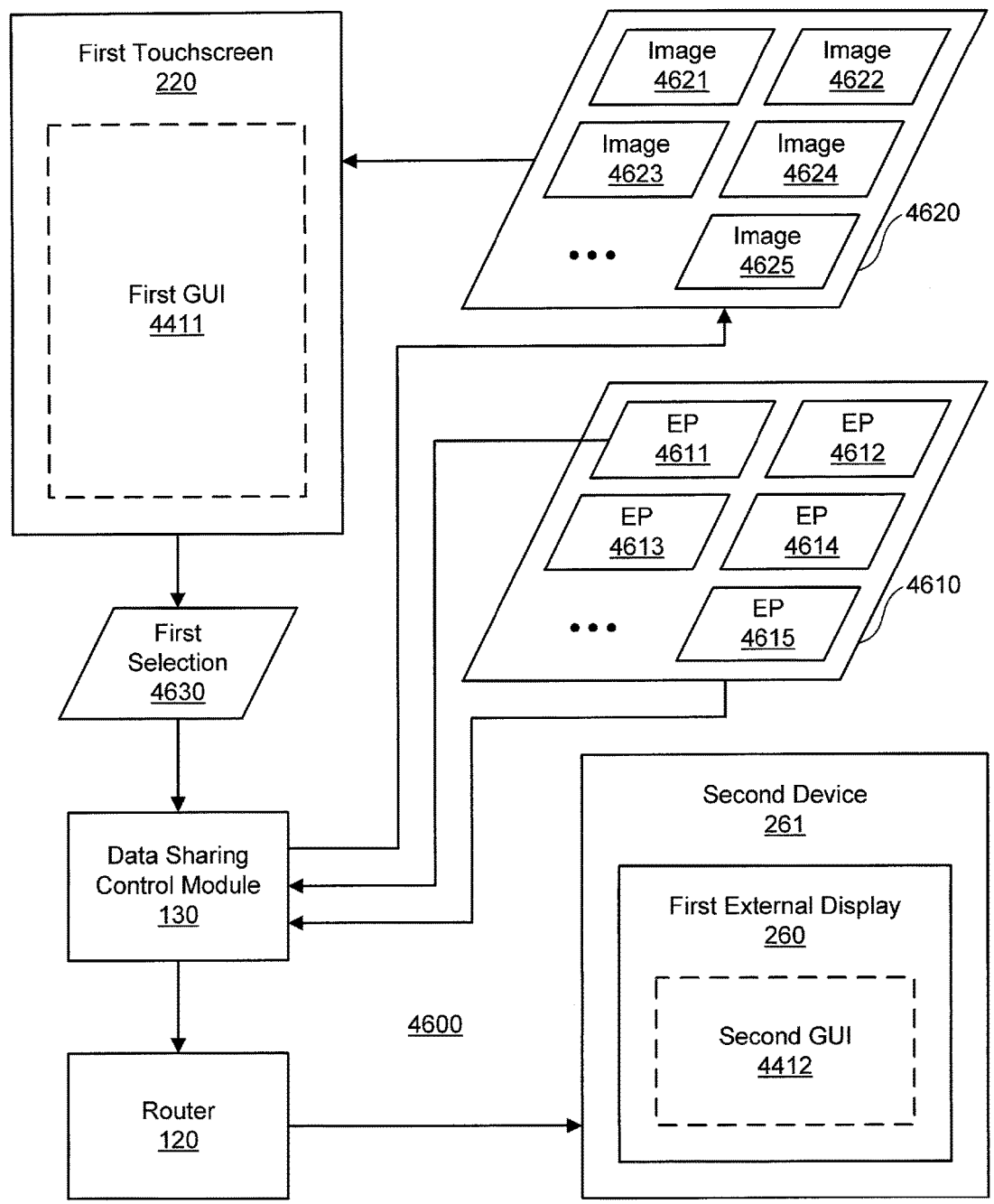
FIGS. 48A-48B are block diagrams of first and second views, respectively, of an exemplary page display system in accordance with an embodiment.
Figure 48B:
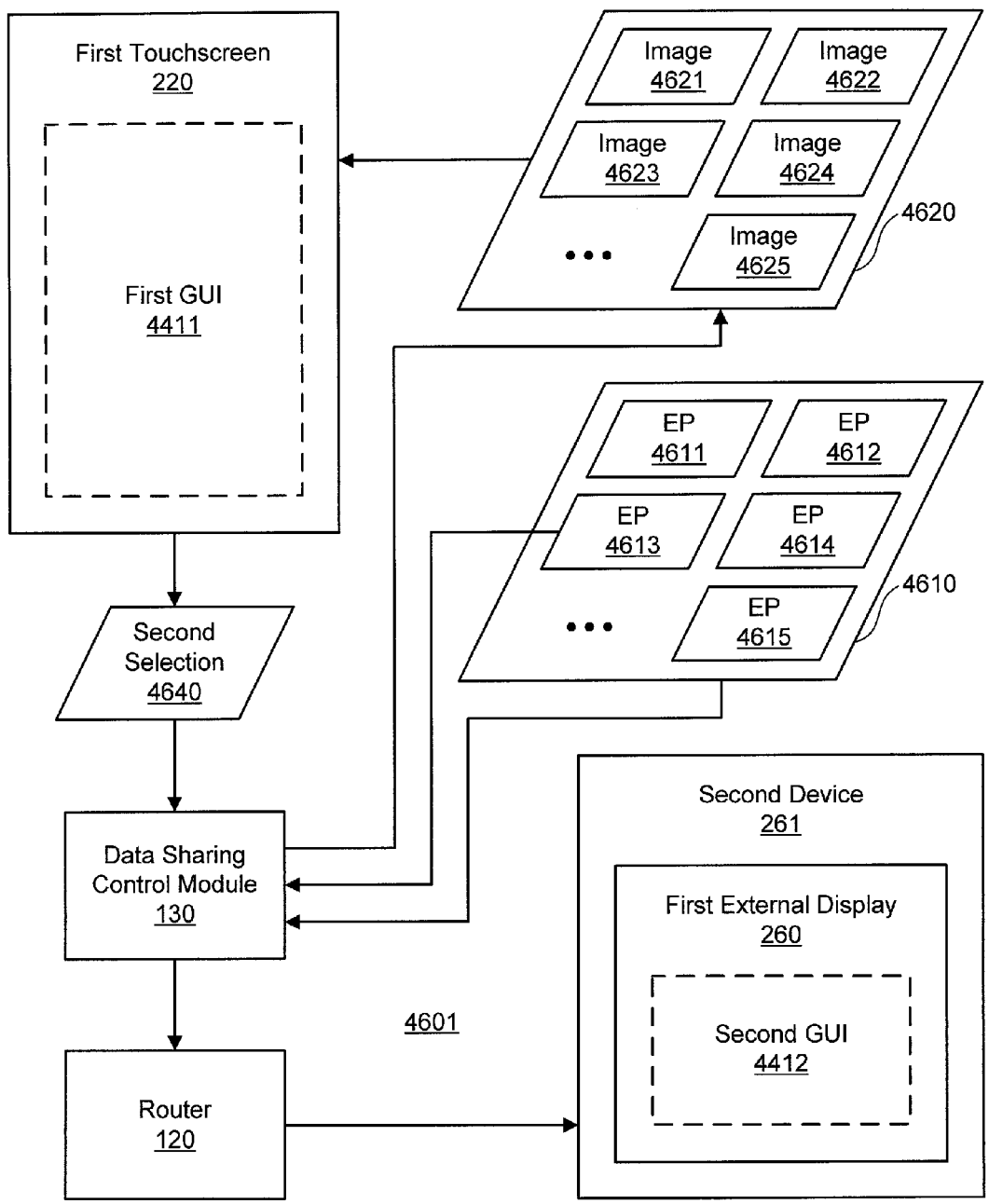

With reference now to FIGS. 48A-48B, first and second views 4600, 4601, respectively, of an exemplary page display system in accordance with an embodiment is shown. In particular, and with reference to FIG. 48A, data sharing control module 130 is configured to access a data file 4610, which may correspond, for example, to first graphical representation 230 (not shown). Data file 4610 has a data format associated with application 4410 (not shown), wherein data file 4610 includes a plurality of electronic pages (EPs), which, for purposes of illustration, are shown as EPs 4611-4615. Data sharing control module 130 is also configured to generate a plurality of images 4620 corresponding to the plurality of EPs, respectively, wherein, for purposes of illustration, these images are shown as images 4621-4625. Data sharing control module 130 is further configured to enable a display of a scrollable list of plurality of images 4620 in first GUI 4411, access a first selection 4630 of a first image (e.g., image 4621) from among plurality of images 4620 within the scrollable list, identify a first EP (e.g., EP 4611) from among the plurality of EPs that corresponds to this image in response to first selection 4630, and enable a display of this first EP in second GUI 4412, such as by causing router 120 to route this first EP to second device 261 such that this first EP may be displayed by first external display 260.

With reference to FIG. 48B, data sharing control module 130 is further configured to access a second selection 4640 of a second image (e.g., image 4623) from among plurality of images 4620 within the scrollable list, identify a second EP (e.g., EP 4613) from among the plurality of EPs that corresponds to this second image in response to second selection 4640, and enable a display of the second EP in second GUI 4412, such as by causing router 120 to route this second EP to second device 261 such that this second EP may be displayed by first external display 260. In this manner, second GUI 4412 may be updated or changed so as to display different EPs at different points in time based on a user's selection within a scrollable list of possible pages that is displayed within first GUI 4411.

Figure 49A:
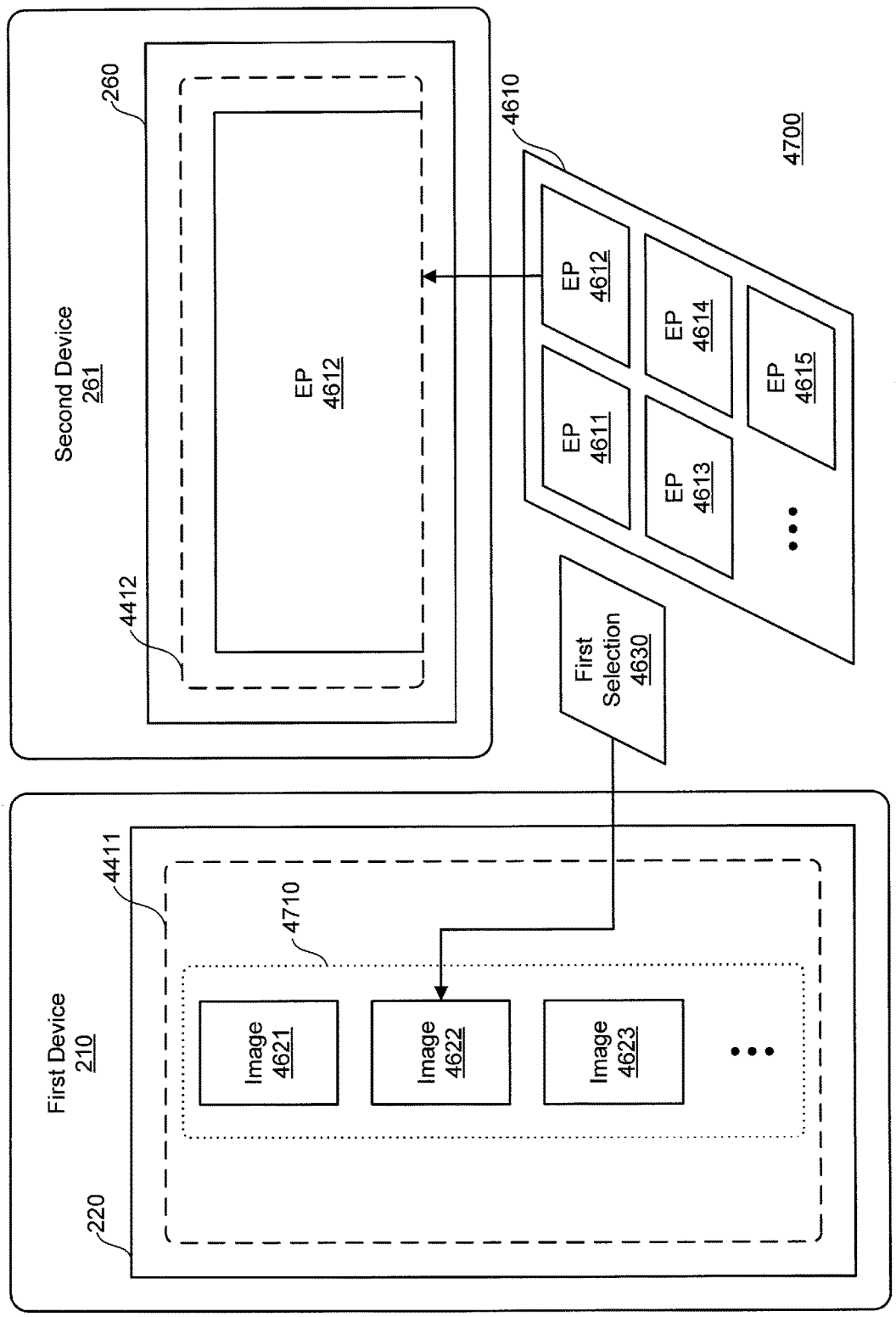
FIGS. 49A-49B are block diagrams of first and second views, respectively, of an exemplary page display paradigm in accordance with an embodiment.
Figure 49B:
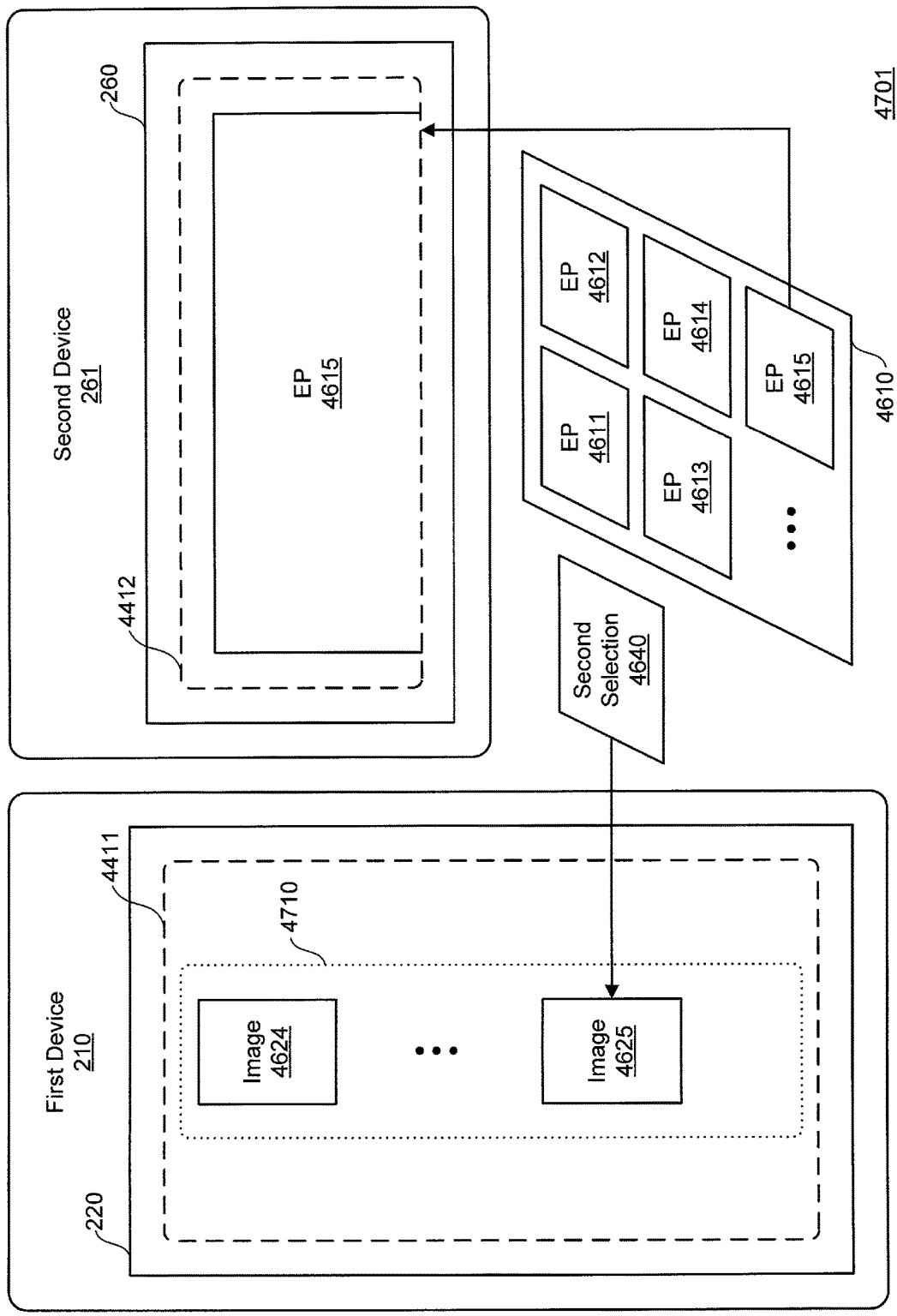

To further illustrate, and with reference now to FIGS. 49A-49B, first and second views 4700, 4701, respectively, of an exemplary page display paradigm in accordance with an embodiment is shown. In particular, data file 4610, which has a data format associated with application 4410 is accessed, wherein data file 4610 includes a plurality of EPs, labeled as EP 4611 through EP 4615 in FIGS. 49A-49B. In one embodiment, data file 4610 corresponds to first graphical representation 230, such as where first graphical representation 230 is a graphical representation (e.g., an icon) of data file 4610 (or one of its EPs).

In an embodiment, a plurality of images, labeled as image 4621 through image 4625 in FIGS. 49A-49B, which correspond to the plurality of EPs, respectively, are generated, and a scrollable list 4710 of the plurality of images is displayed in first GUI 4411. With reference to FIG. 49A, an embodiment provides that first selection 4630 of a first image (e.g., image 4622) from among the plurality of images within scrollable list 4710 is accessed, a first EP (e.g., EP 4612) from among the plurality of EPs that corresponds to this first image is identified in response to first selection 4630, and this first EP is displayed in second GUI 4412.

Moreover, and with reference to FIG. 49B, one embodiment provides that a second selection 4640 of a second image (e.g., image 4625) from among the plurality of images within scrollable list 4710 is accessed, a second EP (e.g., EP 4615) from among the plurality of EPs that corresponds to this second image is identified in response to second selection 4640, and this second EP is displayed in second GUI 4412. In one embodiment, this second EP (e.g., EP 4615) is displayed in second GUI 4412 such that the aforementioned first EP (e.g., EP 4612) is no longer displayed in second GUI 4412. In this manner, a selection of a new image within scrollable list 4710 causes a new EP to replace a previously displayed EP within second GUI 4412.

Exemplary Communication Arrangements

With reference now to FIG. 50A, a first exemplary communication arrangement 5000 in accordance with an embodiment is shown, wherein a signal is to be routed from a source 5010 to a destination 5020. First, the information is routed from source 5010 to a router 5030 through a first transmission line 5040. Subsequently, this information is routed from router 5030 to a receiver 5050 through a second transmission line 5060. Finally, the information is routed from receiver 5050 to destination 5020 through a third transmission line 5070. It is noted that these transmission lines may include, for example, metal (e.g., copper) wires or fiber-optic lines. It is further noted that information may also be routed over the Internet and/or through a distinguishable intranet.

With reference now to FIG. 50B, a second exemplary communication arrangement 5001 in accordance with an embodiment is shown, wherein a signal is to be routed from source 5010 to destination 5020. First, the information is routed from source 5010 to a wireless transmitter 5080 through first transmission line 5040. Subsequently, this information is wirelessly routed from wireless transmitter 5080 to a wireless receiver 5090, such as through a wireless communication network. Finally, the information is routed from wireless receiver 5090 to destination 5020 through second transmission line 5060. It is noted that various wireless communication methods may be implemented, such as by using short wavelength radio transmissions (e.g., Bluetooth™ transmissions), or such as by routing signals across cellular or satellite communication networks, and that the present technology is not limited to any particular wireless communication methodology.

Exemplary Computer System Environments

It is noted that various components of the present technology may be hard-wired or configured to carry out various actions and operations discussed herein. Pursuant to one embodiment, however, a computer system may be implemented to carry out various operations of the present technology. Consequently, an exemplary computer system and configuration will now be explored. However, the present technology is not limited to this exemplary system and configuration. Indeed, other systems and configurations may be implemented.

Figure 51:
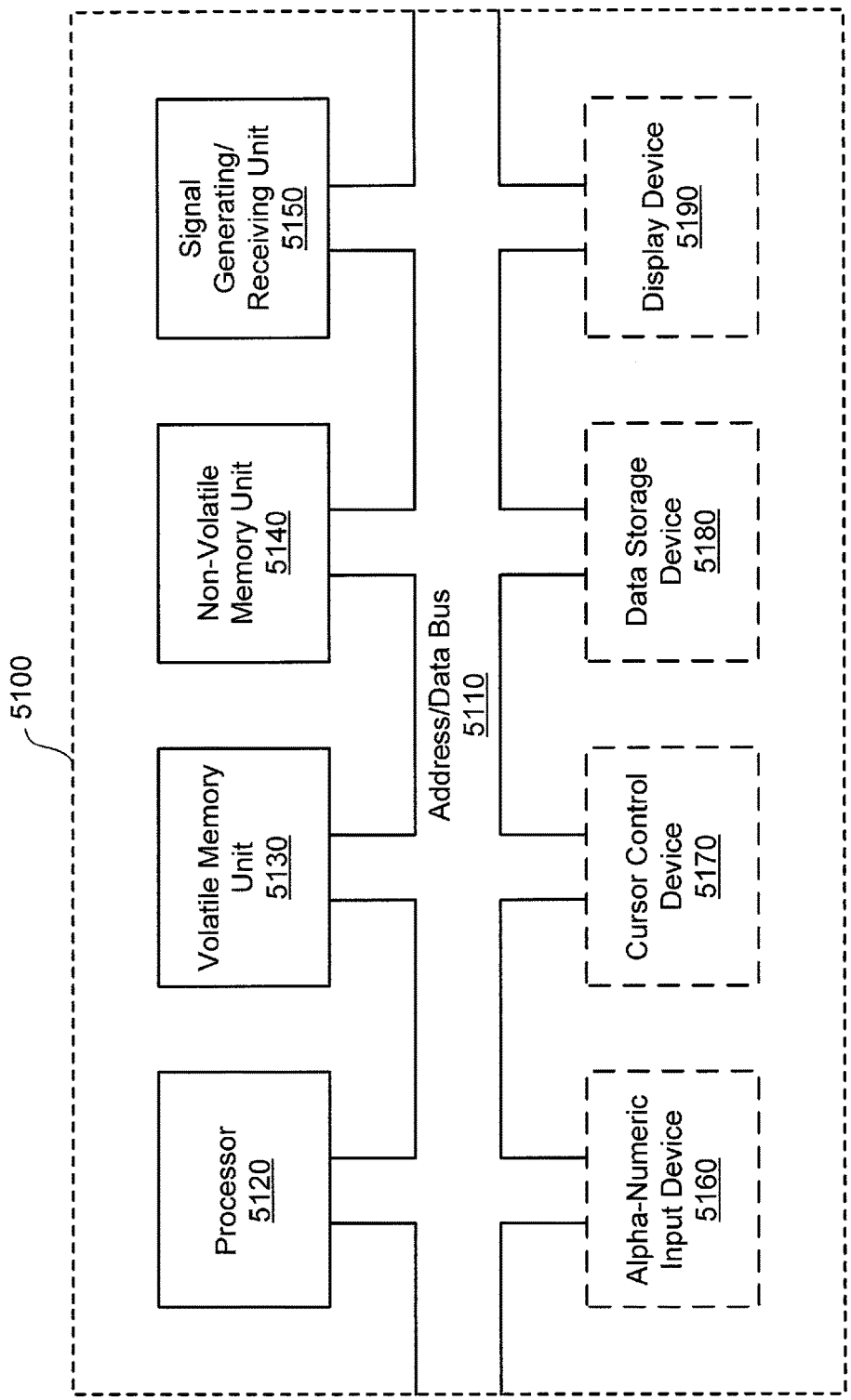
FIG. 51 is a block diagram of an exemplary computer system in accordance with an embodiment.

With reference now to FIG. 51, an exemplary computer system 5100 in accordance with an embodiment is shown. Computer system 5100 may be any type of computing device (e.g., a computing device utilized to perform calculations, processes, operations, and functions associated with a program or algorithm). Within the discussions herein, certain processes and steps are discussed that are realized, pursuant to one embodiment, as a series of instructions, such as a software program, that reside within computer-readable memory units and are executed by one or more processors of computer system 5100. When executed, the instructions cause computer system 5100 to perform specific actions and exhibit specific behavior described in various embodiments herein.

With reference still to FIG. 51, computer system 5100 includes an address/data bus 5110 configured to communicate information between a source and a destination. In addition, one or more data processors, such as processor 5120, are coupled with address/data bus 5110, wherein processor 5120 is configured to process information and instructions. In an embodiment, processor 5120 is a microprocessor or microcontroller, although other types of data processors may be implemented.

Computer system 5100 also includes a number of data storage components, such as, for example, a volatile memory unit 5130. Volatile memory unit 5130 is communicatively associated or coupled with address/data bus 5110. Additionally, volatile memory unit 5130 is configured to store information and instructions for processor 5120. Moreover, volatile memory unit 5130 may include, for example, random access memory (RAM), such as static RAM and/or dynamic RAM. Computer system 5100 further includes a non-volatile memory unit 5140, which is communicatively associated or coupled with address/data bus 5110 and configured to store static information and instructions for processor 5120. In an embodiment, non-volatile memory unit 5140 includes read-only memory (ROM), such as programmable ROM, flash memory, erasable programmable ROM (EPROM), and/or electrically erasable programmable ROM (EEPROM). The foregoing notwithstanding, it is noted that the present technology is not limited to the use of the exemplary storage units discussed herein, and that other types of memory may be implemented.

With reference still to FIG. 51, computer system 5100 also includes one or more signal generating and receiving devices, such as signal generating/receiving unit 5150, which is communicatively associated or coupled with address/data bus 5110 and configured to enable computer system 5100 to interface with other electronic devices and computer systems. The communication interface(s) implemented by the one or more signal generating and receiving devices may utilize wired (e.g., serial cables, modems, and network adaptors) and/or wireless (e.g., wireless modems and wireless network adaptors) communication technologies.

In an embodiment, computer system 5100 optionally includes an alphanumeric input device 5160 that is communicatively associated or coupled with address/data bus 5110, wherein alphanumeric input device 5160 includes alphanumeric and function keys for communicating information and command selections to processor 5120. Moreover, pursuant to one embodiment, a cursor control device 5170 is communicatively associated or coupled with address/data bus 5110, wherein optional cursor control device 5170 is configured to communicate user input information and command selections to processor 5120. For example, cursor control device 5170 may be implemented using a mouse, a track-ball, a track-pad, an optical tracking device, or a touch screen. In a second example, a cursor is directed and/or activated in response to input from alphanumeric input device 5160, such as when special keys or key sequence commands are executed. It is noted, however, that a cursor may be directed by other means, such as, for example, voice commands.

With reference still to FIG. 51, computer system 5100, pursuant to one embodiment, optionally includes a data storage device 5180 that is communicatively associated or coupled with address/data bus 5110, wherein data storage device 5180 is configured to store information and/or computer-executable instructions. To illustrate, one example provides that data storage device 5180 is a magnetic or optical disk drive, such as a hard disk drive (HDD), a floppy disk drive, a compact disk ROM (CD-ROM) drive, a digital versatile disk (DVD) drive, or a Blu-ray Disk™ (BD) drive.

Furthermore, in an embodiment, a display device 5190 is communicatively associated or coupled with address/data bus 5110 and configured to display video and/or graphics. Display device 5190 may be, for example, a cathode ray tube (CRT) display, a field emission display (FED), a plasma display, a liquid crystal display (LCD), a light emitting diode (LED) display, or any other display device suitable for displaying video and/or graphic images and alphanumeric characters capable of being recognized by a user.

It is noted that computer system 5100 is presented as an exemplary computing environment in accordance with an embodiment. However, computer system 5100 is not strictly limited to being a computer system. For example, one embodiment provides that computer system 5100 represents a type of data processing analysis that may be used in accordance with various embodiments described herein. Moreover, other computing systems may be implemented. Indeed, the present technology is not limited to any particular data processing environment.

In addition to the foregoing, it is noted that various methods of the present technology may be carried out by a computer system configured to execute a set of instructions. Such instructions may be stored, for example, on or within a computer-readable medium such that the instructions, when executed, cause a computer system to perform a method of the present technology. Consequently, an exemplary system and configuration for a computer-readable medium will now be explored. However, the present technology is not limited to this exemplary system and configuration. Indeed, other systems and configurations may be implemented.

Figure 52:
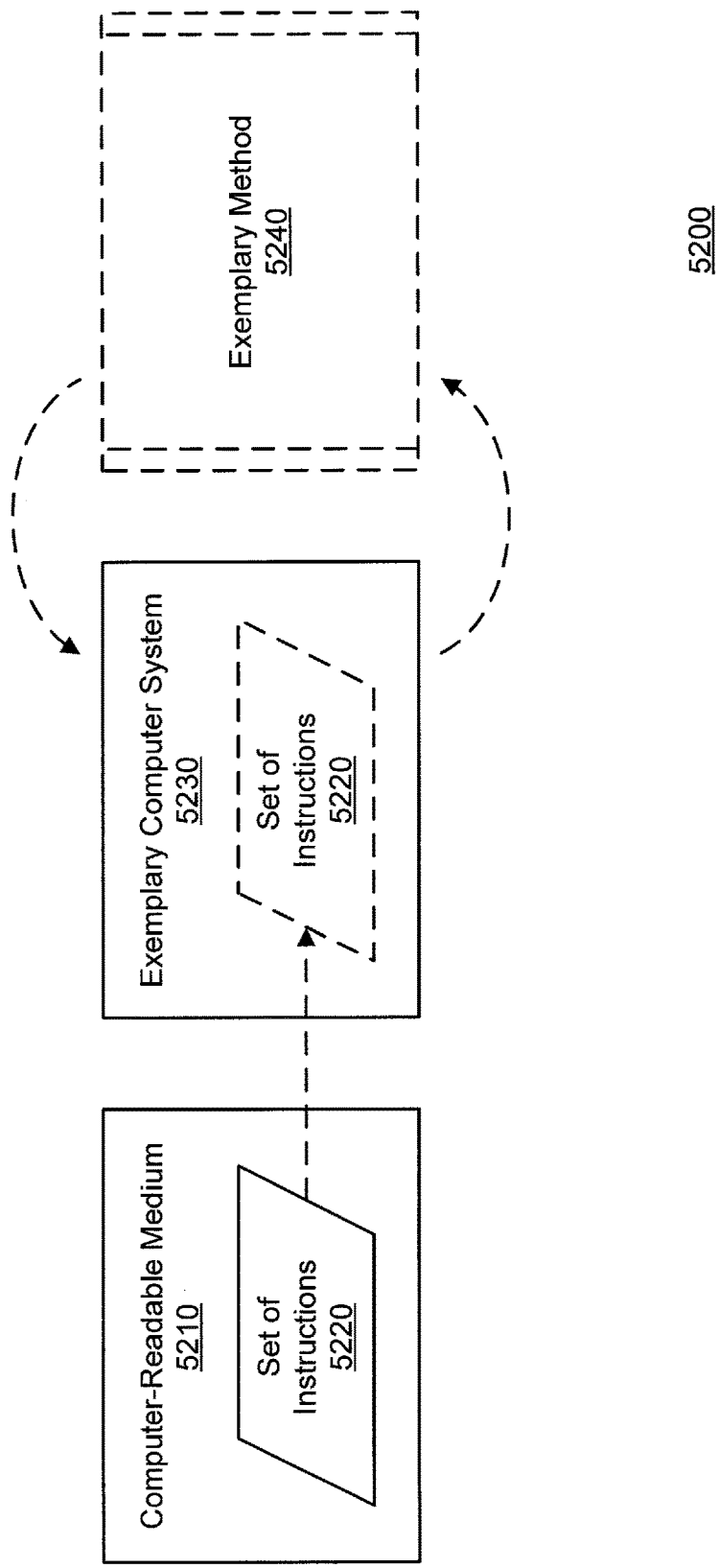
FIG. 52 is a block diagram of an exemplary instruction execution system in accordance with an embodiment.

With reference now to FIG. 52, an exemplary instruction execution system 5200 in accordance with an embodiment is shown. Exemplary instruction execution system 5200 includes a computer-readable medium 5210 configured to store a set of instructions 5220 that when executed cause a computer system, such as exemplary computer system 5230, to perform a method of the present technology, such as exemplary method 5240. For example, in one embodiment, set of instructions 5220 is acquired by computer system 5230 from computer-readable medium 5210, and then computer system 5230 executes set of instructions 5220 and consequently performs exemplary method 5240.

The foregoing notwithstanding, it is noted that the electronic and software based systems discussed herein are merely examples of how suitable computing environments for the present technology might be implemented, and that these examples are not intended to suggest any limitation as to the scope of use or functionality of the present technology. Neither should such exemplary systems be interpreted as having any dependency or requirement relating to any one or combination of the components and modules illustrated in the disclosed examples.

Exemplary Docking Systems

As previously indicated, an embodiment provides that a mobile computing device may be physically coupled or "docked" with a docking system. Consequently, a number of exemplary docking systems will now be explored. However, the present technology is not limited to these exemplary docking systems. Indeed, other systems may be implemented.

Figure 53:
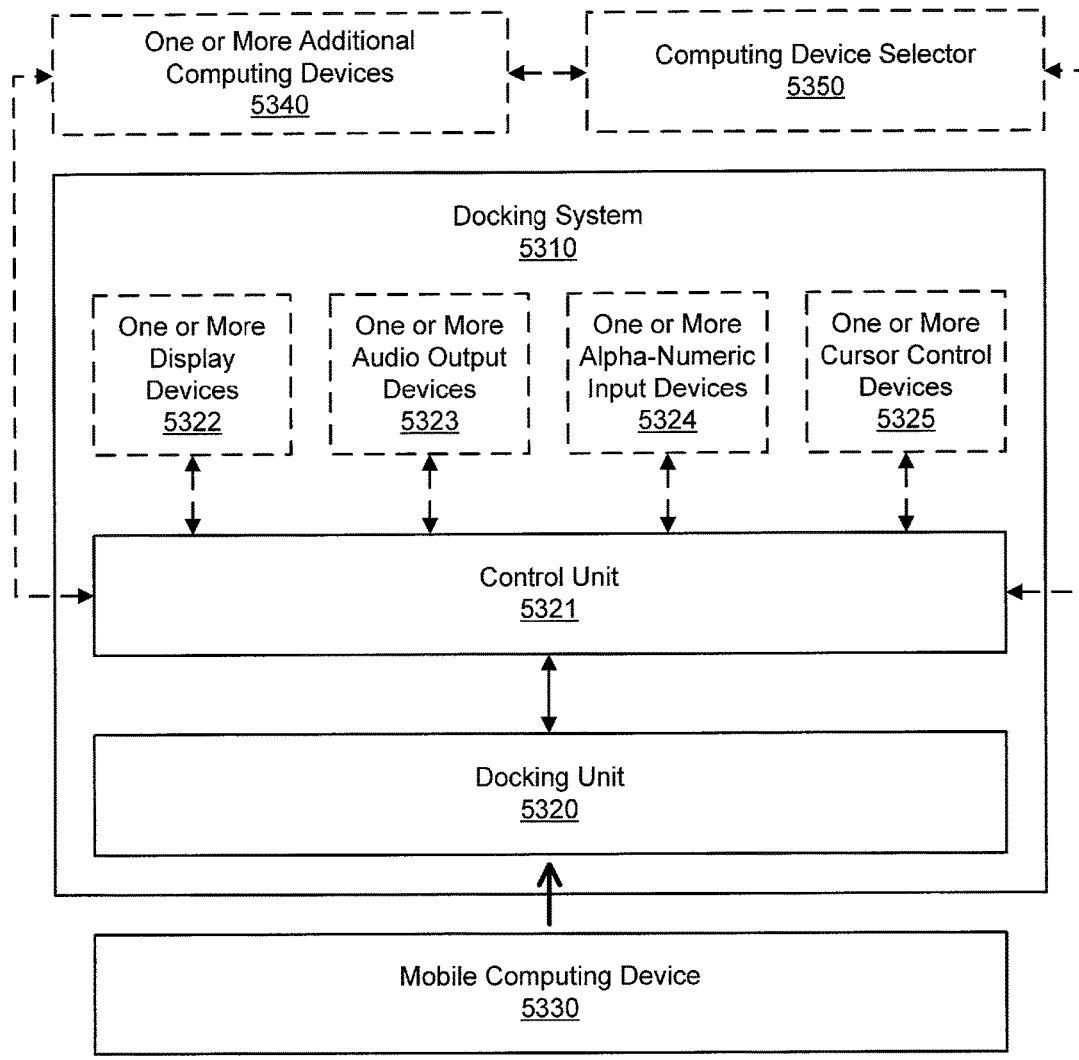
FIG. 53 is a block diagram of an exemplary docking configuration in accordance with an embodiment.

With reference now to FIG. 53, an exemplary docking configuration 5300 in accordance with an embodiment is shown. In particular, a docking system 5310 is provided that includes a docking unit 5320. Docking unit 5320 is configured to electronically couple or "dock" with a mobile computing device 5330 (e.g., first device 210) such that mobile computing device 5330 and docking system 5310 are able to communicate with one another. Docking system 5310 also includes a control unit 5321, which is communicatively associated or coupled with docking unit 5320. Control unit 5321 is configured to determine which information is to be routed through docking unit 5320 as well as determine to which auxiliary devices of docking system 5310 specific information from or associated with mobile computing device 5330 is to be directed.

In an embodiment, docking system 5310 optionally includes one or more display devices 5322 (e.g., display monitors) communicatively associated or coupled with control unit 5321. One or more display devices 5322 are configured to display information that is communicated to docking system 5310 from mobile computing device 5330. Consider the example where mobile computing device 5330 is physically docked with docking unit 5320. Visual information from mobile computing device 5330 is routed through docking unit 5320 to control unit 5321. Control unit 5321 then determines that such visual information is to be displayed by one or more display devices 5322. Consequently, control unit 5321 routes this visual information to one or more display devices 5322 such that one or more display devices 5322 are able to receive and display this information. Moreover, in one embodiment, control unit 5321 is configured to alter or supplement the visual information based on a specific display format or protocol associated with one or more display devices 5322 such that one or more display devices 5322 can display this information using such display format or protocol.

With reference still to FIG. 53, in an embodiment, docking system 5310 optionally includes one or more audio output devices 5323 (e.g., audio speakers) communicatively associated or coupled with control unit 5321. One or more audio output devices 5323 are configured to generate sound corresponding to audio information that is communicated to docking system 5310 from mobile computing device 5330. Consider the example where mobile computing device 5330 is physically docked with docking unit 5320. Audio information from mobile computing device 5330 is routed through docking unit 5320 to control unit 5321. Control unit 5321 then determines that sound corresponding to such audio information is to be generated by one or more audio output devices 5323. Consequently, control unit 5321 routes this audio information to one or more audio output devices 5323 such that one or more audio output devices 5323 are able to receive this audio information and then generate sound corresponding to such information. Moreover, in one embodiment, control unit 5321 is configured to alter or supplement the audio information based on a specific audio output format or protocol associated with one or more audio output devices 5323 such that one or more audio output devices 5323 can generate sound corresponding to this information using such audio output format or protocol.

Moreover, in an embodiment, docking system 5310 optionally includes one or more alpha-numeric input devices 5324 (e.g., keyboards) communicatively associated or coupled with control unit 5321. One or more alpha-numeric input devices 5324 are configured to input alpha-numeric information (e.g., information typed by a user) into docking system 5310. This information may be utilized, for example, to control or modify (1) visual information from mobile computing device 5330 that is being displayed by one or more display devices 5322 and/or (2) sound corresponding to audio information from mobile computing device 5330 that is generated by one or more audio output devices 5323. Consider the example where mobile computing device 5330 is physically docked with docking unit 5320. An application from mobile computing device 5330 is launched on one or more display devices 5322, and a user utilizes one or more alpha-numeric input devices 5324 in order to interact with this launched application. In a second example, a file (e.g., a word processing, spreadsheet or database file) stored within mobile computing device 5330 is launched on one or more display devices 5322, and a user utilizes one or more alpha-numeric input devices 5324 in order to modify information within this launched file. The modified file may then be saved within mobile computing device 5330 such that the implemented changes to this file have been saved in mobile memory.

Similarly, an embodiment provides that docking system 5310 optionally includes one or more cursor control devices 5325 (e.g., electronic mice and touchpads) communicatively associated or coupled with control unit 5321. One or more cursor control devices 5325 are configured to input cursor control information (e.g., cursor instructions from a user) into docking system 5310. This information may be utilized, for example, to control one or more cursors displayed by on one or more display devices 5322. Consider the example where mobile computing device 5330 is physically docked with docking unit 5320. An application or file from mobile computing device 5330 is launched on one or more display devices 5322, and a user utilizes one or more cursor control devices 5325 in order to control one or more displayed cursors to thereby interact with this launched application or file.

With reference still to FIG. 53, in an embodiment, docking system 5310 is also configured to be integrated with one or more additional computing devices 5340 (e.g., a number of desktop computers). To illustrate, a desktop computer may be communicatively associated or coupled with control unit 5321 such that information from the desktop computer may be displayed by one or more display devices 5322. For example, an exemplary implementation provides that docking system 5310 is configured to display information from mobile computing device 5330 when mobile computing device 5330 is docked with docking unit 5320. In this manner, docking system 5310 "defaults" to mobile computing device 5330 when mobile computing device 5330 is docked. However, when mobile computing device 5330 is not docked with docking unit 5320, docking system 5310 "defaults" to displaying information from one or more additional computing devices 5340.

To further illustrate, consider the example where an external desktop computer is communicatively integrated with or connected to docking system 5310. When mobile computing device 5330 is not docked with docking system 5310, the various components of docking system 5310 (e.g., one or more display devices 5322, one or more audio output devices 5323, one or more alpha-numeric input devices 5324 and one or more cursor control devices 5325) are automatically linked to the external desktop computer. However, when mobile computing device 5330 is successfully docked with docking system 5310, the various components of docking system 5310 are automatically linked to mobile computing device 5330. It is noted that this automatic linking may be the result of an automatic selection setting.

The foregoing notwithstanding, in one embodiment, control unit 5321 and one or more additional computing devices 5340 are communicatively coupled or associated with an optional computing device selector 5350, which is configured to select a computing device from among mobile computing device 5330 and one or more additional computing devices 5340 such that the selected device is able to communicate information to docking system 5310 that is to be output to a user. For example, a user may utilize computing device selector 5350 to select a desktop computer that is integrated with or connected to docking system 5310. Consequently, one or more GUIs associated with such desktop computer will be displayed by one or more display devices 5322. However, if the user utilizes computing device selector 5350 to select mobile computing device 5330 (when mobile computing device 5330 is docked with docking system 5310), then one or more GUIs associated with mobile computing device 5330 will be displayed by one or more display devices 5322. Thus, in an embodiment, it is noted that a selection switch or application may be implemented to enable a user to manually switch between the desktop computer and mobile computing device 5330. Moreover, one embodiment provides that this selection switch or application may optionally be configured to enable the user to manually select an automatic selection setting, such as previously explained.

With reference still to FIG. 53, an embodiment provides that docking system 5310 includes a split-screen monitor having first and second display sections that are automatically linked to mobile computing device 5330 and a second computer, respectively, when mobile computing device 5330 is docked with docking system 5310. In this manner, a user can simultaneously interact (through docking system 5310) with both of mobile computing device 5330 and the second computer, such as where this split-screen monitor is itself a touchscreen such that touch inputs can be detected in both of the first and second display sections.

Figure 54:
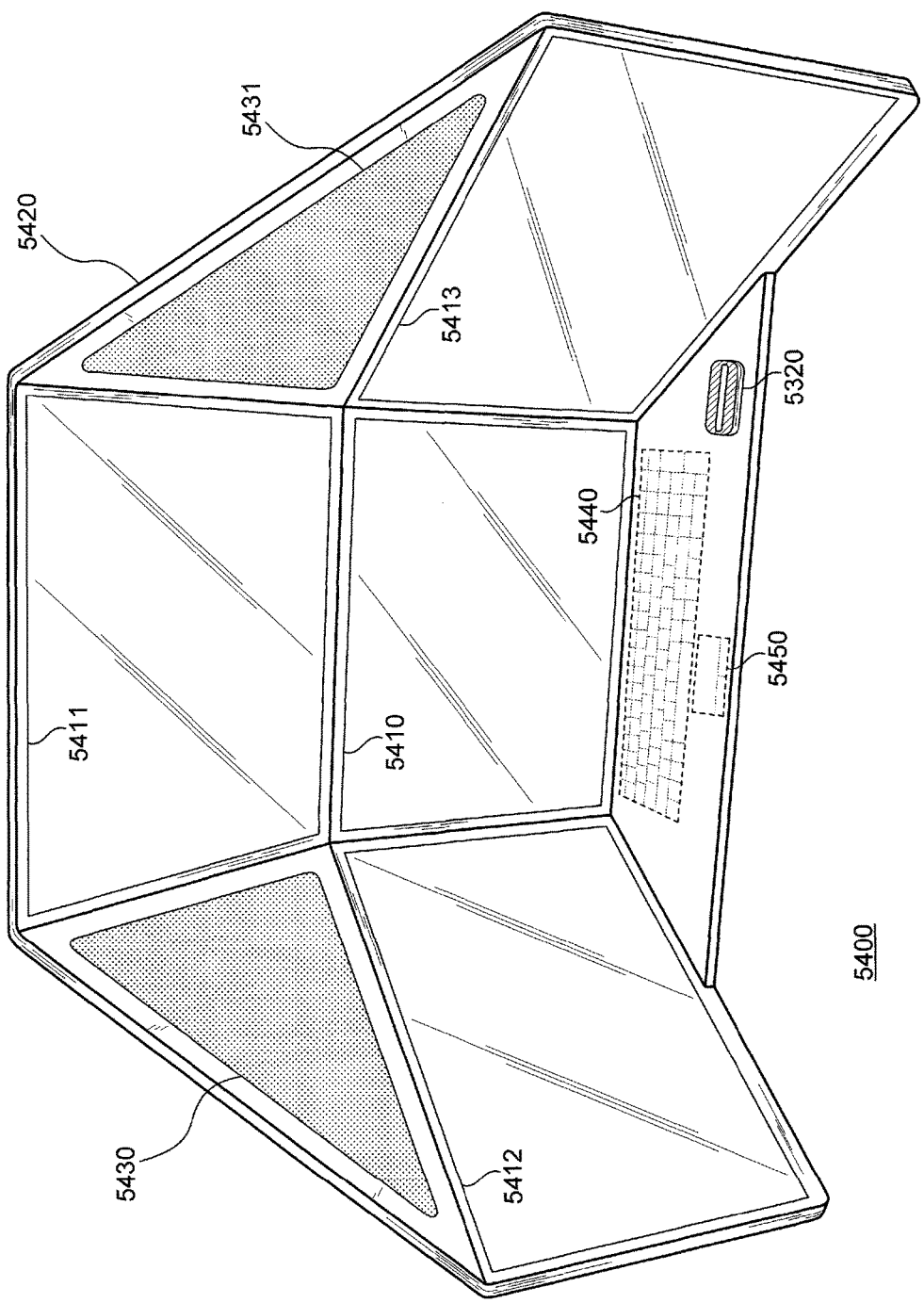
FIG. 54 is a perspective view of an exemplary docking system in accordance with an embodiment.

With reference now to FIG. 54, an exemplary docking system 5400 in accordance with an embodiment is shown. Exemplary docking system 5400 includes a docking unit 5320, such as described above with reference to FIG. 53. Exemplary docking system 5400 may also include one or more additional components described herein, even though such components may not be illustrated in FIG. 54.

In an embodiment, exemplary docking system 5400 includes a number of display screens. For example, in FIG. 54, exemplary docking system 5400 is shown as including four different display screens 5410-5413 that are collectively positioned such that these display screens 5410-5413 are angled to simultaneously display information to the same user. Indeed, it is noted that these display screens 5410-5413 are positioned based upon a predetermined user position such that this grouping of display screens 5410-5413 is geometrically configured to partially wrap around the user, thereby creating a "cave-like" computing environment. Moreover, in one embodiment, each of display screens 5410-5413 is integrated within a single housing 5420, wherein housing 5420 is configured to physically support display screens 5410-5413, and wherein housing 5420 is shaped to angle display screens 5410-5413 such that this cave-like computing environment is created.

Consider the example where a mobile computing device (not shown) is physically docked with docking unit 5320. Visual information from this mobile computing device is routed through docking unit 5320 such that exemplary docking system 5400 receives this visual information. Exemplary docking system 5400 (or a control unit thereof) then determines that such visual information is to be displayed by one or more display screens from among display screens 5410-5413. Consequently, exemplary docking system 5400 (or a control unit thereof) routes this visual information to these one or more display screens such that the visual information is received and displayed by the one or more display screens.

Indeed, one embodiment provides that one or more of these display screens is configured to display information in a split-screen format. Consider the example where one of these display screens simultaneously displays first and second display sections, wherein one of these display sections displays a GUI of a docked mobile computing device, and wherein this GUI shows a number of icons. The user may touch one of these icons in this display section and then (1) touch the other display section, (2) move or drag this icon to this other display section or (3) flick or slide this icon toward this other display section to thereby cause a file, application or program associated with this selected icon to be launched within this other display section.

The foregoing notwithstanding, and with reference still to FIG. 54, it is noted that the present technology is not limited to the implementation of four display screens. Indeed, a different number of display screens (e.g., three or less display screens, or five or more display screens) may be implemented. Moreover, in one embodiment, exemplary docking system 5400 does not include a display screen, such as where exemplary docking system 5400 is specifically designed for use by visually impaired individuals.

In an embodiment, exemplary docking system 5400 includes a number of audio speakers. For example, in FIG.

54, exemplary docking system 5400 is shown as including two different audio speakers 5430, 5431 that are collectively positioned such that these audio speakers 5430, 5431 are angled to simultaneously project sound toward the same user. Indeed, it is noted that these audio speakers 5430, 5431 are positioned based upon a predetermined user position such that this grouping of audio speakers 5430, 5431 is geometrically configured to partially wrap around the user, thereby helping to create a "cave-like" multimedia environment. Moreover, in one embodiment, each of audio speakers 5430, 5431 is integrated within housing 5420, wherein housing 5420 is configured to physically support audio speakers 5430, 5431, and wherein housing 5420 is shaped to angle audio speakers 5430, 5431 such that this cave-like multimedia environment is created.

Consider the example where a mobile computing device (not shown) is physically docked with docking unit 5320. Audio information from this mobile computing device is routed through docking unit 5320 such that exemplary docking system 5400 receives this audio information. Exemplary docking system 5400 (or a control unit thereof) then determines that such audio information is to be routed to audio speakers 5430, 5431 such that audio speakers 5430, 5431 can generate sound corresponding to this audio information. Consequently, exemplary docking system 5400 (or a control unit thereof) routes this audio information to audio speakers 5430, 5431 such that audio speakers 5430, 5431 can generate sound corresponding to this audio information.

The foregoing notwithstanding, it is noted that the present technology is not limited to the implementation of two audio speakers. Indeed, a different number of audio speakers (e.g., one audio speaker, or three or more audio speakers) may be implemented. Moreover, in one embodiment, exemplary docking system 5400 does not include an audio speaker, such as where exemplary docking system 5400 is specifically designed for use by hearing impaired individuals.

Moreover, audio speakers 5430, 5431 are each shown in FIG. 54 as being substantially triangular in shape. This triangular geometry may help to create a "cave-like" work station, such as shown in FIG. 54, which is relatively low profile (as compared to the implementation of squared audio speakers that would extend farther outward). It is also noted, however, that the present technology is not limited to this triangular geometry, and that other geometries may be implemented. For example, in one embodiment, an outside edge of such speakers (as well as housing 5420) is rounded rather than flat, such as to create a rounded physical transition between display screens 5411, 5412, and between display screens 5411, 5413.

In addition to the foregoing, and in accordance with an embodiment, exemplary docking system 5400 optionally includes one or more alpha-numeric input devices and/or cursor control devices. For example, and with reference still to FIG. 54, exemplary docking system 5400 may include a keyboard 5440 and/or a touchpad 5450. It is noted that such alpha-numeric input devices and/or cursor control devices may be configured to function, for example, as described above with reference to FIG. 53.

Furthermore, one embodiment provides that one or more of the implemented display screens (e.g., display screens 5410-5413) are touchscreens. In this manner, a user can simply touch one of the display screens of exemplary docking system 5400 so as to, for example, (1) launch a file or application associated with a mobile computing device on the touched display screen of exemplary docking system 5400 and/or (2) interact with a file or application associated with the mobile computing device that has been launched on the touched display screen of exemplary docking system 5400. In this regard, it is noted that various touchscreen implementations described herein may be utilized with exemplary docking system 5400.

Exemplary Methodologies

A number of exemplary methodologies of the present technology will now be explored. It is noted, however, that the present technology is not limited to these exemplary methodologies. Indeed, other methodologies may also be implemented.

It is further noted that the exemplary methods discussed herein are not limited to the exemplary embodiments, examples and implementations discussed herein. Rather, the exemplary methods discussed herein may be modified and/or supplemented, such as to include any of the exemplary steps or operations discussed herein (e.g., with reference to the above-mentioned systems, devices, components, paradigms, configurations, implementations, etc.).

I. First Exemplary Method of Data Sharing

With reference now to FIG. 55, a first exemplary method of data sharing 5500 in accordance with an embodiment is shown. First exemplary method of data sharing 5500 includes wirelessly routing a selected data set to a selected device in response to a flicking or sliding gesture detected at a touchscreen 5510. It is noted that, although first exemplary method of data sharing 5500 includes routing the selected data set wirelessly, first exemplary method of data sharing 5500 may be modified to include routing the selected data set to the selected device in a different fashion (e.g., using a wired data routing protocol).

The foregoing notwithstanding, in an embodiment, the flicking or sliding gesture indicates both of the selected data set and the selected device. As such, a single gesture can be implemented to select a data set, select an external target, and route the selected data set to such external target, thereby increasing the relative ease with which a user is able to share data.

Consider the example where a particular device is identified as an available device during a device identification process, such as explained above. Upon or subsequent to the identification of this available device, the flicking or sliding gesture moves across the touchscreen such that (1) an icon displayed at a first location on the touchscreen is selected, wherein this icon corresponds to a specific data set (e.g., a data set pertaining to a particular electronic file or application) such that this data set is selected based on the selection of such icon, and (2) the available device is selected based on the flicking or sliding gesture engaging a second location on the touchscreen, wherein this second location (and possibly also the aforementioned first location) enable this available device to be identified as a selected device. For purposes of further illustration, it is noted that such a device selection process is explored above.

The foregoing notwithstanding, although first exemplary method of data sharing 5500 includes routing the selected data set to the selected device in response to a flicking or sliding gesture detected at a touchscreen, first exemplary method of data sharing 5500 may be modified to include routing the selected data set to the selected device in response to a gesture other than a flicking or sliding gesture. Indeed, it is noted that the present technology is not limited to a particular type of gesture. For example, the gesture may be a touching gesture, such as a single touch or multi-touch input (e.g., a single, double or triple touch), which may be applied by a user and detected by the touchscreen. However, other types of gestures may also be implemented.

In addition to the foregoing, and as previously indicated, it is noted that first exemplary method of data sharing 5500 is not limited to the exemplary embodiments and examples discussed above. Rather, first exemplary method of data sharing 5500 may be further modified and/or supplemented, such as to include any of the exemplary steps or operations discussed herein.

II. Second Exemplary Method of Data Sharing

Figure 56:
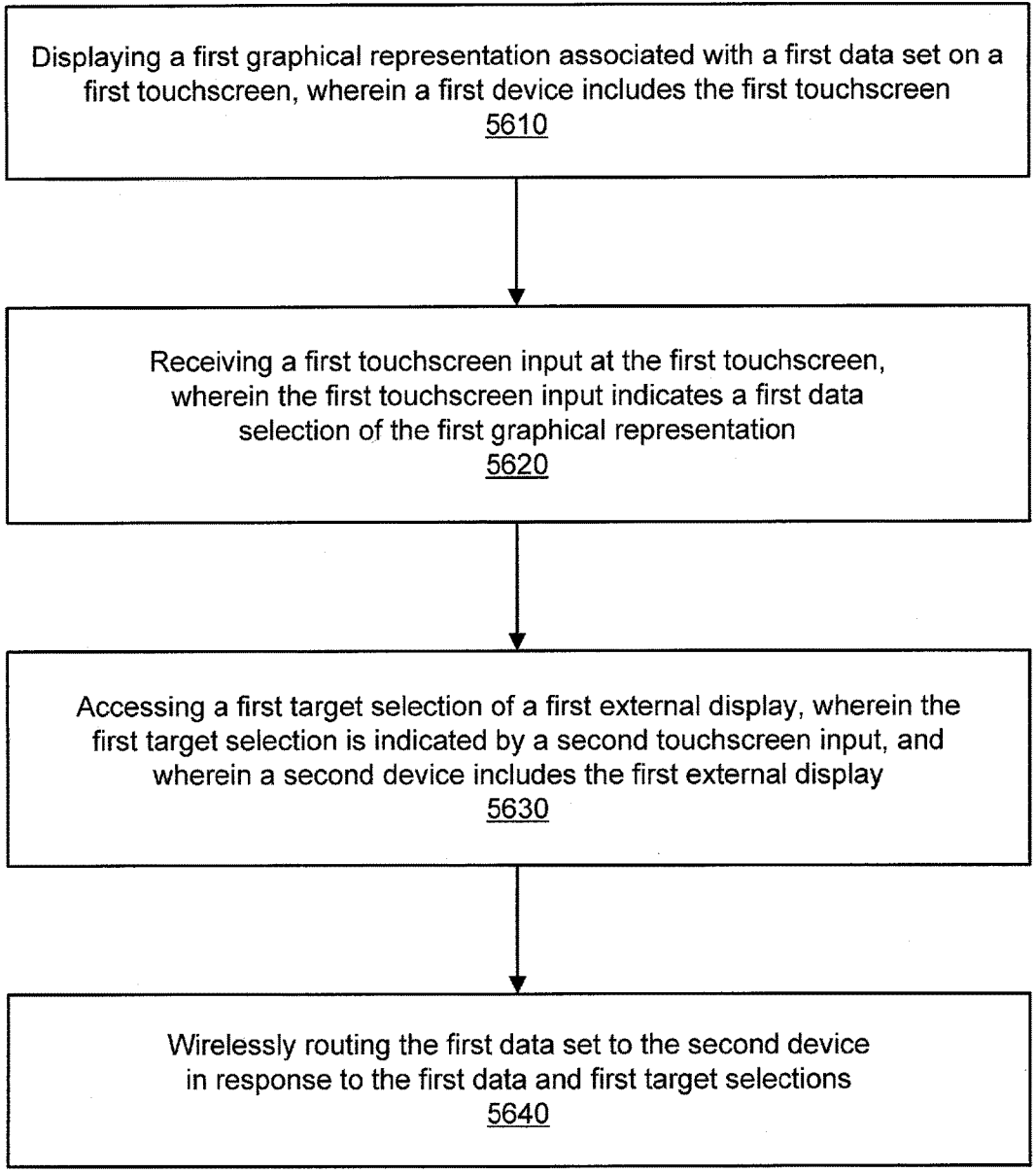
FIG. 56 is a flowchart of a second exemplary method of data sharing in accordance with an embodiment.

With reference now to FIG. 56, a second exemplary method of data sharing 5600 in accordance with an embodiment is shown. Second exemplary method of data sharing 5600 includes displaying a first graphical representation associated with a first data set on a first touchscreen, wherein a first device includes the first touchscreen 5610. Consider the example where the first device is a mobile device (e.g., an electronic tablet, PDA or smartphone) having a touchscreen. A first graphical representation (e.g., an icon or image) associated with a first data set (e.g., an electronic file, image, video, program or application) is displayed on this touchscreen. For example, the first graphical representation may be a small icon or image that represents the first data set, such as by showing the name of, or a brand logo or trademark associated with, the corresponding file, program or application.

To further illustrate, and in accordance with an embodiment, the first graphical representation includes a thumbnail image or icon representing the first data set. For example, the first data set may include data representing a digital image, and the first graphical representation may include a thumbnail image (e.g., a smaller, lower-resolution image) of at least a portion of this digital image. In a second example, the first data set may include computer-readable instructions that when executed causes a program or application to be launched, and the first graphical representation may include an icon (e.g., a brand logo or trademark) corresponding to this program or application. It is noted, however, that the present technology is not limited to the implementation of a thumbnail image or icon. Indeed, in one embodiment, the first graphical representation includes a graphical representation other than a thumbnail image or icon, wherein such graphical representation represents the first data set.

Moreover, in an embodiment, the first data set includes a digital audio file, digital image file, digital video file or digital software application. It is noted, however, that the present technology is not limited to such a digital audio file, digital image file, digital video file or digital software application. Indeed, in one embodiment, the first data set includes information or data that does not correspond to a digital audio file, digital image file, digital video file or digital software application.

Furthermore, one embodiment provides that a selection of this first graphical representation may be interpreted as a selection of the associated first data set. Indeed, and with reference still to FIG. 56, it is noted that second exemplary method of data sharing 5600 also includes receiving a first touchscreen input at the first touchscreen, wherein the first touchscreen input indicates a first data selection of the first graphical representation 5620. Consider the example where the first data set includes, or corresponds to, a file or application represented by the first graphical representation. In order to select this file or application, a user touches the first graphical representation on the first touchscreen, or otherwise selects the first graphical representation in some other manner, such as by, for example, selecting the first graphical representation using (1) an off-screen (e.g., a push-button) input mechanism or (2) a predefined voice recognition command. In response to this touching/selection of the first graphical representation, a first data selection is generated by the first touchscreen, wherein this first data selection reflects the user's selection of this file or application, such as where the first data selection includes an electronic signal or digital data configured to communicate the selection of the first data set.

Second exemplary method of data sharing 5600 further includes accessing (e.g., with a data sharing control module or data sharing device) a first target selection of a first external display, wherein the first target selection is indicated by a second touchscreen input, and wherein a second device includes the first external display 5630. Consider the example where the second device is a computer monitor, television or electronic billboard having a screen configured to display information to an audience. A second touchscreen input is detected (e.g., by the first touchscreen or by the first external display), wherein this second touchscreen input indicates that this second device is a target device to which certain selected data is to be routed.

Consider the example where the first touchscreen generates the first data selection in response to the first touchscreen input, such as previously discussed. Subsequently, the first touchscreen detects the second touchscreen input and then generates the first target selection based on this second touchscreen input, such as where the first target selection includes an electronic signal or digital data configured to communicate the selection of the identified target device. In this manner, the first device has access to both of the first data and first target selections, because both of these selections are generated at the first device. Pursuant to a second example, however, the first external display is a second touchscreen that detects the second touchscreen input and then generates the first target selection based on this second touchscreen input. The second device then transmits or routes (e.g., wirelessly transmits or routes) this first target selection to the first device such that the first device will then have access to both of the first data and first target selections.

Furthermore, and with reference still to FIG. 56, second exemplary method of data sharing 5600 includes wirelessly routing the first data set to the second device in response to the first data and first target selections 5640. For example, the first data selection identifies the first data set as the data set that is to be routed, and the first target selection identifies the second device as the selected target to which the first data set is to be routed. Consequently, the first data set is routed to the target device based on both of the first data and first target selections. The foregoing notwithstanding, it is noted that, although second exemplary method of data sharing 5600 includes routing the selected first data set wirelessly, second exemplary method of data sharing 5600 may be modified to include routing the selected first data set to the target device in a different fashion, such as by using a wired (e.g., USB) data routing protocol.

In addition to the foregoing, it is noted that second exemplary method of data sharing 5600 may be modified and/or supplemented. Indeed, in an embodiment, second exemplary method of data sharing 5600 includes detecting a touching of a location on the first touchscreen, wherein the location corresponds to the first graphical representation, and determining that the first data set is to be routed to an external device based on a duration of the touching of the location being equal to or longer than a predefined duration threshold. Consider the example where a user touches the first graphical representation on the first touchscreen to thereby select the first data set, which the user knows is associated with this first graphical representation. If the predefined duration threshold is 2 seconds, and if the user continues to touch the first graphical representation on the first touchscreen for a period of time that is equal to or greater than this 2 second threshold, then it is determined that the selected first data set is to be routed to an external device. Consequently, the first data set may be routed to a particular external device once such external device is identified as the applicable external target.

To further illustrate, consider the example where a user may quickly touch (or double touch) the first graphical representation to thereby launch a file or application associated with the first data set on the first touchscreen. However, if a user instead touches the first graphical representation for a duration of, for example, at least 2 seconds, it will consequently be determined that a routing of the first data set to an external device has been selected. It is noted that such a determination may be conducted before the specific external device to which the first data set will be routed has been selected. It is also noted that, once the specific external device has finally been selected, the routing of the selected first data set to this external target may be initiated. Thus, in accordance with one embodiment, second exemplary method of data sharing 5600 includes detecting a touching of a location on the first touchscreen, wherein the location corresponds to the first graphical representation, and determining that the first data set is to be routed to the second device based on a duration of the touching of the location being equal to or longer than a predefined duration threshold and based on the first target selection. In particular, while the duration of this touching of such location being equal to or longer than the predefined duration threshold enables a determination that the first data set is to be routed to an external device to be conducted, the first target selection enables the exact external device to which the first data set is to be routed to be identified.

Moreover, in the event that shared content (e.g., a file or application associated with the first data set) is to be launched by a selected external device, it is noted that this same content may or may not be simultaneously displayed by the first touchscreen. Consider the example where this content is selected with the first touchscreen, such as in a manner discussed herein. This same content may then be launched on an external display screen, such that this content has been seemingly "pushed" from the first touchscreen to the external display screen. In an embodiment, the content continues to be displayed by the first touchscreen while this same content is simultaneously displayed by the external display screen, which may be useful, for example, to enable a remote interaction with the content displayed on the external display screen by physically interacting with the first touchscreen, such as where a user touches the first touchscreen so as to route scrolling, rotating, resizing, repositioning or other instructions from the first device to the selected external device.

Pursuant to one embodiment, however, the content is no longer displayed by the first touchscreen when this same content is displayed by the external display screen, wherein the removal of this content from the first touchscreen occurs as a result of this content being successfully displayed by the external display screen. For example, once the content is successfully launched by the external display screen, the selected external device routes (e.g., wirelessly routes) a confirmation signal to the first device that confirms this successful display event, and the first device then causes this same content to be removed from the first touchscreen in response to receiving this confirmation signal. This may be useful, for example, to enable a user of the first device to select different content that is to be "pushed" to the same or a different external device at the same time that the previously selected content is being successfully displayed by the aforementioned external display screen.

As previously indicated, an embodiment provides that second exemplary method of data sharing 5600 includes receiving the second touchscreen input at the first touchscreen. Consider the example where a flicking or sliding gesture along the first touchscreen causes both of the first and second touchscreen inputs to be identified, such as where this flicking or sliding gesture causes two different areas on the first touchscreen to be touched at two different points in time, respectively, such that the first and second touchscreen inputs may be detected by the first touchscreen at these two different points in time, respectively. In particular, a detection of the flicking or sliding gesture is enabled along the first touchscreen, wherein this flicking or sliding gesture indicates (1) the first data selection of the first graphical representation as well as (2) the first target selection of the second device. In this manner, a single gesture (e.g., a flicking or sliding gesture) may be detected to thereby identify both of the first data and first target selections.

The foregoing notwithstanding, and as previously indicated, one embodiment provides that second exemplary method of data sharing 5600 includes receiving the second touchscreen input at the first external display, wherein the first external display includes a second touchscreen. Consider the example where the first external display includes a second touchscreen that is distinct from the first touchscreen of the first device, such as where the second device is a computer monitor, television or electronic billboard that is distinct and separated from the first device. When a user touches this second touchscreen, this physical touching is interpreted as a selection of the second device as the external target, and this target selection (e.g., the first target selection) is communicated (e.g., wirelessly or through a shared network) to the first device.

In accordance with an embodiment, second exemplary method of data sharing 5600 includes identifying the second device in response to the first data selection. For example, the first device may be configured to wirelessly or optically identify those devices within a vicinity of the first device that are capable of communicating (e.g., wirelessly) with the first device. In particular, the first device may be configured to perform this device identification process in response to a graphical symbol (e.g., the first graphical representation) being selected within the first touchscreen. In this manner, the first device is able identify a number of external display screens before the first target selection is received. This may be useful, for example, in expediting the routing of the first data set to a selected external device once the first target selection is received, because the aforementioned device identification process will have already been performed. Moreover, the availability of these external devices may be communicated to a user, such as in an external device list or virtual environment map as discussed herein, so as to aid the user with the target device selection process.

The foregoing notwithstanding, one embodiment provides that second exemplary method of data sharing 5600 includes identifying the second device in response to the first target selection. For example, the first device may be configured to perform the aforementioned device identification process after a graphical symbol (e.g., the first graphical representation) has been selected within the first touchscreen and in response to an external device being selected, such as where the external device (e.g., the second device) is configured to communicate (e.g., wirelessly communicate) a selection of such external device to the first device. This may be useful, for example, in order to minimize or decrease the amount of time between which the first device is able to receive and process both the first data selection and the first target selection.

It is noted that the device identification process may be carried out in accordance with a number of different methodologies. To illustrate, an embodiment provides that second exemplary method of data sharing 5600 includes optically identifying the second device, or identifying the second device based on a proximity of the second device to the first device, such as where, for example, the first device is able to optically identify the second device when the first device is sufficiently close to the second device for such an optic identification to be effectively performed. Indeed, one embodiment provides that second exemplary method of data sharing 5600 includes selecting an optic signal transceiver (e.g., an IR signal transceiver) that is communicatively associated with the first device and identifying the second device with this optic signal transceiver.

The foregoing notwithstanding, one embodiment provides that second exemplary method of data sharing 5600 includes identifying the second device based on a network presence (e.g., a wireless network presence) of the second device. Consider the example where both of the first and second devices are communicatively associated, coupled or connected with a local communication network, such as a LAN (e.g., a WLAN). As a result of the second device being communicatively associated, coupled or connected with this network, a "presence" of the second device on the network may be detected (e.g., the second device may be allocated as a network "node") such that the second device is considered to be an available external device.

Moreover, in an embodiment, the first and second devices are registered with a data sharing service such that the respective registrations of the first and second devices are associated with one another (such as where the device registrations are linked to a registered user account). Consequently, the first and second devices are able to identify each other (and transmit data to one another), such as with optic and/or RF signals, as a result of their respective registrations being associated with one another. In one embodiment, however, the first and second devices are able to identify each other, such as in a manner discussed herein, without the first and second devices being registered with such a data sharing service. In this manner, an unregistered device is able to identify another unregistered device (and share data with that device) without a tedious and restrictive registration process being implemented. This provides users with greater flexibility and convenience, such as when a user wants to share data on the fly with an unregistered device belonging to a friend or family member.

Furthermore, it is noted that, in accordance with an embodiment, data sharing devices are able to identify each other (and transmit data to one another) even when such devices are not wirelessly "connected" with one another over a WLAN. For example, an embodiment provides that the first and second devices are able to identify each other using (1) optic signals, such as IR signals, or (2) RF signals, such as RF signals in the RF range of approximately 2.4 to 2.48 gigahertz. Once this device identification process has finished, the first and second devices may then begin sharing data with one another, such as by using RF signals in the RF range of approximately 2.4 to 2.48 gigahertz, which enables a communication between the first and second devices using relatively short-wavelength radio transmissions configured to exchange data over relatively short distances.

As previously indicated, an embodiment provides that second exemplary method of data sharing 5600 includes detecting a flicking or sliding gesture along the first touchscreen, wherein the flicking or sliding gesture indicates the first and second touchscreen inputs such that the flicking or sliding gesture thereby indicates the first data and first target selections. To illustrate, and in accordance with an exemplary implementation, a flicking or sliding gesture is detected, such as where a user touches an icon displayed by the first touchscreen and then "flicks" or "slides" this icon along the first touchscreen in a direction toward an external device or display (or a graphical representation thereof). It is noted that the flicking or sliding gesture indicates first and second touchscreen inputs, wherein the first and second touchscreen inputs in turn indicate the first data and first target selections, respectively. In this manner, a single gesture may be detected to thereby identify both of the first data and first target selections.

Thus, in an embodiment, the first and second touchscreen inputs result from a flicking or sliding gesture along the first touchscreen. Moreover, in one embodiment, second exemplary method of data sharing 5600 includes identifying the second device based on the flicking or sliding gesture. To illustrate, consider the example where a user touches the first graphical representation on the first touchscreen and then flicks the first graphical representation (1) in a direction toward, or associated with, the second device or (2) in a direction toward, or associated with, a virtual representation of the second device that is displayed on the first touchscreen. As a result of this flicking input, the second device is identified as being the external device to which the selected first data set is to be routed. Similarly, a second example provides that a user touches the first graphical representation on the first touchscreen and then slides the first graphical representation to a virtual representation of the second device that is displayed on the first touchscreen. As a result of this sliding input, the second device is identified as being the external device to which the selected first data set is to be routed.

In accordance with an embodiment, second exemplary method of data sharing 5600 includes identifying the second device, identifying the first external display in response to the identifying of the second device, generating an external device list, and indicating an availability of the first external display in the external device list in response to the identifying of the first external display. In this manner, the external device list may be displayed to a user, such as by displaying the external device list on the first touchscreen, and the user may simply select an available external device from this list to thereby specify the target device (and thereby define the aforementioned target selection), such as by touching (or otherwise selecting) a visual representation or data row/column associated with such external device. For purposes of further illustration pertaining to an exemplary implementation of such an external device list, see the discussion of FIG. 12 above.

Pursuant to one embodiment, the first external display is identified as an available external display based on one or more display parameters associated with the first external display. To illustrate, such one or more display parameters may indicate, for example, (1) that the identified second device includes the first external display and (2) that one or more preselected display features (e.g., a specific screen resolution or contrast ratio, or a 3D display capability) are associated with the first external display. In this manner, display parameters associated with different devices may be implemented to identify the available external displays as well as provide search criteria that can be filtered to thereby identify one or more specific external displays from among the available external displays having particular display capabilities of interest.

In an embodiment, second exemplary method of data sharing 5600 includes identifying a linear data path between the first and second devices and identifying the first external display in response to the identifying of the linear data path. To illustrate, consider the example where a linear data path between the first and second devices is identified, such as where the first device optically identifies the second device. As a result of this linear data path being identified, the first external display is identified as an available external display, such as where the first data set is to be optically or wirelessly transmitted from the first device to the second device along this linear data path.

Indeed, one embodiment provides that the first external display is identified as an available external display based on both of the linear data path and a display parameter. For example, upon or subsequent to the linear data path being identified, such that information may be wirelessly transmitted between the first and second devices, the first external display is identified as an available external display based on the display parameter indicating (1) that the second device includes the first external display and (2) that one or more preselected display features (e.g., a specific screen resolution or contrast ratio, or a 3D display capability) are associated with the first external display.

Pursuant to an embodiment, the linear data path coincides with a line of sight between the first and second devices such that no physical obstacles exist between the first and second devices. Consequently, a clear, visual path is defined between the first and second devices, which may be useful, for example, when the first device is configured to optically identify the second device. The foregoing notwithstanding, one embodiment provides that one or more physical obstacles, such as, for example, a wall, are positioned between the first and second devices such that the linear data path does not coincide with a line of sight between the first and second devices. Nevertheless, the linear data path is defined between the first and second devices. Consider the example where the first device is configured to communicate with the second device using electromagnetic communication signals (e.g., cellular or RF signals). In so much as an electromagnetic signal is able to travel through various physical obstacles, an embodiment provides that the presence of the aforementioned one or more physical obstacles between the first and second devices does not prevent the linear data path from existing between the first and second devices.

In an embodiment, second exemplary method of data sharing 5600 includes selecting a first optic signal transceiver associated with the first device, wherein a second optic signal transceiver is associated with the second device. Second exemplary method of data sharing 5600 also includes generating a first optic signal at the first optic signal transceiver in response to at least one selection from among the first data and first target selections, routing the first optic signal from the first optic signal transceiver to the second optic signal transceiver along a linear signal path, generating a second optic signal at the second optic signal transceiver in response to receiving the first optic signal at the second optic signal transceiver, and routing the second optic signal from the second optic signal transceiver to the first optic signal transceiver along a linear signal path, wherein the aforementioned linear signal paths may or may not substantially overlap within the physical space between the first and second optic signal transceivers. Second exemplary method of data sharing 5600 further includes identifying the first external display in response to receiving the second optic signal at the first optic signal transceiver.

The foregoing notwithstanding, an embodiment provides that the second device is identified using RF signals (such as by enabling a communication between the first and second devices using relatively short-wavelength radio transmissions configured to exchange data over relatively short distances). Consider the example where the aforementioned signal transceivers are actually RF signal transceivers, and wherein the aforementioned optic signals are actually RF signals (e.g., in the RF range of approximately 2.4 to 2.48 gigahertz). A transceiver that is communicatively associated or coupled with the first device may be selected, wherein this transceiver is configured for RF transmissions (e.g., in the RF range of approximately 2.4 to 2.48 gigahertz), and the second device may be identified with this transceiver.

In one embodiment, however, second exemplary method of data sharing 5600 includes selecting an optic signal transmitter associated with the first device, wherein an optic signal receiver is associated with the second device. Second exemplary method of data sharing 5600 also includes generating an optic signal at the optic signal transmitter in response to at least one selection from among the first data and first target selections, routing the optic signal from the optic signal transmitter to the optic signal receiver along a linear signal path, generating a confirmation signal in response to receiving the optic signal at the optic signal receiver, routing the confirmation signal to the first device, and identifying the first external display in response to receiving the confirmation signal at the first device.

It is noted that, in an embodiment, the confirmation signal is an optic signal. Pursuant to one embodiment, however, the confirmation signal is a different type of signal. For example, the confirmation signal may be an electromagnetic signal (e.g., a cellular or RF signal). Indeed, it is noted that the present technology is not limited to any particular signal type.

Thus, in accordance with an embodiment, the confirmation signal is generated at the optic signal receiver and routed to the first device from the optic signal receiver. Pursuant to one embodiment, however, the confirmation signal is generated by a device other than the optic signal receiver, and the confirmation signal is then routed to the first device from this other device. Consider the example where the second device is a node on a local communication network, where the optic signal receiver is configured to receive the optic signal, and where the second device is configured to notify a network controller that the optic signal was received, such as by generating a notification signal and routing this notification signal to the network controller. Upon this notification, the network controller will generate the confirmation signal and then route the confirmation signal to the first device. This may be useful, for example, when the confirmation signal is an electromagnetic signal rather than an optic signal. Pursuant to one embodiment, however, the confirmation signal is generated and transmitted by the optic signal receiver.

In an embodiment, an external display is selected based on multiple touchscreen inputs. Indeed, one embodiment provides that second exemplary method of data sharing 5600 includes receiving the first and second touchscreen inputs at first and second locations, respectively, on the first touchscreen, identifying a first geometric ray based on the first and second locations, and determining that the second device is located along the first geometric ray to thereby select the first external display. To illustrate, consider the example where the first and second touchscreen inputs are received at the first and second locations, respectively, on the first touchscreen, wherein the first touchscreen input indicates the first data selection. Additionally, the first geometric ray is identified, wherein this first geometric ray is based on the first and second locations, such as, for example, where the first geometric ray is identified as (1) beginning at the first location, or at a location within the first device that is adjacent to, near or associated with this first location, and (2) traveling through the second location, or through a location within the first device that is adjacent to, near or associated with this second location. Furthermore, it is determined that the second device is located along the first geometric ray in order to thereby select the first external display. For example, the second device may be selected based on the first and second touchscreen inputs, and the first external display may then be identified and selected based on the aforementioned display parameter.

Moreover, and as previously indicated, an embodiment provides that the first and second touchscreen inputs result from a finger sliding or flicking gesture along the first touchscreen. Consider the example where a user's finger touches the first touchscreen at the first location. The user's finger then slides to the second location on the first touchscreen, such as pursuant to a sliding or flicking motion, such that both of the first and second touchscreen inputs are sensed by the first touchscreen. In this manner, it is noted that the identification of the first geometric ray may result from a user's finger sliding or flicking gesture, such as may occur when the user is attempting to slide or flick a selected icon in the direction of a specific external display to thereby cause information associated with such icon to be displayed on such external display.

To further illustrate, consider the example where it is determined that each of the first and second locations, as well as the second device, are located along the first geometric ray, and the first geometric ray is selected based on this determination. For purposes of illustration, it is noted that the first device may be considered to be "aimed at" the second device (see, e.g., FIG. 20) when the second device is positioned along the first geometric ray, wherein this first geometric ray is determined (as previously discussed) based on the first and second positions within the first touchscreen.

Indeed, in one embodiment, an optic signal is transmitted toward the second device along the first geometric ray (e.g., based on the first and second locations). In response to the second device receiving this optic signal, the second device communicates to the first device, such as with another optic signal or an electromagnetic signal) that the second device is capable of communicating with the first device. Consequently, the first device then has the option of causing specific data, such as the selected first data set, to be routed to the second device.

In addition to the foregoing, an embodiment provides that, once the first touchscreen input is identified at the first location, a predefined radius (e.g., 1 centimeter), or other geometric measurement, is associated with this first location. This radius (or other measurement) defines an area (e.g., a circular area) along the first touchscreen in which an identification of a second touchscreen input is precluded (such as during this same gesture or for a predefined period of time beginning at or around the moment at which the first touchscreen input was first identified). In this manner, the identification of an unintentional second touchscreen input (e.g., based upon an insignificant movement of the user's finger) may be avoided. This may be a useful feature, for example, for users having shaking hands, which may be caused from a neurological disorder or other medical condition. That being said, if the user's finger slides along the first touchscreen to a location that is outside of the aforementioned defined area, then a second touchscreen input will indeed be identified.

The foregoing notwithstanding, and in accordance with an exemplary scenario, it is noted that the first touchscreen might not be held completely, or even substantially, parallel to the ground plane, which could possibly make the device selection process more difficult where this skewed geometry causes the first device to be "aimed" in a direction other than that in which the second device is located relative to the first device. However, in one embodiment, second exemplary method of data sharing 5600 includes identifying a spatial orientation of the first touchscreen relative to a reference or ground plane (e.g., a horizontal reference plane), such as where the first device is tilted relative to the reference or ground plane. Second exemplary method of data sharing 5600 also includes identifying the first geometric ray based on the first location, second location and spatial orientation.

To illustrate, consider the example where a reference ray is identified based on both of the first and second locations being located along the reference ray. Additionally, a reference angle (e.g., an angle of altitude or elevation) is identified between the reference ray and the reference plane. Furthermore, the first geometric ray is identified based on the reference ray and the reference angle, such as where the calculated angle of altitude or elevation is utilized to determine the horizontal vector associated with the reference ray, and the second device is identified based on the second device being located along the first geometric ray. Thus, even though the first device may not be "aimed at" the second device in the manner that was previously discussed, the second device will nevertheless be identified and selected.

In addition to the foregoing, an embodiment provides that the first geometric ray is identified as beginning at, or being aligned with, for example, the first location on the first touchscreen. Pursuant to one embodiment, however, the first geometric ray begins at, or is aligned with, a different preselected point on or within either of the first touchscreen and the first device. As such, it is noted that the present technology is not limited to any specific geometric paradigm.

Moreover, in one embodiment, second exemplary method of data sharing 5600 includes receiving, detecting or enabling a detection of a third touchscreen input at a third location on the first touchscreen, identifying a second geometric ray based on the first and third locations, and determining that a third device that includes a second external display is located along the second geometric ray to thereby select the second external display. To illustrate, consider the example where a third touchscreen input is received at a third location on the first touchscreen. Additionally, a second geometric ray is identified based on the first and third locations. Furthermore, it is determined that a third device is located along the second geometric ray, and the third device is selected based on this determination. Indeed, pursuant to one example, it is determined that the third device, which includes a second external display, is located along the second geometric ray, and the second external display is selected based on this determination.

The foregoing notwithstanding, an embodiment provides that the first device may be positioned between a number of external displays, such as where a number of external displays are located in front of the first device while a number of other external displays are located behind the first device. For example, pursuant to one embodiment, the first device is positioned approximately between the second device and a fourth device, wherein the fourth device includes a third external display. The second touchscreen input is received at the second location on the first touchscreen, the first geometric ray is identified based on the first and second locations, it is determined that the second device is located along the first geometric ray, and the first external display is selected based on this determination. Additionally, a fourth touchscreen input is received at a fourth location on the first touchscreen, a third geometric ray is identified based on the first and fourth locations, it is determined that the fourth device is located along the third geometric ray, and the third external display is selected based on this determination.

Alternatively, or in addition to the foregoing, an embodiment provides that the first device is positioned approximately between the third device and a fifth device, wherein the fifth device includes a fourth external display. The third touchscreen input is received at the third location on the first touchscreen, the second geometric ray is identified based on the first and third locations, it is determined that the third device is located along the second geometric ray, and the second external display is selected based on this determination. Moreover, a fifth touchscreen input is received at a fifth location on the first touchscreen, a fourth geometric ray is identified based on the first and fifth locations, it is determined that the fifth device is located along the fourth geometric ray, and the fourth external display is selected based on this determination.

Thus, in accordance with an embodiment, different locations on the first touchscreen may be touched to thereby cause one or more specific external displays to be selected. As such, a number of exemplary gestures that may be implemented to touch different locations on the first touchscreen will now be explored. It is noted, however, that the present technology is not limited to these exemplary gestures. Indeed, various other gestures not discussed herein may be implemented.

In an embodiment, a "sliding" gesture may be detected along the first touchscreen. This sliding gesture, which may define a linear or nonlinear path along the first touchscreen, indicates the first and second touchscreen inputs at the first and second locations, respectively, such that this sliding gesture thereby indicates the first data selection and the first target selection.

The foregoing notwithstanding, in one embodiment, a "spiral" gesture may be detected along the first touchscreen, wherein this spiral gesture defines a nonlinear, spiral-shaped path along the first touchscreen, and wherein the aforementioned first, second and third touchscreen inputs (and optionally also the aforementioned fourth and fifth touchscreen inputs) result from this spiral gesture along the first touchscreen.

For example, a user's finger touches the first touchscreen at a first location and then travels along a nonlinear, spiral-shaped path to second and third locations. The user's finger may then continue to travel along this nonlinear, spiral-shaped path to fourth and fifth locations. Consequently, a nonlinear, spiral-shaped path is defined along the first touchscreen such that the first, second, third, fourth and fifth touchscreen inputs result from what may be referred to, for example, as a "spiral" gesture along the first touchscreen. Furthermore, in one embodiment, the user's finger remains in physical contact with the first touchscreen between the first location and the last identified location (e.g., the fifth location) along the nonlinear, spiral-shaped path such that this spiral gesture has concluded before the user's finger is lifted away from the first touchscreen. In this manner, multiple external devices may be selected with a single gesture along the first touchscreen.

It is further noted that the present technology is not limited to merely a single gesture along the first touchscreen. Indeed, multiple gestures along the first touchscreen may be implemented. To illustrate, consider the example where a user's finger touches the first touchscreen at the first location and is then lifted away from the first touchscreen such that the user's finger is no longer in physical contact with the first touchscreen. This first gesture may be referred to, for example, as a "touch" gesture. After this touch gesture, the user's finger again touches the first touchscreen and travels along a linear (or nonlinear) path, wherein the second and third locations are located along this path. This second gesture may be referred to, for example, as a "linear" (or "nonlinear") gesture. The combination of these touch and linear (or nonlinear) gestures causes the first, second and third touchscreen inputs to be received by the first touchscreen.

Similarly, in one embodiment, after the initial touch gesture at the first location (and optionally before or after the linear or nonlinear gesture along the second and third locations), the user's finger again touches the first touchscreen and travels along a linear (or nonlinear) path to the fourth and fifth locations. This latter gesture may also be referred to, for example, as a "linear" (or "nonlinear") gesture, and the combination of the initial touch gesture at the first location and the subsequent linear gesture at the fourth and fifth locations causes the first, fourth and fifth touchscreen inputs to be received by the first touchscreen.

The foregoing notwithstanding, in an embodiment, second exemplary method of data sharing 5600 includes generating a virtual environment map that includes a first visual representation of the first external display (or of the second device). For purposes of illustration, the virtual environment map may also include a number of additional visual representations of a corresponding number of other external displays/devices. Second exemplary method of data sharing 5600 also includes displaying the virtual environment map on the first touchscreen and receiving, or detecting, the first and second touchscreen inputs at first and second locations, respectively, on the first touchscreen, wherein the first location corresponds to the first graphical representation such that the first touchscreen input indicates the first data selection, and wherein the second location corresponds to the first visual representation such that the second touchscreen input indicates the first target selection. In this manner, the first external display (or the second device) may be selected based on a selection of its corresponding visual representation within the virtual environment map.

In addition to the foregoing, one embodiment provides that the virtual environment map also includes a second visual representation of the second external display (or of the third device). For example, the third touchscreen input is detected at a third location on the first touchscreen, wherein the third location corresponds to the second visual representation such that the third touchscreen input indicates a second target selection of the second external display (or of the third device). In this manner, the second external display (or the third device) may be selected based on a selection of its corresponding visual representation within the virtual environment map.

Similarly, a number of additional external devices/displays may be selected based on a selection of a number of additional visual representations within the virtual environment map that correspond to such external devices/displays, respectively. Indeed, it is noted that the present technology is not limited to the implementation of a specific number of external devices/displays, and that many different external devices/displays may be represented within (and consequently selected within) the virtual environment map.

Furthermore, in one embodiment, the virtual environment map is a "to scale" representation (e.g., a "bird's-eye view" or elevated perspective) of the ambient environment. For example, the virtual environment may show (1) a "to scale" representation of the distance(s) from the first device to one or more external devices and/or (2) a "to scale" representation of the distance(s) of a particular external device to one or more other external devices. It is noted, however, that the present technology is not limited to such "to scale" representations. Indeed, an embodiment provides that the virtual environment map is not "to scale".

In an embodiment, and as previously indicated, second exemplary method of data sharing 5600 includes detecting a flicking or sliding gesture along the first touchscreen, wherein the flicking or sliding gesture indicates the first and second touchscreen inputs at the first and second locations, respectively, such that the flicking or sliding gesture indicates the first data and first target selections. Moreover, one embodiment provides that a user may "flick" or "slide" an icon in a direction of one of the displayed visual representations of the external displays to thereby select one of such external displays. To illustrate, consider the example where second exemplary method of data sharing 5600 includes generating a virtual environment map that includes a visual representation of the first external display, displaying the virtual environment map on the first touchscreen, and receiving the first touchscreen input at a location on the first touchscreen, wherein this location corresponds to the first graphical representation such that the first touchscreen input indicates the first data selection. Second exemplary method of data sharing 5600 also includes enabling a flicking or sliding of the first graphical representation toward the visual representation in response to the first touchscreen input being received at the aforementioned location and routing the first data set to the second device in response to the first graphical representation being flicked or slid toward the visual representation.

In accordance with an embodiment, a selected data set may be routed to multiple external devices. Indeed, pursuant to one embodiment, second exemplary method of data sharing 5600 includes accessing a second target selection of a third device (or of a second external display, such as where the third device includes the second external display), and routing the first data set to the third device in response to the first data and second target selections. To illustrate, consider the example where the second and third devices include the first and second external displays, respectively. The first target selection of the first external display is accessed, and the first data set is routed to the second device in response to the first data selection and the first target selection. Additionally, the second target selection of the second external display is accessed, and the first data set is routed to the third device in response to the first data selection and the second target selection. Thus, it is noted that the first data set may be routed to multiple external devices such that data associated with the first graphical representation may be displayed on multiple displays. In this regard, an exemplary implementation involves the routing of the first data set to multiple (e.g., 2 or more) external devices such that data associated with the first graphical representation may be displayed on multiple (e.g., 2 or more) external displays.

Furthermore, in an embodiment, second exemplary method of data sharing 5600 includes routing the first data set to the second device in response to the first data and first target selections such that a second graphical representation of, or associated with, the first data set is displayed on the first external display. To illustrate, consider the example where a user touches the first graphical representation to thereby select the first data set. The user then touches, slides or flicks the first graphical representation toward a different location on the first touchscreen that is associated with the first external display, wherein this second action represents the second touchscreen input. As a result of this second action, the first external display is selected, and the first data set is routed to the second device. The second graphical representation, which may include, for example, an application or a number of images corresponding to the first data set, may then be displayed on the first external display.

Moreover, in an embodiment, second exemplary method of data sharing 5600 includes displaying the second graphical representation on the first touchscreen, receiving a scrolling input associated with the first data set at the first touchscreen, and enabling a scrolling of the second graphical representation on the first external display in response to the scrolling input. To illustrate, in one embodiment, the first touchscreen displays the second graphical representation, which may include, for example, a graphical representation of an image file, a word processing file, a spreadsheet file, a database file, a PDF file or an application corresponding to the first data set. A currently displayed size of the second graphical representation is sufficiently large such that at least a portion of the second graphical representation is not currently displayed by the first touchscreen. However, the current display of the second graphical representation is scrollable in response to the scrolling input, such as where a user may touch the first touchscreen and move his or her finger along the first touchscreen to thereby cause the first touchscreen to display a portion of the second graphical representation that was previously hidden from view. In this manner, a scrolling of the second graphical representation within the first touchscreen may be performed.

To further illustrate, an embodiment provides that the first touchscreen detects the scrolling input and then generates the scrolling selection based on this scrolling input, wherein the scrolling selection may include, for example, electronic data/instructions reflecting the scrolling input. The scrolling selection is transmitted or routed to the second device, wherein the first external display is currently displaying the second graphical representation. In response to the scrolling selection, a scrolling of the second graphical representation within the first external display is performed.

Thus, in an embodiment, a user may slide his or her finger along first touchscreen 220 to thereby initiate a scrolling of a graphical representation that is displayed on an external device. This may be useful, for example, if the user is not positioned sufficiently close to the external display to physically interact with the external display, if the user is physically incapable of physically interacting with the external display, or if the external display does not itself include a touchscreen that would allow such physical interaction to be possible.

Furthermore, one embodiment provides that a user may physically interact with the first touchscreen to thereby rotate, resize and/or reposition a display of a graphical representation on an external device. Consider the example where a user touches two different areas on the first touchscreen, such as with two different fingers, respectively. The user then simultaneously moves both of these fingers in the same clockwise (or counterclockwise) direction along the first touchscreen to thereby cause a display of a graphical representation on an external device to be similarly rotated in a clockwise (or counterclockwise) direction. Additionally, the user may move these two fingers toward (or away from) one another along the first touchscreen to thereby cause at least a portion of the display of the graphical representation on the external device to appear smaller (or larger). In this manner, a user may remotely zoom out (or zoom in) on the externally displayed graphical representation. Moreover, the user may drag his or her finger along first touchscreen 220 to thereby cause the graphical representation displayed on the external device to be repositioned to a different location on the external display.

The foregoing notwithstanding, it is noted that the selected data set may be stored at different locations before being routed to the second device. To illustrate, an embodiment provides that second exemplary method of data sharing 5600 includes identifying a local storage parameter associated with the first data set and routing the first data set to the second device from the first device based on the local storage parameter. Consider the example where the local storage parameter indicates that the first device is already storing the first data set, or that the first data set is stored locally within a storage unit (e.g., a USB flash drive) that is communicatively associated or coupled with the first device. As a result of this indication, the first data set is routed (e.g., wirelessly routed) to the second device from the first device, which is in contrast to the first data set being retrieved or accessed by the second device from some other data source (e.g., a remote storage unit).

In the event that the first data set is to be routed to the second device from the first device, it is noted that the first data set may be routed using, for example, either of a wireless or wired communication protocol. To illustrate, an embodiment provides that second exemplary method of data sharing 5600 includes identifying first and second wireless settings associated with the first and second devices, respectively, and wirelessly routing the first data set to the second device from the first device based on the first and second wireless settings. Consider the example where the first wireless setting reflects that the first device is capable of transmitting information wirelessly, and where the second wireless setting reflects that the second device is capable of receiving a wireless communication from the first device. During the device identification process, the second wireless setting is wirelessly transmitted from the second device to the first device such that the first device, upon or subsequent to identifying the second device as being an available external device, is put on notice that the first data set is to be wirelessly routed directly to the second device from the first device rather than being retrieved from a remote storage unit.

The foregoing notwithstanding, in one embodiment, data is routed to the second device based on first and second devices being communicatively coupled with one another, such as where the first device is physically "docked" with the second device, or such as where the first and second devices are communicatively linked with one another through a transmission line (and/or a wired communication network). To illustrate, consider the example where first and second wired settings associated with the first and second devices, respectively, are identified. It is noted that the first data set may be routed to the second device from the first device through a transmission line based on the first and second wired settings.

To further illustrate, consider the example where the first wired setting reflects that the first device is capable of transmitting information pursuant to a specific wired communication protocol (e.g., pursuant to a serial or parallel data transmission protocol), and where the second wired setting reflects that the second device is capable of receiving a wired communication from the first device through the transmission line by utilizing this same wired communication protocol. During the device identification process, such as when both of the first and second devices are communicatively coupled with or connected to the transmission line such that the first and second devices are communicatively associated or coupled with one another, the second wired setting is transmitted from the second device to the first device through the transmission line such that the first device, upon or subsequent to identifying the second device as being an available external device, is put on notice that the first data set is to be routed directly to the second device from the first device through the transmission line rather than being retrieved from a remote storage unit.

Indeed, pursuant to an exemplary implementation, the first data set is stored locally by the first device, and, once the first and second devices have been communicatively coupled with one another, routing this locally stored data from the first device to the second device through the transmission line will be quicker than would a wireless transmission of the first data set from the first device to the second device. In this manner, and with reference still to FIG. 56, it is noted that, in an embodiment, wirelessly routing the first data set to the second device in response to the first data and first target selections 5640 may be modified such that the first data set is routed to the second device in response to the first data and first target selections using a wired communication protocol. As such, it is noted that the present technology is not limited to the wireless routing of a selected data set.

As previously discussed, an embodiment provides that the first data set is stored locally at or within the first device such that the first data set may be routed from the first device to the second device. Pursuant to one embodiment, however, the first data set is stored in a remote storage device rather than at or within the first device, and the first data set is routed from this remote storage device to the second device. To illustrate, consider the example where second exemplary method of data sharing 5600 includes identifying a remote storage parameter associated with the first data set, identifying a remote storage device associated with the remote storage parameter, and routing (e.g., wirelessly routing) the first data set to the second device from the remote storage device (e.g., through a LAN or WAN) based on the remote storage parameter.

To further illustrate, consider the example where the remote storage parameter reflects that the first data set is stored in the remote storage device. The remote storage parameter is routed to the second device from the first device such that the second device will know to retrieve the first data set directly from the remote storage device rather than from the first device. This may be useful, for example, where the first data set includes a relatively large amount of information, and where (1) the local storage of such a large amount of information within the first device is not practical and/or (2) the routing of such a large amount of information from the first device to the second device is not practical.

Furthermore, pursuant to one exemplary implementation, the second device includes its own storage device where the first data set has already been stored. Thus, and with reference still to FIG. 56, it is noted that wirelessly routing the first data set to the second device in response to the first data and first target selections 5640 may be modified such that second exemplary method of data sharing 5600 instead includes routing (e.g., wirelessly routing) an instruction to the second device in response to the first data and first target selections, wherein this instruction is configured to instruct the second device to access the first data set from its own storage unit. This instruction may also be optionally configured to instruct the second device to launch or display a file or application associated with the first data set, such as in a manner discussed herein.

Similarly, one embodiment provides that certain content (e.g., a digital file, image, video, application, program, etc.) is already stored at the second device. In response to the first data and first target selections, the first data set is routed to the second device (such as, for example, from the first device or from an intermediary device), wherein this first data set includes an instruction for such content to be launched by the second device. Thus, it is noted that the routing of the first data set to the second device, as discussed herein, may or may not include routing the shared content.

In an embodiment, second exemplary method of data sharing 5600 includes identifying a first file, application or program associated with the first graphical representation in response to the first data selection and launching the first file, application or program, or causing the first file, application or program to be launched, on the first external display in response to the first data and first target selections. To illustrate, consider the example where, in response to the first data selection, it is determined that the first data set has been selected and that the first data set corresponds to the first file, application or program. In response to the first target selection, it is determined that the first external display has been selected. Consequently, the first file, application or program is routed to the second device (or an instruction is routed to the second device that instructs the second device to access the first file, application or program from a local or remote storage device) such that the first file, application or program is accessed by the second device. As a result, the first file, application or program may be displayed on the first external display, wherein, as previously indicated, it is noted that the first external display may be, or include, for example, a second touchscreen such that a user may utilize this second touchscreen to thereby interact with this file, application or program.

To further illustrate, and in accordance with an exemplary implementation, the first file, application or program, which is associated with the first graphical representation, is identified in response to the first data selection, and the first file, application or program is launched on the first external display in response to the first target selection. Consider the example where the first graphical representation is selected, such as previously discussed, and the first external display is selected, such as where the first external display is a second touchscreen that a user touches to thereby select the first external display. The first data set is routed to the second device based on the first graphical representation and the first external display being selected, and the first file, application or program, which corresponds to the first graphical representation, is then launched on the first external display. Indeed, in an embodiment, the first data set includes instructions to launch the first file, application or program; consequently, the second device launches the first file, application or program on the first external display in response to receiving the first data set and executing these instructions.

Moreover, it is noted that the first data set may or may not include the first file, application or program. For example, if the first data set includes the first file, application or program, then the first file, application or program is routed to the second device as a logical consequence of the first data set being routed to the second device. However, one embodiment provides that the first file, application or program is already stored within a local memory of, or an external storage device (e.g., "cloud" storage) accessible by, the second device. Consequently, the second device accesses the first file, application or program from such memory in response to receiving and executing the instructions stored within the first data set.

Furthermore, and in accordance with an embodiment, it is noted that a user may be presented with a number of options, such as, for example, "copy", "launch" and "copy & launch" command prompts, in response to the selection of the first data set. These options would enable a user to decide whether the first data set is to be copied to storage accessible by the second device and/or launched by the selected external device. Consider the example where a user touches the first graphical representation on the first touchscreen for a predetermined amount of time, which thereby communicates to the first device that the first data set includes, or is associated with, content that is to be shared. In response to the first graphical representation being touched for a preselected amount of time, a pop-up menu is generated on the first touchscreen that lists "copy", "launch" and "copy & launch" command prompts. Additionally, in response to the user selecting the "copy" command prompt, the first device will enable a copying of the selected content to a storage device that is accessible by the selected external device. Alternatively, in response to the user selecting the "launch" command prompt, the first device will communicate to the selected external device that the selected content is to be launched by the selected external device. If the selected external device already has access to this content, then this requested launch will be successful; otherwise, the selected external device may optionally return a failure notification and/or data request for this content to the first device. As a second alternative, in response to the user selecting the "copy & launch" command prompt, the first device will enable a copying of the selected content to a storage device that is accessible by the selected external device along with a launch request directing the second device to launch this same content. Finally, and for purposes of clarification, it is noted that the actual selection of the external device at issue may occur before or after the user selects one of the aforementioned command prompts.

In addition to the foregoing, it is noted that different files, applications or programs may be simultaneously displayed on the first touchscreen and the first external display, respectively. For example, an embodiment provides that second exemplary method of data sharing 5600 includes displaying a second graphical representation associated with a second data set on the first touchscreen, receiving a second data selection of the second graphical representation at the first touchscreen, identifying a second file, application or program associated with the second graphical representation in response to the second data selection, receiving a second target selection of the first touchscreen at the first touchscreen, and launching the second file, application or program on the first touchscreen in response to the second data and second target selections. Moreover, in one embodiment, second exemplary method of data sharing 5600 includes detecting a touch input at a location on the first touchscreen (e.g., a single touch or double touching of this location), wherein the location corresponds to the second graphical representation, and identifying the second data and second target selections based on this detecting of the touch input at this location.

To illustrate, consider the example where the second data selection of the second graphical representation is received, detected, generated or identified at or with the first touchscreen. Additionally, the second file, application or program, which is associated with the second graphical representation, is identified in response to the second data selection. Moreover, the second target selection of the first touchscreen is received, detected, generated or identified at or with the first touchscreen, and the second file, application or program is launched on the first touchscreen in response to the second target selection.

To further illustrate, consider the example where the second graphical representation is selected after the first file, application or program has already been launched on the first external display. After the second graphical representation has been selected, the user again touches the first touchscreen such that the first touchscreen, rather than another external display, is selected. Consequently, the second file, application or program, which corresponds to the second graphical representation, is then launched on the first touchscreen. Thus, it is noted that a user may be provided with the option of launching files, applications or programs on the first device (e.g., an electronic tablet, PDA or smartphone) as well as on a number of external devices (e.g., a number of computer monitors, television screens and/or electronic billboards), and that the files, applications or programs launched on these various devices may indeed be different files, applications or programs.

The foregoing notwithstanding, in an embodiment, two or more different GUIs that correspond to the same application (or the same computer program) may be launched on two or more different displays. Indeed, in one embodiment, second exemplary method of data sharing 5600 includes identifying an application associated with the first graphical representation in response to the first data selection, the application including the first and second GUIs, and launching the first and second GUIs on the first touchscreen and the first external display, respectively, in response to the first data and first target selections. To illustrate, an example provides that, in response to the first data selection and the first target selection, the first touchscreen displays the first GUI and the second GUI is routed to (or accessed by) the second device to thereby enable the first external display to display the second GUI, wherein, as previously indicated, it is noted that the first external display may be, or include, for example, a second touchscreen.

To further illustrate, consider the example where an application, which is associated with the first graphical representation, is identified in response to the first data selection, wherein the application includes the first and second GUIs. The first and second GUIs are launched on the first touchscreen and the first external display, respectively, in response to the first target selection. Moreover, an embodiment provides that a user may interact with the first GUI within the first touchscreen to thereby communicate (e.g., wirelessly) information (e.g., user selections) to the second GUI, which is displayed by the first external display. Similarly, one embodiment provides that a user may interact with the second GUI, such as where the first external display includes a second touchscreen, to thereby communicate (e.g., wirelessly) information (e.g., user selections) to the first GUI, which is displayed by the first touchscreen.

In accordance with an embodiment, second exemplary method of data sharing 5600 includes accessing a data file having a data format associated with the application, wherein the data file includes a plurality of EPs. It is noted that the data file may correspond, for example, to the first graphical representation, such as where the first graphical representation is a graphical representation (e.g., an icon) of the data file (or one of its EPs). Second exemplary method of data sharing 5600 also includes generating a plurality of images corresponding to the plurality of EPs, respectively, displaying a scrollable list of the plurality of images in the first GUI, accessing a first selection of a first image from among the plurality of images within the scrollable list, identifying a first EP from among the plurality of EPs that corresponds to the first image in response to the first selection, and displaying the first EP in the second GUI.

To illustrate, consider the example where the application is launched by the second device such that the second GUI is displayed on the first external display. A user utilizes the first touchscreen to select a data file having a specific format (e.g., a PDF format), wherein the application is capable of opening and displaying data files having this particular format. As a result of this data file being selected, the data file is routed to (or accessed by) the second device such that this data file is launched by the second device and displayed within the second GUI. Moreover, in the event that the data file includes multiple pages, then a scrollable list of these pages is displayed within the first GUI on the first touchscreen such that the user may scroll through this list using the first touchscreen and touch a particular page within this list to thereby cause the selected page to be displayed in the second GUI. For example, the user's page selection may be routed from the first device to the second device such that the second device causes the selected page to be displayed in the second GUI as a result of this page selection.

Moreover, in one embodiment, second exemplary method of data sharing 5600 includes accessing a second selection of a second image from among the plurality of images within the scrollable list, identifying a second EP from among the plurality of EPs that corresponds to the second image in response to the second selection, and displaying the second EP in the second GUI. In one embodiment, this second EP is displayed in the second GUI such that the aforementioned first EP is no longer displayed in the second GUI. In this manner, a selection of a new image within the scrollable list causes a new EP to replace a previously displayed EP within the second GUI. Consequently, it is noted that the second GUI may be updated or changed so as to display different EPs at different points in time based on a user's selection within a scrollable list of possible pages, wherein this scrollable list is displayed within the first GUI.

The foregoing notwithstanding, and in accordance with an embodiment, the first data set is routed to the second device in response to a selection of an image of the second device (or of the first external display) within the first touchscreen. To illustrate, an example provides that second exemplary method of data sharing 5600 includes displaying an image of the second device on the first touchscreen. Second exemplary method of data sharing 5600 also includes enabling a routing of the first data set to the second device in response to (1) a repositioning of the first graphical representation toward the image on the first touchscreen, wherein the repositioning indicates the first target selection, or (2) a touching of this image on the first touchscreen, wherein this touching of the image indicates the first target selection.

Indeed, in one embodiment, second exemplary method of data sharing 5600 includes detecting a touching of a location on the first touchscreen, wherein the location corresponds to the first graphical representation, activating a digital camera based on a duration of the touching of the location being longer than a predefined duration threshold, generating the image with the digital camera, and displaying the image on the first touchscreen such that the second device is graphically identified as an available external device. Consider the example where the first device includes a digital camera. When this digital camera is "aimed" at the second device, this digital camera may be activated to thereby capture a digital image of the second device, and this digital image may be displayed on first touchscreen. Additionally, the fact that the second device has been identified as an available external device may be communicated to a user using the first touchscreen.

To illustrate, an example provides that, upon or subsequent to the device identification process discussed above, whereby the second device is identified as an available external device, object recognition software is utilized to identify the image as being a graphical representation of the second device. Consequently, the image is identified as a recognized "object" within a larger background image displayed on the first touchscreen, wherein the first graphical representation is part of a foreground image (e.g., along with a number of other graphical representations) that is displayed over (or in front of) this background image. This recognition of the identified image may be displayed to a user, such as, for example, by displaying a conspicuous border around the recognized object. For example, the border may be a broken or solid border having a color or contrast shade/hue that is easily discernable from a remainder of the background image, and the border may optionally be blinking or have a changing color or contrast shade/hue so as to be even more conspicuous to a user. Indeed, one embodiment provides that a conspicuous color or contrast shade/hue is automatically chosen on the fly using imaging processing software.

The foregoing notwithstanding, in one embodiment, the image of the second device is actually a virtual representation of the second device. For example, rather than being an accurate image of the actual shape, color, hue, etc., of the second device, the image may be a preselected shape or icon that represents the second device without actually resembling the appearance of the second device.

In addition to the foregoing, and as previously indicated, it is noted that second exemplary method of data sharing 5600 is not limited to the exemplary embodiments and examples discussed above. Rather, second exemplary method of data sharing 5600 may be further modified and/or supplemented, such as to include any of the exemplary steps or operations discussed herein.

III. Third Exemplary Method of Data Sharing

Figure 57:
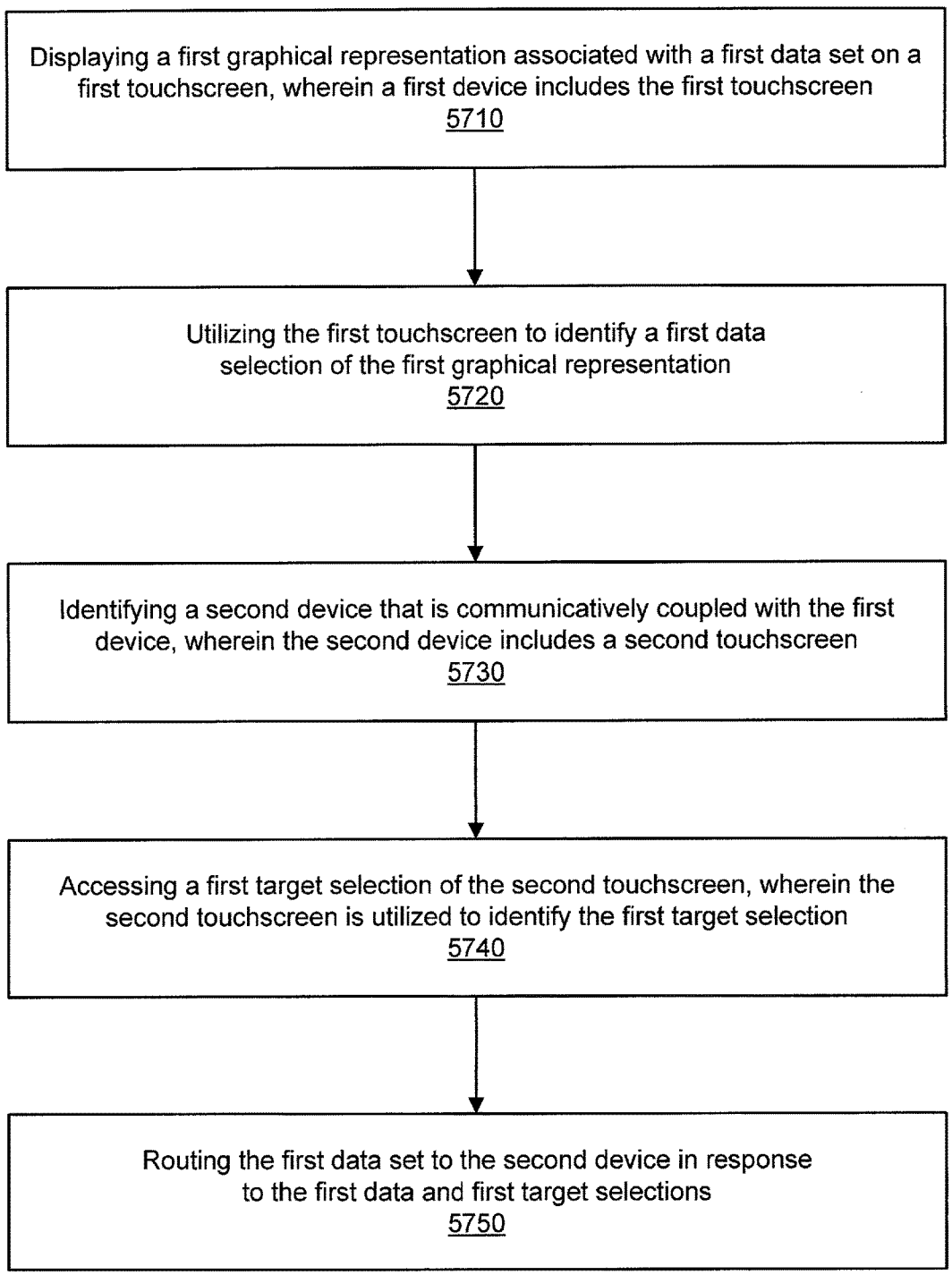
FIG. 57 is a flowchart of a third exemplary method of data sharing in accordance with an embodiment.

With reference now to FIG. 57, a third exemplary method of data sharing 5700 in accordance with an embodiment is shown. Third exemplary method of data sharing 5700 includes displaying a first graphical representation associated with a first data set on a first touchscreen, wherein a first device includes the first touchscreen 5710. Third exemplary method of data sharing 5700 also includes utilizing the first touchscreen to identify a first data selection of the first graphical representation 5720 and identifying a second device that is communicatively coupled with (e.g., physically and electronically docked with) the first device, wherein the second device includes a second touchscreen 5730. Third exemplary method of data sharing 5700 further includes accessing a first target selection of the second touchscreen, wherein the second touchscreen is utilized to identify the first target selection 5740. Moreover, third exemplary method of data sharing 5700 includes routing (e.g., electronically routing) the first data set to the second device in response to the first data and first target selections 5750.

In addition to the foregoing, and as previously indicated, it is noted that third exemplary method of data sharing 5700 is not limited to the exemplary embodiments and examples discussed above. Rather, third exemplary method of data sharing 5700 may be further modified and/or supplemented, such as to include any of the exemplary steps or operations discussed herein. In this regard, and for purposes of enablement, please see, for example, the Third Exemplary Concept Group presented in the Exemplary Summary Concepts section, infra, along with (1) the Exemplary Systems and Configurations section, (2) the First Exemplary Method of Data Sharing section and (3) the Second Exemplary Method of Data Sharing section, supra. Additionally, for purposes of further illustration, please see the Exemplary Implementations section, infra.

IV. Fourth Exemplary Method of Data Sharing

Figure 58:
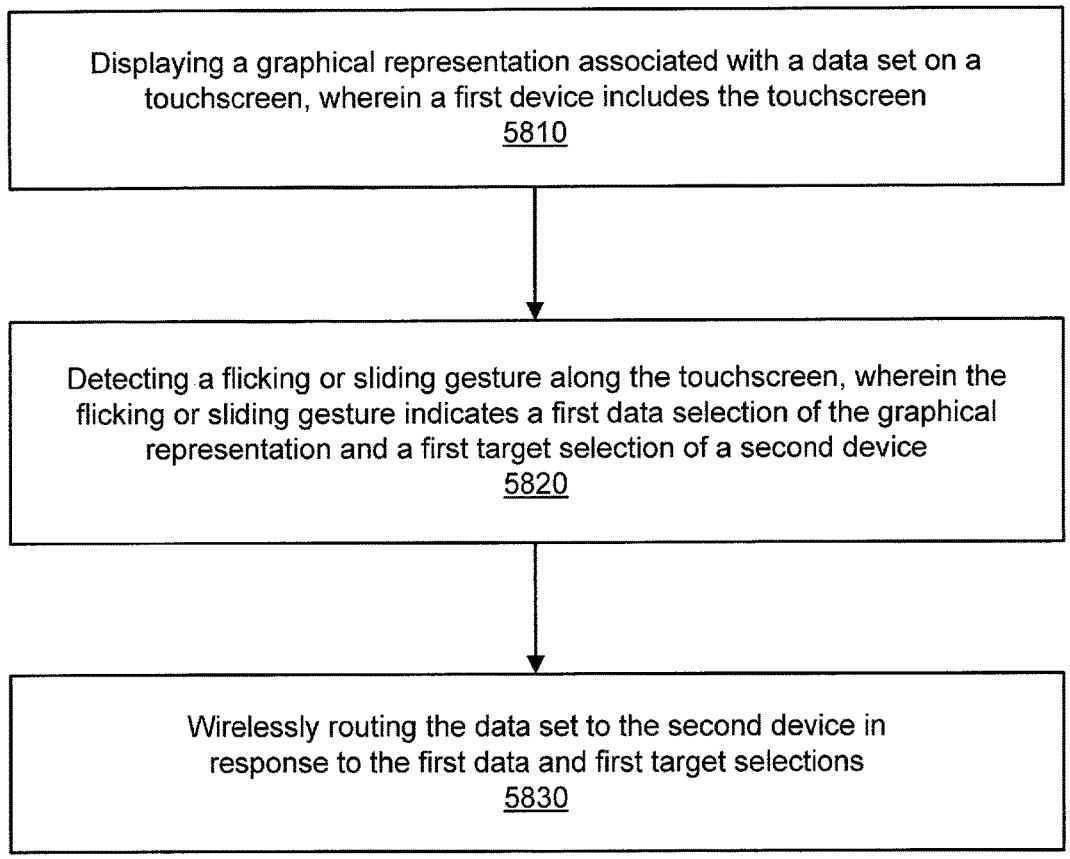
FIG. 58 is a flowchart of a fourth exemplary method of data sharing in accordance with an embodiment.

With reference now to FIG. 58, a fourth exemplary method of data sharing 5800 in accordance with an embodiment is shown. Fourth exemplary method of data sharing 5800 includes displaying a graphical representation associated with a data set on a touchscreen, wherein a first device includes the touchscreen 5810. Fourth exemplary method of data sharing 5800 also includes detecting a flicking or sliding gesture along the touchscreen, wherein the flicking or sliding gesture indicates a first data selection of the graphical representation and a first target selection of a second device 5820. The foregoing notwithstanding, in one embodiment, this flicking or sliding gesture may be a gesture other than a flicking or sliding gesture. Indeed, it is noted that the present technology is not limited to a particular type of gesture.

With reference still to FIG. 58, fourth exemplary method of data sharing 5800 further includes wirelessly routing the data set to the second device in response to the first data and first target selections 5830, such as to cause the data set to be stored in a storage device associated with the selected second device (such as where, for example, (1) the second device includes a local hard drive, (2) the second device is or includes an external backup drive, or (3) the second device is configured to automatically forward the data set to one or more remote servers (e.g., one or more virtual or "cloud" servers) capable of remotely storing such data in one or more remote storage units). In one embodiment, however, wirelessly routing the data set to the second device in response to the first data and first target selections 5830 may be modified such that the data set is routed to the second device using a data routing protocol other than a wireless data routing protocol (e.g., a wired data routing protocol). Indeed, it is noted that the present technology is not limited to a particular data routing protocol.

In addition to the foregoing, and as previously indicated, it is noted that fourth exemplary method of data sharing 5800 is not limited to the exemplary embodiments and examples discussed above. Rather, fourth exemplary method of data sharing 5800 may be further modified and/or supplemented, such as to include any of the exemplary steps or operations discussed herein. In this regard, and for purposes of enablement, please see, for example, the Fourth Exemplary Concept Group presented in the Exemplary Summary Concepts section, infra, along with (1) the Exemplary Systems and Configurations section, (2) the First Exemplary Method of Data Sharing section and (3) the Second Exemplary Method of Data Sharing section, supra. Additionally, for purposes of further illustration, please see the Exemplary Implementations section, infra.

V. Fifth Exemplary Method of Data Sharing

Figure 59:
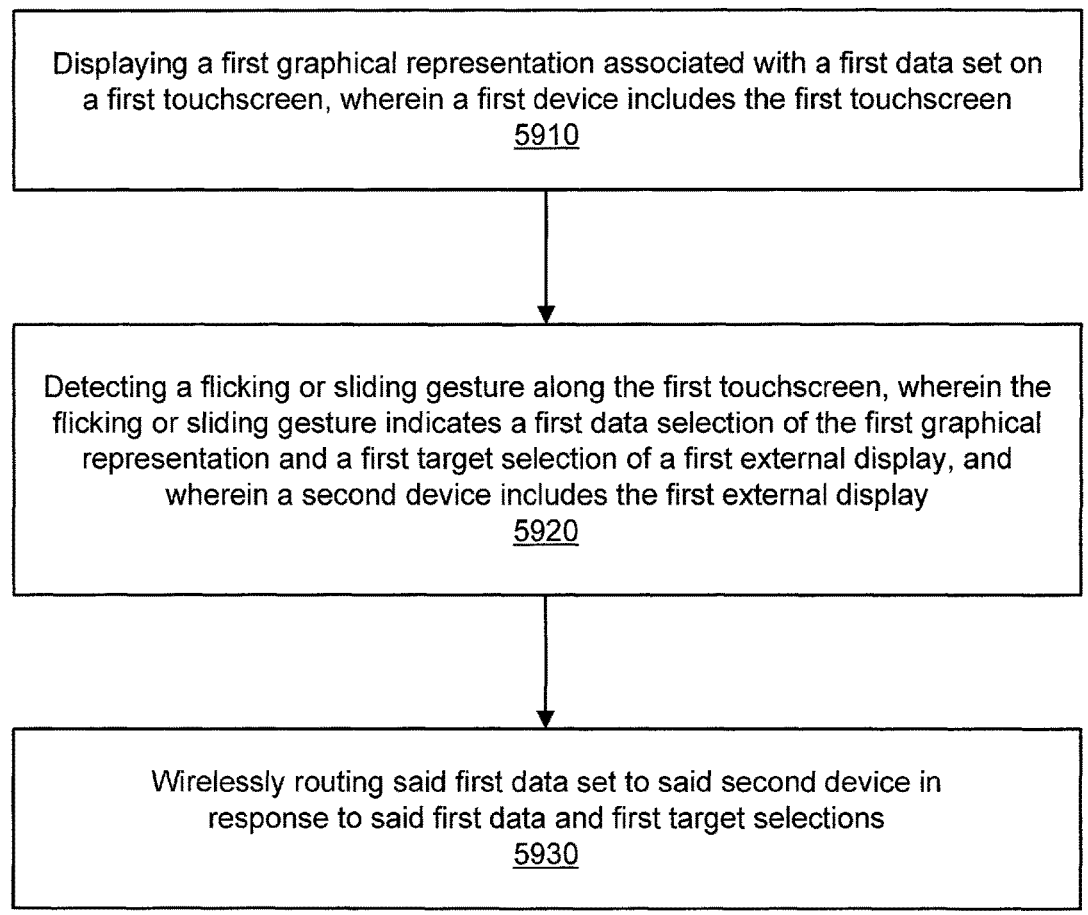
FIG. 59 is a flowchart of a fifth exemplary method of data sharing in accordance with an embodiment.

With reference now to FIG. 59, a fifth exemplary method of data sharing 5900 in accordance with an embodiment is shown. Fifth exemplary method of data sharing 5900 includes displaying a first graphical representation associated with a first data set on a first touchscreen, wherein a first device includes the first touchscreen 5910. Fifth exemplary method of data sharing 5900 also includes detecting a flicking or sliding gesture along the first touchscreen, wherein the flicking or sliding gesture indicates a first data selection of the first graphical representation and a first target selection of a first external display, and wherein a second device includes the first external display 5920. The foregoing notwithstanding, in one embodiment, this flicking or sliding gesture may be a gesture other than a flicking or sliding gesture. Indeed, it is noted that the present technology is not limited to a particular type of gesture.

With reference still to FIG. 59, fifth exemplary method of data sharing 5900 further includes wirelessly routing the first data set to the second device in response to the first data and first target selections 5930, such as to cause the first data set (or content associated therewith) to be launched on the selected first external display. In one embodiment, however, wirelessly routing the first data set to the second device in response to the first data and first target selections 5930 may be modified such that the first data set is routed to the second device using a data routing protocol other than a wireless data routing protocol (e.g., a wired data routing protocol). Indeed, it is noted that the present technology is not limited to a particular data routing protocol.

In addition to the foregoing, and as previously indicated, it is noted that fifth exemplary method of data sharing 5900 is not limited to the exemplary embodiments and examples discussed above. Rather, fifth exemplary method of data sharing 5900 may be further modified and/or supplemented, such as to include any of the exemplary steps or operations discussed herein. In this regard, and for purposes of enablement, please see, for example, the Fifth Exemplary Concept Group presented in the Exemplary Summary Concepts section, infra, along with (1) the Exemplary Systems and Configurations section, (2) the First Exemplary Method of Data Sharing section and (3) the Second Exemplary Method of Data Sharing section, supra. Additionally, for purposes of further illustration, please see the Exemplary Implementations section, infra.

Exemplary Implementations

In view of the foregoing, a number of exemplary implementations of the present technology will now be explored. It is noted, however that the present technology is not limited to the following exemplary implementations.

I. Docking System for Handheld Computer

In an embodiment, a docking system for a handheld device is provided, wherein the computer database (e.g., programs, files, and the operating system) is stored within the handheld device. The docking system includes an external keyboard, one or more external monitors, and a physical/electronic dock for the handheld device. In one embodiment, the handheld device is automatically linked to the keyboard and monitors when it is docked. In this manner, a user may travel with his computer database in the palm of his hand, and then simply dock it at his destination, whereby he will be provided with a larger keyboard and monitor.

In an embodiment, an external desktop computer may also be integrated with the docking system. When the handheld device is not docked, the keyboard and monitors are automatically linked to the desktop computer. However, when the handheld device is docked, the keyboard and monitors are automatically linked to the handheld device. It is noted that this automatic linking may be the result of an automatic selection setting. Alternatively, a selection switch or application may be implemented to enable a user to manually switch between the desktop computer and the handheld device, and optionally to enable the user to manually select an automatic selection setting, such as previously explained.

In an embodiment, multiple monitors are implemented. Alternatively, or in addition to the foregoing, a single monitor may be partitioned into multiple screens. Moreover, different applications may be launched and respectively shown on different screens. For example, both word processing documents and portable document format (PDF) files may be stored within the memory of the handheld device. A word processing document may be opened and shown on a first screen, and a PDF document may be opened and shown on a second screen. Furthermore, thumbnail images corresponding to these documents may appear on the handheld device such that the user can scroll through a list of thumbnails by touching the screen of the handheld device. Touching a thumbnail of a word processing document, such as by double-clicking on it, causes the document to appear on, for example, the first screen, and touching a thumbnail of a PDF document causes the image to appear on, for example, the second screen.

It is noted that a thumbnail image may be defined as, for example, an image displayed within a first portion of the screen on which the image is shown, wherein such screen also comprises a second portion upon which the image is not shown. In this manner, a thumbnail image may be defined as, for example, an image that is smaller than a full screen image. Additionally, it is further noted that, in certain embodiments, a thumbnail image may be defined as, for example, an image of at least a portion of a document to which the thumbnail image corresponds.

The foregoing notwithstanding, in an embodiment, a user may touch a thumbnail on the handheld device, and then touch one of the monitors, in order to have the corresponding image/document appear on the selected screen. In this manner, the user may select, on the fly (or in real time), which document/image is to appear on which screen. Additionally, in an embodiment, the user may touch an image/document on a screen to thereby scroll through or highlight information. Moreover, in an embodiment, a user may double-click on a thumbnail image displayed on a handheld device to thereby open the image/document on the handheld device; then, the user may touch the image/document on the handheld device to scroll through the corresponding image/document shown on a selected screen.

Furthermore, an embodiment provides that the docking system has multiple screens (e.g., 4 screens) positioned to collectively wrap around the user, so as to create a cave-like feel to the workspace. A plurality of audio speakers, such as two triangular speakers, may also be implemented, such as to configure the workspace for multimedia applications. Additionally, the keyboard may be physically coupled with, or electronically connected to, the remainder of the device. Alternatively, the keyboard may be configured to wirelessly route information to the screens, speaker and/or handheld device.

Moreover, it is noted that the dock for the handheld device may be physically integrated with one of the components discussed herein, such as the keyboard or the multi-monitor structure. Alternatively, a separate dock may be provided, wherein the separate dock is configured to communicate with the other components using either wireless or wired communication protocols.

II. Mobile Computing

An embodiment provides a system comprising a mobile (e.g., handheld) computing device, such as a smartphone and a docking system. In an embodiment, the smartphone docks with the docking system such that information may be communicated from the smartphone to the docking system, and vice versa. The docking system comprises one or more display screens, and optionally a keyboard and/or pointing device (e.g., a mouse).

Pursuant to one exemplary implementation, when the smartphone is docked, a user clicks/touches an application icon on the smartphone, and then touches one of the screens of the docking system, and the selected application is then launched on the selected screen. In this manner, multiple smartphone applications may be launched on different screens, respectively, of the docking system. Alternatively, or in addition to the foregoing, an embodiment provides that a user is provided the option of double-clicking an application icon on the smartphone, or touching the icon once and then touching somewhere else on the smartphone screen, such that the selected application is launched on the smartphone screen.

In accordance with one embodiment, a remote computing application is launched on one of the docking system screens, wherein the remote computing application accesses a remote database (e.g., a home computer) and displays a GUI, such as a desktop screen, of a remote terminal. Consequently, both a smartphone application and a screenshot of a remote terminal may be simultaneously displayed on first and second screens, respectively, of the docking system.

Alternatively, or in addition to the foregoing, an embodiment provides that one of the docking system screens is used to display information stored externally (e.g., in a "cloud" server). For example, an externally stored word processing document could be launched and displayed in a docking system screen, and changes to that document would be stored in the external storage. In this manner, a user would have the option of not carrying around his or her important electronic files. Rather, these files could be stored in a "cloud", and then accessed and modified locally.

Moreover, in one embodiment, data stored externally is accessed and modified through a communication network (e.g., a cellular network) associated with the docked cell phone. Pursuant to one exemplary implementation, however, the docking system is a node on a different communication network (e.g., the Internet) and, therefore, an externally stored file that is identified by the docked smartphone is accessed and modified through this latter network. An advantage of this implementation would be realized when the data transfer rate of the latter network is faster than the data transfer rate of the former.

III. Mobile Data Sharing

An embodiment provides a mobile data sharing system, wherein a mobile device (e.g., an electronic tablet, PDA or smartphone) stores certain information, and data stored on the mobile device may be selected and then wirelessly routed in real-time to an external display device (e.g., a computer monitor or television screen). In particular, an embodiment provides that an icon (e.g., a thumbnail image) corresponding to certain information is touched on the display screen of the mobile device, and then the user "flicks" this icon in the direction of an external display to thereby cause the corresponding information to be wirelessly routed to and displayed upon the external display.

In one embodiment, the mobile device and one or more external displays are configured to share information with one another over the same data network (e.g., over an Internet, Intranet, cellular or other data network). Additionally, in an embodiment, the mobile device and the one or more displays each include one or more optic sensors (e.g., infrared (IR) sensors) such that one of the one or more external displays is selected, for example, by (1) aligning a preselected edge of the mobile device with an IR sensor of such display or (2) "flicking" the selected icon in the direction of such display.

The foregoing notwithstanding, in an embodiment, an icon is touched on the mobile device by a user, and the user then makes a "spiral" motion on the touchscreen to thereby cause the corresponding information to be displayed on each of a plurality of display screens located within a vicinity of the mobile device. Furthermore, it is noted that the term "icon", as used herein, may be construed, for example, as being any graphical representation of information (or a specific application) to which the icon corresponds.

In one embodiment, a user touches an icon on the mobile device, and then touches an external display screen to thereby cause the corresponding information to be displayed on such external display screen. Thus, it is noted that, in accordance with an embodiment, the user may select an external display device by physically aligning the mobile device with the IR sensor of such display, by "flicking"/gesturing the corresponding icon toward such display, or by simply touching the display.

The foregoing notwithstanding, in an embodiment, a virtual map of the external displays, and optionally one or more external storage devices, is automatically displayed on the mobile device when an icon is selected. The user then has the option of, for example, (1) touching the virtual representation of one of these external devices within the virtual map, (2) sliding the icon to such virtual representation, or (3) "flicking"/gesturing the icon toward such virtual representation to thereby select the corresponding external device. An external display, once selected, will store/display the selected information once the information has been routed (e.g., wirelessly routed) to such display device. An external storage device, once selected, will store the selected information once the information has been routed (e.g., wirelessly routed) to such display/storage device.

Moreover, in an embodiment, once a virtual representation has been selected in the virtual map, one or more additional virtual representations may be selected such that the selected information is stored at and/or displayed upon the corresponding external device. In one embodiment, selecting a new virtual representation will cause the first selected virtual representation to be deselected. However, in accordance with an embodiment, the selected icon is visually associated with (e.g., contained within) the first selected virtual representation, this icon is again touched to thereby reselect this icon, and one or more other virtual representations are selected, such as, for example, in a manner previously described herein, such that the selected information is displayed on and/or stored at each of the external devices corresponding to the first selected virtual representation and the one or more aforementioned other virtual representations.

Furthermore, in an embodiment, a copy of the selected information corresponding to the selected icon is stored in a remote storage device (e.g., a storage device that is not physically coupled with the mobile device). Once both the icon and the external display/storage device have been selected, a copy of the selected information is routed (e.g., wirelessly routed) to such external display/storage device from the aforementioned remote storage device (rather than from the mobile device).

Although various embodiments discussed herein involve a series of specific steps, actions or operations for achieving a result, it is noted these steps, actions or operations are examples of various steps, actions or operations that may be performed in accordance with a number of exemplary implementations. Indeed, the embodiments disclosed herein may be configured such that various other steps, actions or operations are performed, such as variations of the steps, actions or operations recited. Moreover, the steps disclosed herein may be performed in an order different than presented, and not all of the steps are necessarily performed in a particular embodiment.

Exemplary Summary Concepts

In view of the foregoing, it is noted that the present technology includes at least the following concepts:

I. First Exemplary Concept Group

1. A method of data sharing including or comprising:
wirelessly routing a selected data set to a selected device in response to a flicking or sliding gesture detected at a touchscreen.

2. The method of Concept 1, wherein the flicking or sliding gesture indicates both of the selected data set and the selected device.

3. A data sharing device or system configured to perform any of the methods of Concepts 1 and 2, or any portion thereof.

4. A computer-readable medium storing a set of instructions that when executed cause a computer system to perform any one of the methods of Concepts 1 and 2, or any portion thereof.

5. A data sharing device or system configured to execute the set of instructions of Concept 4, or any portion thereof.

II. Second Exemplary Concept Group

1. A method of data sharing including or comprising:
displaying a first graphical representation associated with a first data set on a first touchscreen, a first device including or comprising the first touchscreen;
receiving a first touchscreen input at the first touchscreen, the first touchscreen input indicating a first data selection of the first graphical representation;
accessing a first target selection of a first external display, the first target selection being indicated by a second touchscreen input, and a second device including or comprising the first external display; and
wirelessly routing the first data set to the second device in response to the first data and first target selections.

2. The method of Concept 1, further including or comprising:
detecting a touching of a location on the first touchscreen, the location corresponding to the first graphical representation; and
determining that the first data set is to be routed to an external device based on a duration of the touching of the location being longer than a predefined duration threshold.

3. The method of Concept 1, further including or comprising:
detecting a touching of a location on the first touchscreen, the location corresponding to the first graphical representation; and
determining that the first data set is to be routed to the second device based on a duration of the touching of the location being longer than a predefined duration threshold and based on the first target selection.

4. The method of Concept 1, wherein the first graphical representation includes or comprises a thumbnail image or icon representing the first data set.

5. The method of Concept 1, wherein the first data set includes or comprises a digital audio file, digital image file, digital video file or digital software application.

6. The method of Concept 1, further including or comprising:
receiving the second touchscreen input at the first touchscreen.

7. The method of Concept 1, further including or comprising:
receiving the second touchscreen input at the first external display, the first external display including or comprising a second touchscreen.

8. The method of Concept 1, further including or comprising:
identifying the second device in response to the first data selection.

9. The method of Concept 1, further including or comprising:
identifying the second device in response to the first target selection.

10. The method of Concept 1, further including or comprising:
optically identifying the second device.

11. The method of Concept 1, further including or comprising:
identifying the second device based on a proximity of the second device to the first device.

12. The method of Concept 1, further including or comprising:
identifying the second device based on a network presence of the second device.

13. The method of Concept 1, further including or comprising:
detecting a flicking or sliding gesture along the first touchscreen, the flicking or sliding gesture indicating the first and second touchscreen inputs such that the flicking or sliding gesture thereby indicates the first data and first target selections; and
identifying the second device based on the flicking or sliding gesture.

14. The method of Concept 1, further including or comprising:
identifying the second device;
identifying the first external display in response to the identifying of the second device;
generating an external device list; and
indicating an availability of the first external display in the external device list in response to the identifying of the first external display.

15. The method of Concept 1, further including or comprising:
identifying a linear data path between the first and second devices; and
identifying the first external display in response to the identifying of the linear data path.

16. The method of Concept 1, further including or comprising:

selecting a first optic signal transceiver associated with the first device, a second optic signal transceiver being associated with the second device;

generating a first optic signal at the first optic signal transceiver in response to at least one selection from among the first data and first target selections;

routing the first optic signal from the first optic signal transceiver to the second optic signal transceiver along a linear signal path;

generating a second optic signal at the second optic signal transceiver in response to receiving the first optic signal at the second optic signal transceiver;

routing the second optic signal from the second optic signal transceiver to the first optic signal transceiver along a linear signal path; and identifying the first external display in response to receiving the second optic signal at the first optic signal transceiver.

17. The method of Concept 1, further including or comprising:

selecting an optic signal transmitter associated with the first device, an optic signal receiver being associated with the second device;

generating an optic signal at the optic signal transmitter in response to at least one selection from among the first data and first target selections;

routing the optic signal from the optic signal transmitter to the optic signal receiver along a linear signal path;

generating a confirmation signal in response to receiving the optic signal at the optic signal receiver;

routing the confirmation signal to the first device; and identifying the first external display in response to receiving the confirmation signal at the first device.

18. The method of Concept 1, further including or comprising:

receiving the first and second touchscreen inputs at first and second locations, respectively, on the first touchscreen;

identifying a first geometric ray based on the first and second locations; and determining that the second device is located along the first geometric ray to thereby select the first external display.

19. The method of Concept 18, further including or comprising:

identifying a spatial orientation of the first touchscreen relative to a reference plane; and identifying the first geometric ray based on the first location, second location and spatial orientation.

20. The method of Concept 18, wherein the first and second touchscreen inputs result from a flicking or sliding gesture along the first touchscreen.

21. The method of Concept 18, further including or comprising:

receiving a third touchscreen input at a third location on the first touchscreen;

identifying a second geometric ray based on the first and third locations; and determining that a third device including or comprising a second external display is located along the second geometric ray to thereby select the second external display.

22. The method of Concept 21, wherein the first, second and third touchscreen inputs result from a spiral gesture along the first touchscreen.

23. The method of Concept 1, further including or comprising:

generating a virtual environment map including or comprising a visual representation of the first external display;

displaying the virtual environment map on the first touchscreen; and receiving the first and second touchscreen inputs at first and second locations, respectively, on the first touchscreen, the first location corresponding to the first graphical representation such that the first touchscreen input indicates the first data selection, and the second location corresponding to the visual representation such that the second touchscreen input indicates the first target selection.

24. The method of Concept 23, further including or comprising:

detecting a flicking or sliding gesture along the first touchscreen, the flicking or sliding gesture indicating the first and second touchscreen inputs at the first and second locations, respectively, such that the flicking or sliding gesture indicates the first data and first target selections.

25. The method of Concept 1, further including or comprising:

generating a virtual environment map including or comprising a visual representation of the first external display;

displaying the virtual environment map on the first touchscreen;

receiving the first touchscreen input at a location on the first touchscreen, the location corresponding to the first graphical representation such that the first touchscreen input indicates the first data selection;

enabling a flicking or sliding of the first graphical representation toward the visual representation in response to the first touchscreen input being received at the location; and routing the first data set to the second device in response to the first graphical representation being flicked or slid toward the visual representation.

26. The method of Concept 1, further including or comprising:

accessing a second target selection of a second external display, a third device including or comprising the second external display; and routing the first data set to the third device in response to the first data and second target selections.

27. The method of Concept 26, further including or comprising:

generating a virtual environment map including or comprising first and second visual representations of the first and second external displays, respectively;

displaying the virtual environment map on the first touchscreen; and receiving the first touchscreen input, the second touchscreen input and a third touchscreen input at first, second and third locations, respectively, on the first touchscreen, the first location corresponding to the first graphical representation such that the first touchscreen input indicates the first data selection, and the second and third locations corresponding to the first and second visual representations, respectively, such that the second and third touchscreen inputs indicate the first and second target selections, respectively.

28. The method of Concept 1, further including or comprising:

routing the first data set to the second device in response to the first data and first target selections such that a second graphical representation of, or associated with, the first data set is displayed on the first external display.

29. The method of Concept 28, further including or comprising:

displaying the second graphical representation on the first touchscreen;

receiving a scrolling input associated with the first data set at the first touchscreen; and enabling a scrolling of the second graphical representation on the first external display in response to the scrolling input.

30. The method of Concept 1, further including or comprising:

identifying a local storage parameter associated with the first data set; and routing the first data set to the second device from the first device based on the local storage parameter.

31. The method of Concept 30, further including or comprising:

identifying first and second wireless settings associated with the first and second devices, respectively; and wirelessly routing the first data set to the second device from the first device based on the first and second wireless settings.

32. The method of Concept 1, further including or comprising:

identifying a remote storage parameter associated with the first data set;

identifying a remote storage device associated with the remote storage parameter; and routing the first data set to the second device from the remote storage device based on the remote storage parameter.

33. The method of Concept 1, further including or comprising:

identifying a first application associated with the first graphical representation in response to the first data selection; and launching the first application on the first external display in response to the first data and first target selections.

34. The method of Concept 33, further including or comprising:

displaying a second graphical representation associated with a second data set on the first touchscreen;

receiving a second data selection of the second graphical representation at the first touchscreen;

identifying a second application associated with the second graphical representation in response to the second data selection;

receiving a second target selection of the first touchscreen at the first touchscreen; and launching the second application on the first touchscreen in response to the second data and second target selections.

35. The method of Concept 34, further including or comprising:

detecting a touch input at a location on the first touchscreen, the location corresponding to the second graphical representation; and identifying the second data and second target selections based on the detecting of the touch input at the location.

36. The method of Concept 1, further including or comprising:

identifying an application associated with the first graphical representation in response to the first data selection, the application including or comprising first and second graphical user interfaces; and launching the first and second graphical user interfaces on the first touchscreen and the first external display, respectively, in response to the first data and first target selections.

37. The method of Concept 36, further including or comprising:

accessing a data file having a data format associated with the application, the data file including or comprising a plurality of electronic pages;

generating a plurality of images corresponding to the plurality of electronic pages, respectively;

displaying a scrollable list of the plurality of images in the first graphical user interface;

accessing a first selection of a first image from among the plurality of images within the scrollable list;

identifying a first electronic page from among the plurality of electronic pages that corresponds to the first image in response to the first selection; and displaying the first electronic page in the second graphical user interface.

38. The method of Concept 37, further including or comprising:

accessing a second selection of a second image from among the plurality of images within the scrollable list;

identifying a second electronic page from among the plurality of electronic pages that corresponds to the second image in response to the second selection; and displaying the second electronic page in the second graphical user interface.

39. The method of Concept 37, wherein the data file corresponds to the first graphical representation.

40. The method of Concept 1, further including or comprising:

displaying an image of the second device on the first touchscreen; and enabling a routing of the first data set to the second device in response to a repositioning of the first graphical representation toward the image on the first touchscreen, the repositioning indicating the first target selection.

41. The method of Concept 40, further including or comprising:

detecting a touching of a location on the first touchscreen, the location corresponding to the first graphical representation;

activating a digital camera based on a duration of the touching of the location being longer than a predefined duration threshold;

generating the image with the digital camera; and displaying the image on the first touchscreen such that the second device is graphically identified as an available external device.

42. The method of Concept 1, further including or comprising:

displaying an image of the second device on the first touchscreen; and enabling a routing of the first data set to the second device in response to a first touching of the image on the first touchscreen, the first touching indicating the first target selection.

43. The method of Concept 42, further including or comprising:

detecting a second touching of a location on the first touchscreen, the location corresponding to the first graphical representation;

activating a digital camera based on a duration of the second touching of the location being longer than a predefined duration threshold;

generating the image with the digital camera; and displaying the image on the first touchscreen such that the second device is graphically identified as an available external device.

44. A data sharing device or system configured to perform any of the methods of Concepts 1-43, or any portion thereof.

45. A computer-readable medium storing a set of instructions that when executed cause a computer system to perform any one of the methods of Concepts 1-43, or any portion thereof.

46. A data sharing device or system configured to execute the set of instructions of Concept 45, or any portion thereof.

III. Third Exemplary Concept Group

1. A method of data sharing including or comprising:

displaying a first graphical representation associated with a first data set on a first touchscreen, a first device including or comprising the first touchscreen;

utilizing the first touchscreen to identify a first data selection of the first graphical representation;

identifying a second device communicatively coupled with the first device, the second device including or comprising a second touchscreen;

accessing a first target selection of the second touchscreen, the second touchscreen being utilized to identify the first target selection; and routing the first data set to the second device in response to the first data and first target selections.

2. The method of Concept 1, further including or comprising:

detecting a touching of a location on the first touchscreen, the location corresponding to the first graphical representation; and determining that the first data set is to be routed to an external device based on a duration of the touching of the location being longer than a predefined duration threshold.

3. The method of Concept 1, further including or comprising:

detecting a touching of a location on the first touchscreen, the location corresponding to the first graphical representation; and determining that the first data set is to be routed to the second device based on a duration of the touching of the location being longer than a predefined duration threshold and based on the first target selection.

4. The method of Concept 1, wherein the first graphical representation includes or comprises a thumbnail image or icon representing the first data set.

5. The method of Concept 1, wherein the first data set includes or comprises a digital audio file, digital image file, digital video file or digital software application.

6. The method of Concept 1, further including or comprising:

identifying the second device in response to the first data selection.

7. The method of Concept 1, further including or comprising:

identifying the second device in response to the first target selection.

8. The method of Concept 1, further including or comprising:

identifying the second device based on the second device being communicatively coupled with the first device.

9. The method of Concept 1, further including or comprising:

identifying the second device;

identifying the second touchscreen in response to the identifying of the second device;

generating an external device list; and indicating an availability of the second touchscreen in the external device list in response to the identifying of the second touchscreen.

10. The method of Concept 1, further including or comprising:

routing the first data set to the second device in response to the first data and first target selections such that a second graphical representation of, or associated with, the first data set is displayed on the second touchscreen.

11. The method of Concept 10, further including or comprising:

displaying the second graphical representation on the first touchscreen;

receiving a scrolling input associated with the first data set at the first touchscreen; and enabling a scrolling of the second graphical representation on the second touchscreen in response to the scrolling input.

12. The method of Concept 10, further including or comprising:

displaying a third graphical representation associated with a second data set on the first touchscreen;

receiving a second data selection of the third graphical representation at the first touchscreen;

accessing a second target selection of a third touchscreen, the second device including or comprising the third touchscreen; and routing the second data set to the second device in response to the second data and second target selections such that a fourth graphical representation of, or associated with, the second data set is displayed on the third touchscreen.

13. The method of Concept 10, wherein the second touchscreen includes or comprises first and second display sections, the first target selection corresponding to the first display section, and the method further including or comprising:

displaying a third graphical representation associated with a second data set on the first touchscreen;

receiving a second data selection of the third graphical representation at the first touchscreen;

accessing a second target selection of the second display section; and routing the second data set to the second device in response to the second data and second target selections such that a fourth graphical representation of, or associated with, the second data set is displayed on the second touchscreen.

14. The method of Concept 1, further including or comprising:

identifying a local storage parameter associated with the first data set; and routing the first data set to the second device from the first device based on the local storage parameter.

15. The method of Concept 14, further including or comprising:

identifying first and second wireless settings associated with the first and second devices, respectively; and wirelessly routing the first data set to the second device from the first device based on the first and second wireless settings.

16. The method of Concept 14, further including or comprising:

identifying first and second wired settings associated with the first and second devices, respectively; and routing the first data set to the second device from the first device through a transmission line based on the first and second wired settings.

17. The method of Concept 1, further including or comprising:

identifying a remote storage parameter associated with the first data set;

identifying a remote storage device associated with the remote storage parameter; and routing the first data set to the second device from the remote storage device based on the remote storage parameter.

18. The method of Concept 1, further including or comprising:

identifying a first application associated with the first graphical representation in response to the first data selection; and launching the first application on the second touchscreen in response to the first data and first target selections.

19. The method of Concept 18, further including or comprising:

displaying a second graphical representation associated with a second data set on the first touchscreen;

receiving a second data selection of the second graphical representation at the first touchscreen;

identifying a second application associated with the second graphical representation in response to the second data selection;

receiving a second target selection of the first touchscreen at the first touchscreen; and launching the second application on the first touchscreen in response to the second data and second target selections.

20. The method of Concept 19, further including or comprising:

detecting a touch input at a location on the first touchscreen, the location corresponding to the second graphical representation; and identifying the second data and second target selections based on the detecting of the touch input at the location.

21. The method of Concept 1, further including or comprising:

identifying an application associated with the first graphical representation in response to the first data selection, the application including or comprising first and second graphical user interfaces; and launching the first and second graphical user interfaces on the first touchscreen and the second touchscreen, respectively, in response to the first data and first target selections.

22. The method of Concept 21, further including or comprising:

accessing a data file having a data format associated with the application, the data file including or comprising a plurality of electronic pages;

generating a plurality of images corresponding to the plurality of electronic pages, respectively;

displaying a scrollable list of the plurality of images in the first graphical user interface;

accessing a first selection of a first image from among the plurality of images within the scrollable list;

identifying a first electronic page from among the plurality of electronic pages that corresponds to the first image in response to the first selection; and displaying the first electronic page in the second graphical user interface.

23. The method of Concept 22, further including or comprising:

accessing a second selection of a second image from among the plurality of images within the scrollable list;

identifying a second electronic page from among the plurality of electronic pages that corresponds to the second image in response to the second selection; and displaying the second electronic page in the second graphical user interface.

24. The method of Concept 22, wherein the data file corresponds to the first graphical representation.

25. The method of Concept 1, further including or comprising:

displaying an image of the second device on the first touchscreen; and enabling a routing of the first data set to the second device in response to a repositioning of the first graphical representation toward the image on the first touchscreen, the repositioning indicating the first target selection.

26. The method of Concept 25, further including or comprising:

detecting a touching of a location on the first touchscreen, the location corresponding to the first graphical representation;

activating a digital camera based on a duration of the touching of the location being longer than a predefined duration threshold;

generating the image with the digital camera; and displaying the image on the first touchscreen such that the second device is graphically identified as an available external device.

27. The method of Concept 1, further including or comprising:

displaying an image of the second device on the first touchscreen; and enabling a routing of the first data set to the second device in response to a first touching of the image on the first touchscreen, the first touching indicating the first target selection.

28. The method of Concept 27, further including or comprising:

detecting a second touching of a location on the first touchscreen, the location corresponding to the first graphical representation;

activating a digital camera based on a duration of the second touching of the location being longer than a predefined duration threshold;

generating the image with the digital camera; and displaying the image on the first touchscreen such that the second device is graphically identified as an available external device.

29. A data sharing device or system configured to perform any of the methods of Concepts 1-28, or any portion thereof.

30. A computer-readable medium storing a set of instructions that when executed cause a computer system to perform any one of the methods of Concepts 1-28, or any portion thereof.

31. A data sharing device or system configured to execute the set of instructions of Concept 30, or any portion thereof.

IV. Fourth Exemplary Concept Group

1. A method of data sharing including or comprising:

displaying a graphical representation associated with a data set on a touchscreen, a first device including or comprising the touchscreen;

detecting a flicking or sliding gesture along the touchscreen, the flicking or sliding gesture indicating a first data selection of the graphical representation and a first target selection of a second device; and wirelessly routing the data set to the second device in response to the first data and first target selections.

2. The method of Concept 1, further including or comprising:

detecting a touching of a location on the touchscreen, the location corresponding to the graphical representation; and determining that the data set is to be routed to an external device based on a duration of the touching of the location being longer than a predefined duration threshold.

3. The method of Concept 1, further including or comprising:

detecting a touching of a location on the touchscreen, the location corresponding to the graphical representation; and determining that the data set is to be routed to the second device based on a duration of the touching of the location being longer than a predefined duration threshold and based on the first target selection.

4. The method of Concept 1, wherein the graphical representation includes or comprises a thumbnail image or icon representing the data set.

5. The method of Concept 1, wherein the data set includes or comprises a digital audio file, digital image file, digital video file or digital software application.

6. The method of Concept 1, further including or comprising:
identifying the second device in response to the first data selection.

7. The method of Concept 1, further including or comprising:
identifying the second device in response to the first target selection.

8. The method of Concept 1, further including or comprising:
optically identifying the second device.

9. The method of Concept 1, further including or comprising:
identifying the second device based on a proximity of the second device to the first device.

10. The method of Concept 1, further including or comprising:
identifying the second device based on a network presence of the second device.

11. The method of Concept 1, wherein the flicking or sliding gesture indicates first and second touchscreen inputs that indicate the first data and first target selections, respectively, the method further including or comprising:
identifying the second device based on the first data and first target selections.

12. The method of Concept 1, further including or comprising:
generating an external device list;
identifying an availability of the second device; and
indicating the availability of the second device in the external device list in response to the identifying of the availability of the second device.

13. The method of Concept 1, further including or comprising:
identifying a linear data path between the first and second devices; and
identifying an availability of the second device in response to the identifying of the linear data path.

14. The method of Concept 1, further including or comprising:
selecting a first optic signal transceiver associated with the first device, a second optic signal transceiver being associated with the second device;
generating a first optic signal at the first optic signal transceiver in response to at least one selection from among the first data and first target selections;
routing the first optic signal from the first optic signal transceiver to the second optic signal transceiver along a linear signal path;
generating a second optic signal at the second optic signal transceiver in response to receiving the first optic signal at the second optic signal transceiver;
routing the second optic signal from the second optic signal transceiver to the first optic signal transceiver along a linear signal path; and
identifying an availability of the second device in response to receiving the second optic signal at the first optic signal transceiver.

15. The method of Concept 1, further including or comprising:
selecting an optic signal transmitter associated with the first device, an optic signal receiver being associated with the second device;
generating an optic signal at the optic signal transmitter in response to at least one selection from among the first data and first target selections;
routing the optic signal from the optic signal transmitter to the optic signal receiver along a linear signal path;
generating a confirmation signal in response to receiving the optic signal at the optic signal receiver;
routing the confirmation signal to the first device; and
identifying an availability of the second device in response to receiving the confirmation signal at the first device.

16. The method of Concept 1, further including or comprising:
receiving first and second touchscreen inputs at first and second locations, respectively, on the touchscreen;
identifying a first geometric ray based on the first and second locations; and
determining that the second device is located along the first geometric ray to thereby select the second device.

17. The method of Concept 16, further including or comprising:
identifying a spatial orientation of the touchscreen relative to a reference plane; and
identifying the first geometric ray based on the first location, second location and spatial orientation.

18. The method of Concept 16, wherein the first and second touchscreen inputs result from the flicking or sliding gesture along the touchscreen.

19. The method of Concept 16, further including or comprising:
receiving a third touchscreen input at a third location on the touchscreen;
identifying a second geometric ray based on the first and third locations; and
determining that a third device is located along the second geometric ray to thereby select the third device.

20. The method of Concept 19, wherein the first, second and third touchscreen inputs result from a spiral gesture along the touchscreen.

21. The method of Concept 1, further including or comprising:
generating a virtual environment map including or comprising a visual representation of the second device;
displaying the virtual environment map on the touchscreen;
receiving a touchscreen input at a location on the touchscreen, the location corresponding to the graphical representation such that the touchscreen input indicates the first data selection;
enabling a flicking or sliding of the graphical representation toward the visual representation in response to the touchscreen input being received at the location; and
routing the data set to the second device in response to the graphical representation being flicked or slid toward the visual representation.

22. The method of Concept 1, further including or comprising:
accessing a second target selection of a third device; and routing the data set to the third device in response to the first data and second target selections.

23. The method of Concept 22, further including or comprising:

generating a virtual environment map including or comprising a visual representation of the third device;

displaying the virtual environment map on the touchscreen; and receiving a touchscreen input at a location on the touchscreen, the location corresponding to the visual representation such that the touchscreen input indicates the second target selection.

24. The method of Concept 1, wherein the second device includes or comprises an external storage unit, the method further including or comprising:

routing the data set to the second device in response to the first data and first target selections such that the data set is stored in the external storage unit.

25. The method of Concept 1, further including or comprising:

identifying a local storage parameter associated with the data set; and routing the data set to the second device from the first device based on the local storage parameter.

26. The method of Concept 25, further including or comprising:

identifying first and second wireless settings associated with the first and second devices, respectively; and wirelessly routing the data set to the second device from the first device based on the first and second wireless settings.

27. The method of Concept 1, further including or comprising:

identifying a remote storage parameter associated with the data set;

identifying a remote storage device associated with the remote storage parameter; and routing the data set to the second device from the remote storage device based on the remote storage parameter.

28. The method of Concept 1, further including or comprising:

displaying an image of the second device on the touchscreen; and enabling a routing of the data set to the second device in response to a repositioning of the graphical representation toward the image on the touchscreen, the repositioning indicating the first target selection.

29. The method of Concept 28, further including or comprising:

detecting a touching of a location on the touchscreen, the location corresponding to the graphical representation;

activating a digital camera based on a duration of the touching of the location being longer than a predefined duration threshold;

generating the image with the digital camera; and displaying the image on the touchscreen such that the second device is graphically identified as an available external device.

30. The method of Concept 1, further including or comprising:

displaying an image of the second device on the touchscreen; and enabling a routing of the data set to the second device in response to a first touching of the image on the touchscreen, the first touching indicating the first target selection.

31. The method of Concept 30, further including or comprising:

detecting a second touching of a location on the touchscreen, the location corresponding to the graphical representation;

activating a digital camera based on a duration of the second touching of the location being longer than a predefined duration threshold;

generating the image with the digital camera; and displaying the image on the touchscreen such that the second device is graphically identified as an available external device.

32. A data sharing device or system configured to perform any of the methods of Concepts 1-31, or any portion thereof.

33. A computer-readable medium storing a set of instructions that when executed cause a computer system to perform any one of the methods of Concepts 1-31, or any portion thereof.

34. A data sharing device or system configured to execute the set of instructions of Concept 33, or any portion thereof.

V. Fifth Exemplary Concept Group

1. A method of data sharing including or comprising:

displaying a first graphical representation associated with a first data set on a first touchscreen, a first device including or comprising the first touchscreen;

detecting a flicking or sliding gesture along the first touchscreen, the flicking or sliding gesture indicating a first data selection of the first graphical representation and a first target selection of a first external display, a second device including or comprising the first external display; and wirelessly routing the first data set to the second device in response to the first data and first target selections.

2. The method of Concept 1, further including or comprising:

detecting a touching of a location on the first touchscreen, the location corresponding to the first graphical representation; and determining that the first data set is to be routed to an external device based on a duration of the touching of the location being longer than a predefined duration threshold.

3. The method of Concept 1, further including or comprising:

detecting a touching of a location on the first touchscreen, the location corresponding to the first graphical representation; and determining that the first data set is to be routed to the second device based on a duration of the touching of the location being longer than a predefined duration threshold and based on the first target selection.

4. The method of Concept 1, wherein the first graphical representation includes or comprises a thumbnail image or icon representing the first data set.

5. The method of Concept 1, wherein the first data set includes or comprises a digital audio file, digital image file, digital video file or digital software application.

6. The method of Concept 1, further including or comprising:

identifying the second device in response to the first data selection.

7. The method of Concept 1, further including or comprising:

identifying the second device in response to the first target selection.

8. The method of Concept 1, further including or comprising:

optically identifying the second device.

9. The method of Concept 1, further including or comprising:

identifying the second device based on a proximity of the second device to the first device.

10. The method of Concept 1, further including or comprising:

identifying the second device based on a network presence of the second device.

11. The method of Concept 1, wherein the flicking or sliding gesture indicates first and second touchscreen inputs that indicate the first data and first target selections, respectively; and identifying the second device based on the first data and first target selections.

12. The method of Concept 1, further including or comprising:

identifying the second device;

identifying the first external display in response to the identifying of the second device;

generating an external device list; and indicating an availability of the first external display in the external device list in response to the identifying of the first external display.

13. The method of Concept 1, further including or comprising:

identifying a linear data path between the first and second devices; and identifying the first external display in response to the identifying of the linear data path.

14. The method of Concept 1, further including or comprising:

selecting a first optic signal transceiver associated with the first device, a second optic signal transceiver being associated with the second device;

generating a first optic signal at the first optic signal transceiver in response to at least one selection from among the first data and first target selections;

routing the first optic signal from the first optic signal transceiver to the second optic signal transceiver along a linear signal path;

generating a second optic signal at the second optic signal transceiver in response to receiving the first optic signal at the second optic signal transceiver;

routing the second optic signal from the second optic signal transceiver to the first optic signal transceiver along a linear signal path; and identifying the first external display in response to receiving the second optic signal at the first optic signal transceiver.

15. The method of Concept 1, further including or comprising:

selecting an optic signal transmitter associated with the first device, an optic signal receiver being associated with the second device;

generating an optic signal at the optic signal transmitter in response to at least one selection from among the first data and first target selections;

routing the optic signal from the optic signal transmitter to the optic signal receiver along a linear signal path;

generating a confirmation signal in response to receiving the optic signal at the optic signal receiver;

routing the confirmation signal to the first device; and identifying the first external display in response to receiving the confirmation signal at the first device.

16. The method of Concept 1, further including or comprising:

receiving first and second touchscreen inputs at first and second locations, respectively, on the first touchscreen;

identifying a first geometric ray based on the first and second locations; and determining that the second device is located along the first geometric ray to thereby select the first external display.

17. The method of Concept 16, further including or comprising:

identifying a spatial orientation of the first touchscreen relative to a reference plane; and identifying the first geometric ray based on the first location, second location and spatial orientation.

18. The method of Concept 16, wherein the first and second touchscreen inputs result from the flicking or sliding gesture along the first touchscreen.

19. The method of Concept 16, further including or comprising:

receiving a third touchscreen input at a third location on the first touchscreen;

identifying a second geometric ray based on the first and third locations; and determining that a third device including or comprising a second external display is located along the second geometric ray to thereby select the second external display.

20. The method of Concept 19, wherein the first, second and third touchscreen inputs result from a spiral gesture along the first touchscreen.

21. The method of Concept 1, further including or comprising:

generating a virtual environment map including or comprising a visual representation of the first external display;

displaying the virtual environment map on the first touchscreen;

receiving a touchscreen input at a location on the first touchscreen, the location corresponding to the first graphical representation such that the touchscreen input indicates the first data selection;

enabling a flicking or sliding of the first graphical representation toward the visual representation in response to the touchscreen input being received at the location; and routing the first data set to the second device in response to the first graphical representation being flicked or slid toward the visual representation.

22. The method of Concept 1, further including or comprising:

accessing a second target selection of a second external display, a third device including or comprising the second external display; and routing the first data set to the third device in response to the first data and second target selections.

23. The method of Concept 22, further including or comprising:

generating a virtual environment map including or comprising a visual representation of the second external display;

displaying the virtual environment map on the first touchscreen; and receiving a touchscreen input at a location on the first touchscreen, the location corresponding to the visual representation such that the touchscreen input indicates the second target selection.

24. The method of Concept 1, further including or comprising:

routing the first data set to the second device in response to the first data and first target selections such that a second graphical representation of or associated with, the first data set is displayed on the first external display.

25. The method of Concept 24, further including or comprising:

displaying the second graphical representation on the first touchscreen;

receiving a scrolling input associated with the first data set at the first touchscreen; and enabling a scrolling of the second graphical representation on the first external display in response to the scrolling input.

26. The method of Concept 1, further including or comprising:

identifying a local storage parameter associated with the first data set; and routing the first data set to the second device from the first device based on the local storage parameter.

27. The method of Concept 26, further including or comprising:

identifying first and second wireless settings associated with the first and second devices, respectively; and wirelessly routing the first data set to the second device from the first device based on the first and second wireless settings.

28. The method of Concept 1, further including or comprising:

identifying a remote storage parameter associated with the first data set;

identifying a remote storage device associated with the remote storage parameter; and routing the first data set to the second device from the remote storage device based on the remote storage parameter.

29. The method of Concept 1, further including or comprising:

identifying a first application associated with the first graphical representation in response to the first data selection; and launching the first application on the first external display in response to the first data and first target selections.

30. The method of Concept 29, further including or comprising:

displaying a second graphical representation associated with a second data set on the first touchscreen;

receiving a second data selection of the second graphical representation at the first touchscreen;

identifying a second application associated with the second graphical representation in response to the second data selection;

receiving a second target selection of the first touchscreen at the first touchscreen; and launching the second application on the first touchscreen in response to the second data and second target selections.

31. The method of Concept 30, further including or comprising:

detecting a touch input at a location on the first touchscreen, the location corresponding to the second graphical representation; and identifying the second data and second target selections based on the detecting of the touch input at the location.

32. The method of Concept 1, further including or comprising:

identifying an application associated with the first graphical representation in response to the first data selection, the application including or comprising first and second graphical user interfaces; and launching the first and second graphical user interfaces on the first touchscreen and the first external display, respectively, in response to the first data and first target selections.

33. The method of Concept 32, further including or comprising:

accessing a data file having a data format associated with the application, the data file including or comprising a plurality of electronic pages;

generating a plurality of images corresponding to the plurality of electronic pages, respectively;

displaying a scrollable list of the plurality of images in the first graphical user interface;

accessing a first selection of a first image from among the plurality of images within the scrollable list;

identifying a first electronic page from among the plurality of electronic pages that corresponds to the first image in response to the first selection; and displaying the first electronic page in the second graphical user interface.

34. The method of Concept 33, further including or comprising:

accessing a second selection of a second image from among the plurality of images within the scrollable list;

identifying a second electronic page from among the plurality of electronic pages that corresponds to the second image in response to the second selection; and displaying the second electronic page in the second graphical user interface.

35. The method of Concept 33, wherein the data file corresponds to the first graphical representation.

36. The method of Concept 1, further including or comprising:

displaying an image of the second device on the first touchscreen; and enabling a routing of the first data set to the second device in response to a repositioning of the first graphical representation toward the image on the first touchscreen, the repositioning indicating the first target selection.

37. The method of Concept 36, further including or comprising:

detecting a touching of a location on the first touchscreen, the location corresponding to the first graphical representation;

activating a digital camera based on a duration of the touching of the location being longer than a predefined duration threshold;

generating the image with the digital camera; and displaying the image on the first touchscreen such that the second device is graphically identified as an available external device.

38. The method of Concept 1, further including or comprising:

displaying an image of the second device on the first touchscreen; and enabling a routing of the first data set to the second device in response to a first touching of the image on the first touchscreen, the first touching indicating the first target selection.

39. The method of Concept 38, further including or comprising:

detecting a second touching of a location on the first touchscreen, the location corresponding to the first graphical representation;

activating a digital camera based on a duration of the second touching of the location being longer than a predefined duration threshold;

generating the image with the digital camera; and displaying the image on the first touchscreen such that the second device is graphically identified as an available external device.

40. A data sharing device or system configured to perform any of the methods of Concepts 1-39, or any portion thereof.

41. A computer-readable medium storing a set of instructions that when executed cause a computer system to perform any one of the methods of Concepts 1-39, or any portion thereof.

42. A data sharing device or system configured to execute the set of instructions of Concept 41, or any portion thereof.

VI. Sixth Exemplary Concept Group.

1. A data sharing system including or comprising:
a touchscreen;
a router; and
a data sharing control module communicatively associated with the touchscreen and the router, the data sharing control module configured to cause the router to wirelessly route a selected data set to a selected device in response to a flicking or sliding gesture detected at the touchscreen.

2. The data sharing system of Concept 1, wherein the flicking or sliding gesture indicates both of the selected data set and the selected device.

VII. Seventh Exemplary Concept Group

1. A data sharing system including or comprising:
a first device including or comprising a first touchscreen;
a router; and
a data sharing control module communicatively associated with the first touchscreen and the router, the data sharing control module configured to enable a display of a first graphical representation associated with a first data set on the first touchscreen, enable a detection of a first touchscreen input at the first touchscreen, the first touchscreen input indicating a first data selection of the first graphical representation, access a first target selection of a first external display, the first target selection being indicated by a second touchscreen input, a second device including or comprising the first external display, and cause the router to wirelessly route the first data set to the second device in response to the first data and first target selections.

2. The data sharing system of Concept 1, wherein the data sharing control module is further configured to enable a detection of a touching of a location on the first touchscreen, the location corresponding to the first graphical representation, and determine that the first data set is to be routed to an external device based on a duration of the touching of the location being longer than a predefined duration threshold.

3. The data sharing system of Concept 1, wherein the data sharing control module is further configured to enable a detection of a touching of a location on the first touchscreen, the location corresponding to the first graphical representation, and determine that the first data set is to be routed to the second device based on a duration of the touching of the location being longer than a predefined duration threshold and based on the first target selection.

4. The data sharing system of Concept 1, further including or comprising:
a data bus communicatively coupled with the first touchscreen, the data sharing control module and the router, the data bus configured to transmit display instructions from the data sharing control module to the first touchscreen, transmit detection instructions from the data sharing control module to the first touchscreen, transmit detected data from the first touchscreen to the data sharing control module, and transmit routing instructions from the data sharing control module to the router.

5. The data sharing system of Concept 1, wherein the first graphical representation includes or comprises a thumbnail image or icon representing the first data set.

6. The data sharing system of Concept 1, wherein the first data set includes or comprises a digital audio file, digital image file, digital video file or digital software application.

7. The data sharing system of Concept 1, wherein the second touchscreen input is received at the first touchscreen.

8. The data sharing system of Concept 1, wherein the second touchscreen input is received at the first external display, the first external display including or comprising a second touchscreen.

9. The data sharing system of Concept 1, further including or comprising:
a device identification module communicatively associated with the data sharing control module, the device identification module configured to identify the second device in response to the first data selection.

10. The data sharing system of Concept 1, further including or comprising:
a device identification module communicatively associated with the data sharing control module, the device identification module configured to identify the second device in response to the first target selection.

11. The data sharing system of Concept 1, further including or comprising:
a device identification module communicatively associated with the data sharing control module, the device identification module configured to optically identify the second device.

12. The data sharing system of Concept 1, further including or comprising:
a device identification module communicatively associated with the data sharing control module, the device identification module configured to identify the second device based on a proximity of the second device to the first device.

13. The data sharing system of Concept 1, further including or comprising:
a device identification module communicatively associated with the data sharing control module, the device identification module configured to identify the second device based on a network presence of the second device.

14. The data sharing system of Concept 1, wherein the data sharing control module is further configured to enable a detection of a flicking or sliding gesture made along the first touchscreen, the flicking or sliding gesture indicating the first and second touchscreen inputs such that the flicking or sliding gesture thereby indicates the first data and first target selections, and the data sharing system further including or comprising:
a device identification module communicatively associated with the data sharing control module, the device identification module configured to identify the second device based on the flicking or sliding gesture.

15. The data sharing system of Concept 1, further including or comprising:
a device identification module communicatively associated with the data sharing control module, the device identification module configured to identify the second device and identify the first external display in response to the identifying of the second device; and
a list generation module communicatively associated with the device identification module, the list generation module configured to generate an external device list, and the list generation module further configured to indicate an availability of the first external display in the external device list in response to the identifying of the first external display.

16. The data sharing system of Concept 1, further including or comprising:
a data path identification module communicatively associated with the data sharing control module, the data path identification module configured to identify a linear data path between the first and second devices; and a device identification module communicatively associated with the data path identification module, the device identification module configured to identify the first external display in response to the identifying of the linear data path.

17. The data sharing system of Concept 1, further including or comprising:
a first optic signal transceiver communicatively associated with the first device, a second optic signal transceiver being communicatively associated with the second device, the first optic signal transceiver configured to generate a first optic signal in response to at least one selection from among the first data and first target selections and transmit the first optic signal to the second optic signal transceiver along a linear signal path.

18. The data sharing system of Concept 17, wherein the second optic signal transceiver is configured to generate a second optic signal in response to receiving the first optic signal and transmit the second optic signal to the first optic signal transceiver along a linear signal path, the data sharing system further including or comprising:
a device identification module communicatively associated with the first optic signal transceiver, the device identification module configured to identify the first external display in response to the second optic signal being received at the first optic signal transceiver.

19. The data sharing system of Concept 1, further including or comprising:
an optic signal transmitter communicatively associated with the first device, an optic signal receiver being communicatively associated with the second device, the optic signal transmitter configured to generate an optic signal in response to at least one selection from among the first data and first target selections and transmit the optic signal to the optic signal receiver along a linear signal path.

20. The data sharing system of Concept 19, further including or comprising:
a confirmation signal receiver communicatively associated with the first device, the optic signal receiver being configured to generate a confirmation signal in response to receiving the optic signal and transmit the confirmation signal to the confirmation signal receiver; and
a device identification module communicatively associated with the confirmation signal receiver, the device identification module configured to identify the first external display in response to the confirmation signal being received at the confirmation signal receiver.

21. The data sharing system of Concept 1, wherein the first touchscreen is configured to detect the first and second touchscreen inputs at first and second locations, respectively, on the first touchscreen, the data sharing system further including or comprising:
a geometric ray identification module communicatively associated with the first touchscreen, the geometric ray identification module configured to identify a first geometric ray based on the first and second locations; and
a device selection module communicatively associated with the geometric ray identification module, the device selection module configured to determine that the second device is located along the first geometric ray to thereby select the first external display.

22. The data sharing system of Concept 21, further including or comprising:
a spatial orientation identification module communicatively associated with the device selection module, the spatial orientation identification module configured to identify a spatial orientation of the first touchscreen relative to a reference plane, and the geometric ray identification module further configured to identify the first geometric ray based on the first location, second location and spatial orientation.

23. The data sharing system of Concept 21, wherein the data sharing control module is further configured to enable a detection of a flicking or sliding gesture made along the first touchscreen, the first and second touchscreen inputs resulting from the flicking or sliding gesture along the first touchscreen.

24. The data sharing system of Concept 21, wherein the data sharing control module is further configured to enable a detection of a third touchscreen input at a third location on the first touchscreen, the geometric ray identification module is further configured to identify a second geometric ray based on the first and third locations, and the device selection module is further configured to determine that a third device including or comprising a second external display is located along the second geometric ray to thereby select the second external display.

25. The data sharing system of Concept 24, wherein the data sharing control module is further configured to enable a detection of a spiral gesture made along the first touchscreen, the first, second and third touchscreen inputs resulting from the spiral gesture along the first touchscreen.

26. The data sharing system of Concept 1, further including or comprising:
a map generation module communicatively associated with the data sharing control module, the map generation module configured to generate a virtual environment map including or comprising a visual representation of the first external display, and the data sharing control module being further configured to enable a display of the virtual environment map on the first touchscreen and enable a detection of the first and second touchscreen inputs at first and second locations, respectively, on the first touchscreen, the first location corresponding to the first graphical representation such that the first touchscreen input indicates the first data selection, and the second location corresponding to the visual representation such that the second touchscreen input indicates the first target selection.

27. The data sharing system of Concept 26, wherein the data sharing control module is further configured to enable a detection of a flicking or sliding gesture along the first touchscreen, the flicking or sliding gesture indicating the first and second touchscreen inputs at the first and second locations, respectively, such that the flicking or sliding gesture indicates the first data and first target selections.

28. The data sharing system of Concept 1, further including or comprising:
a map generation module communicatively associated with the data sharing control module, the map generation module configured to generate a virtual environment map including or comprising a visual representation of the first external display, and the data sharing control module being further configured to enable a display of the virtual environment map on the first touchscreen, enable a detection of the first touchscreen input at a location on the first touchscreen, the location corresponding to the first graphical representation such that the first touchscreen input indicates the first data selection, enable a flicking or sliding of the first graphical representation toward the visual representation in response to the first touchscreen input being received at the location, and cause the router to route the first data set to the second device in response to the first graphical representation being flicked or slid toward the visual representation.

29. The data sharing system of Concept 1, wherein the data sharing control module is further configured to access a second target selection of a second external display, a third device including or comprising the second external display, and cause the router to route the first data set to the third device in response to the first data and second target selections.

30. The data sharing system of Concept 29, further including or comprising:
a map generation module communicatively associated with the data sharing control module, the map generation module configured to generate a virtual environment map including or comprising first and second visual representations of the first and second external displays, respectively, the data sharing control module being further configured to enable a display of the virtual environment map on the first touchscreen, and the first touchscreen being further configured to receive the first touchscreen input, the second touchscreen input and a third touchscreen input at first, second and third locations, respectively, on the first touchscreen, the first location corresponding to the first graphical representation such that the first touchscreen input indicates the first data selection, and the second and third locations corresponding to the first and second visual representations, respectively, such that the second and third touchscreen inputs indicate the first and second target selections, respectively.

31. The data sharing system of Concept 1, wherein the data sharing control module is further configured to cause the router to route the first data set to the second device in response to the first data and first target selections such that a second graphical representation of, or associated with, the first data set is displayed on the first external display.

32. The data sharing system of Concept 31, wherein the data sharing control module is further configured to enable a display of the second graphical representation on the first touchscreen, enable a detection of a scrolling input associated with the first data set at the first touchscreen, and enable a scrolling of the second graphical representation on the first external display in response to the scrolling input.

33. The data sharing system of Concept 1, wherein the data sharing control module is further configured to identify a local storage parameter associated with the first data set and cause the router to route the first data set to the second device from the first device based on the local storage parameter.

34. The data sharing system of Concept 33, wherein the data sharing control module is further configured to identify first and second wireless settings associated with the first and second devices, respectively, and cause the router to wirelessly route the first data set to the second device from the first device based on the first and second wireless settings.

35. The data sharing system of Concept 1, wherein the data sharing control module is further configured to identify a remote storage parameter associated with the first data set, identify a remote storage device associated with the remote storage parameter, and cause the router to route the first data set to the second device from the remote storage device based on the remote storage parameter.

36. The data sharing system of Concept 1, wherein the data sharing control module is further configured to identify a first application associated with the first graphical representation in response to the first data selection and enable a launching of the first application on the first external display in response to the first data and first target selections.

37. The data sharing system of Concept 36, wherein the data sharing control module is further configured to enable a display of a second graphical representation associated with a second data set on the first touchscreen, enable a detection of a second data selection of the second graphical representation at the first touchscreen, identify a second application associated with the second graphical representation in response to the second data selection, enable a detection of a second target selection of the first touchscreen at the first touchscreen, and enable a launching of the second application on the first touchscreen in response to the second data and second target selections.

38. The data sharing system of Concept 37, wherein the data sharing control module is further configured to enable a detection of a touch input at a location on the first touchscreen, the location corresponding to the second graphical representation, and identify the second data and second target selections based on the detection of the touch input at the location.

39. The data sharing system of Concept 1, wherein the data sharing control module is further configured to identify an application associated with the first graphical representation in response to the first data selection, the application including or comprising first and second graphical user interfaces, and enable a launching of the first and second graphical user interfaces on the first touchscreen and the first external display, respectively, in response to the first data and first target selections.

40. The data sharing system of Concept 39, wherein the data sharing control module is further configured to access a data file having a data format associated with the application, the data file including or comprising a plurality of electronic pages, generate a plurality of images corresponding to the plurality of electronic pages, respectively, enable a display of a scrollable list of the plurality of images in the first graphical user interface, access a first selection of a first image from among the plurality of images within the scrollable list, identify a first electronic page from among the plurality of electronic pages that corresponds to the first image in response to the first selection, and enable a display of the first electronic page in the second graphical user interface.

41. The data sharing system of Concept 40, wherein the data sharing control module is further configured to access a second selection of a second image from among the plurality of images within the scrollable list, identify a second electronic page from among the plurality of electronic pages that corresponds to the second image in response to the second selection, and enable a display of the second electronic page in the second graphical user interface.

42. The data sharing system of Concept 40, wherein the data file corresponds to the first graphical representation.

43. The data sharing system of Concept 1, wherein the data sharing control module is further configured to enable a display of an image of the second device on the first touchscreen and enable a routing of the first data set to the second device in response to a repositioning of the first graphical representation toward the image on the first touchscreen, the repositioning indicating the first target selection.

44. The data sharing system of Concept 43, further including or comprising:
a digital camera communicatively associated with the data sharing control module, the data sharing control module being further configured to enable a detection of a touching of a location on the first touchscreen, the location corresponding to the first graphical representation, activate the digital camera based on a duration of the touching of the location being longer than a predefined duration threshold, enable a generation of the image with the digital camera, and enable a display of the image on the first touchscreen such that the second device is graphically identified as an available external device.

45. The data sharing system of Concept 1, wherein the data sharing control module is further configured to enable a display of an image of the second device on the first touchscreen and enable a routing of the first data set to the second device in response to a first touching of the image on the first touchscreen, the first touching indicating the first target selection.

46. The data sharing system of Concept 45, further including or comprising:
a digital camera communicatively associated with the data sharing control module, the data sharing control module being further configured to enable a detection of a second touching of a location on the first touchscreen, the location corresponding to the first graphical representation, activate the digital camera based on a duration of the second touching of the location being longer than a predefined duration threshold, enable a generation of the image with the digital camera, and enable a display of the image on the first touchscreen such that the second device is graphically identified as an available external device.

VIII. Eighth Exemplary Concept Group

1. A data sharing system including or comprising:
a first device including or comprising a first touchscreen;
a router; and
a data sharing control module communicatively associated with the first touchscreen and the router, the data sharing control module configured to enable a display of a first graphical representation associated with a first data set on the first touchscreen, utilize the first touchscreen to identify a first data selection of the first graphical representation, identify a second device communicatively coupled with the first device, the second device including or comprising a second touchscreen, access a first target selection of the second touchscreen, the second touchscreen being utilized to identify the first target selection, and cause the router to route the first data set to the second device in response to the first data and first target selections.

2. The data sharing system of Concept 1, wherein the data sharing control module is further configured to enable a detection of a touching of a location on the first touchscreen, the location corresponding to the first graphical representation, and determine that the first data set is to be routed to an external device based on a duration of the touching of the location being longer than a predefined duration threshold.

3. The data sharing system of Concept 1, wherein the data sharing control module is further configured to enable a detection of a touching of a location on the first touchscreen, the location corresponding to the first graphical representation, and determine that the first data set is to be routed to the second device based on a duration of the touching of the location being longer than a predefined duration threshold and based on the first target selection.

4. The data sharing system of Concept 1, wherein the first graphical representation includes or comprises a thumbnail image or icon representing the first data set.

5. The data sharing system of Concept 1, wherein the first data set includes or comprises a digital audio file, digital image file, digital video file or digital software application.

6. The data sharing system of Concept 1, further including or comprising:
a device identification module communicatively associated with the data sharing control module, the device identification module configured to identify the second device in response to the first data selection.

7. The data sharing system of Concept 1, further including or comprising:
a device identification module communicatively associated with the data sharing control module, the device identification module configured to identify the second device in response to the first target selection.

8. The data sharing system of Concept 1, further including or comprising:
a device identification module communicatively associated with the data sharing control module, the device identification module configured to identify the second device based on the second device being communicatively coupled with the first device.

9. The data sharing system of Concept 1, further including or comprising:
a device identification module communicatively associated with the data sharing control module, the device identification module configured to identify the second device and identify the second touchscreen in response to the identifying of the second device; and
a list generation module communicatively associated with the device identification module, the list generation module configured to generate an external device list, and the list generation module further configured to indicate an availability of the second touchscreen in the external device list in response to the identifying of the second touchscreen.

10. The data sharing system of Concept 1, wherein the data sharing control module is further configured to cause the router to route the first data set to the second device in response to the first data and first target selections such that a second graphical representation of, or associated with, the first data set is displayed on the second touchscreen.

11. The data sharing system of Concept 10, wherein the data sharing control module is further configured to enable a display of the second graphical representation on the first touchscreen, enable a detection of a scrolling input associated with the first data set at the first touchscreen, and enable a scrolling of the second graphical representation on the second touchscreen in response to the scrolling input.

12. The data sharing system of Concept 10, wherein the data sharing control module is further configured to enable a display of a third graphical representation associated with a second data set on the first touchscreen, enable a detection of a second data selection of the third graphical representation at the first touchscreen, access a second target selection of a third touchscreen, the second device including or comprising the third touchscreen, and cause the router to route the second data set to the second device in response to the second data and second target selections such that a fourth graphical representation of, or associated with, the second data set is displayed on the third touchscreen.

13. The data sharing system of Concept 10, wherein the second touchscreen includes or comprises first and second display sections, the first target selection corresponding to the first display section, and the data sharing control module being further configured to enable a display of a third graphical representation associated with a second data set on the first touchscreen, enable a detection of a second data selection of the third graphical representation at the first touchscreen, access a second target selection of the second display section, and cause the router to route the second data set to the second device in response to the second data and second target selections such that a fourth graphical representation of, or associated with, the second data set is displayed on the second touchscreen.

14. The data sharing system of Concept 1, wherein the data sharing control module is further configured to identify a local storage parameter associated with the first data set and cause the router to route the first data set to the second device from the first device based on the local storage parameter.

15. The data sharing system of Concept 14, wherein the data sharing control module is further configured to identify first and second wireless settings associated with the first and second devices, respectively, and cause the router to wirelessly route the first data set to the second device from the first device based on the first and second wireless settings.

16. The data sharing system of Concept 14, wherein the data sharing control module is further configured to identify first and second wired settings associated with the first and second devices, respectively, and cause the router to route the first data set to the second device from the first device through a transmission line based on the first and second wired settings.

17. The data sharing system of Concept 1, wherein the data sharing control module is further configured to identify a remote storage parameter associated with the first data set, identify a remote storage device associated with the remote storage parameter, and cause the router to route the first data set to the second device from the remote storage device based on the remote storage parameter.

18. The data sharing system of Concept 1, wherein the data sharing control module is further configured to identify a first application associated with the first graphical representation in response to the first data selection and enable a launching of the first application on the second touchscreen in response to the first data and first target selections.

19. The data sharing system of Concept 18, wherein the data sharing control module is further configured to enable a display of a second graphical representation associated with a second data set on the first touchscreen, enable a detection of a second data selection of the second graphical representation at the first touchscreen, identify a second application associated with the second graphical representation in response to the second data selection, enable a detection of a second target selection of the first touchscreen at the first touchscreen, and enable a launching of the second application on the first touchscreen in response to the second data and second target selections.

20. The data sharing system of Concept 19, wherein the data sharing control module is further configured to enable a detection of a touch input at a location on the first touchscreen, the location corresponding to the second graphical representation, and identify the second data and second target selections based on the detection of the touch input at the location.

21. The data sharing system of Concept 1, wherein the data sharing control module is further configured to identify an application associated with the first graphical representation in response to the first data selection, the application including or comprising first and second graphical user interfaces, and enable a launching of the first and second graphical user interfaces on the first touchscreen and the second touchscreen, respectively, in response to the first data and first target selections.

22. The data sharing system of Concept 21, wherein the data sharing control module is further configured to access a data file having a data format associated with the application, the data file including or comprising a plurality of electronic pages, generate a plurality of images corresponding to the plurality of electronic pages, respectively, enable a display of a scrollable list of the plurality of images in the first graphical user interface, access a first selection of a first image from among the plurality of images within the scrollable list, identify a first electronic page from among the plurality of electronic pages that corresponds to the first image in response to the first selection, and enable a display of the first electronic page in the second graphical user interface.

23. The data sharing system of Concept 22, wherein the data sharing control module is further configured to access a second selection of a second image from among the plurality of images within the scrollable list, identify a second electronic page from among the plurality of electronic pages that corresponds to the second image in response to the second selection, and enable a display of the second electronic page in the second graphical user interface.

24. The data sharing system of Concept 22, wherein the data file corresponds to the first graphical representation.

25. The data sharing system of Concept 1, wherein the data sharing control module is further configured to enable a display of an image of the second device on the first touchscreen and enable a routing of the first data set to the second device in response to a repositioning of the first graphical representation toward the image on the first touchscreen, the repositioning indicating the first target selection.

26. The data sharing system of Concept 25, further including or comprising:
a digital camera communicatively associated with the data sharing control module, the data sharing control module being further configured to enable a detection of a touching of a location on the first touchscreen, the location corresponding to the first graphical representation, activate the digital camera based on a duration of the touching of the location being longer than a predefined duration threshold, enable a generation of the image with the digital camera, and enable a display of the image on the first touchscreen such that the second device is graphically identified as an available external device.

27. The data sharing system of Concept 1, wherein the data sharing control module is further configured to enable a display of an image of the second device on the first touchscreen and enable a routing of the first data set to the second device in response to a first touching of the image on the first touchscreen, the first touching indicating the first target selection.

28. The data sharing system of Concept 27, further including or comprising:
a digital camera communicatively associated with the data sharing control module, the data sharing control module being further configured to enable a detection of a second touching of a location on the first touchscreen, the location corresponding to the first graphical representation, activate the digital camera based on a duration of the second touching of the location being longer than a predefined duration threshold, enable a generation of the image with the digital camera, and enable a display of the image on the first touchscreen such that the second device is graphically identified as an available external device.

IX. Ninth Exemplary Concept Group

1. A data sharing system including or comprising:
a first device including or comprising a touchscreen;
a router; and
a data sharing control module communicatively associated with the touchscreen and the router, the data sharing control module configured to enable a display of a graphical representation associated with a data set on the touchscreen, enable a detection of a flicking or sliding gesture along the touchscreen, the flicking or sliding gesture indicating a first data selection of the graphical representation and a first target selection of a second device, and cause the router to wirelessly route the data set to the second device in response to the first data and first target selections.

2. The data sharing system of Concept 1, wherein the data sharing control module is further configured to enable a detection of a touching of a location on the touchscreen, the location corresponding to the graphical representation, and determine that the data set is to be routed to an external device based on a duration of the touching of the location being longer than a predefined duration threshold.

3. The data sharing system of Concept 1, wherein the data sharing control module is further configured to enable a detection of a touching of a location on the touchscreen, the location corresponding to the graphical representation, and determine that the data set is to be routed to the second device based on a duration of the touching of the location being longer than a predefined duration threshold and based on the first target selection.

4. The data sharing system of Concept 1, wherein the graphical representation includes or comprises a thumbnail image or icon representing the data set.

5. The data sharing system of Concept 1, wherein the data set includes or comprises a digital audio file, digital image file, digital video file or digital software application.

6. The data sharing system of Concept 1, further including or comprising:
a device identification module communicatively associated with the data sharing control module, the device identification module configured to identify the second device in response to the first data selection.

7. The data sharing system of Concept 1, further including or comprising:
a device identification module communicatively associated with the data sharing control module, the device identification module configured to identify the second device in response to the first target selection.

8. The data sharing system of Concept 1, further including or comprising:
a device identification module communicatively associated with the data sharing control module, the device identification module configured to optically identify the second device.

9. The data sharing system of Concept 1, further including or comprising:
a device identification module communicatively associated with the data sharing control module, the device identification module configured to identify the second device based on a proximity of the second device to the first device.

10. The data sharing system of Concept 1, further including or comprising:
a device identification module communicatively associated with the data sharing control module, the device identification module configured to identify the second device based on a network presence of the second device.

11. The data sharing system of Concept 1, wherein the flicking or sliding gesture indicates first and second touchscreen inputs that indicate the first data and first target selections, respectively, the data sharing system further including or comprising:
a device identification module communicatively associated with the data sharing control module, the device identification module configured to identify the second device based on the first data and first target selections.

12. The data sharing system of Concept 1, further including or comprising:
a device identification module communicatively associated with the data sharing control module, the device identification module configured to identify an availability of the second device; and
a list generation module communicatively associated with the device identification module, the list generation module configured to generate an external device list and indicate the availability of the second device in the external device list in response to the identifying of the availability of the second device.

13. The data sharing system of Concept 1, further including or comprising:
a data path identification module communicatively associated with the data sharing control module, the data path identification module configured to identify a linear data path between the first and second devices; and
a device identification module communicatively associated with the data path identification module, the device identification module configured to identify an availability of the second device in response to the identifying of the linear data path.

14. The data sharing system of Concept 1, further including or comprising:
a first optic signal transceiver communicatively associated with the first device, a second optic signal transceiver being communicatively associated with the second device, the first optic signal transceiver configured to generate a first optic signal in response to at least one selection from among the first data and first target selections and transmit the first optic signal to the second optic signal transceiver along a linear signal path.

15. The data sharing system of Concept 14, wherein the second optic signal transceiver is configured to generate a second optic signal in response to receiving the first optic signal and transmit the second optic signal to the first optic signal transceiver along a linear signal path, the data sharing system further including or comprising:
a device identification module communicatively associated with the first optic signal transceiver, the device identification module configured to identify an availability of the second device in response to the second optic signal being received at the first optic signal transceiver.

16. The data sharing system of Concept 1, further including or comprising:
an optic signal transmitter communicatively associated with the first device, an optic signal receiver being communicatively associated with the second device, the optic signal transmitter configured to generate an optic signal in response to at least one selection from among the first data and first target selections and transmit the optic signal to the optic signal receiver along a linear signal path.

17. The data sharing system of Concept 16, further including or comprising:
a confirmation signal receiver communicatively associated with the first device, the optic signal receiver being configured to generate a confirmation signal in response to receiving the optic signal and transmit the confirmation signal to the confirmation signal receiver; and
a device identification module communicatively associated with the confirmation signal receiver, the device identification module configured to identify the first external display in response to the confirmation signal being received at the confirmation signal receiver.

18. The data sharing system of Concept 1, wherein the touchscreen is configured to detect first and second touchscreen inputs at first and second locations, respectively, on the touchscreen, the data sharing system further including or comprising:

a geometric ray identification module communicatively associated with the touchscreen, the geometric ray identification module configured to identify a first geometric ray based on the first and second locations; and a device selection module communicatively associated with the geometric ray identification module, the device selection module configured to determine that the second device is located along the first geometric ray to thereby select the second device.

19. The data sharing system of Concept 18, further including or comprising:

a spatial orientation identification module communicatively associated with the device selection module, the spatial orientation identification module configured to identify a spatial orientation of the touchscreen relative to a reference plane, and the geometric ray identification module further configured to identify the first geometric ray based on the first location, second location and spatial orientation.

20. The data sharing system of Concept 18, wherein the first and second touchscreen inputs result from the flicking or sliding gesture along the touchscreen.

21. The data sharing system of Concept 18, wherein the data sharing control module is further configured to enable a detection of a third touchscreen input at a third location on the touchscreen, the geometric ray identification module is further configured to identify a second geometric ray based on the first and third locations, and the device selection module is further configured to determine that a third device is located along the second geometric ray to thereby select the third device.

22. The data sharing system of Concept 21, wherein the first, second and third touchscreen inputs result from a spiral gesture along the touchscreen.

23. The data sharing system of Concept 1, further including or comprising:

a map generation module communicatively associated with the data sharing control module, the map generation module configured to generate a virtual environment map including or comprising a visual representation of the second device, and the data sharing control module being further configured to enable a display of the virtual environment map on the touchscreen, enable a detection of a touchscreen input at a location on the touchscreen, the location corresponding to the first graphical representation such that the touchscreen input indicates the first data selection, enable a flicking or sliding of the graphical representation toward the visual representation in response to the touchscreen input being received at the location, and cause the router to route the data set to the second device in response to the graphical representation being flicked or slid toward the visual representation.

24. The data sharing system of Concept 1, wherein the data sharing control module is further configured to access a second target selection of a third device and cause the router to route the data set to the third device in response to the first data and second target selections.

25. The data sharing system of Concept 24, further including or comprising:

a map generation module communicatively associated with the data sharing control module, the map generation module configured to generate a virtual environment map including or comprising a visual representation of the third device, and the data sharing control module being further configured to enable a display of the virtual environment map on the touchscreen and enable a detection of a touchscreen input at a location on the touchscreen, the location corresponding to the visual representation such that the touchscreen input indicates the second target selection.

26. The data sharing system of Concept 1, wherein the second device includes or comprises an external storage unit, the data sharing control module being further configured to cause the router to route the data set to the second device in response to the first data and first target selections such that the data set is stored in the external storage unit.

27. The data sharing system of Concept 1, wherein the data sharing control module is further configured to identify a local storage parameter associated with the data set and cause the router to route the data set to the second device from the first device based on the local storage parameter.

28. The data sharing system of Concept 27, wherein the data sharing control module is further configured to identify first and second wireless settings associated with the first and second devices, respectively, and cause the router to wirelessly route the data set to the second device from the first device based on the first and second wireless settings.

29. The data sharing system of Concept 1, wherein the data sharing control module is further configured to identify a remote storage parameter associated with the data set, identify a remote storage device associated with the remote storage parameter, and cause the router to route the data set to the second device from the remote storage device based on the remote storage parameter.

30. The data sharing system of Concept 1, wherein the data sharing control module is further configured to enable a display of an image of the second device on the touchscreen and enable a routing of the data set to the second device in response to a repositioning of the graphical representation toward the image on the touchscreen, the repositioning indicating the first target selection.

31. The data sharing system of Concept 30, further including or comprising:

a digital camera communicatively associated with the data sharing control module, the data sharing control module being further configured to enable a detection of a touching of a location on the touchscreen, the location corresponding to the graphical representation, activate the digital camera based on a duration of the touching of the location being longer than a predefined duration threshold, enable a generation of the image with the digital camera, and enable a display of the image on the touchscreen such that the second device is graphically identified as an available external device.

32. The data sharing system of Concept 1, wherein the data sharing control module is further configured to enable a display of an image of the second device on the touchscreen and enable a routing of the data set to the second device in response to a first touching of the image on the touchscreen, the first touching indicating the first target selection.

33. The data sharing system of Concept 32, further including or comprising:

a digital camera communicatively associated with the data sharing control module, the data sharing control module being further configured to enable a detection of a second touching of a location on the touchscreen, the location corresponding to the graphical representation, activate the digital camera based on a duration of the second touching of the location being longer than a predefined duration threshold, enable a generation of the image with the digital camera, and enable a display of the image on the touchscreen such that the second device is graphically identified as an available external device.

X. Tenth Exemplary Concept Group

1. A data sharing system including or comprising:
a first device including or comprising a first touchscreen;
a router; and
a data sharing control module communicatively associated with the first touchscreen and the router, the data sharing control module configured to enable a display of a first graphical representation associated with a first data set on the first touchscreen, enable a detection of a flicking or sliding gesture along the first touchscreen, the flicking or sliding gesture indicating a first data selection of the first graphical representation and a first target selection of a first external display, a second device including or comprising the first external display, and cause the router to wirelessly route the first data set to the second device in response to the first data and first target selections.

2. The data sharing system of Concept 1, wherein the data sharing control module is further configured to enable a detection of a touching of a location on the first touchscreen, the location corresponding to the first graphical representation, and determine that the first data set is to be routed to an external device based on a duration of the touching of the location being longer than a predefined duration threshold.

3. The data sharing system of Concept 1, wherein the data sharing control module is further configured to enable a detection of a touching of a location on the first touchscreen, the location corresponding to the first graphical representation, and determine that the first data set is to be routed to the second device based on a duration of the touching of the location being longer than a predefined duration threshold and based on the first target selection.

4. The data sharing system of Concept 1, wherein the first graphical representation includes or comprises a thumbnail image or icon representing the first data set.

5. The data sharing system of Concept 1, wherein the first data set includes or comprises a digital audio file, digital image file, digital video file or digital software application.

6. The data sharing system of Concept 1, further including or comprising:
a device identification module communicatively associated with the data sharing control module, the device identification module configured to identify the second device in response to the first data selection.

7. The data sharing system of Concept 1, further including or comprising:
a device identification module communicatively associated with the data sharing control module, the device identification module configured to identify the second device in response to the first target selection.

8. The data sharing system of Concept 1, further including or comprising:
a device identification module communicatively associated with the data sharing control module, the device identification module configured to optically identify the second device.

9. The data sharing system of Concept 1, further including or comprising:
a device identification module communicatively associated with the data sharing control module, the device identification module configured to identify the second device based on a proximity of the second device to the first device.

10. The data sharing system of Concept 1, further including or comprising:
a device identification module communicatively associated with the data sharing control module, the device identification module configured to identify the second device based on a network presence of the second device.

11. The data sharing system of Concept 1, wherein the flicking or sliding gesture indicates first and second touchscreen inputs that indicate the first data and first target selections, respectively, the data sharing system further including or comprising:
a device identification module communicatively associated with the data sharing control module, the device identification module configured to identify the second device based on the first data and first target selections.

12. The data sharing system of Concept 1, further including or comprising:
a device identification module communicatively associated with the data sharing control module, the device identification module configured to identify the second device and identify the first external display in response to the identifying of the second device; and
a list generation module communicatively associated with the device identification module, the list generation module configured to generate an external device list, and the list generation module further configured to indicate an availability of the first external display in the external device list in response to the identifying of the first external display.

13. The data sharing system of Concept 1, further including or comprising:
a data path identification module communicatively associated with the data sharing control module, the data path identification module configured to identify a linear data path between the first and second devices; and
a device identification module communicatively associated with the data path identification module, the device identification module configured to identify the first external display in response to the identifying of the linear data path.

14. The data sharing system of Concept 1, further including or comprising:
a first optic signal transceiver communicatively associated with the first device, a second optic signal transceiver being communicatively associated with the second device, the first optic signal transceiver configured to generate a first optic signal in response to at least one selection from among the first data and first target selections and transmit the first optic signal to the second optic signal transceiver along a linear signal path.

15. The data sharing system of Concept 14, wherein the second optic signal transceiver is configured to generate a second optic signal in response to receiving the first optic signal and transmit the second optic signal to the first optic signal transceiver along a linear signal path, the data sharing system further including or comprising:
a device identification module communicatively associated with the first optic signal transceiver, the device identification module configured to identify the first external display in response to the second optic signal being received at the first optic signal transceiver.

16. The data sharing system of Concept 1, further including or comprising:
an optic signal transmitter communicatively associated with the first device, an optic signal receiver being communicatively associated with the second device, the optic signal transmitter configured to generate an optic signal in response to at least one selection from among the first data and first target selections and transmit the optic signal to the optic signal receiver along a linear signal path.

17. The data sharing system of Concept 16, further including or comprising:

a confirmation signal receiver communicatively associated with the first device, the optic signal receiver being configured to generate a confirmation signal in response to receiving the optic signal and transmit the confirmation signal to the confirmation signal receiver; and a device identification module communicatively associated with the confirmation signal receiver, the device identification module configured to identify the first external display in response to the confirmation signal being received at the confirmation signal receiver.

18. The data sharing system of Concept 1, wherein the first touchscreen is configured to detect first and second touchscreen inputs at first and second locations, respectively, on the first touchscreen, the data sharing system further including or comprising:

a geometric ray identification module communicatively associated with the first touchscreen, the geometric ray identification module configured to identify a first geometric ray based on the first and second locations; and a device selection module communicatively associated with the geometric ray identification module, the device selection module configured to determine that the second device is located along the first geometric ray to thereby select the first external display.

19. The data sharing system of Concept 18, further including or comprising:

a spatial orientation identification module communicatively associated with the device selection module, the spatial orientation identification module configured to identify a spatial orientation of the first touchscreen relative to a reference plane, and the geometric ray identification module further configured to identify the first geometric ray based on the first location, second location and spatial orientation.

20. The data sharing system of Concept 18, wherein the first and second touchscreen inputs result from the flicking or sliding gesture along the first touchscreen.

21. The data sharing system of Concept 18, wherein the data sharing control module is further configured to enable a detection of a third touchscreen input at a third location on the first touchscreen, the geometric ray identification module is further configured to identify a second geometric ray based on the first and third locations, and the device selection module is further configured to determine that a third device including or comprising a second external display is located along the second geometric ray to thereby select the second external display.

22. The data sharing system of Concept 21, wherein the first, second and third touchscreen inputs result from a spiral gesture along the first touchscreen.

23. The data sharing system of Concept 1, further including or comprising:

a map generation module communicatively associated with the data sharing control module, the map generation module configured to generate a virtual environment map including or comprising a visual representation of the first external display, and the data sharing control module being further configured to enable a display of the virtual environment map on the first touchscreen, enable a detection of a touchscreen input at a location on the first touchscreen, the location corresponding to the first graphical representation such that the touchscreen input indicates the first data selection, enable a flicking or sliding of the first graphical representation toward the visual representation in response to the touchscreen input being received at the location, and cause the router to route the first data set to the second device in response to the first graphical representation being flicked or slid toward the visual representation.

24. The data sharing system of Concept 1, wherein the data sharing control module is further configured to access a second target selection of a second external display, a third device including or comprising the second external display, and cause the router to route the first data set to the third device in response to the first data and second target selections.

25. The data sharing system of Concept 24, further including or comprising:

a map generation module communicatively associated with the data sharing control module, the map generation module configured to generate a virtual environment map including or comprising a visual representation of the second external display, and the data sharing control module being further configured to enable a display of the virtual environment map on the first touchscreen and enable a detection of a touchscreen input at a location on the first touchscreen, the location corresponding to the visual representation such that the touchscreen input indicates the second target selection.

26. The data sharing system of Concept 1, wherein the data sharing control module is further configured to cause the router to route the first data set to the second device in response to the first data and first target selections such that a second graphical representation of, or associated with, the first data set is displayed on the first external display.

27. The data sharing system of Concept 26, wherein the data sharing control module is further configured to enable a display of the second graphical representation on the first touchscreen, enable a detection of a scrolling input associated with the first data set at the first touchscreen, and enable a scrolling of the second graphical representation on the first external display in response to the scrolling input.

28. The data sharing system of Concept 1, wherein the data sharing control module is further configured to identify a local storage parameter associated with the first data set and cause the router to route the first data set to the second device from the first device based on the local storage parameter.

29. The data sharing system of Concept 28, wherein the data sharing control module is further configured to identify first and second wireless settings associated with the first and second devices, respectively, and cause the router to wirelessly route the first data set to the second device from the first device based on the first and second wireless settings.

30. The data sharing system of Concept 1, wherein the data sharing control module is further configured to identify a remote storage parameter associated with the first data set, identify a remote storage device associated with the remote storage parameter, and cause the router to route the first data set to the second device from the remote storage device based on the remote storage parameter.

31. The data sharing system of Concept 1, wherein the data sharing control module is further configured to identify a first application associated with the first graphical representation in response to the first data selection and enable a launching of the first application on the first external display in response to the first data and first target selections.

32. The data sharing system of Concept 31, wherein the data sharing control module is further configured to enable a display of a second graphical representation associated with a second data set on the first touchscreen, enable a detection of a second data selection of the second graphical representation at the first touchscreen, identify a second application associated with the second graphical representation in response to the second data selection, enable a detection of a second target selection of the first touchscreen at the first touchscreen, and enable a launching of the second application on the first touchscreen in response to the second data and second target selections.

33. The data sharing system of Concept 32, wherein the data sharing control module is further configured to enable a detection of a touch input at a location on the first touchscreen, the location corresponding to the second graphical representation, and identify the second data and second target selections based on the detection of the touch input at the location.

34. The data sharing system of Concept 1, wherein the data sharing control module is further configured to identify an application associated with the first graphical representation in response to the first data selection, the application including or comprising first and second graphical user interfaces, and enable a launching of the first and second graphical user interfaces on the first touchscreen and the first external display, respectively, in response to the first data and first target selections.

35. The data sharing system of Concept 34, wherein the data sharing control module is further configured to access a data file having a data format associated with the application, the data file including or comprising a plurality of electronic pages, generate a plurality of images corresponding to the plurality of electronic pages, respectively, enable a display of a scrollable list of the plurality of images in the first graphical user interface, access a first selection of a first image from among the plurality of images within the scrollable list, identify a first electronic page from among the plurality of electronic pages that corresponds to the first image in response to the first selection, and enable a display of the first electronic page in the second graphical user interface.

36. The data sharing system of Concept 35, wherein the data sharing control module is further configured to access a second selection of a second image from among the plurality of images within the scrollable list, identify a second electronic page from among the plurality of electronic pages that corresponds to the second image in response to the second selection, and enable a display of the second electronic page in the second graphical user interface.

37. The data sharing system of Concept 35, wherein the data file corresponds to the first graphical representation.

38. The data sharing system of Concept 1, wherein the data sharing control module is further configured to enable a display of an image of the second device on the first touchscreen and enable a routing of the first data set to the second device in response to a repositioning of the first graphical representation toward the image on the first touchscreen, the repositioning indicating the first target selection.

39. The data sharing system of Concept 38, further including or comprising:
a digital camera communicatively associated with the data sharing control module, the data sharing control module being further configured to enable a detection of a touching of a location on the first touchscreen, the location corresponding to the first graphical representation, activate the digital camera based on a duration of the touching of the location being longer than a predefined duration threshold, enable a generation of the image with the digital camera, and enable a display of the image on the first touchscreen such that the second device is graphically identified as an available external device.

40. The data sharing system of Concept 1, wherein the data sharing control module is further configured to enable a display of an image of the second device on the first touchscreen and enable a routing of the first data set to the second device in response to a first touching of the image on the first touchscreen, the first touching indicating the first target selection.

41. The data sharing system of Concept 40, further including or comprising:
a digital camera communicatively associated with the data sharing control module, the data sharing control module being further configured to enable a detection of a second touching of a location on the first touchscreen, the location corresponding to the first graphical representation, activate the digital camera based on a duration of the second touching of the location being longer than a predefined duration threshold, enable a generation of the image with the digital camera, and enable a display of the image on the first touchscreen such that the second device is graphically identified as an available external device.

It is noted that reference throughout this specification to features, advantages, or similar language does not imply that all of the features and advantages should be or are in any single embodiment. Rather, language referring to the features and advantages may be understood to mean that a specific feature or advantage described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon the foregoing exemplary embodiments, it is noted that certain modifications, variations, and alternative constructions may be implemented without departing from the scope of the present technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A system comprising:
a touchscreen operable to detect a first touchscreen input indicating a data selection, a first device comprising the touchscreen;
a first non-transitory module configured to access a display parameter indicating a screen resolution, contrast ratio, or three-dimensional (3D) display capability associated with an external display, a second device comprising the external display, the first non-transitory module further configured to identify the external display as an available external display based on the display parameter;
a second non-transitory module configured to cause, based on the identifying of the external display as the available external display, the touchscreen to display an indication of an availability of the external display to thereby enable a user to select the second device, and
a wireless transmitter to wirelessly transmit a data set to the second device based on the data selection and a target selection, the target selection being indicated by a second touchscreen input.

2. The system of claim 1, wherein a transceiver is integrated with the first device, the transceiver capable of transmitting radio frequency (RF) transmissions in the RF range of approximately 2.4 to 2.48 gigahertz.

3. The system of claim 1, wherein the wireless transmitter is a router operable to wirelessly route, based on routing instructions, the data set from the first device to the second device.

4. A method comprising:
    detecting, with a touchscreen, a first touchscreen input indicating a data selection, a first device comprising the touchscreen;
    accessing a display parameter indicating a screen resolution, contrast ratio, or three-dimensional (3D) display capability associated with an external display, a second device comprising the external display;
    enabling, based on the display parameter, a target selection of the second device to be indicated by a second touchscreen input; and
    wirelessly transmitting, with a wireless transmitter, a data set to the second device based on the data selection and the target selection.

5. The method of claim 4, wherein a transceiver is integrated with the first device, the transceiver capable of transmitting radio frequency (RF) transmissions in the RF range of approximately 2.4 to 2.48 gigahertz.

6. A computer-readable medium storing a set of instructions that when executed cause a computer system to perform a method comprising:
    accessing a data selection indicated by a first touchscreen input detected by a touchscreen, a first device comprising the touchscreen;
    accessing a display parameter indicating a screen resolution, contrast ratio, or three-dimensional (3D) display capability associated with an external display, a second device comprising the external display;
    enabling, based on the display parameter, a target selection of the second device to be indicated by a second touchscreen input; and
    causing a wireless transmitter to wirelessly transmit a data set to the second device based on the data selection and the target selection.

7. The computer-readable medium of claim 6, wherein a transceiver is integrated with the first device, the transceiver capable of transmitting radio frequency (RF) transmissions in the RF range of approximately 2.4 to 2.48 gigahertz.

8. The computer-readable medium of claim 6, wherein the computer system comprises the computer-readable medium, the computer system further comprising:
    a bus coupled with the computer-readable medium; and
    one or more data processors coupled with the bus, the one or more data processors operable to execute the set of instructions to thereby cause the computer system to perform the method.

9. The computer-readable medium of claim 6, wherein the data set includes instructions for causing the second device to access an application from a local memory of the second device.

10. The computer-readable medium of claim 6, wherein the first and second touchscreen inputs are detected at first and second locations, respectively, on the touchscreen, the method further comprising:
    causing a first graphical user interface (GUI) and a second GUI to be launched on the touchscreen and on the external display, respectively, based on the first and second locations.

11. The computer-readable medium of claim 6, wherein the first touchscreen input is detected at a first location on the touchscreen, the method further comprising:
    identifying an application based on the first location;
    accessing a data file having a data format associated with the application, the data file comprising a plurality of electronic pages (EPs); and
    causing the touchscreen to display, in a GUI, a list of a plurality of images corresponding to the plurality of EPs, respectively.

12. The computer-readable medium of claim 6, wherein the method further comprises:
    causing the touchscreen to display, in a GUI, a list of a plurality of images;
    accessing a selection of an image from among the plurality of images within the list;
    identifying, based on the selection, an electronic page (EP) that corresponds to the image; and
    causing the EP to be displayed in a second GUI.

13. The computer-readable medium of claim 6, wherein the method further comprises:
    identifying, in response to the data selection, the second device as being an available device.

14. The computer-readable medium of claim 6, wherein the first and second touchscreen inputs are detected at first and second locations, respectively, on the touchscreen, the data selection is a first data selection, and the method further comprises:
    enabling a detection of a third touchscreen input at a third location on the touchscreen, the third touchscreen input indicating a second data selection;
    enabling a detection of a fourth touchscreen input at a fourth location on the touchscreen, the fourth touchscreen input indicating a target selection of the first device; and
    causing an application or program to be launched on the touchscreen based on the second data selection and the target selection of the first device, the third and fourth touchscreen inputs resulting from a gesture that is one of:
    a flicking or sliding gesture, and
    a multi-touch input.

15. The computer-readable medium of claim 6, wherein the method further comprises:
    causing, in response to the data selection and the target selection of the second device, an application or program to be launched on the external display.

16. The computer-readable medium of claim 6, wherein the enabling of the target selection of the second device comprises:
    identifying the external display as an available external display based on the display parameter; and
    causing, based on the identifying of the external display as the available external display, the touchscreen to display an indication of an availability of the external display in an external device list to thereby enable a user to select the second device from the external device list, and
    wherein the causing of the wireless transmitter to wirelessly transmit the data set to the second device based on the data selection and the target selection comprises:

causing of the wireless transmitter to wirelessly transmit the data set from the first device to the second device based on the data selection and the target selection.

* * * * *

UNITED STATES PATENT AND TRADEMARK OFFICE
CERTIFICATE OF CORRECTION

PATENT NO.          : 9,563,341 B2
APPLICATION NO.     : 14/985216
DATED               : February 7, 2017
INVENTOR(S)         : Jerry Alan Crandall It is certified that error appears in the above-identified patent and that said Letters Patent is hereby corrected as shown below:

In the Claims

Column 112 Lines 49-67 and Column 113 Lines 1-2 issued Claim 1 should read as follows:

1. A system comprising:
a touchscreen operable to detect a first touchscreen input indicating a data selection, a first device comprising the touchscreen;
a first non-transitory module configured to access a display parameter indicating a screen resolution, contrast ratio, or three-dimensional (3D) display capability associated with an external display, a second device comprising the external display, the first non-transitory module further configured to identify the external display as an available external display based on the display parameter;
a second non-transitory module configured to cause, based on the identifying of the external display as the available external display, the touchscreen to display an indication of an availability of the external display to thereby enable a user to select the second device, and
a wireless transmitter operable to wirelessly transmit a data set to the second device based on the data selection and a target selection, the target selection being indicated by a second touchscreen input.

Signed and Sealed this
Twenty-seventh Day of June, 2017

Joseph Matal
*Performing the Functions and Duties of the
Under Secretary of Commerce for Intellectual Property and
Director of the United States Patent and Trademark Office*